United States Patent
Ito et al.

(10) Patent No.: US 9,999,075 B2
(45) Date of Patent: Jun. 12, 2018

(54) PROGRAM EXECUTED IN TRANSMITTER, RECEIVER AND PROGRAM EXECUTED IN RECEIVER

(71) Applicants: NEC Communication Systems, Ltd., Minato-ku, Tokyo (JP); A School Corporation Kansai University, Suita-shi, Osaka (JP); Advanced Telecommunications Research Institute International, Soraku-gun, Kyoto (JP)

(72) Inventors: Tetsuya Ito, Minato-ku (JP); Yukihiro Hara, Minato-ku (JP); Masahito Iwai, Minato-ku (JP); Hiroyuki Yomo, Suita (JP); Takatoshi Kimura, Soraku-gun (JP); Akio Hasegawa, Soraku-gun (JP)

(73) Assignees: NEC COMMUNICATION SYSTEMS, LTD., Tokyo (JP); A SCHOOL CORPORATION KANSAI UNIVERSITY, Osaka (JP); ADVANCED TELECOMMUNICATIONS RESEARCH INSTITUTE INT, Kyoto (JP)

( * ) Notice: Subject to any disclaimer, the term of this patent is extended or adjusted under 35 U.S.C. 154(b) by 67 days.

(21) Appl. No.: 14/854,422

(22) Filed: Sep. 15, 2015

(65) Prior Publication Data
US 2016/0007380 A1    Jan. 7, 2016

Related U.S. Application Data

(63) Continuation of application No. PCT/JP2013/071055, filed on Aug. 2, 2013.

(30) Foreign Application Priority Data

Mar. 25, 2013 (JP) ................. 2013-062827

(51) Int. Cl.
*H04W 74/08* (2009.01)
*H04W 72/04* (2009.01)

(52) U.S. Cl.
CPC ... *H04W 74/0816* (2013.01); *H04W 72/0446* (2013.01)

(58) Field of Classification Search
CPC ............... H04W 72/0446; H04W 74/0816
See application file for complete search history.

(56) References Cited

U.S. PATENT DOCUMENTS

2007/0297451 A1* 12/2007 Kim .............. H04L 1/0041
    370/469
2013/0054850 A1*  2/2013 Co ............... H04L 12/4633
    710/105
2013/0329621 A1   12/2013 Kondo et al.

FOREIGN PATENT DOCUMENTS

JP    2012-175544 A     9/2012
JP    2012-175544    * 10/2012

* cited by examiner

*Primary Examiner* — Jae Y Lee
(74) *Attorney, Agent, or Firm* — Keating & Bennett, LLP

(57) ABSTRACT

A transmitter generates a header frame having a frame length indicating the beginning of data to be transmitted, data frames having frame lengths representing the data to be transmitted, and an end frame having a frame length indicating the end of the data to be transmitted. Then, for all of the header frame, data frames and end frame, the transmitter executes transmitting the kth frame when the wireless communication space is available, thereby transmitting the header frame, data frames and end frame, one after another, in accordance with the CSMA/CA scheme.

20 Claims, 70 Drawing Sheets

| BIT VALUE OF DATA | FRAME LENGTH ($\mu s$) |
|---|---|
| 0000 | 710 |
| 0001 | 740 |
| 0010 | 770 |
| 0011 | 800 |
| 0100 | 830 |
| 0101 | 860 |
| 0110 | 890 |
| 0111 | 920 |
| 1000 | 950 |
| 1001 | 980 |
| 1010 | 1010 |
| 1011 | 1040 |
| 1100 | 1070 |
| 1101 | 1100 |
| 1110 | 1130 |
| 1111 | 1160 |

TBL1

FIG. 6
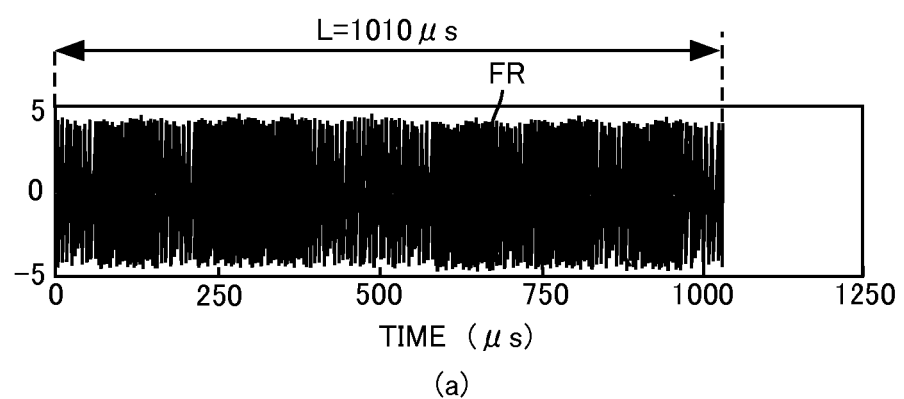
(a)
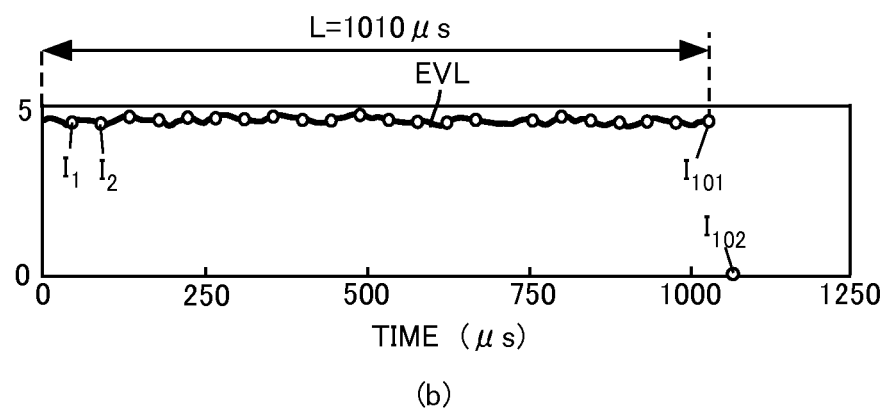
(b)

| NUMBER OF DATA FRAMES | FRAME LENGTH OF HEADER FRAME ($\mu$s) |
|---|---|
| 1 | 1190 |
| 2 | 1220 |
| 3 | 1250 |
| ⋮ | ⋮ |
| n | 1190+(n−1)×30 |

TBL2

WFR1-2

| HFR2 | DFR_1 | DFR_2 | DFR_3 | FFR1 |
| HEADER FRAME 1250$\mu$s | DATA FRAME 1010$\mu$s | DATA FRAME 800$\mu$s | DATA FRAME 1160$\mu$s | END FRAME 680$\mu$s |

FIG. 24

TBL3

| BIT VALUE OF DATA | FRAME LENGTH ($\mu$s) |
|---|---|
| 0000 | 725 |
| 0001 | 755 |
| 0010 | 785 |
| 0011 | 815 |
| 0100 | 845 |
| 0101 | 875 |
| 0110 | 905 |
| 0111 | 935 |
| 1000 | 965 |
| 1001 | 995 |
| 1010 | 1025 |
| 1011 | 1055 |
| 1100 | 1085 |
| 1101 | 1115 |
| 1110 | 1145 |
| 1111 | 1175 |

FIG. 25

TBL4

| BIT VALUE OF END INFORMATION | FRAME LENGTH ($\mu$s) |
|---|---|
| 00 | 500 |
| 01 | 530 |
| 10 | 560 |
| 11 | 590 |

FIG. 46

TBL5

| BIT VALUE OF DATA | FIRST FRAME LENGTH ($\mu$s) | SECOND FRAME LENGTH ($\mu$s) |
|---|---|---|
| 0000 | 725 | 1175 |
| 0001 | 755 | 1145 |
| 0010 | 785 | 1115 |
| 0011 | 815 | 1085 |
| 0100 | 845 | 1055 |
| 0101 | 875 | 1025 |
| 0110 | 905 | 995 |
| 0111 | 935 | 965 |
| 1000 | 965 | 935 |
| 1001 | 995 | 905 |
| 1010 | 1025 | 875 |
| 1011 | 1055 | 845 |
| 1100 | 1085 | 815 |
| 1101 | 1115 | 785 |
| 1110 | 1145 | 755 |
| 1111 | 1175 | 725 |

FIG. 47

TBL6

| NUMBER OF TRANSMISSIONS | FRAME LENGTH ($\mu$s) |
|---|---|
| 2 | 1200 |
| 3 | 1230 |
| 4 | 1260 |
| 5 | 1290 |

FIG. 57

I) ONE OF A, B AND C IS PLACED

A: NUMBER OF DATA FRAMES
B: ERROR VERIFICATION INFORMATION
C: NUMBER OF TRANSMISSIONS OF DATA FRAMES

TBL-7

| HEADER FRAME | A | -- | B | -- | C | -- |
|---|---|---|---|---|---|---|
| END FRAME | -- | A | -- | B | -- | C |

(a)

TBL-8

| HEADER FRAME | A | -- | -- | B | -- | -- | C | -- | -- |
|---|---|---|---|---|---|---|---|---|---|
| END FRAME | -- | A | -- | -- | B | -- | -- | C | -- |
| SUB-HEADER FRAME | -- | -- | A | -- | -- | B | -- | -- | C |

(b)

TBL-9

| HEADER FRAME | A | -- | -- | B | -- | -- | C | -- | -- |
|---|---|---|---|---|---|---|---|---|---|
| END FRAME | -- | A | -- | -- | B | -- | -- | C | -- |
| VERIFICATION FRAME | -- | -- | A | -- | -- | B | -- | -- | C |

(c)

TBL-10

| HEADER FRAME | A | -- | -- | -- | B | -- | -- | -- | C | -- | -- | -- |
|---|---|---|---|---|---|---|---|---|---|---|---|---|
| END FRAME | -- | A | -- | -- | -- | B | -- | -- | -- | C | -- | -- |
| SUB-HEADER FRAME | -- | -- | A | -- | -- | -- | B | -- | -- | -- | C | -- |
| VERIFICATION FRAME | -- | -- | -- | A | -- | -- | -- | B | -- | -- | -- | C |

II) TWO OF A, B AND C ARE PLACED

A: NUMBER OF DATA FRAMES
B: ERROR VERIFICATION INFORMATION
C: NUMBER OF TRANSMISSIONS OF DATA FRAMES

TBL-11

| HEADER FRAME | A+B | --- | A | B | B+C | --- | B | C | A+C | --- | A | C |
|---|---|---|---|---|---|---|---|---|---|---|---|---|
| END FRAME | --- | A+B | B | A | --- | B+C | C | B | --- | A+C | C | A |

(a)

TBL-12

| HEADER FRAME | A+B | --- | --- | A | B | A | B | -- | -- |
|---|---|---|---|---|---|---|---|---|---|
| END FRAME | --- | A+B | --- | B | A | -- | -- | A | B |
| SUB-HEADER FRAME | --- | --- | A+B | -- | -- | B | A | B | A |

(b)

TBL-13

| HEADER FRAME | A+C | --- | --- | A | C | A | C | -- | -- |
|---|---|---|---|---|---|---|---|---|---|
| END FRAME | --- | A+C | --- | C | A | -- | -- | A | C |
| SUB-HEADER FRAME | --- | --- | A+C | -- | -- | C | A | C | A |

(c)

TBL-14

| HEADER FRAME | B+C | --- | --- | B | C | B | C | -- | -- |
|---|---|---|---|---|---|---|---|---|---|
| END FRAME | --- | B+C | --- | C | B | -- | -- | B | C |
| SUB-HEADER FRAME | --- | --- | B+C | -- | -- | C | B | C | B |

(d)

TBL-15

| HEADER FRAME | A+B | --- | --- | A | B | A | B | -- | -- |
|---|---|---|---|---|---|---|---|---|---|
| END FRAME | --- | A+B | --- | B | A | -- | -- | A | B |
| VERIFICATION FRAME | --- | --- | A+B | -- | -- | B | A | B | A |

A: NUMBER OF DATA FRAMES
B: ERROR VERIFICATION INFORMATION
C: NUMBER OF TRANSMISSIONS OF DATA FRAMES

TBL-16

| | | | | | | | | | |
|---|---|---|---|---|---|---|---|---|---|
| HEADER FRAME | A+C | --- | --- | A | C | A | C | -- | -- |
| END FRAME | --- | A+C | --- | C | A | -- | -- | A | C |
| VERIFICATION FRAME | --- | --- | A+C | -- | -- | C | A | C | A |

(f)

TBL-17

| | | | | | | | | | |
|---|---|---|---|---|---|---|---|---|---|
| HEADER FRAME | B+C | --- | --- | B | C | B | C | -- | -- |
| END FRAME | --- | B+C | --- | C | B | -- | -- | B | C |
| VERIFICATION FRAME | --- | --- | B+C | -- | -- | C | B | C | B |

(g)

TBL-18

| | | | | | | | | | | | | | | | | |
|---|---|---|---|---|---|---|---|---|---|---|---|---|---|---|---|---|
| HEADER FRAME | A+B | --- | --- | --- | A | B | -- | -- | -- | -- | A | B | A | B | -- | -- |
| END FRAME | --- | A+B | --- | --- | B | A | A | B | -- | -- | -- | -- | -- | -- | A | B |
| SUB-HEADER FRAME | --- | --- | A+B | --- | -- | -- | B | A | A | B | B | A | -- | -- | -- | -- |
| VERIFICATION FRAME | --- | --- | --- | A+B | -- | -- | -- | -- | B | A | -- | -- | B | A | B | A |

(h)

TBL-19

| | | | | | | | | | | | | | | | | |
|---|---|---|---|---|---|---|---|---|---|---|---|---|---|---|---|---|
| HEADER FRAME | A+C | --- | --- | --- | A | C | -- | -- | -- | -- | A | C | A | C | -- | -- |
| END FRAME | --- | A+C | --- | --- | C | A | A | C | -- | -- | -- | -- | -- | -- | A | C |
| SUB-HEADER FRAME | --- | --- | A+C | --- | -- | -- | C | A | A | C | C | A | -- | -- | -- | -- |
| VERIFICATION FRAME | --- | --- | --- | A+C | -- | -- | -- | -- | C | A | -- | -- | C | A | C | A |

(i)

TBL-20

| | | | | | | | | | | | | | | | | |
|---|---|---|---|---|---|---|---|---|---|---|---|---|---|---|---|---|
| HEADER FRAME | B+C | --- | --- | --- | B | C | -- | -- | -- | -- | B | C | B | C | -- | -- |
| END FRAME | --- | B+C | --- | --- | C | B | B | C | -- | -- | -- | -- | -- | -- | B | C |
| SUB-HEADER FRAME | --- | --- | B+C | --- | -- | -- | C | B | B | C | C | B | -- | -- | -- | -- |
| VERIFICATION FRAME | --- | --- | --- | B+C | -- | -- | -- | -- | C | B | -- | -- | C | B | C | B |

III) ALL OF A, B AND C ARE PLACED

A: NUMBER OF DATA FRAMES
B: ERROR VERIFICATION INFORMATION
C: NUMBER OF TRANSMISSIONS OF DATA FRAMES

TBL-21

| HEADER FRAME | A+B+C | ------ | A+B | C | B+C | A | A+C | B |
|---|---|---|---|---|---|---|---|---|
| END FRAME | ------ | A+B+C | C | A+B | A | B+C | B | A+C |

(a)

TBL-22

| HEADER FRAME | A+B+C | ------ | ------ |
|---|---|---|---|
| END FRAME | ------ | A+B+C | ------ |
| SUB-HEADER FRAME | ------ | ------ | A+B+C |

(b)

TBL-23

| HEADER FRAME | A+B | C | B+C | A | A+C | B |
|---|---|---|---|---|---|---|
| END FRAME | C | A+B | A | B+C | B | A+C |
| SUB-HEADER FRAME | --- | --- | --- | --- | --- | --- |

(c)

TBL-24

| HEADER FRAME | --- | --- | --- | --- | --- | --- |
|---|---|---|---|---|---|---|
| END FRAME | A+B | C | B+C | A | A+C | B |
| SUB-HEADER FRAME | C | A+B | A | B+C | B | A+C |

(d)

TBL-25

| HEADER FRAME | A+B | C | B+C | A | A+C | B |
|---|---|---|---|---|---|---|
| END FRAME | --- | --- | --- | --- | --- | --- |
| SUB-HEADER FRAME | C | A+B | A | B+C | B | A+C |

(e)

TBL-26

| HEADER FRAME | A | A | B | B | C | C |
|---|---|---|---|---|---|---|
| END FRAME | B | C | A | C | A | B |
| SUB-HEADER FRAME | C | B | C | A | B | A |

A: NUMBER OF DATA FRAMES
B: ERROR VERIFICATION INFORMATION
C: NUMBER OF TRANSMISSIONS OF DATA FRAMES

TBL-27

| | | | |
|---|---|---|---|
| HEADER FRAME | A+B+C | ------ | ------ |
| END FRAME | ------ | A+B+C | ------ |
| VERIFICATION FRAME | ------ | ------ | A+B+C |

(g)

TBL-28

| | | | | | | |
|---|---|---|---|---|---|---|
| HEADER FRAME | A+B | C | B+C | A | A+C | B |
| END FRAME | C | A+B | A | B+C | B | A+C |
| VERIFICATION FRAME | --- | --- | --- | --- | --- | --- |

(h)

TBL-29

| | | | | | | |
|---|---|---|---|---|---|---|
| HEADER FRAME | --- | --- | --- | --- | --- | --- |
| END FRAME | A+B | C | B+C | A | A+C | B |
| VERIFICATION FRAME | C | A+B | A | B+C | B | A+C |

(i)

TBL-30

| | | | | | | |
|---|---|---|---|---|---|---|
| HEADER FRAME | A+B | C | B+C | A | A+C | B |
| END FRAME | --- | --- | --- | --- | --- | --- |
| VERIFICATION FRAME | C | A+B | A | B+C | B | A+C |

(j)

TBL-31

| | | | | | | |
|---|---|---|---|---|---|---|
| HEADER FRAME | A | A | B | B | C | C |
| END FRAME | B | C | A | C | A | B |
| VERIFICATION FRAME | C | B | C | A | B | A |

A: NUMBER OF DATA FRAMES
B: ERROR VERIFICATION INFORMATION
C: NUMBER OF TRANSMISSIONS OF DATA FRAMES

TBL-32

| | | | | |
|---|---|---|---|---|
| HEADER FRAME | A+B+C | ------ | ------ | ------ |
| END FRAME | ------ | A+B+C | ------ | ------ |
| SUB-HEADER FRAME | ------ | ------ | A+B+C | ------ |
| VERIFICATION FRAME | ------ | ------ | ------ | A+B+C |

(l)

TBL-33

| | | | | | | |
|---|---|---|---|---|---|---|
| HEADER FRAME | A+B | C | B+C | A | A+C | B |
| END FRAME | C | A+B | A | B+C | B | A+C |
| SUB-HEADER FRAME | --- | --- | --- | --- | --- | --- |
| VERIFICATION FRAME | --- | --- | --- | --- | --- | --- |

(m)

TBL-34

| | | | | | | |
|---|---|---|---|---|---|---|
| HEADER FRAME | --- | --- | --- | --- | --- | --- |
| END FRAME | A+B | C | B+C | A | A+C | B |
| SUB-HEADER FRAME | C | A+B | A | B+C | B | A+C |
| VERIFICATION FRAME | --- | --- | --- | --- | --- | --- |

(n)

TBL-35

| | | | | | | |
|---|---|---|---|---|---|---|
| HEADER FRAME | A+B | C | B+C | A | A+C | B |
| END FRAME | --- | --- | --- | --- | --- | --- |
| SUB-HEADER FRAME | C | A+B | A | B+C | B | A+C |
| VERIFICATION FRAME | --- | --- | --- | --- | --- | --- |

(o)

TBL-36

| | | | | | | |
|---|---|---|---|---|---|---|
| HEADER FRAME | --- | --- | --- | --- | --- | --- |
| END FRAME | --- | --- | --- | --- | --- | --- |
| SUB-HEADER FRAME | A+B | C | B+C | A | A+C | B |
| VERIFICATION FRAME | C | A+B | A | B+C | B | A+C |

A: NUMBER OF DATA FRAMES
B: ERROR VERIFICATION INFORMATION
C: NUMBER OF TRANSMISSIONS OF DATA FRAMES

TBL-37

| HEADER FRAME | C | A+B | A | B+C | B | A+C |
|---|---|---|---|---|---|---|
| END FRAME | --- | --- | --- | --- | --- | --- |
| SUB-HEADER FRAME | --- | --- | --- | --- | --- | --- |
| VERIFICATION FRAME | A+B | C | B+C | A | A+C | B |

(q)

TBL-38

| HEADER FRAME | --- | --- | --- | --- | --- | --- |
|---|---|---|---|---|---|---|
| END FRAME | A+B | C | B+C | A | A+C | B |
| SUB-HEADER FRAME | --- | --- | --- | --- | --- | --- |
| VERIFICATION FRAME | C | A+B | A | B+C | B | A+C |

(r)

TBL-39

| HEADER FRAME | A | A | B | B | C | C | -- | -- | -- | -- | -- | -- |
|---|---|---|---|---|---|---|---|---|---|---|---|---|
| END FRAME | B | C | A | C | A | B | A | A | B | B | C | C |
| SUB-HEADER FRAME | C | B | C | A | B | A | B | C | A | C | A | B |
| VERIFICATION FRAME | -- | -- | -- | -- | -- | -- | C | B | C | A | B | A |

(s)

TBL-40

| HEADER FRAME | A | A | B | B | C | C | A | A | B | B | C | C |
|---|---|---|---|---|---|---|---|---|---|---|---|---|
| END FRAME | -- | -- | -- | -- | -- | -- | B | C | A | C | A | B |
| SUB-HEADER FRAME | B | C | A | C | A | B | -- | -- | -- | -- | -- | -- |
| VERIFICATION FRAME | C | B | C | A | B | A | C | B | C | A | B | A |

TBL-41

| FRAME LENGTH (μs) | NUMBER OF DATA FRAMES | ERROR VERIFICATION INFORMATION | NUMBER OF TRANSMISSIONS OF DATA FRAMES |
|---|---|---|---|
| 500 | 001 | 00 | 001 |
| 520 | 001 | 00 | 010 |
| 540 | 001 | 00 | 011 |
| 560 | 001 | 00 | 100 |
| 580 | 001 | 00 | 101 |
| 600 | 001 | 00 | 110 |
| 620 | 001 | 00 | 111 |
| 640 | 001 | 01 | 001 |
| 660 | 001 | 01 | 010 |
| 680 | 001 | 01 | 011 |
| 700 | 001 | 01 | 100 |
| 720 | 001 | 01 | 101 |
| 740 | 001 | 01 | 110 |
| 760 | 001 | 01 | 111 |
| 780 | 001 | 10 | 001 |
| 800 | 001 | 10 | 010 |
| 820 | 001 | 10 | 011 |
| 840 | 001 | 10 | 100 |
| 860 | 001 | 10 | 101 |
| 880 | 001 | 10 | 110 |
| 900 | 001 | 10 | 111 |
| 920 | 001 | 11 | 001 |
| 940 | 001 | 11 | 010 |
| 960 | 001 | 11 | 011 |
| 980 | 001 | 11 | 100 |
| 1000 | 001 | 11 | 101 |
| 1020 | 001 | 11 | 110 |
| 1040 | 001 | 11 | 111 |
| 1060 | 010 | 00 | 001 |
| 1080 | 010 | 00 | 010 |
| 1100 | 010 | 00 | 011 |
| 1120 | 010 | 00 | 100 |
| 1140 | 010 | 00 | 101 |
| 1160 | 010 | 00 | 110 |
| 1180 | 010 | 00 | 111 |
| ⋮ | ⋮ | ⋮ | ⋮ |
| 4160 | 111 | 11 | 001 |
| 4180 | 111 | 11 | 010 |
| 4200 | 111 | 11 | 011 |
| 4220 | 111 | 11 | 100 |
| 4240 | 111 | 11 | 101 |
| 4260 | 111 | 11 | 110 |
| 4280 | 111 | 11 | 111 |

FIG. 69

TBL-42

| FRAME LENGTH (μs) | NUMBER OF DATA FRAMES | ERROR VERIFICATION INFORMATION |
|---|---|---|
| 505 | 001 | 00 |
| 525 | 001 | 01 |
| 545 | 001 | 10 |
| 565 | 001 | 11 |
| 585 | 010 | 00 |
| 605 | 010 | 01 |
| 625 | 010 | 10 |
| 645 | 010 | 11 |
| 665 | 011 | 00 |
| 685 | 011 | 01 |
| 705 | 011 | 10 |
| 725 | 011 | 11 |
| 745 | 100 | 00 |
| 765 | 100 | 01 |
| 785 | 100 | 10 |
| 805 | 100 | 11 |
| 825 | 101 | 00 |
| 845 | 101 | 01 |
| 865 | 101 | 10 |
| 885 | 101 | 11 |
| 905 | 110 | 00 |
| 925 | 110 | 01 |
| 945 | 110 | 10 |
| 965 | 110 | 11 |
| 985 | 111 | 00 |
| 1005 | 111 | 01 |
| 1025 | 111 | 10 |
| 1045 | 111 | 11 |

FIG. 70

TBL-43

| FRAME LENGTH (μs) | ERROR VERIFICATION INFORMATION | NUMBER OF TRANSMISSIONS OF DATA FRAMES |
|---|---|---|
| 510 | 00 | 001 |
| 530 | 01 | 001 |
| 550 | 10 | 001 |
| 570 | 11 | 001 |
| 590 | 00 | 010 |
| 610 | 01 | 010 |
| 630 | 10 | 010 |
| 650 | 11 | 010 |
| 670 | 00 | 011 |
| 690 | 01 | 011 |
| 710 | 10 | 011 |
| 730 | 11 | 011 |
| 750 | 00 | 100 |
| 770 | 01 | 100 |
| 790 | 10 | 100 |
| 810 | 11 | 100 |
| 830 | 00 | 101 |
| 850 | 01 | 101 |
| 870 | 10 | 101 |
| 890 | 11 | 101 |
| 910 | 00 | 110 |
| 930 | 01 | 110 |
| 950 | 10 | 110 |
| 970 | 11 | 110 |
| 990 | 00 | 111 |
| 1010 | 01 | 111 |
| 1030 | 10 | 111 |
| 1050 | 11 | 111 |

FIG. 71

TBL-44

| FRAME LENGTH (μs) | NUMBER OF DATA FRAMES | NUMBER OF TRANSMISSIONS OF DATA FRAMES |
|---|---|---|
| 515 | 001 | 001 |
| 535 | 001 | 010 |
| 555 | 001 | 011 |
| 575 | 001 | 100 |
| 595 | 001 | 101 |
| 615 | 001 | 110 |
| 635 | 001 | 111 |
| 655 | 010 | 001 |
| 675 | 010 | 010 |
| 695 | 010 | 011 |
| 715 | 010 | 100 |
| 735 | 010 | 101 |
| 755 | 010 | 110 |
| 775 | 010 | 111 |
| 795 | 011 | 001 |
| 815 | 011 | 010 |
| 835 | 011 | 011 |
| 855 | 011 | 100 |
| 875 | 011 | 101 |
| 895 | 011 | 110 |
| 915 | 011 | 111 |
| 935 | 100 | 001 |
| 955 | 100 | 010 |
| 975 | 100 | 011 |
| 995 | 100 | 100 |
| 1015 | 100 | 101 |
| 1035 | 100 | 110 |
| 1055 | 100 | 111 |
| 1075 | 101 | 001 |
| 1095 | 101 | 010 |
| 1115 | 101 | 011 |
| 1135 | 101 | 100 |
| 1155 | 101 | 101 |
| 1175 | 101 | 110 |
| 1195 | 101 | 111 |
| 1215 | 110 | 001 |
| 1235 | 110 | 010 |
| 1255 | 110 | 011 |
| 1275 | 110 | 100 |
| 1295 | 110 | 101 |
| 1315 | 110 | 110 |
| 1335 | 110 | 111 |
| 1355 | 111 | 001 |
| 1375 | 111 | 010 |
| 1395 | 111 | 011 |
| 1415 | 111 | 100 |
| 1435 | 111 | 101 |
| 1455 | 111 | 110 |
| 1475 | 111 | 111 |

FIG. 83

TBL-45

| BIT VALUE OF HEADER INFORMATION | FRAME LENGTH ($\mu$s) |
|---|---|
| 0000 | 715 |
| 0001 | 745 |
| 0010 | 775 |
| 0011 | 805 |
| 0100 | 835 |
| 0101 | 865 |
| 0110 | 895 |
| 0111 | 925 |
| 1000 | 955 |
| 1001 | 985 |
| 1010 | 1015 |
| 1011 | 1045 |
| 1100 | 1075 |
| 1101 | 1105 |
| 1110 | 1135 |
| 1111 | 1165 |

FIG. 84

TBL-46

| BIT VALUE OF DELIMITER INFORMATION | FRAME LENGTH ($\mu$ s) |
|---|---|
| 0000 | 720 |
| 0001 | 750 |
| 0010 | 780 |
| 0011 | 810 |
| 0100 | 840 |
| 0101 | 870 |
| 0110 | 900 |
| 0111 | 930 |
| 1000 | 960 |
| 1001 | 990 |
| 1010 | 1020 |
| 1011 | 1050 |
| 1100 | 1080 |
| 1101 | 1110 |
| 1110 | 1140 |
| 1111 | 1170 |

FIG. 85

TBL-47

| BIT VALUE OF CHECK FRAME | FRAME LENGTH ($\mu$s) |
| --- | --- |
| 0000 | 725 |
| 0001 | 755 |
| 0010 | 785 |
| 0011 | 815 |
| 0100 | 845 |
| 0101 | 875 |
| 0110 | 905 |
| 0111 | 935 |
| 1000 | 965 |
| 1001 | 995 |
| 1010 | 1025 |
| 1011 | 1055 |
| 1100 | 1085 |
| 1101 | 1115 |
| 1110 | 1145 |
| 1111 | 1175 |

US 9,999,075 B2

1

PROGRAM EXECUTED IN TRANSMITTER, RECEIVER AND PROGRAM EXECUTED IN RECEIVER

TECHNICAL FIELD

The present invention relates to a program executed in a transmitter, a receiver and a program executed in such a receiver.

BACKGROUND ART

There are receivers that comply with the Carrier Sense Multiple Access with Collision Avoidance (CSMA/CA) wireless standard and detects the frame length(s) of one or more radio frames each having a desired frame length, and decodes the detected frame length(s) into a bit sequence.

Further, receivers that receive radio frames while avoiding interference by an undesired radio frame are known (Patent Document 1). Such a receiver uses a plurality of radio frames, performs state transition by receiving a radio frame with a desired length, and, when it has received a plurality of radio frames with desired lengths and thus a transition condition is met, decodes the plurality of frame lengths into a bit sequence.

Patent Document 1: JP 2012-175544 A

DISCLOSURE OF THE INVENTION

When the decoding method described in Patent Document 1 is used, the CSMA/CA wireless standard defines frame lengths, and the amount of information that can be represented by one frame is limited, making it difficult to modulate a desired data sequence into frame lengths for transmission.

The present invention was made to solve this problem. An object of the present invention is to provide a program executed in a transmitter that can transmit desired data represented by frame lengths.

Another object of the present invention is to provide a receiver that can receive desired data represented by frame lengths.

Still another object of the present invention is to provide a program executed in a receiver that can receive desired data represented by frame lengths.

According to an embodiment of the present invention, a program for causing a computer to execute transmission of radio frames in a transmitter is a program for causing a computer to execute: a first step in which a generating circuitry generates a first radio frame having a frame length representing header information of data to be transmitted and a second radio frame having a frame length representing the data to be transmitted; and a second step in which a transmitting circuitry transmits the first radio frame and the second radio frame one after another in accordance with a wireless communication scheme to transmit a radio frame when a wireless communication space is available and to wait to transmit a radio frame when the wireless communication space is not available.

Further, a receiver according to an embodiment of the present invention includes a receiving circuitry, first and second detecting circuitry, and a decoding circuitry. The receiving circuitry sequentially receives a first radio frame having a frame length representing header information of data to be transmitted and a second radio frame having a frame length representing the data to be transmitted. The first detecting circuitry detects a beginning of the data to be transmitted based on a received radio wave of the first radio frame. When the beginning of the data to be transmitted is detected, the second detecting circuitry detects the frame length of the second radio frame based on a received radio wave of the second radio frame. The decoding circuitry decodes the detected frame length into a bit sequence representing the data to be transmitted.

Further, according to an embodiment of the present invention, a program for causing a computer to execute reception of radio frames in a receiver is a program for causing a computer to execute: a first step in which a receiving circuitry sequentially receives a first radio frame having a frame length representing header information of data to be transmitted and a second radio frame having a frame length representing the data to be transmitted; a second step in which a first detecting circuitry detects a beginning of the data to be transmitted based on a received wave of the first radio frame; a third step in which, when the beginning of the data to be transmitted is detected, a second detecting circuitry detects the frame length of the second radio frame based on a received radio wave of the second radio frame; and a fourth step in which a decoding circuitry decodes the detected frame length into a bit sequence representing the data to be transmitted.

The program executed in the transmitter according to an embodiment of the present invention causes a computer to execute sequentially transmitting a first radio frame having a frame length representing header information of data to be transmitted and a second radio frame having a frame length representing the data to be transmitted in accordance with a wireless communication scheme to transmit a radio frame when a wireless communication space is available and to wait to transmit a radio frame when the wireless communication space is not available. As a result, a receiving device can detect the beginning of the data to be transmitted based on the received radio wave of the first radio frame and decode the data to be transmitted based on the received radio wave of the second radio frame.

Thus, desired data may be represented by frame lengths and transmitted.

Further, the receiver according to an embodiment of the present invention sequentially receives first and second radio frames and detects the beginning of the data to be transmitted based on the received radio wave of the first radio frame; when it has detected the beginning of the data to be transmitted, it detects the frame length of the second radio frame based on the received radio wave of the second radio frame and decodes the detected frame length into a bit sequence representing the data to be transmitted.

Thus, desired data represented by frame lengths may be received.

Furthermore, the program executed in the receiver according to an embodiment of the present invention causes a computer to execute the operations that are the same as the operations of the above receiver.

Thus, desired data represented by frame lengths may be received.

BRIEF DESCRIPTION OF THE DRAWINGS

FIG. 6 conceptually illustrates envelope detection and bit determination.

FIG. 24 is a correspondence table illustrating another relationship between the bit value of data and frame length.

FIG. 25 is a correspondence table illustrating the relationship between the bit value of end information and frame length.

FIG. 46 is a correspondence table illustrating the relationship between the bit value of data, first frame length and second frame length.

FIG. 47 is a correspondence table illustrating the relationship between the number of transmissions, and frame length.

FIG. 57 illustrates relationships between information and frames where one of the number of the data frames DFR_1 to DFR_n, the verification information for verifying the data frames DFR_1 to DFR_n for an error and the number of transmissions of the data frames DFR_1 to DFR_n is placed thereon.

FIG. 58 illustrates relationships between information and frames where two of the number of the data frames DFR_1 to DFR_n, the verification information for verifying the data frames DFR_1 to DFR_n for an error and the number of transmissions of the data frames DFR_1 to DFR_n are placed thereon.

FIG. 59 illustrates relationships between information and frames where two of the number of the data frames DFR_1 to DFR_n, the verification information for verifying the data frames DFR_1 to DFR_n for an error and the number of transmissions of the data frames DFR_1 to DFR_n are placed thereon.

FIG. 60 illustrates relationships between information and frames where all of the number of the data frames DFR_1 to DFR_n, the verification information for verifying the data frames DFR_1 to DFR_n for an error and the number of transmissions of the data frames DFR_1 to DFR_n are placed thereon.

FIG. 61 illustrates relationships between information and frames where all of the number of the data frames DFR_1 to DFR_n, the verification information for verifying the data frames DFR_1 to DFR_n for an error and the number of transmissions of the data frames DFR_1 to DFR_n are placed threreon.

FIG. 62 illustrates relationships between information and frames where all of the number of the data frames DFR_1 to DFR_n, the verification information for verifying the data frames DFR_1 to DFR_n for an error and the number of transmissions of the data frames DFR_1 to DFR_n are placed thereon.

FIG. 63 illustrates relationships between information and frames where all of the number of the data frames DFR_1 to DFR_n, the verification information for verifying the data frames DFR_1 to DFR_n for an error and the number of transmissions of the data frames DFR_1 to DFR_n are placed thereon.

FIG. 64 is a correspondence table illustrating the correspondence between the number of the data frames DFR_1 to DFR_n, the error verification information and the number of transmissions of the data frames DFR_1 to DFR_n, and frame length.

FIG. 69 is a correspondence table illustrating the correspondence between the number of the data frames DFR_1 to DFR_n and error verification information, and frame length.

FIG. 70 is a correspondence table illustrating the relationship between the error verification information and the number of transmissions of the data frames DFR_1 to DFR_n, and frame length.

FIG. 71 is a correspondence table illustrating the correspondence between the number of the data frames DFR_1 to DFR_n and the number of transmissions of the data frames DFR_1 to DFR_n, and frame length.

FIG. 83 is a correspondence table illustrating the correspondence between the bit value of header information and frame length.

FIG. 84 is a correspondence table illustrating the correspondence between the bit value of delimiter information and frame length.

FIG. 85 is a correspondence table illustrating the correspondence between the bit value of a check frame and frame length.

BEST MODES FOR CARRYING OUT THE INVENTION

Figure 1:
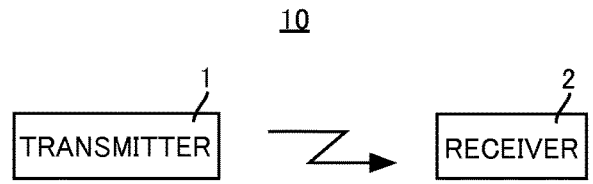
FIG. 1 is a schematic diagram of a wireless communication system according to Embodiment 1 of the present invention.

Embodiments of the present invention will be described in detail with reference to the drawings. The same or corresponding components in the drawings are labeled with the same characters, and their description will not be repeated.

[Embodiment 1]

FIG. 1 is a schematic diagram of a wireless communication system according to Embodiment 1 of the present invention. Referring to FIG. 1, the wireless communication system 10 according to Embodiment 1 of the present invention includes a transmitter 1 and a receiver 2.

The transmitter 1 and receiver 2 are positioned in a wireless communication space. The transmitter 1 generates, in the manner described below, a header frame HFR having a frame length indicating the beginning of data to be transmitted, data frames DFR having a plurality of frame lengths representing the data to be transmitted, and an end frame FFR having a frame length indicating the end of the data to be transmitted. Then, the transmitter 1 transmits the header frame HFR, data frame DFR and end frame FFR one after another in accordance with a wireless communication scheme to transmit radio frames when the wireless communication space is available and to wait to transmit radio frames when the wireless communication space is not available (i.e. CSMA/CA scheme).

The receiver 2 receives the header frame HFR, data frames DFR and end frame FFR transmitted by the transmitter 1, and, based on the received radio wave of the header frame HFR, data frames DFR and end frame FFR that have been received, detects the beginning of the data to be transmitted, decodes the receiving radio waves into bit sequences indicating the data to be transmitted, and detects the end of the data to be transmitted.

Figure 2:
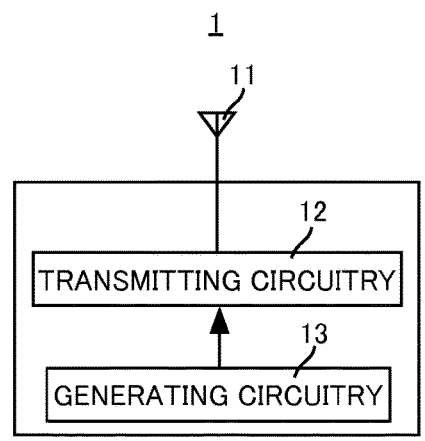
FIG. 2 is a schematic diagram of the transmitter of FIG. 1.

FIG. 2 is a schematic diagram of the transmitter 1 of FIG. 1. Referring to FIG. 2, the transmitter 1 includes an antenna 11, a transmitting circuitry 12 and a generating circuitry 13.

The generating circuitry 13 generates, in the manner described below, the header frame HFR, data frames DFR and end frame FFR described above. Then, the generating circuitry 13 outputs the header frame HFR, data frames DFR and end frame FFR that have been generated to the transmitting circuitry 12.

The transmitting circuitry 12 receives the header frame HFR, data frames DFR and end frame FFR from the generating circuitry 13. Then, the transmitting circuitry 12 transmits the header frame HFR, data frames DFR and end frame FFR one after another via the antenna 11 in accordance with the CSMA/CA scheme. In this case, the transmitting circuitry 12 transmits the header frame HFR, data frames DFR and end frame FFR at a frequency of 2.4 GHz, for example.

Figure 3:
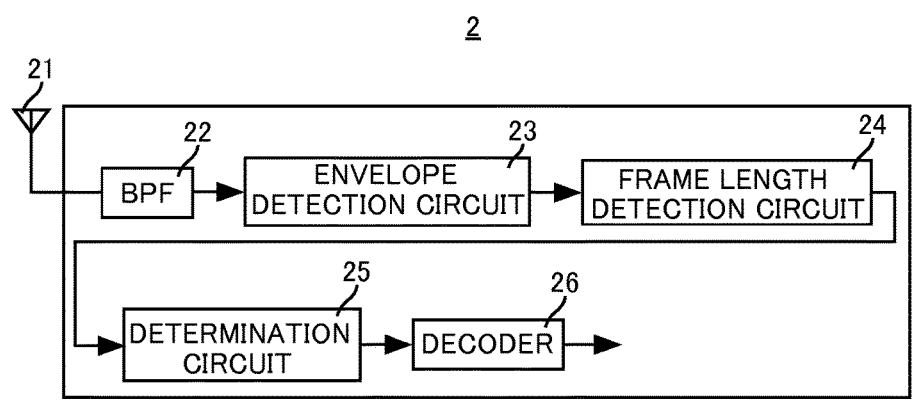
FIG. 3 is a schematic diagram of the receiver of FIG. 1.

FIG. 3 is a schematic diagram of the receiver 2 of FIG. 1. Referring to FIG. 3, the receiver 2 includes an antenna 21, a band pass filter (BPF) 22, an envelope detection circuit 23, a frame length detection circuit 24, a determination circuit 25, and a decoder 26.

The BPF 22 receives a radio frame transmitted by the transmitter 1 via the antenna 21, and outputs those portions of the received radio wave of the received radio frame that have the frequency of the radio frame to the envelope detection circuit 23.

The envelope detection circuit 23 receives the received radio wave from the BPF 22, detects the envelope of the received radio wave that has been received, and outputs the envelope to the frame length detection circuit 24.

The frame length detection circuit 24 receives the envelope from the envelope detection circuit 23 and, based on the received envelope, detects the frame length in the manner described below. Then, the frame length detection circuit 24 outputs the detected frame length to the determination circuit 25.

The determination circuit 25 receives the frame length from the frame length detection circuit 24 and determines whether the received frame length indicates the beginning of the data to be transmitted. If the determination circuit 25 determines that the frame length indicates the beginning of the data to be transmitted, it outputs the frame lengths that it subsequently receives from the frame length detection circuit 24 to the decoder 26. On the other hand, if the determination circuit 25 determines that the frame length does not indicate the beginning of the data to be transmitted, it discards the frame lengths that it subsequently receives from the frame length detection circuit 24.

When the decoder 26 receives a frame length from the determination circuit 25, it converts the frame length to a bit sequence in the manner described below, and outputs the converted bit sequence to the host system (not shown).

Figures 4, 5:
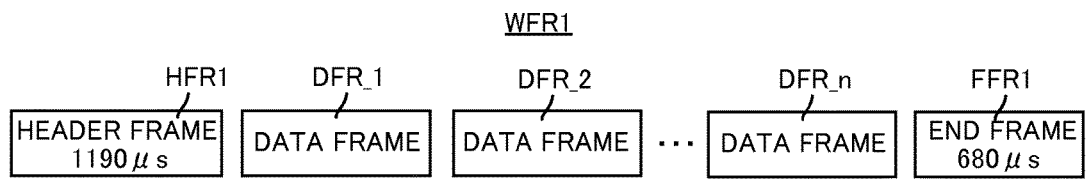
FIG. 4 conceptually illustrates a radio frame according to Embodiment 1.
FIG. 5 is a correspondence table illustrating the relationship between the bit value of data and frame length.

FIG. 4 conceptually illustrates a radio frame according to Embodiment 1. Referring to FIG. 4, a radio frame WFR1 according to Embodiment 1 includes a header frame HFR1, data frames DFR_1 to DFR_n (n is an integer not smaller than 1), and an end frame FFR1.

The header frame HFR1 has a frame length indicating the beginning of data to be transmitted (i.e. 1190 µs).

Each of the data frames DFR_1 to DFR_n has a frame length representing the data to be transmitted.

The end frame FFR1 has a frame length indicating the end of the data to be transmitted (i.e. 680 µs).

Then, the header frame HFR1, data frames DFR_1 to DFR_n and end frame FFR1 are transmitted one after another in accordance with the CSMA/CA scheme.

FIG. 5 is a correspondence table illustrating the relationship between the bit value of data and frame length. Referring to FIG. 5, the correspondence table TBL1 contains bit values of data and frame lengths. The bit values of data are associated with the frame lengths.

A bit value of data is represented by 4 bits, for example. The frame length of 710 µs is associated with the bit value of "0000", the frame length of 740 µs is associated with the bit value of "0001", the frame length of 770 µs is associated with the bit value of "0010", the frame length of 800 µs is associated with the bit value of "0011", the frame length of 830 µs is associated with the bit value of "0100", the frame length of 860 µs is associated with the bit value of "0101", the frame length of 890 µs is associated with the bit value of "0110", the frame length of 920 µs is associated with the bit value of "0111", the frame length of 950 µs is associated with the bit value of "1000", the frame length of 980 µs is associated with the bit value of "1001", the frame length of 1010 µs is associated with the bit value of "1010", the frame length of 1040 µs is associated with the bit value of "1011", the frame length of 1070 µs is associated with the bit value of "1100", the frame length of 1100 µs is associated with the bit value of "1101", the frame length of 1130 µs is associated with the bit value of "1110", and the frame length of 1160 µs is associated with the bit value of "1111".

Thus, the data to be transmitted is represented by frame lengths different from the frame lengths of the header frame HFR1 and end frame FFR1. In the correspondence table TBL1, the frame length increases by 30 µs as the bit value increases by "1".

The generating circuitry 13 of the transmitter 1 holds the correspondence table TBL1. Then, the generating circuitry 13 divides the bit sequence representing data to be transmitted into 4-bit values, and refers to the correspondence table TBL1 to convert the divided 4-bit values into frame lengths. Thereafter, the generating circuitry 13 generates data frames DFR_1 to DFR_n having the converted frame lengths.

For example, if the bit sequence representing data to be transmitted is "1101001010010001", the generating circuitry 13 divides the bit sequence of "1101001010010001" into the bit values of "1101", "0010", "1001", and "0001". Then, the generating circuitry 13 refers to the correspondence table TBL1 to convert the bit value of "1101" into the frame length of 1100 µs, convert the bit value of "0010" into the frame length of 770 µs, convert the bit value of "1001" into the frame length of 980 µs, and convert the bit value of "0001" into the frame length of 740 µs. Thereafter, the generating circuitry 13 generates the data frame DFR_1 having the frame length of 1100 µs, the data frame DFR_2 having the frame length of 770 µs, the data frame DFR_3 having the frame length of 980 µs, and the data frame DFR_4 having the frame length of 740 µs.

The decoder 26 of the receiver 2 holds the correspondence table TBL1. Then, the decoder 26 refers to the correspondence table TBL1 to convert frame lengths received from the determination circuit 25 into bit values to decode the frame lengths into bit sequences indicating data to be transmitted.

FIG. 6 conceptually illustrates envelope detection and bit determination. Referring to FIG. 6, the envelope detection circuit 23 of the receiver 2 receives a received radio wave FR of a radio frame WFR from the BPF 22. The radio frame WFR has a frame length L of 1010 (μs), for example (see (a)).

The envelope detection circuit 23 detects an envelope EVL of the radio frame WFR, and detects the detected envelope EVL at an interval of 10 μs to obtain the detected values $I_1$ to $I_{102}$ (see (b)).

Then, the envelope detection circuit 23 outputs the detected values $I_1$ to $I_{102}$ to the frame length detection circuit 24. The frame length detection circuit 24 determines the bit values of the detected values $I_1$ to $I_{102}$ and obtains the bit sequence "111 . . . 1110". The frame length detection circuit 24 then accumulates the bit value of "1" starting from the beginning of the bit sequence "111 . . . 1110" and obtains the cumulative value of "101". Since the bit value of the 102nd is "0", the frame length detection circuit 24 multiplies the cumulative value of "101" by the interval of 10 μs to obtain a frame length of 1010 μs, and resets the cumulative value of "101".

Figure 7:
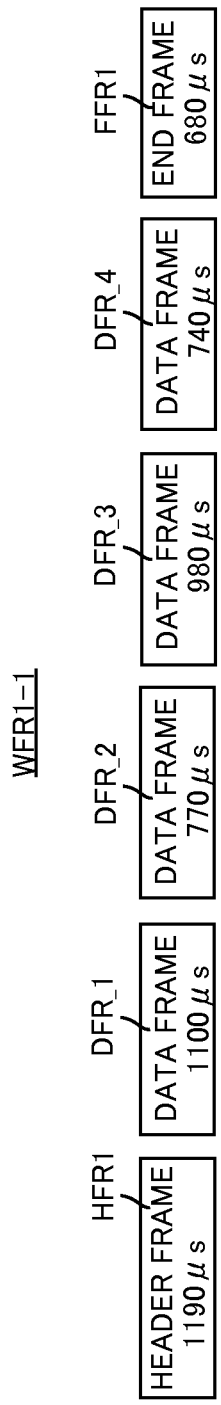
FIG. 7 illustrates a specific example of a radio frame according to Embodiment 1.

FIG. 7 illustrates a specific example of a radio frame WFR1 according to Embodiment 1. FIG. 7 illustrates a method of transmitting data to be transmitted in connection with an example where the bit sequence representing data to be transmitted is "1101001010010001".

Referring to FIG. 7, the generating circuitry 13 of the transmitter 1 generates a header frame HFR1 having the frame length of 1190 μs indicating the beginning of the data to be transmitted. Then, as described above, based on the bit sequence of "1101001010010001", the generating circuitry 13 generates the data frame DFR_1 having the frame length of 1100 μs, the data frame DFR_2 having the frame length of 770 μs, the data frame DFR_3 having the frame length of 980 μs, and the data frame DFR_4 having the frame length of 740 μs. Thereafter, the generating circuitry 13 generates the end frame FFR1 having the frame length of 680 μs indicating the end of the data to be transmitted.

Then, the generating circuitry 13 outputs the radio frame WFR1-1 including the header frame HFR1, four data frames DFR_1 to DFR_4 and end frame FFR1 to the transmitting circuitry 12.

The transmitting circuitry 12 receives from the generating circuitry 13 the radio frame WFR1-1 (i.e. the header frame HFR1, four data frames DFR_1 to DFR_4 and end frame FFR1).

Then, the transmitting circuitry 12 performs carrier sensing via the antenna 11 and, when the wireless communication space is available, transmits the header frame HFR1 constituting a part of the radio frame WFR1-1 via the antenna 11.

Thereafter, the transmitting circuitry 12 performs carrier sensing via the antenna 11 and, when the wireless communication space is available, transmits the data frame DFR_1 constituting a part of the radio frame WFR1-1 via the antenna 11.

Subsequently, in a similar manner, the transmitting circuitry 12 sequentially transmits the data frames DFR_2 to DFR_4 constituting parts of the radio frame WFR1-1 via the antenna 11 in accordance with the CSMA/CA scheme.

Finally, the transmitting circuitry 12 performs carrier sensing via the antenna 11 and, when the wireless communication space is available, transmits the end frame FFR1 constituting a part of the radio frame WFR1-1 via the antenna 11.

On the other hand, if the carrier sensing indicates that the wireless communication space is not available, the transmitting circuitry 12 waits to transmit the header frame HFR1, four data frames DFR_1 to DFR_4 and end frame FFR1.

Thus, the four data frames DFR_1 to DFR_4 having frame lengths representing data to be transmitted are sandwiched between the header frame HFR1 and end frame FFR1 and are transmitted in accordance with the CSMA/CA scheme.

The BPF 22 of the receiver 2 receives radio waves via the antenna 21 and outputs the portions of the received radio wave that have the frequency of the radio frame WFR1-1 to the envelope detection circuit 23.

Then, for each of portions of a plurality of the received radio waves received from the BPF 22, the envelope detection circuit 23 detects detection values in the manner described above, and outputs the plurality of detected values $I_1$ to $I_{120}$, $I_1$ to $I_{111}$, $I_1$ to $I_{78}$, $I_1$ to $I_{99}$, $I_1$ to $I_{75}$ and $I_1$ to $I_{69}$ that have been detected to the frame length detection circuit 24.

The frame length detection circuit 24 receives the plurality of detected values $I_1$ to $I_{120}$, $I_1$ to $I_{111}$, $I_1$ to $I_{78}$, $I_1$ to $I_{99}$, $I_1$ to $I_{75}$ and $I_1$ to $I_{69}$ from the envelope detection circuit 23.

Then, based on the detected values $I_1$ to $I_{120}$, the frame length detection circuit 24 detects the cumulative value of "119", multiplies the cumulative value of "119" by the interval of 10 μs to detect the frame length of 1190 μs, and, based on the detected value $I_{120}$="0", resets the cumulative value of "119".

Thereafter, based on the detected values $I_1$ to $I_{111}$, the frame length detection circuit 24 detects the cumulative value of "110", multiplies the cumulative value of "110" by the interval of 10 μs to detect the frame length of 1100 μs, and, based on the detected value $I_{111}$="0", resets the cumulative value of "110".

Subsequently, based on the detected values $I_1$ to $I_{78}$, $I_1$ to $I_{99}$, $I_1$ to $I_{75}$ and $I_1$ to $I_{69}$, the frame length detection circuit 24 similarly detects the frame lengths of 770 μs, 980 μs, 740 μs and 680 μs, respectively.

Then, the frame length detection circuit 24 successively provides the frame lengths of 1190 μs, 1100 μs, 770 μs, 980 μs, 740 μs and 680 μs to the determination circuit 25.

The determination circuit 25 sequentially receives from the frame length detection circuit 24 the frame lengths of 1190 μs, 1100 μs, 770 μs, 980 μs, 740 μs and 680 μs. When the determination circuit 25 has received the frame length of 1190 μs, senses the beginning of the data to be transmitted based on the frame length of 1190 μs, and sequentially outputs the received frame lengths of 1100 μs, 770 μs, 980 μs and 740 μs to the decoder 26.

Thereafter, the determination circuit 25 receives the frame length of 680 μs, and senses the end of the data to be transmitted based on the received frame length of 680 μs, and stops outputting frame lengths to the decoder 26.

The decoder 26 sequentially receives from the determination circuit 25 the frame lengths of 1100 μs, 770 μs, 980 μs and 740 μs, and refers to the correspondence table TBL1 to convert the received frame lengths of 1100 μs, 770 μs, 980 μs and 740 μs to the bit values of "1101", "0010", "1001" and "0001", respectively. Then, the decoder 26 outputs the data to be transmitted made of the bit sequence of "1101001010010001" to the host system.

Thus, the transmitter 1 sequentially transmits the header frame HFR1, four data frames DFR_1 to DFR_4 and end frame FFR1 in accordance with the CSMA/CA scheme. When the receiver 2 detects the frame length of the header frame HFR1 (i.e. 1190 μs) based on a received radio wave, it senses the beginning of the data to be transmitted and converts the four frame lengths of the four data frames DFR_1 to DFR_4 (i.e. 1100 μs, 770 μs, 980 μs and 740 μs) into bit values (i.e. "1101", "0010", "1001" and "0001"), thereby receiving the data to be transmitted (i.e. "1101001010010001"). Then, when the receiver 2 detects the frame length of the end frame FFR1 (i.e. 680 μs), it senses the end of the data to be transmitted and ends the reception process.

As such, it is only required that the transmitter 1 transmit the data frames DFR_1 to DFR_n having frame lengths representing data to be transmitted by sandwiching between the header frame HFR1 and end frame FFR1, and that the number of the data frames DFR_1 to DFR_n be not smaller than 1.

Therefore, desired data may be represented by frame lengths and transmitted. Also, desired data represented by frame lengths may be received.

Figure 8:
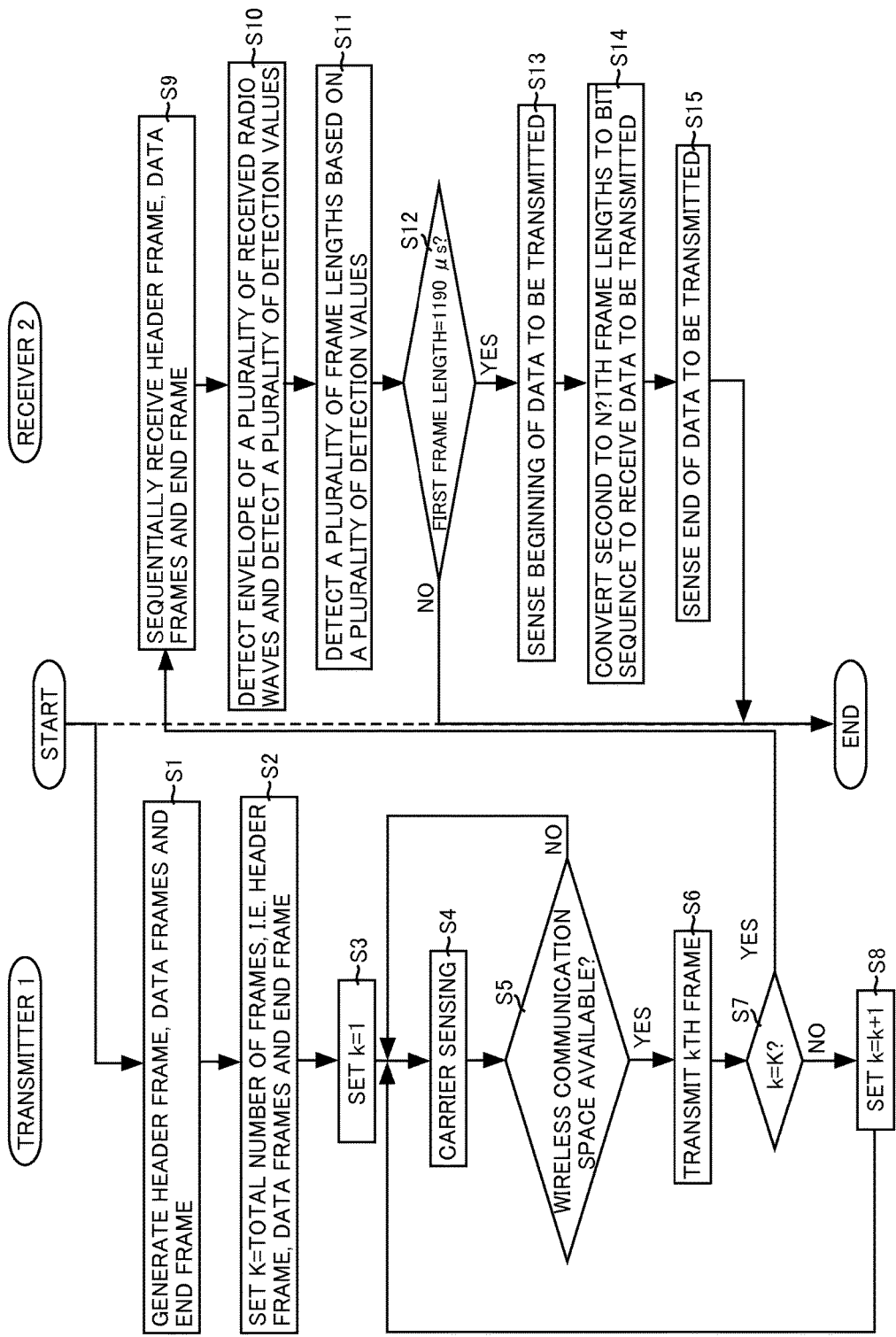
FIG. 8 is a flow chart illustrating the operation of the wireless communication system of FIG. 1.

FIG. 8 is a flow chart illustrating the operation of the wireless communication system 10 of FIG. 1. Referring to FIG. 8, when the operation of the wireless communication system 10 is started, the transmitter 1 generates the header frame HFR1, data frames DFR_1 to DFR_n and end frame FFR1 in the manner described above (step S1).

Then, the transmitter 1 sets K=total number of frames, i.e. header frame HFR1, data frames DFR_1 to DFR_n and end frame FFR1 (step S2), and sets k=1 (step S3).

Thereafter, the transmitter 1 performs carrier sensing (step S4), and, based on the results of the carrier sensing, determines whether the wireless communication space is available (step S5).

If it is determined that the wireless communication space is available, the transmitter 1 transmits the kth frame (step S6).

Thereafter, the transmitter 1 determines whether k=K (step S7). If it is determined at step S7 that k=K is not true, the transmitter 1 sets k=k+1 (step S8). Thereafter, the operation returns to step S4, and steps S4 to S8 described above are repeated until it is determined at step S7 that k=K.

Then, if it is determined at step S7 that k=K, the transmitter 1 stops transmitting radio frames.

The receiver 2 sequentially receives the header frame HFR1, data frames DFR_1 to DFR_n and end frame FFR1 (step S9).

Then, the receiver 2 detects the envelopes of a plurality of the received radio wave of the header frame HFR1, data frames DFR_1 to DFR_n and end frame FFR1 and detects a plurality of detected values (step S10).

Thereafter, the receiver 2 detects the plurality of frame lengths based on the plurality of detected values in the manner described above (step S11).

Then, the receiver 2 determines whether the first frame length is 1190 μs (step S12).

If it is determined at step S12 that the first frame length is 1190 μs, the receiver 2 senses the beginning of the data to be transmitted (step S13), and converts the second to N−1th frame lengths into bit sequences in the manner described above, thereby receiving the data to be transmitted (step S14).

Thereafter, based on the received radio wave of the end frame FFR1, the receiver 2 senses the end of the data to be transmitted (step S15).

Then, if it is determined at step S12 that the first frame length is not 1190 μs, or after step S15, the operation ends.

Thus, the transmitter 1 sequentially transmits the header frame HFR1, n data frames DFR_1 to DFR_n and the end frame FFR1 in accordance with the CSMA/CA scheme. When the receiver 2 detects the frame length of the header frame HFR1 based on a received radio wave, it senses the beginning of the data to be transmitted, and converts the n frame lengths of the n data frames DFR_1 to DFR_n into bit sequences, thereby receiving the data to be transmitted. Then, when the receiver 2 detects the frame length of the end frame FFR1, it senses the end of the data to be transmitted, and ends the reception process.

As a result, it is only required that the transmitter 1 transmit the data frames DFR_1 to DFR_n having frame lengths representing data to be transmitted by sandwiching between the header frame HFR1 and end frame FFR1, and that the number of the data frames DFR_1 to DFR_n be not smaller than 1.

Thus, desired data may be represented by frame lengths and be transmitted. Further, desired data represented by frame lengths may be received.

In the above descriptions, the correspondence table TBL1 associates frame lengths with bit values of data where the frame length increases by 30 μs as the bit value of data increases by "1"; however, Embodiment 1 is not limited to such an implementation, and the correspondence table TBL1 associates frame lengths with bit values of data where the frame length increases by a described length as the bit value of data increases by "1".

In the above descriptions, the header frame HFR1 has the frame length of 1190 μs; alternatively, in Embodiment 1, the header frame HFR1 may have any frame length that is different from the frame lengths associated with bit values of data.

Further, in the above descriptions, the end frame FFR1 has the frame length of 680 μs; alternatively, in Embodiment 1, the end frame FFR1 may have any frame length that is different from the frame lengths associated with bit values of data.

Thus, since the header frame HFR1, data frames DFR_1 to DFR_n and end frame FFR1 have different frame lengths each other, the receiver 2 can distinguish between the header frame HFR1, data frames DFR_1 to DFR_n and end frame FFR1 to receive these frames.

Further, in Embodiment 1, there may not be an end frame FFR1 because the receiver 2 can sense the beginning of data to be transmitted even if there is no the end frame FFR1.

Further, in Embodiment 1, the operations of the transmitter 1 and receiver 2 may be executed by a program. In this case, each of the transmitter 1 and receiver 2 includes a central processing unit (CPU), a read on memory (ROM) and a random access memory (RAM). In the transmitter 1, the ROM stores a program A including steps S1 to S8 shown in FIG. 8, and the CPU reads the program A from the ROM and executes it. Thus, the operation of the transmitter 1 is performed. In the receiver 2, the ROM stores a program B including steps S9 to S15 shown in FIG. 8, and the CPU reads the program B from the ROM and executes it. Thus, the operation of the receiver 2 is performed. Further, each of the ROMs of the transmitter 1 and receiver 2 corresponds to the storage medium storing a computer- (i.e. CPU-) readable program.

[Embodiment 2]

Figure 9:
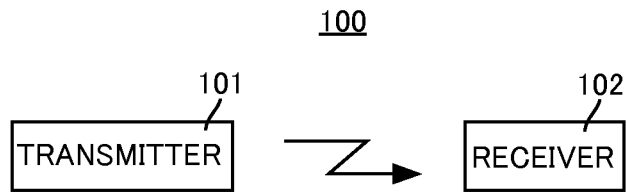
FIG. 9 is a schematic diagram of a wireless communication system according to Embodiment 2.

FIG. 9 is a schematic diagram of a wireless communication system according to Embodiment 2. Referring to FIG. 9, a wireless communication system 100 according to Embodiment 2 includes a transmitter 101 and a receiver 102.

The transmitter 101 and receiver 102 are positioned in a wireless communication space. The transmitter 101 generates a header frame HFR2 having a frame length representing the beginning of data to be transmitted and the number of data frames in the manner described below.

The transmitter 101 generates the data frames DFR_1 to DFR_n and the end frame FFR1 in the same manner as that in the transmitter 1.

When the wireless communication space is available, the transmitter 101 transmits the header frame HFR2, data frames DFR_1 to DFR_n and end frame FFR1 one after another in accordance with the CSMA/CA scheme.

The receiver 102 receives the header frame HFR2, data frames DFR_1 to DFR_n and end frame FFR1 transmitted by the transmitter 101. Then, based on the received radio wave of the header frame HFR2 that has been received, the receiver 102 detects the frame length representing the beginning of the data to be transmitted and the number of data frames. Otherwise, the receiver 102 performs the same functions as the receiver 1.

Figure 10:
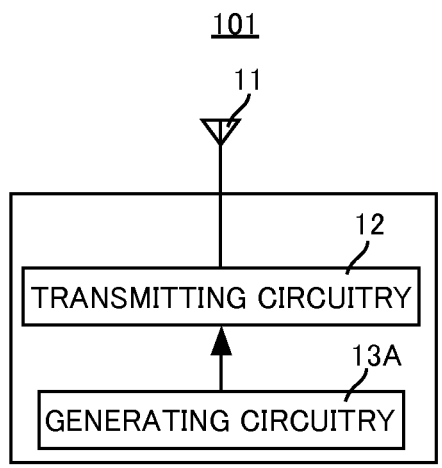
FIG. 10 is a schematic diagram of the transmitter of FIG. 9.

FIG. 10 is a schematic diagram of the transmitter 101 of FIG. 9. Referring to FIG. 10, the transmitter 101 is the same as the transmitter 1 except that the generating circuitry 13 of the transmitter 1 of FIG. 2 is replaced by a generating circuitry 13A.

The generating circuitry 13A generates data frames DFR_1 to DFR_n in the same manner as that in the generating circuitry 13. Then, the generating circuitry 13A detects the number n of the generated data frames DFR_1 to DFR_n, and generates a header frame HFR2 having a frame length indicating the beginning of the data to be transmitted and the number n of data frames in the manner described below. Otherwise, the generating circuitry 13A performs the same functions as the generating circuitry 13.

In the transmitter 101, the transmitting circuitry 12 receives from the generating circuitry 13A the header frame HFR2, data frames DFR_1 to DFR_n and end frame FFR1, and transmits the header frame HFR2, data frames DFR_1 to DFR_n and end frame FFR1 that have been received one after another in accordance with the CSMA/CA scheme.

Figure 11:
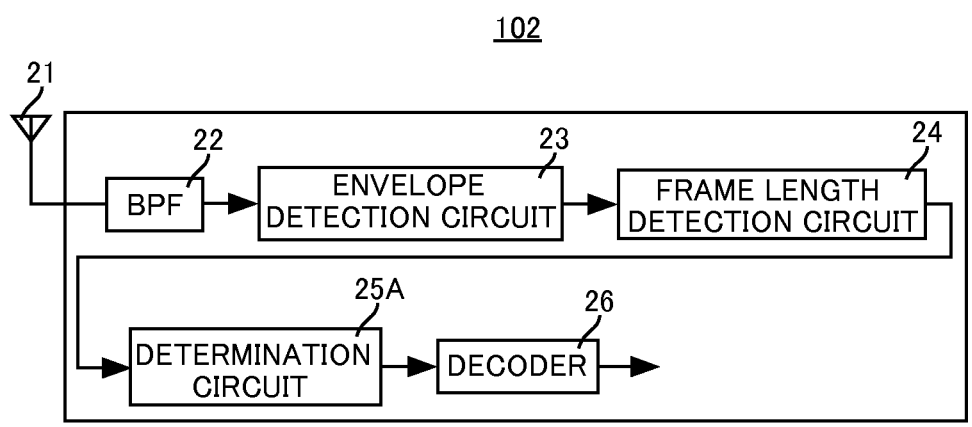
FIG. 11 is a schematic diagram of the receiver of FIG. 9.

FIG. 11 is a schematic diagram of the receiver 102 of FIG. 9. Referring to FIG. 11, the receiver 102 is the same as the receiver 2 except that the determination circuit 25 of the receiver 2 of FIG. 3 is replaced by a determination circuit 25A.

When the determination circuit 25A receives the first frame length from the frame length detection circuit 24, it determines whether the first frame length that has been received is equal to the frame length of the header frame HFR2.

If it is determined that the first frame length is equal to the frame length of the header frame HFR2, the determination circuit 25A senses the beginning of the data to be transmitted and detects the number n of the data frames DFR_1 to DFR_n. When the determination circuit 25A has detected the number n of the data frames DFR_1 to DFR_n, the determination circuit 25A outputs to the decoder 26 the number of frame lengths that matches the number n of the data frames DFR_1 to DFR_n that has been detected. Otherwise, the determination circuit 25A performs the same functions as the determination circuit 25.

Figures 12, 13:
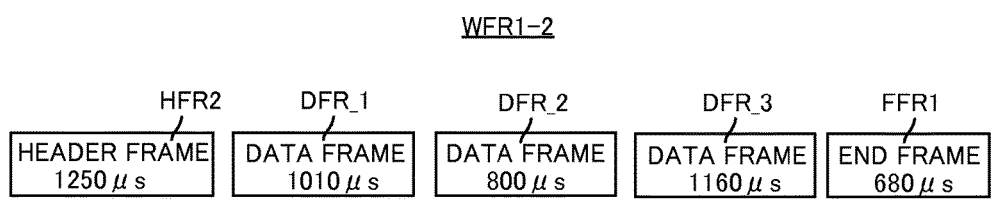
FIG. 12 is a correspondence table illustrating the relationship between the number of data frames and the frame length of a header frame.
FIG. 13 illustrates a specific example of a radio frame according to Embodiment 2.

FIG. 12 is a correspondence table illustrating the relationship between the number of data frames and the frame length of a header frame.

Referring to FIG. 12, the correspondence table TBL2 contains numbers of data frames and frame lengths of header frames. The numbers of data frames are associated with the frame lengths of header frames.

The frame length of 1190 μs is associated with the number of data frames of 1, the frame length of 1220 μs is associated with the number of data frames of 2, the frame length of 1250 μs is associated with the number of data frames of 3, and so forth, and the frame length of 1190+(n−1)×30 μs is associated with the number of data frames of n.

The frame length of 1190 μs indicates the beginning of data to be transmitted and that the number of data frames is 1; the frame length of 1220 μs indicates the beginning of data to be transmitted and that the number of data frames is 2; the frame length of 1250 μs indicates the beginning of data to be transmitted and that the number of data frames is 3; and so forth; and the frame length of 1190+(n−1)×30 μs indicates the beginning of data to be transmitted and that the number of data frames is n.

The generating circuitry 13A of the transmitter 101 holds the correspondence tables TBL1 and TBL2. In the same manner as that in the generating circuitry 13, the generating circuitry 13A generates data frames DFR_1 to DFR_n, and detects the number n of the generated data frames DFR_1 to DFR_n.

Then, the generating circuitry 13A refers to the correspondence table TBL2 and detects the frame length corresponding to the detected number n, and generates a header frame HFR2 having the detected frame length.

The determination circuit 25A of the receiver 102 holds the correspondence table TBL2. The determination circuit 25A refers to the correspondence table TBL2 and detects the number n of data frames corresponding to the first frame length. Then, the determination circuit 25A outputs the number of frame lengths that is equal to the detected number n to the decoder 26.

FIG. 13 illustrates a specific example of a radio frame according to Embodiment 2. FIG. 13 illustrates how data to be transmitted is transmitted in an example where the bit sequence representing the data to be transmitted is "101000111111".

Referring to FIG. 13, the generating circuitry 13A of the transmitter 101 divides the bit sequence of "101000111111" representing the data to be transmitted into the bit values of "1010", "0011", and "1111". Then, the generating circuitry 13A refers to the correspondence table TBL1 to convert the bit value of "1010" into the frame length of 1010 μs, convert the bit value of "0011" into the frame length of 800 μs, and convert the bit value of "1111" into the frame length of 1160 μs.

Then, the generating circuitry 13A generates a data frame DFR_1 having the frame length of 1010 μs, a data frame DFR_2 having the frame length of 800 μs, and a data frame DFR_3 having the frame length of 1160 μs.

Then, the generating circuitry 13A detects the number of the generated data frames DFR_1 to DFR_3 (i.e. 3).

Thereafter, the generating circuitry 13A refers to the correspondence table TBL2 to detect the frame length of 1250 μs corresponding to that number (i.e. 3), and generates a header frame HFR2 having the detected frame length of 1250 μs.

Finally, the generating circuitry 13A generates the end frame FFR1 having the frame length of 680 μs indicating the end of the data to be transmitted.

Then, the generating circuitry 13A outputs the radio frame WFR1-2 including the header frame HFR2, three data frames DFR_1 to DFR_3 and end frame FFR1 to the transmitting circuitry 12.

The transmitting circuitry 12 receives from the generating circuitry 13A the radio frame WFR1-2 (i.e. the header frame HFR2, three data frames DFR_1 to DFR_3 and end frame FFR1).

Then, the transmitting circuitry 12 transmits the header frame HFR2, three data frames DFR_1 to DFR_3 and end frame FFR1 constituting the radio frame WFR1-2 via the antenna 11 in accordance with the CSMA/CA scheme.

The BPF 22 of the receiver 102 receives a radio wave via the antenna 21 and outputs a plurality of reception radio waves that have the frequency of the radio frame WFR1-2 in the received radio waves to the envelope detection circuit 23.

Then, the envelope detection circuit 23 detects detection values for each of the plurality of reception radio waves received from the BPF 22 in the manner described above and outputs the detected detection values $I_1$ to $I_{126}$, $I_1$ to $I_{102}$, $I_1$ to $I_{81}$, $I_1$ to $I_{117}$ and $I_1$ to $I_{69}$ to the frame length detection circuit 24.

The frame length detection circuit 24 receives the detection values $I_1$ to $I_{126}$, $I_1$ to $I_{102}$, $I_1$ to $I_{81}$, $I_1$ to $I_{117}$ and $I_1$ to $I_{69}$ from the envelope detection circuit 23.

Then, based on the detection d values $I_1$ to $I_{126}$, $I_1$ to $I_{102}$, $I_1$ to $I_{81}$, $I_1$ to $I_{117}$ and $I_1$ to $I_{69}$, the frame length detection circuit 24 detects the frame lengths of 1250 μs, 1010 μs, 800 μs, 1160 μs and 680 μs, respectively, in the manner described above.

Then, the frame length detection circuit 24 sequentially outputs the frame lengths of 1250 μs, 1010 μs, 800 μs, 1160 μs and 680 μs to the determination circuit 25A.

The determination circuit 25A sequentially receives the frame lengths of 1250 μs, 1010 μs, 800 μs, 1160 μs and 680 μs from the frame length detection circuit 24. When the determination circuit 25A has received the frame length of 1250 μs, it refers to the correspondence table TBL2 and, based on the frame length of 1250 μs, detects the beginning of the data to be transmitted and detects the number of data frames, i.e. 3. Thereafter, the determination circuit 25A sequentially outputs the three frame lengths, i.e. frame lengths of 1010 μs, 800 μs and 1160 μs that it subsequently receives to the decoder 26.

Finally, the determination circuit 25A receives the frame length of 680 μs and, based on the received frame length of 680 μs, detects the end of the data to be transmitted and stops outputting frame lengths to the decoder 26.

The decoder 26 sequentially receives the three frame lengths of 1010 μs, 800 μs and 1160 μs from the determination circuit 25A, and refers to the correspondence table TBL1 to convert the received frame lengths of 1010 μs, 800 μs and 1160 μs to the bit values of "1010", "0011" and "1111", respectively. Then, the decoder 26 outputs the data to be transmitted composed of the bit sequence of "101000111111" to the host system.

Thus, the transmitter 101 sequentially transmits the header frame HFR2, three data frames DFR_1 to DFR_3 and end frame FFR1 in accordance with the CSMA/CA scheme. When the receiver 102 detects the frame length of the header frame HFR2 (i.e. 1250 μs) based on the received radio wave, it senses the beginning of the data to be transmitted based on the frame length of 1250 μs, and it detects the number of data frames, i.e. 3, and converts the three frame lengths of the three data frames DFR_1 to DFR_3 (i.e. 1010 μs, 800 μs and 1160 μs) to the bit values (i.e. "1010", "0011" and "1111") to receive the data to be transmitted (i.e. "101000111111"). When the receiver 102 detects the frame length of the end frame FFR1 (i.e. 680 μs), it senses the end of the data to be transmitted and ends the reception process.

As a result, when the determination circuit 25A of the receiver 102 has detected the beginning of the data to be transmitted and the number of data frames, it outputs the number of frame lengths that is equal to the detected number to the decoder 26. When the determination circuit 25A has received from the frame length detection circuit 24 a number of frame lengths that is different from the number of data frames, it discards the received frame lengths.

Therefore, it is possible to prevent a frame from being interrupted or prevent a frame from being omitted.

Figure 14:
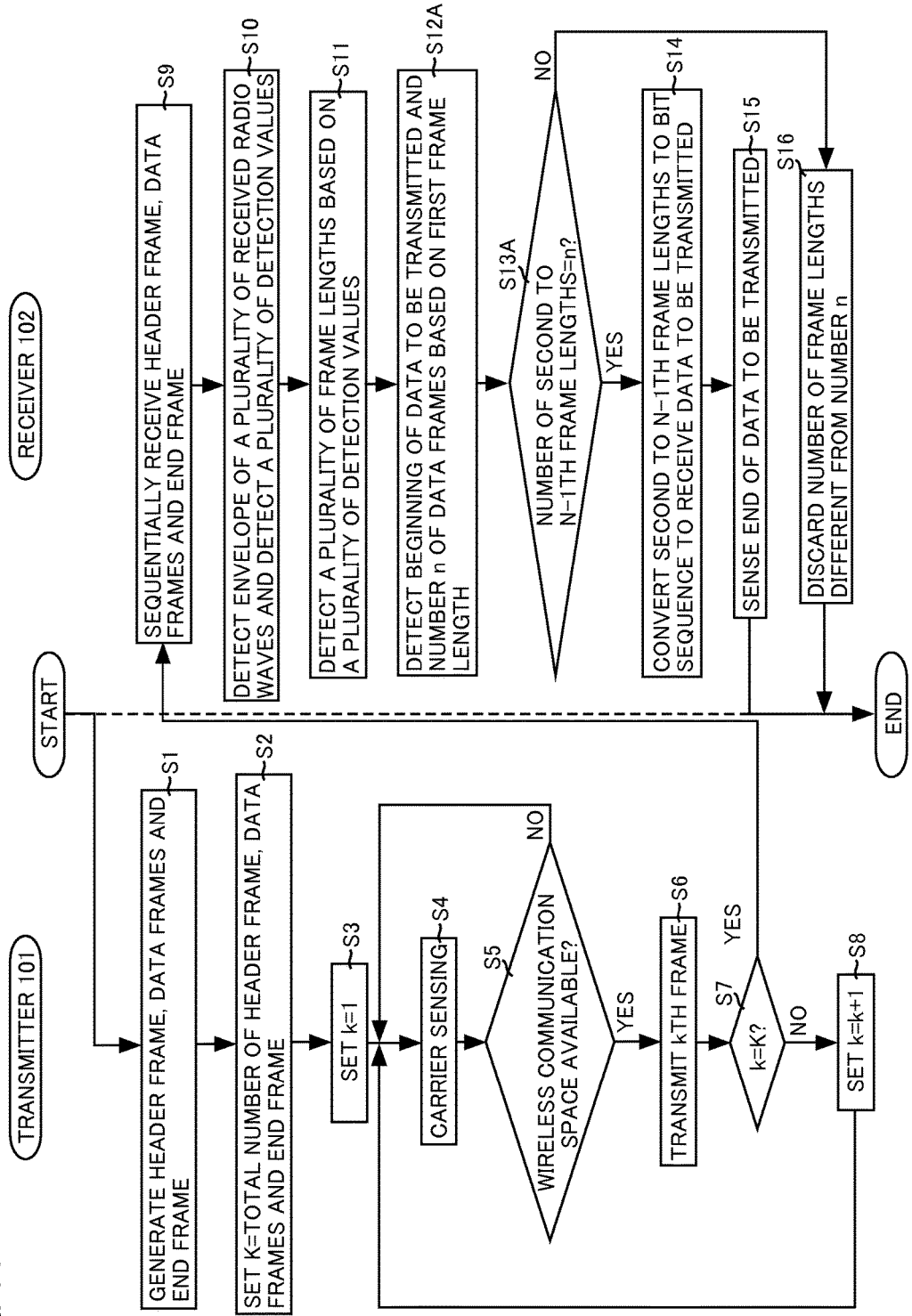
FIG. 14 is a flow chart illustrating the operation of the wireless communication system of FIG. 9.

FIG. 14 is a flow chart illustrating the operation of the wireless communication system 100 of FIG. 9. The flow chart of FIG. 14 is the same as the flow chart of FIG. 8 except that steps S12 and S13 of the flow chart of FIG. 8 are replaced by steps S12A and S13A, respectively, and step S16 is added.

Referring to FIG. 14, when the operation of the wireless communication system 100 is started, the transmitter 101 sequentially performs steps S1 to S8 described above. At step S1, the transmitter 101 generates data frames DFR_1 to DFR_n and, after detecting the number n of the generated data frames DFR_1 to DFR_n, generates a header frame HFR2 based on the detected number n and the correspondence table TBL2.

The receiver 102 sequentially executes steps S9 to step S11 described above. Then, after step S11, based on the first frame length, the receiver 102 detects the beginning of the data to be transmitted and the number n of data frames in the manner described above (step S12A).

Then, the receiver 102 determines whether the number of the frame lengths from the second one to the N−1th one is equal to the number n (step S13A).

If it is determined at step S13A that the number of the frame lengths from the second one to the N−1th one is equal to the number n, the receiver 102 sequentially executes steps S14 and S15 described above.

On the other hand, if it is determined at step S13A that the number of the frame lengths from the second one to the N−1th one is not equal to the number n, the receiver 102 discards the number of frame lengths that is different from the number n (step S16).

After step S15 or step S16, the operation ends.

Thus, in Embodiment 2, the transmitter 101 transmits the header frame HFR2 that has a frame length that represents the number of data frames. The receiver 102 detects the number n of data frames and, if the number of frame lengths from the second one to the N−1th one is equal to the number n, converts the second to N−1th frame lengths to bit sequences, thereby receiving the data to be transmitted. If the number of frame lengths from the second one to the N−1th one is not equal to the number n, the receiver 102 discards the number of frame lengths that is different from the number n.

Therefore, it is possible to prevent a frame from being interrupted data or prevent a frame from being omitted.

In the correspondence table TBL2, the frame length of a header frame increases by 30 μs from 1190 μs to 1190+(n−1)×30 μs as the number of data frames increases; however, Embodiment 2 is not limited to such an implementation, and the frame length of a header frame may increase by any interval as the number of data frames increases as long as the frame length is different from the frame lengths of the data frames DFR_1 to DFR_n.

Further, in Embodiment 2, the operations of the transmitter 101 and receiver 102 may be carried out by a program. In this case, each of the transmitter 101 and receiver 102 includes a CPU, a ROM and a RAM. In the transmitter 101, the ROM stores the program A including steps S1 to S8 shown in FIG. 14, and the CPU reads the program A from the ROM and executes it. Thus, the operation of the transmitter 101 is performed. In the receiver 102, the ROM stores a program C including steps S9 to S11, S12A, S13A and S14 to S16 shown in FIG. 14, and the CPU reads the program C from the ROM and executes it. Thus, the operation of the receiver 102 is performed. Further, each of the ROMs of the transmitter 101 and receiver 102 corresponds to the storage medium storing a computer- (i.e. CPU-) readable program.

Otherwise, the description of Embodiment 2 is the same as that of Embodiment 1.

[Embodiment 3]

Figure 15:
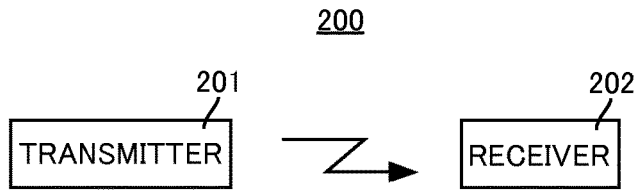
FIG. 15 is a schematic diagram of a wireless communication system according to Embodiment 3.

FIG. 15 is a schematic diagram of a wireless communication system according to Embodiment 3. Referring to FIG. 15, the wireless communication system 200 according to Embodiment 3 includes a transmitter 201 and a receiver 202.

The transmitter 201 and receiver 202 are positioned in a wireless communication space. The transmitter 201 generates, in the manner described below, sub-header frames SHFR_1 to SHFR_m (m is an integer not smaller than 1) that are located at a desired interval along the data frames DFR_1 to DFR_n and have a frame length that indicates a delimiter within the sequence of the data frames DFR_1 to DFR_n. Each of the sub-header frames SHFR_1 to SHFR_m is also referred to as "delimiter frame".

The transmitter 201 generates a header frame HFR1, data frames DFR_1 to DFR_n and end frame FFR1 in the same manner as that in the transmitter 1.

Then, the transmitter 201 transmits the header frame HFR1, data frames DFR_1 and DFR_2, sub-header frame SHFR_1, data frames DFR_3 and DFR_4, . . . sub-header frame SHFR_m, data frames DFR_n-1 and DFR_n, and end frame FFR1 one after another in accordance with the CSMA/CA scheme.

The receiver 202 receives the header frame HFR1, data frames DFR_1 and DFR_2, sub-header frame SHFR_1, data frames DFR_3 and DFR_4, . . . sub-header frame SHFR_m, data frames DFR_n-1 and DFR_n, and end frame FFR1 transmitted by the transmitter 201. Then, based on the received radio wave of the received sub-header frames SHFR_1 to SHFR_m, the receiver 202 detects the frame length that indicates the delimiter inserted into the sequence of the data frames DFR_1 to DFR_n. Otherwise, the receiver 202 performs the same functions as the receiver 1.

Figure 16:
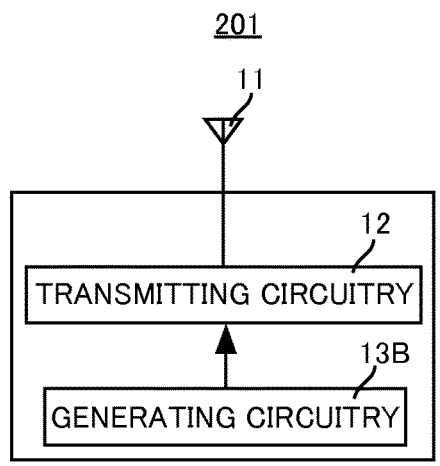
FIG. 16 is a schematic diagram of the transmitter of FIG. 15.

FIG. 16 is a schematic diagram of the transmitter 201 of FIG. 15. Referring to FIG. 16, the transmitter 201 is the same as the transmitter 1 except that the generating circuitry 13 of the transmitter 1 of FIG. 2 is replaced by the generating circuitry 13B.

The generating circuitry 13B generates the sub-header frames SHFR_1 to SHFR_m having the frame length that indicates the delimiter inserted into the sequence of the data frames DFR_1 to DFR_n in the manner described below. Otherwise, the generating circuitry 13B performs the same functions as the generating circuitry 13.

In the transmitter 201, the transmitting circuitry 12 receives, from the generating circuitry 13B, the header frame HFR1, data frames DFR_1 and DFR_2, sub-header frame SHFR_1, data frames DFR_3 and DFR_4, . . . sub-header frame SHFR_m, data frames DFR_n-1 and DFR_n, and end frame FFR1, and transmits the header frame HFR1, data frames DFR_1 and DFR_2, sub-header frame SHFR_1, data frames DFR_3 and DFR_4, . . . sub-header frame SHFR_m, data frames DFR_n-1 and DFR_n, and end frame FFR1 that have been received one after another in accordance with the CSMA/CA scheme.

Figure 17:
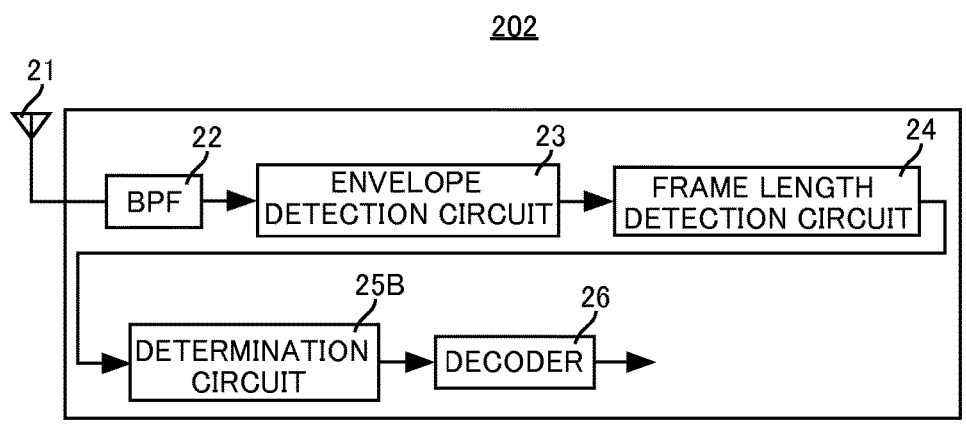
FIG. 17 is a schematic diagram of the receiver of FIG. 15.

FIG. 17 is a schematic diagram of the receiver 202 of FIG. 15. Referring to FIG. 17, the receiver 202 is the same as the receiver 2 except that the determination circuit 25 of the receiver 2 of FIG. 3 is replaced by a determination circuit 25B.

The determination circuit 25B holds the frame length of the header frame HFR1, the frame lengths of the sub-header frames SHFR_1 to SHFR_m and the frame length of the end frame FFR.

If the frame length received from the frame length detection circuit 24 matches the frame length of the header frame HFR1, the determination circuit 25B outputs a predetermined number of frame lengths to the decoder 26, and, if the frame length received from the frame length detection circuit 24 matches the frame length of any one of the sub-header frames SHFR_1 to SHFR_m, outputs a predetermined number of frame lengths to the decoder 26. Otherwise, the determination circuit 25B performs the same functions as the determination circuit 25.

Figure 18:
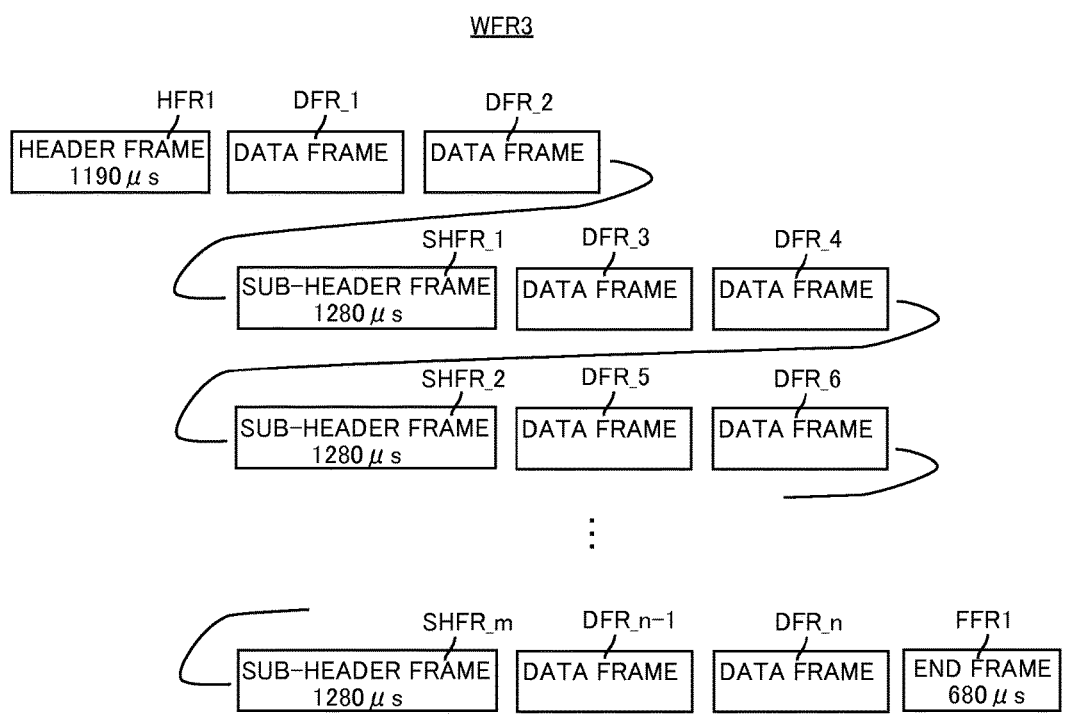
FIG. 18 conceptually illustrates a radio frame according to Embodiment 3.

FIG. 18 conceptually illustrates a radio frame according to Embodiment 3. Referring to FIG. 18, the radio frame WFR3 of Embodiment 3 includes a header frame HFR1, data frames DFR_1 to DFR_n, sub-header frames SHFR_1 to SHFR_m, and an end frame FFR1.

The two data frames DFR_1 and DFR_2 are positioned to follow the header frame HFR1. The sub-header frame SHFR_1 is positioned to follow the data frame DFR_2. The two data frames DFR_3 and DFR_4 are positioned to follow the sub-header frame SHFR_1. The sub-header frame SHFR_2 is positioned to follow the data frame DFR_4. The two data frames DFR_5 and DFR_6 are positioned to follow the sub-header frame SHFR_2.

Other frames are positioned in a similar manner, and the sub-header frame SHFR_m is positioned to follow the data frame DFR_n-2, and the two data frames DFR_n-1 and DFR_n are positioned to follow the sub-header frame SHFR_m.

Then, the end frame FFR1 is positioned to follow the data frame DFR_n.

Each of the sub-header frames SHFR_1 to SHFR_m has the frame length of 1280 μs. The frame length of 1280 μs indicates a delimiter inserted into the sequence of the data frames DFR_1 to DFR_n.

FIG. 18 shows an implementation where the number of data frames DFR positioned to follow the header frame HFR1 and each of the sub-header frames SHFR_1 to SHFR_m is two; however, Embodiment 3 is not limited to such an implementation, and the numbers of data frames DFR positioned to follow the header frame HFR1 and each of the sub-header frames SHFR_1 to SHFR_m may be 1 or more. Further, the numbers of data frames DFR positioned to follow the header frame HFR1 and the sub-header frames SHFR_1 to SHFR_m may be the same or different from each other.

The generating circuitry 13B of the transmitter 201 generates sub-header frames SHFR_1 to SHFR_m having the frame length of 1280 μs. Further, the generating circuitry 13B generates a header frame HFR1, data frames DFR_1 to DFR_n and end frame FFR1 in the same manner as that in the generating circuitry 13.

Then, the generating circuitry 13B outputs the header frame HFR1, sub-header frames SHFR_1 to SHFR_m, data frames DFR_1 to DFR_n and end frame FFR1 to the transmitting circuitry 12 in the order shown in FIG. 18.

The transmitting circuitry 12 receives, from the generating circuitry 13B, the header frame HFR1, sub-header frames SHFR_1 to SHFR_m, data frames DFR_1 to DFR_n and end frame FFR1 in the order shown in FIG. 18 and transmits the header frame HFR1, sub-header frames SHFR_1 to SHFR_m, data frames DFR_1 to DFR_n and end frame FFR1 that have been received one after another in the order shown in FIG. 18 in accordance with the CSMA/CA scheme.

The receiver 202 receives the header frame HFR1, sub-header frames SHFR_1 to SHFR_m, data frames DFR_1 to DFR_n and end frame FFR1 in the order shown in FIG. 18.

Then, based on a plurality of received radio waves, the receiver 202 detects a plurality of frame lengths in the manner described above.

If the first frame length received from the frame length detection circuit 24 is equal to 1190 µs, the determination circuit 25B senses the beginning of the data to be transmitted, and outputs a predetermined number (i.e. 2) of frame lengths following the first frame to the decoder 26.

Then, each time the determination circuit 25B determines that the frame length received from the frame length detection circuit 24 is equal to 1280 µs, it repeatedly outputs a predetermined number (i.e. 2) of frame lengths following the frame length of 1280 µs to the decoder 26.

Finally, if the frame length received from the frame length detection circuit 24 is equal to 680 µs, the determination circuit 25B senses the end of the data to be transmitted and stops outputting frame lengths to the decoder 26.

The decoder 26 refers to the correspondence table TBL1 to convert the n frame lengths received from the determination circuit 25B to bit values, thereby receiving the data to be transmitted. Then, the decoder 26 outputs the data to be transmitted to the host system.

Thus, in Embodiment 3, n data frames DFR_1 to DFR_n are transmitted in such a way that a predetermined number of them are sandwiched between the header frame HFR1, sub-header frames SHFR_1 to SHFR_m and end frame FFR1, thereby allowing a desired length of data to be transmitted while enabling detection of interruption by an interference frame or omission of a desired frame.

Figure 19:
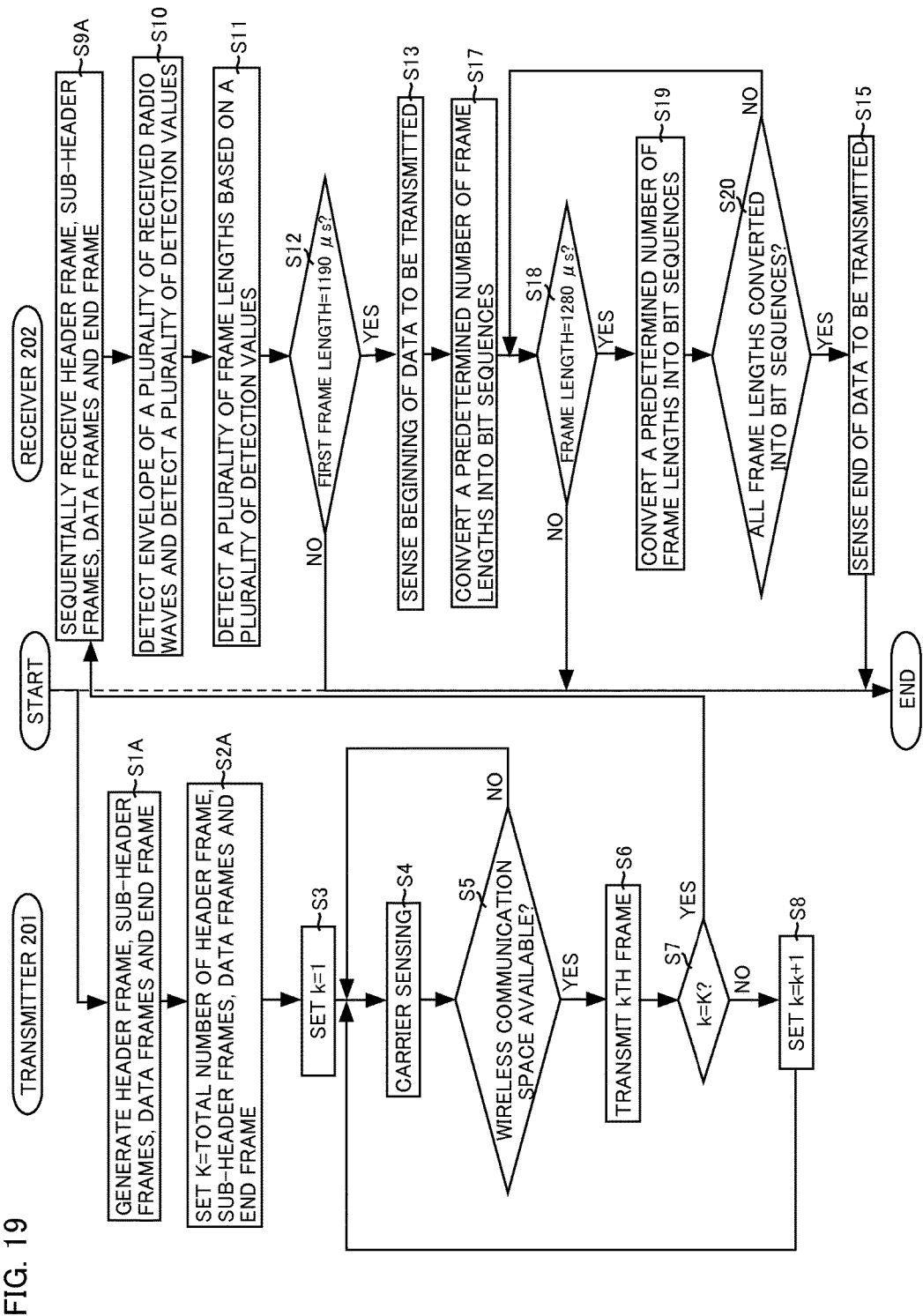
FIG. 19 is a flow chart illustrating the operation of the wireless communication system of FIG. 15.

FIG. 19 is a flow chart illustrating the operation of the wireless communication system 200 of FIG. 15. The flow chart of FIG. 19 is the same as the flow chart of FIG. 8 except that steps S1, S2 and S9 of the flow chart of FIG. 8 are replaced by steps S1A, S2A and S9A, respectively, and steps S17 to steps S20 are added between steps S13 and S15.

Referring to FIG. 19, when the operation of the wireless communication system 200 is started, the transmitter 201 generates a header frame HFR1, sub-header frames SHFR_1 to SHFR_m, data frames DFR_1 to DFR_n and an end frame FFR1 (step S1A).

Then, the transmitter 201 sets K=total number of frames, i.e. header frame HFR1, sub-header frames SHFR_1 to SHFR_m, data frames DFR_1 to DFR_n and end frame FFR1 (step S2A).

Thereafter, the transmitter 201 executes steps S3 to S8 described above. Thus, the transmitter 201 transmits the header frame HFR1, sub-header frames SHFR_1 to SHFR_m, data frames DFR_1 to DFR_n and end frame FFR1 one after another in the order shown in FIG. 18 in accordance with the CSMA/CA scheme.

When it is determined at step S7 that k=K, the transmitter 201 stops transmitting frames.

Then, the receiver 202 receives the header frame HFR1, sub-header frames SHFR_1 to SHFR_m, data frames DFR_1 to DFR_n and end frame FFR1 in the order shown in FIG. 18 (step S9A).

Thereafter, the receiver 202 sequentially executes steps S10 to S13 discussed above.

After step S13, the receiver 202 refers to the correspondence table TBL1 to convert the predetermined number of frame lengths to bit sequences (step S17).

Then, the receiver 202 determines whether the frame length is equal to 1280 µs (step S18).

If it is determined at step S18 that the frame length is equal to 1280 µs, the receiver 202 converts the predetermined number of frame lengths to bit sequences (step S19).

Thereafter, the receiver 202 determines whether all the frame lengths have been converted to bit sequences (step S20).

If it is determined at step S20 that at least one of all the frame lengths have not been converted to bit sequences, the operation returns to step S18 and steps S18 to S20 described above are repeatedly performed.

Then, if it is determined at step S20 that all the frame lengths have been converted to bit sequences, the receiver 202 performs step S15 described above.

On the other hand, if it is determined at step S12 that the first frame length is not 1190 µs, or if it is determined at step S18 that the frame length is not 1280 µs, or after step S15, the operation ends.

Thus, the data frames DFR_1 to DFR_n are transmitted in such a way that a predetermined number of these frames are sandwiched between the header frame HFR1, sub-header frames SHFR_1 to SHFR_m and end frame FFR1, thereby allowing a desired length of data to be transmitted while enabling detection of interruption by an interference frame or omission of a desired frame.

In Embodiment 3, the operations of transmitter 201 and receiver 202 may be carried out by a program. In this case, each of the transmitter 201 and receiver 202 includes a CPU, a ROM and a RAM. In the transmitter 201, the ROM stores a program D including steps S1A, S2A and S3 to S8 shown in FIG. 19, and the CPU reads the program D from the ROM and executes it. Thus, the operation of the transmitter 201 is performed. In the receiver 202, the ROM stores a program E including steps S9A, S10, S11, S12, S13, S17 to S20 and S15 shown in FIG. 14, and the CPU reads the program E from the ROM and executes it. Thus, the operation of the receiver 202 is performed. Further, each of the ROMs of the transmitter 201 and receiver 202 corresponds to the storage medium storing a computer- (i.e. CPU-) readable program.

Otherwise, the description of Embodiment 3 is the same as that of Embodiment 1.

[Embodiment 4]

Figure 20:
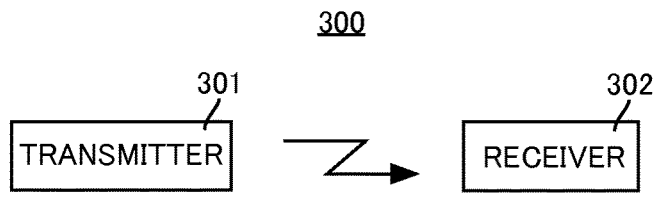
FIG. 20 is a schematic diagram of a wireless communication system according to Embodiment 4.

FIG. 20 is a schematic diagram of a wireless communication system according to Embodiment 4. Referring to FIG. 20, the wireless communication system 300 accordance to Embodiment 4 includes a transmitter 301 and a receiver 302.

The transmitter 301 and receiver 302 are positioned in a wireless communication space. The transmitter 301 divides a bit sequence representing header information into bit values with desired numbers of bits and converts the divided bit values to frame lengths in the manner described below to generate header frames HFR_1 to HFR_i (i is an integer not smaller than 1) having the converted frame lengths.

The transmitter 301 also divides a bit sequence of end information indicating the end of data to be transmitted into bit values with desired numbers of bits, and converts the divided bit values to frame lengths in the manner described below to generate end frames FFR_1 to FFRj (j is an integer not smaller than 1) having the converted frame lengths.

Further, the transmitter 301 generates data frames DFR_1 to DFR_n in the same manner as that in the transmitter 1.

Then, the transmitter 301 transmits the header frames HFR_1 to HFR_i, data frames DFR_1 to DFR_n and end frames FFR_1 to FFR_j one after another in accordance with the CSMA/CA scheme.

The receiver 302 receives the header frames HFR_1 to HFR_i, data frames DFR_1 to DFR_n and end frames FFR_1 to FFR_j that have been transmitted by the transmitter 301. Then, based on the received radio wave of the header frames HFR_1 to HFR_i, data frames DFR_1 to DFR_n and end frames FFR_1 to FFR_j that has been received, the receiver 302 detects the plurality of frame lengths of the header frames HFR_1 to HFR_i, data frames DFR_1 to DFR_n and end frames FFR_1 to FFR_j, and converts the detected plurality of frame lengths to bit sequences, thereby receiving the header information, data to be transmitted and end information.

Figure 21:
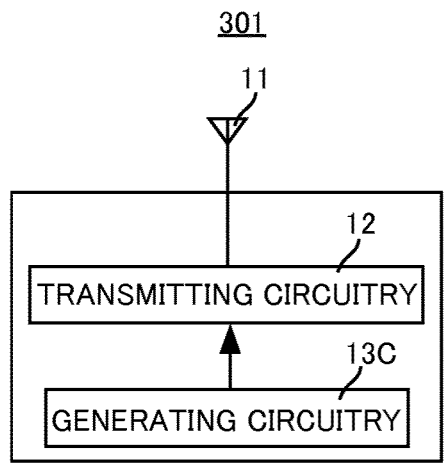
FIG. 21 is a schematic diagram of the transmitter of FIG. 20.

FIG. 21 is a schematic diagram of the transmitter 301 of FIG. 20. Referring to FIG. 21, the transmitter 301 is the same as the transmitter 1 except that the generating circuitry 13 of the transmitter 1 of FIG. 2 is replaced by a generating circuitry 13C.

The generating circuitry 13C generates header frames HFR_1 to HFR_i and end frames FFR_1 to FFR_j in the manner described below. Otherwise, the generating circuitry 13C performs the same functions as the generating circuitry 13.

In the transmitter 301, the transmitting circuitry 12 receives, from the generating circuitry 13C, the header frames HFR_1 to HFR_i, data frames DFR_1 to DFR_n and end frames FFR_1 to FFR_j, and transmits the header frames HFR_1 to HFR_i, data frames DFR_1 to DFR_n and end frames FFR_1 to FFR_j that have been received one after another in accordance with the CSMA/CA scheme.

Figure 22:
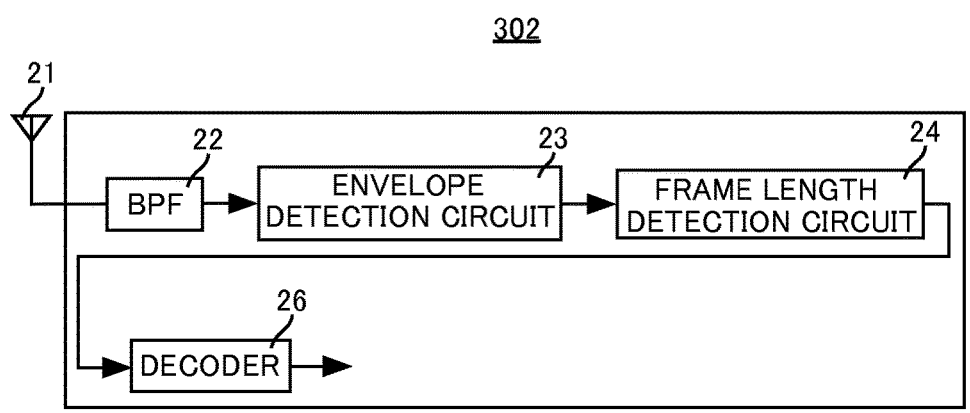
FIG. 22 is a schematic diagram of the receiver of FIG. 20.

FIG. 22 is a schematic diagram of the receiver 302 of FIG. 20. Referring to FIG. 22, the receiver 302 is the same as the receiver 2 except that the determination circuit 25 of the receiver 2 of FIG. 3 is omitted.

Accordingly, in the receiver 302, the frame length detection circuit 24 outputs all the frame lengths that have been detected to the decoder 26.

Figure 23:
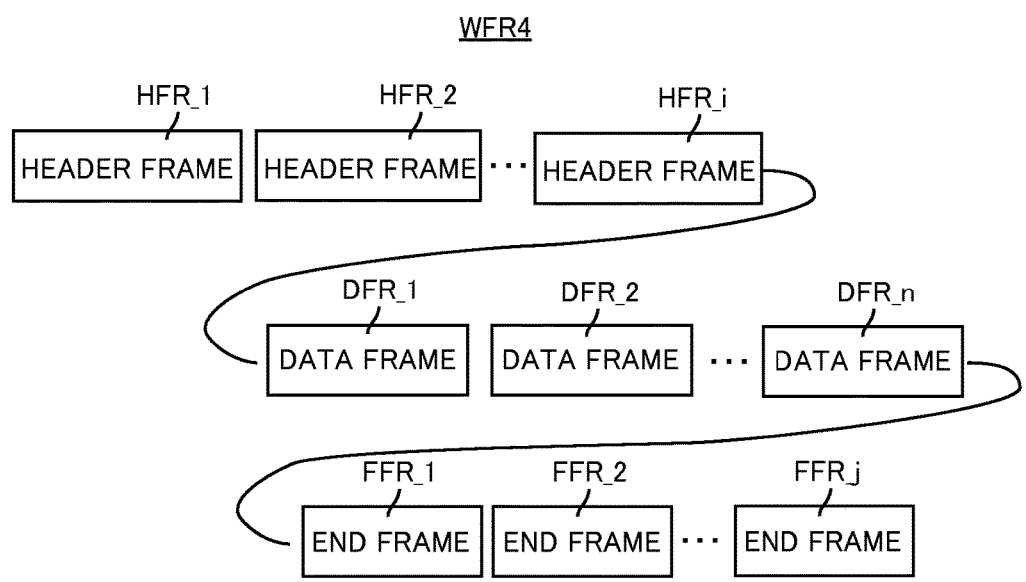
FIG. 23 conceptually illustrates a radio frame according to Embodiment 4.

FIG. 23 conceptually illustrates a radio frame according to Embodiment 4. Referring to FIG. 23, the radio frame WFR4 includes header frames HFR_1 to HFR_i, data frames DFR_1 to DFR_n and end frames FFR_1 to FFR_j.

The data frames DFR_1 to DFR_n are positioned to follow the header frames HFR_1 to HFR_i, and the end frames FFR_1 to FFR_j are positioned to follow the data frames DFR_1 to DFR_n.

The header frames HFR_1 to HFR_i have frame lengths corresponding to the bit sequence of the header information. The end frames FFR_1 to FFR_j have frame lengths corresponding to the bit sequence of the end information.

Thus, in the radio frame WFR4, each of the header frame HFR and end frame FFR is composed of at least one frame. Accordingly, the radio frame WFR4 may include one header frame HFR and one end frame FFR; a plurality of header frames HFR and one end frame FFR; one header frame HFR and a plurality of end frames FFR; or a plurality of header frames HFR and a plurality of end frames FFR. That is, at least one of the header frame HFR and end frame FFR may be composed of one or more radio frames having one or more frame lengths.

FIG. 24 is a correspondence table illustrating another relationship between the bit value of data and frame length.

Referring to FIG. 24, the correspondence table TBL3 contains bit values of data and frame lengths. The bit values of data are associated with the frame lengths.

A bit value of data is represented by 4 bits, for example. The frame length of 725 μs is associated with the bit value of "0000", the frame length of 755 μs is associated with the bit value of "0001", the frame length of 785 μs is associated with the bit value of "0010", the frame length of 815 μs is associated with the bit value of "0011", the frame length of 845 μs is associated with the bit value of "0100", the frame length of 875 μs is associated with the bit value of "0101", the frame length of 905 μs is associated with the bit value of "0110", the frame length of 935 μs is associated with the bit value of "0111", the frame length of 965 μs is associated with the bit value of "1000", the frame length of 995 μs is associated with the bit value of "1001", the frame length of 1025 μs is associated with the bit value of "1010", the frame length of 1055 μs is associated with the bit value of "1011", the frame length of 1085 μs is associated with the bit value of "1100", the frame length of 1115 μs is associated with the bit value of "1101", the frame length of 1145 μs is associated with the bit value of "1110", and the frame length of 1175 μs is associated with the bit value of "1111".

Thus, in the correspondence table TBL3, the frame length increases by 30 μs as the bit value increases by "1".

FIG. 25 is a correspondence table illustrating the relationship between the bit value of end information and frame length. Referring to FIG. 25, the correspondence table TBL4 contains bit values of end information and frame lengths. The bit values of end information are associated with the frame lengths.

A bit value of end information is represented by 2 bits, for example. The frame length of 500 μs is associated with the bit value of "00", the frame length of 530 μs is associated with the bit value of "01", the frame length of 560 μs is associated with the bit value of "10", and the frame length of 590 μs is associated with the bit value of "11".

Thus, in the correspondence table TBL4, the frame length increases by 30 μs as the bit value increases by "1".

In Embodiment 4, the correspondence table TBL1 (see FIG. 5) is used to convert the bit sequence of header information to frame lengths.

As a result, the frame lengths representing header information, the frame lengths representing data to be transmitted and the frame lengths representing end information are different from each other.

The generating circuitry 13C of the transmitter 301 holds the correspondence table TBL1 (see FIG. 5), correspondence table TBL3 and correspondence table TBL4.

Then, the generating circuitry 13C divides the bit sequence representing the header information into bit values with 4 bits, and refers to the correspondence table TBL1 to convert the divided bit values to frame lengths to generate header frames HFR_1 to HFR_i having the converted frame lengths.

Further, the generating circuitry 13C divides the bit sequence representing the data to be transmitted into bit values with 4 bits, and refers to the correspondence table TBL3 to convert the divided bit values to frame lengths to generate data frames DFR_1 to DFR_n having the converted frame lengths.

Furthermore, the generating circuitry 13C divides the bit sequence representing the end information into bit values with 2 bits, and refers to the correspondence table TBL4 to convert the divided bit values to frame lengths to generate end frames FFR_1 to FFR_j having the converted frame lengths.

Then, the generating circuitry 13C outputs the header frames HFR_1 to HFR_i, data frames DFR_1 to DFR_n and end frames FFR_1 to FFR_j to the transmitting circuitry 12.

The transmitting circuitry 12 transmits the header frames HFR_1 to HFR_i, data frames DFR_1 to DFR_n and end frames FFR_1 to FFR_j one after another in accordance with the CSMA/CA scheme.

The decoder 26 of the receiver 302 holds the correspondence tables TBL1, TBL3 and TBL4. The decoder 26 sequentially receives a plurality of frame lengths from the frame length detection circuit 24. Then, the decoder 26 refers to the correspondence tables TBL1, TBL3 and TBL4 and sequentially converts the plurality of frame lengths to bit sequences and outputs the converted bit sequences to the host system.

In this case, the decoder 26 refers to all the correspondence tables TBL1, TBL3 and TBL4 and detects the correspondence table containing the frame length from the frame length detection circuit 24 (i.e. one of the correspondence tables TBL1, TBL3 and TBL4), and refers to the detected correspondence table (i.e. one of the correspondence tables TBL1, TBL3 and TBL4) to convert the frame length to a bit sequence.

In Embodiment 4, the host system receives, from the decoder 26, the bit sequence representing header information, the bit sequence representing data to be transmitted and the bit sequence representing end information, and, based on the bit sequence representing header information and the bit sequence representing end information, detects the beginning and end of the data to be transmitted and receives the data to be transmitted.

Figure 26:
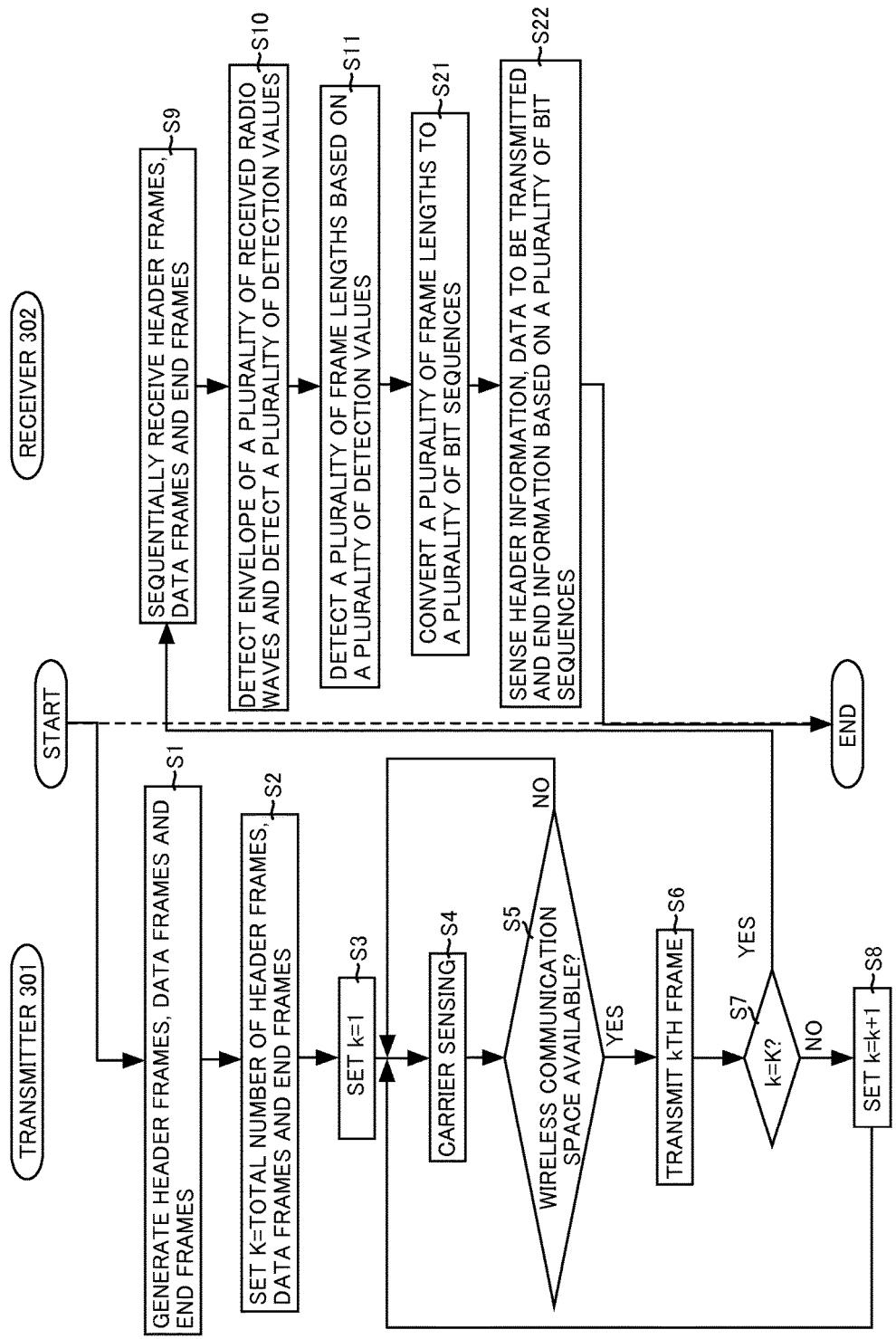
FIG. 26 is a flow chart illustrating the operation of the wireless communication system of FIG. 20.

FIG. 26 is a flow chart illustrating the operation of the wireless communication system 300 of FIG. 20. The flow chart of FIG. 26 is the same as the flow chart of FIG. 8 except that steps S12 to S15 of the flow chart of FIG. 8 are replaced by steps S21 and S22.

Referring to FIG. 26, when the operation of the wireless communication system 300 is started, the transmitter 301 sequentially performs steps S1 to S8 described above. In this case, at step S1, the transmitter 301 refers to the correspondence table TBL1 to generate header frames HFR_1 to HFR_i representing header information, refers to the correspondence table TBL3 to generate data frame DFR_1 to DFR_n, and refers to the correspondence table TBL4 to generate end frames FFR_1 to FFR_j.

Then, the receiver 302 sequentially executes steps S9 to S11 described above. After step S11, the decoder 26 of the receiver 302 refers to the correspondence tables TBL1, TBL3 and TBL4 to convert a plurality of frame lengths received from the frame length detection circuit 24 to a plurality of bit sequences (step S21), and outputs the converted plurality of bit sequences to the host system.

Based on the plurality of bit sequences, the host system senses the header information, data to be transmitted and end information (step S22). Thus, the operation ends.

Thus, in Embodiment 4, the transmitter 301 converts not only the bit sequence representing data to be transmitted but also the bit sequence of header information and the bit sequence of end information to frame lengths and transmits them, and the receiver 302 acquires the bit sequence of the header information and the bit sequence of the end information.

Therefore, the header information is capable of representing information other than the beginning of data to be transmitted. The end information is capable of representing information other than the end of data to be transmitted.

In Embodiment 4, the correspondence tables TBL1, TBL3 and TBL4 may contain other sets of frame lengths being different from frame lengths described above as long as the frame length changes as the bit value increases. It should be noted that the sets of frame lengths contained in the tables TBL1, TBL3 and TBL4 are different from each other.

Further, in Embodiment 4, the operations of the transmitter 301 and receiver 302 may be carried out by a program. In this case, each of the transmitter 301 and receiver 302 includes a CPU, a ROM and a RAM. In the transmitter 301, the ROM stores the program A including steps S1 to S8 shown in FIG. 26, and the CPU reads the program A from the ROM and executes it. Thus, the operation of the transmitter 301 is performed. In the receiver 302, the ROM stores a program F including steps S9 to S11, S21 and S22 shown in FIG. 26, and the CPU reads the program F from the ROM and executes it. Thus, the operation of the receiver 302 is performed. Further, each of the ROMs of the transmitter 301 and receiver 302 corresponds to the storage medium storing the computer- (i.e. CPU-) readable program.

Otherwise, the description of Embodiment 4 is the same as that of Embodiment 1.

[Embodiment 5]

Figure 27:
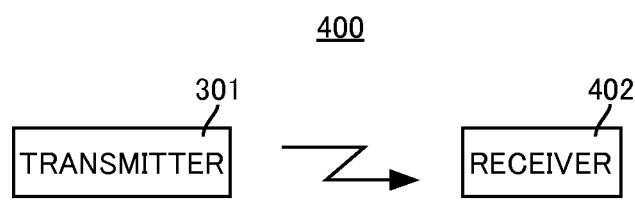
FIG. 27 is a schematic diagram of a wireless communication system according to Embodiment 5.

FIG. 27 is a schematic diagram of a wireless communication system according to Embodiment 5. Referring to FIG. 27, the wireless communication system 400 according to Embodiment 5 is the same as the wireless communication system 300 except that the receiver 302 of the wireless communication system 300 of FIG. 20 is replaced by a receiver 402.

In Embodiment 5, a radio frame WFR5 transmitting data to be transmitted is analogous to the radio frame WFR4 (see FIG. 23) where the number of the header frames HFR_1 to HFR_i is 2 or more (i.e., i is an integer not smaller than 2) and the number of the end frames FFR_1 to FFR_j is 2 or more (i.e. j is an integer not smaller than 2).

The receiver 402 is positioned in a wireless communication space. The receiver 402 receives the radio frame WFR5 transmitted by the transmitter 301 and senses the header frames HFR_1 to HFR_i and end frames FFR_1 to FFR_j of the radio frame WFR5 that has been received in the state transition scheme, described below.

The receiver 402 decodes the data frames DFR_1 to DFR_n into bit sequences where the permitted number of interrupt frames that interrupt the sequence of the data frames DFR_1 to DFR_n of the radio frame WFR5 is w (w=1 or 2), or decodes the data frames DFR_1 to DFR_n into bit sequences while preventing a data frame from being omitted.

Figure 28:
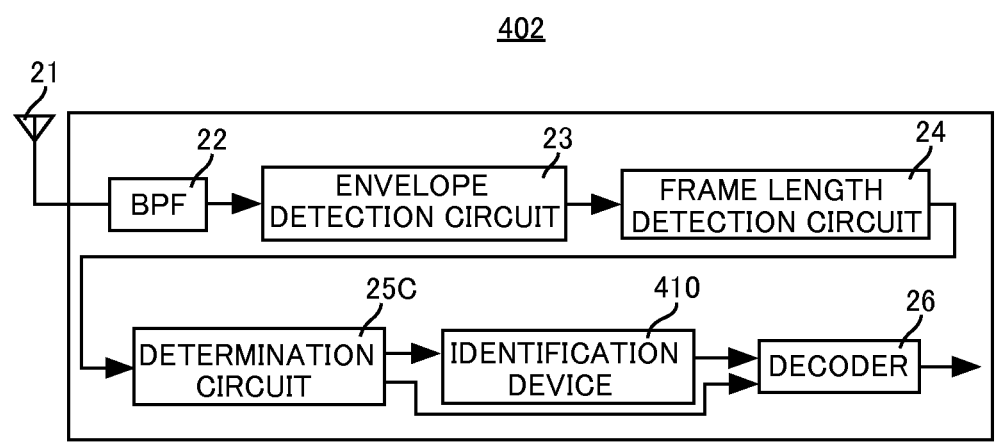
FIG. 28 is a schematic diagram of the receiver of FIG. 27.

FIG. 28 is a schematic diagram of the receiver 402 of FIG. 27. Referring to FIG. 28, the receiver 402 is the same as the receiver 2 except that the determination circuit 25 of the receiver 2 of FIG. 3 is replaced by a determination circuit 25C and an identification device 410 is added.

The determination circuit 25C holds the correspondence tables TBL1, TBL3 and TBL4. The determination circuit 25C also holds the number of the data frames DFR_1 to DFR_n.

If frame lengths received from the frame length detection circuit 24 are contained in the correspondence table TBL1 or TBL4, the determination circuit 25C outputs the frame lengths to the identification device 410. On the other hand, if the frame lengths received from the frame length detection circuit 24 are not contained in the correspondence tables TBL1 or TBL4, the determination circuit 25c discards the frame lengths.

If frame lengths received from the frame length detection circuit 24 are contained in the correspondence table TBL3, the determination circuit 25C determines whether the number of the frame lengths contained in the correspondence table TBL3 matches the number n. If the number of the frame lengths contained in the correspondence table TBL3 matches the number n, the determination circuit 25C outputs the frame lengths to the decoder 26. On the other hand, if the number of the frame lengths contained in the correspondence table TBL3 does not match the number n, the determination circuit 25C discards the frame lengths.

If frame lengths received from the frame length detection circuit 24 are not contained in the correspondence table TBL3, the determination circuit 25C determines whether the number of the frame lengths that are not contained in the correspondence table TBL3 is not greater than the permitted value w. If the number of the frame lengths not contained in the correspondence table TBL3 is not greater than the permitted value w, the determination circuit 25C outputs the frame lengths to the decoder 26. On the other hand, if the number of the frame lengths not contained in the correspondence table TBL3 is greater than the permitted value w, the determination circuit 25c discards the frame lengths.

The identification device 410 receives a plurality of frame lengths from the determination circuit 25C and, if the plurality of frame lengths that have been received match a plurality of wait states of its own, it outputs to the decoder 26 a signal HDS indicating that header information has been received or a signal FS indicating that end information has been received.

On the other hand, if the plurality of frame lengths do not match the plurality of wait states of its own, the identification device 410 does not output the signal HDS or FS to the decoder 26.

In the receiver 402, the decoder 26 holds the correspondence table TBL3. When the decoder 26 receives the signal HDS from the identification device 410 and then receives a frame length from the determination circuit 25C, it refers to the correspondence table TBL3 and decodes the received frame length into bit values.

Figure 29:
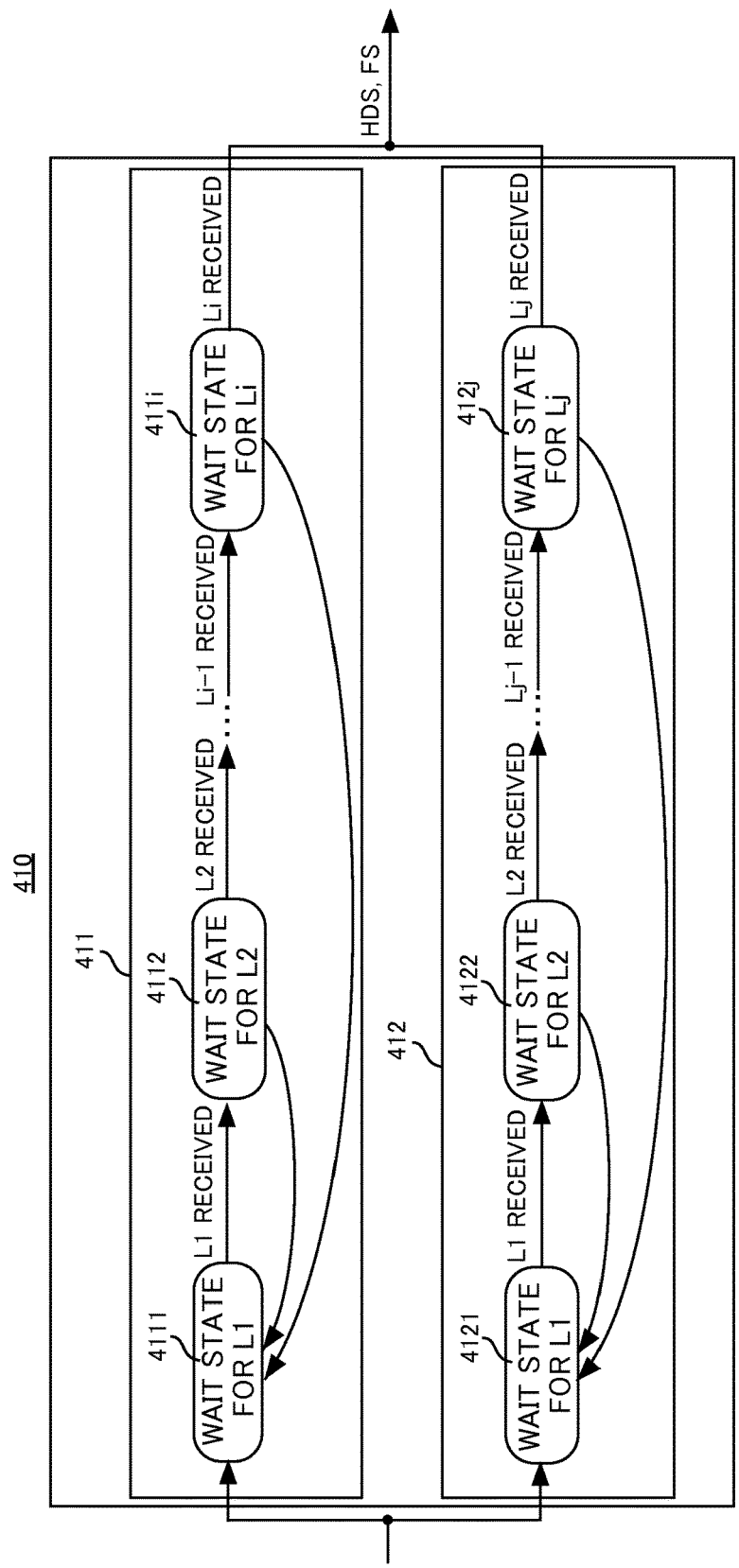
FIG. 29 is a state transition diagram of the identification device of FIG. 28.

FIG. 29 is a state transition diagram of the identification device 410 of FIG. 28. Referring to FIG. 29, the identification device 410 includes transition circuits 411 and 412.

The transition circuit 411 includes an wait state for-L1 4111, an wait state for-L2 4112, . . . , and an wait state for-Li 411$i$.

The wait state for-L1 4111 to wait state for-Li 411$i$ are states of waiting for the frame lengths L1, L2, . . . and Li, respectively.

First, the transition circuit 411 is in the wait state for-L1 4111, and, when the frame length L1 or a frame length close to L1, such as L1−10 μs or L1+10 μs, is input, transitions to the wait state for-L2 4112. Then, when the frame length L2 or a frame length close to L2 is input, the transition circuit 411 transitions to the wait state for-L3 4113. Similarly, when the frame length Li-1 or a frame length close to Li-1 is input, the transition circuit 411 transitions to the wait state for-Li 411$i$; when the frame length Li or a frame length close to Li is input, the circuit determines that the plurality of frame lengths match the wait state for-L1 4111 to wait state for-Li 411$i$, and outputs the signal HDS to the decoder 26.

Thus, the transition circuit 411 detects the header frames HFR_1 to HFR_i by detecting i frame lengths L1, L2, . . . and Li. That is, the transition circuit 411 senses the beginning of data to be transmitted by detecting i frame lengths L1, L2, . . . and Li.

On the other hand, if, for example, in the wait state for-L2 4112, the frame length L2 or a frame length close to L2 is not input in a predetermined time period, or a frame length different from the frame length L2 or a frame length close to L2 is input two or more times, the transition circuit 411 returns to the wait state for-L1 4111, which is the initial state.

That is, the transition circuit 411 returns to the wait state for-L1 4111, i.e. the initial state, if the i frame lengths L1, L2, . . . , and Li are not successively input even if a frame that is not one of the header frames HFR_1 to HFR_i happens to match the frame length for which the device is waiting for.

Supposing, while the transmitter 301 is transmitting the header frames HFR_1 to HFR_i, a frame from another transmitter interrupts the sequence, for example, even if a frame length different from the frame length L2 or a frame length close to L2 is input in the wait state for-L2 4112, the transition circuit 411 transitions to the state of waiting for the next frame length L3 if the frame length of L2 is input in a predetermined time period or before two or more different frame lengths are input.

Thus, even when the header frames HFR_1 to HFR_i having a plurality of frame lengths are transmitted, the device is capable of properly receiving the header frames HFR_1 to HFR_i as the transition circuit 411 transitions in state as shown in FIG. 29.

The transition circuit 412 includes an wait state for-L1 4121, wait state for-L2 4122, . . . , and an wait state for-Lj 412$j$.

In the same operation as that for the transition circuit 411 described above, the transition circuit 412 determines that j frame lengths of the end frames FFR_1 to FFR_j match j wait states, i.e. wait-for-L1 state 4121 to wait-for-Lj state 412$j$, and outputs a signal FS to the decoder 26.

In the identification device 410, the two transition circuits 411 and 412 transition in state in response to the same plurality of frame lengths from the determination circuit 25C; however, when i frame lengths of the header frames HFR_1 to HFR_i, are input, the transition circuit 411 determines that the i frame lengths match the i wait states, i.e. i wait state for-L1 4111 to wait state for-Li 411$i$ and outputs the signal HDS, while the transition circuit 412 does not output the signal HDS because it cannot detect the match.

Further, when j frame lengths of the end frame FFR_1 to FFR_j are input, the transition circuit 412 determines that the j frame lengths match the j wait states, i.e. wait state for-L1 4121 to wait state for-Lj 412$j$ and outputs the signal FS, while the transition circuit 411 does not output the signal FS because it cannot detect the match.

Thus, even when the same plurality of frame lengths are input to both the transition circuits 411 and 412, the identification device 410 is capable of outputting the signal HDS or FS to the decoder 26.

Figure 30:
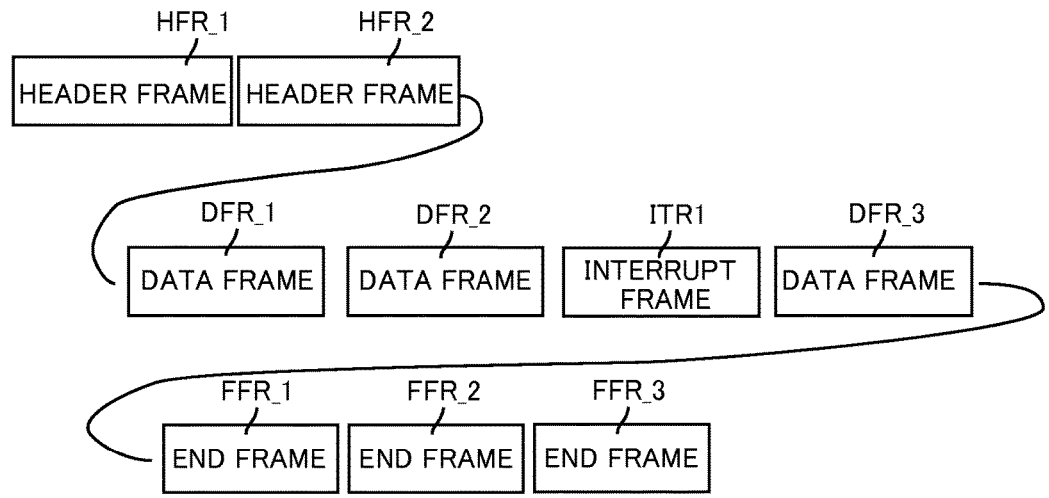
FIG. 30 illustrates a reception state of a radio frame in Embodiment 5.

FIG. 30 illustrates a manner in which a radio frame WFR5 is received according to Embodiment 5. Referring to FIG. 30, the radio frame WFR5-1 includes two header frames HFR_1 and HFR_2, three data frames DFR_1 to DFR_3 and three end frames FFR_1 to FFR_3.

In addition, FIG. 30 shows an interrupt frame ITR1 that interrupts between the data frames DFR_2 and data frame DFR_3.

The transmitter 301 transmits the header frames HFR_1 and HFR_2, data frames DFR_1 to DFR_3 and end frames FFR_1 to FFR_3 one after another in accordance with the CSMA/CA scheme.

Then, the receiver 402 sequentially receives the header frames HFR_1 and HFR_2, data frames DFR_1 and DFR_2, interrupt frame ITR1, data frame DFR_3 and end frames FFR_1 to FFR_3.

The frame length detection circuit 24 of the receiver 402 sequentially outputs the two frame lengths $L_{H1}$ and $L_{H2}$ of the header frames HFR_1 and HFR_2 to the determination circuit 25C, sequentially outputs the four frame lengths $L_{D1}$, $L_{D2}$, $L_{IT1}$ and $L_{D3}$ of the data frame DFR_1, data frame DFR_2, interrupt frame ITR1 and data frame DFR_3 to the determination circuit 25C, and sequentially outputs the three frame lengths $L_{F1}$ to $L_{F3}$ of the end frames FFR_1 to FFR_3 to the determination circuit 25C.

When the determination circuit 25C receives the two frame lengths $L_{H1}$ and $L_{H2}$, it refers to the correspondence tables TBL1, TBL3 and TBL4 and senses that the two frame lengths LED and $L_{H2}$ are contained in the correspondence table TBL1, and sequentially outputs the two frame lengths $L_{H1}$ and $L_{H2}$ to the identification device 410.

When the identification device 410 receives the two frame lengths $L_{H1}$ and $L_{H2}$, the transition circuit 411 senses that the two frame lengths LED and $L_{H2}$ match the wait state for-L1 4111 and wait state for-L2 4112 and outputs the signal HDS to the decoder 26, After the determination circuit 25C has outputted the two frame lengths $L_{H1}$ and $L_{H2}$ to the identification device 410, it sequentially receives the four frame lengths $L_{D1}$, $L_{D2}$, $L_{IT1}$ and $L_{D3}$. Then, the determination circuit 25C senses that the frame lengths $L_{D1}$, $L_{D2}$, and $L_{D3}$ are contained in the correspondence table TBL3, and senses that the frame length $L_{IT1}$ is not contained in any of the correspondence tables TBL1, TBL3 and TBL4. Thereafter, the determination circuit 25C determines that the number of the frame lengths that are not contained in the correspondence table TBL3 (i.e. 1) is not greater than the permitted value w (i.e. 1 or 2), and ignores the frame length $L_{IT1}$ and outputs the frame lengths $L_{D1}$, $L_{D2}$ and $L_{D3}$ to the decoder 26.

After the determination circuit 25C has outputted the frame lengths $L_{D1}$, $L_{D2}$ and $L_{D3}$ to the decoder 26, it sequentially receives the three frame lengths $L_{F1}$ to $L_{F3}$. Then, the determination circuit 25C senses that the three frame lengths $L_{F1}$ to $L_{F3}$ are contained in the correspondence table TBL4, and outputs the three frame lengths $L_{F1}$ to $L_{F3}$ to the identification device 410.

When the identification device 410 receives the three frame lengths $L_{F1}$ to $L_{F3}$, the transition circuit 412 senses that the three frame lengths $L_{F1}$ to $L_{F3}$ match the wait state for-L1 4121 to wait state for-L3 4123, and outputs the signal FS to the decoder 26.

After the decoder 26 has received the signal HDS from the identification device 410, it receives the frame lengths $L_{D1}$, $L_{D2}$ and $L_{D3}$ from the determination circuit 25C, and, based on the signal HDS, senses the beginning of the data to be transmitted. Then, the decoder 26 refers to the correspondence table TBL3 to convert the received frame lengths $L_{D1}$, $L_{D2}$ and $L_{D3}$ to three bit values. Thereafter, the decoder 26 receives the signal FS and senses the end of the data to be transmitted, and outputs the bit sequence with the three bit values being arranged properly to the host system.

Thus, the receiver 402 permits a number of interrupt frame lengths ITR that is not larger than the permitted value w and performs the receiving process of data to be transmitted.

If the number of interrupt frames is larger than the permitted value w, the determination circuit 25C discards the frame lengths $L_{D1}$, $L_{D2}$ and $L_{D3}$. That is, if the number of interrupt frames is larger than the permitted value w, the receiver 402 stops the receiving process of the data to be transmitted.

Figure 31:
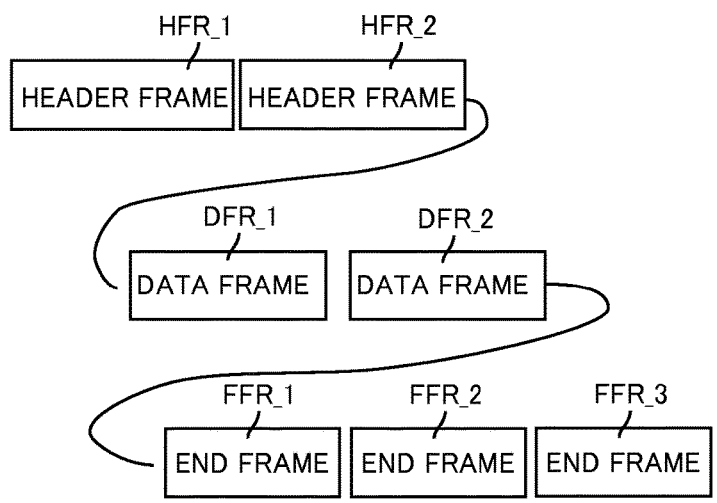
FIG. 31 illustrates another reception state of a radio frame in Embodiment 5.

FIG. 31 illustrates another manner in which a radio frame WFR5 is received according to Embodiment 5.

The transmitter 301 transmits the header frames HFR_1 and HFR_2, data frames DFR_1 to DFR_3 and end frames FFR_1 to FFR_3 one after another in accordance with the CSMA/CA scheme.

Then, the receiver 402 sequentially receives the header frames HFR_1 and HFR_2, data frames DFR_1 and DFR_2 and end frames FFR_1 to FFR_3.

The frame length detection circuit 24 of the receiver 402 sequentially outputs the two frame lengths $L_{H1}$ and $L_{H2}$ of the header frames HFR_1 and HFR_2 to the determination circuit 25C, sequentially outputs the two frame lengths $L_{D1}$ and $L_{D2}$ of the data frames DFR_1 and DFR_2 to the determination circuit 25C, and sequentially outputs the three frame lengths $L_{F1}$ to $L_{F3}$ of the end frames FFR_1 to FFR_3 to the determination circuit 25C.

When the determination circuit 25C has received the two frame lengths $L_{H1}$ and $L_{H2}$, it refers to the correspondence tables TBL1, TBL3 and TBL4 and senses that the two frame lengths $L_{H1}$ and $L_{H2}$ are contained in the correspondence table TBL1, and sequentially outputs the two frame lengths $L_{H1}$ and $L_{H2}$ to the identification device 410.

When the identification device 410 has received the two frame lengths $L_{H1}$ and $L_{H2}$, the transition circuit 411 senses that the two frame lengths $L_{H1}$ and $L_{H2}$ match the wait state for-L1 4111 and wait state for-L2 4112, and outputs the signal HDS to the decoder 26.

After the determination circuit 25C has outputted the two frame lengths $L_{H1}$ and $L_{H2}$ to the identification device 410, it sequentially receives the two frame lengths $L_{D1}$ and $L_{D2}$. Then, the determination circuit 25C senses that the frame lengths $L_{D1}$ and $L_{D2}$ are contained in the correspondence table TBL3, and senses that the number of frame lengths $L_{D1}$ and $L_{D2}$ contained in the correspondence table TBL3 (i.e. 2) is smaller than the number n of the data frames DFR_1 to DFR_3 (i.e. 3). Then, the determination circuit 25C discards the frame lengths $L_{D1}$ and $L_{D2}$.

In this case, even if the determination circuit 25C receives the three frame lengths $L_{F1}$ to $L_{F3}$ after it has discarded the frame lengths $L_{D1}$ and $L_{D2}$, it does not determine whether the three frame lengths $L_{F1}$ to $L_{F3}$ are contained in any one of the correspondence tables TBL1, TBL3 and TBL4.

Also, if the number of the frame lengths of the data frames DFR is larger than the predetermined number (i.e. 3), the determination circuit 25C discards the frame lengths received from the frame length detection circuit 24.

Thus, if a data frame DFR is omitted, the receiver 402 determines that it has failed to receive the data to be transmitted, and stops the receiving process of the data to be transmitted.

Therefore, it is possible to correctly receive data frames DFR while preventing a data frame DFR from being omitted.

Figure 32:
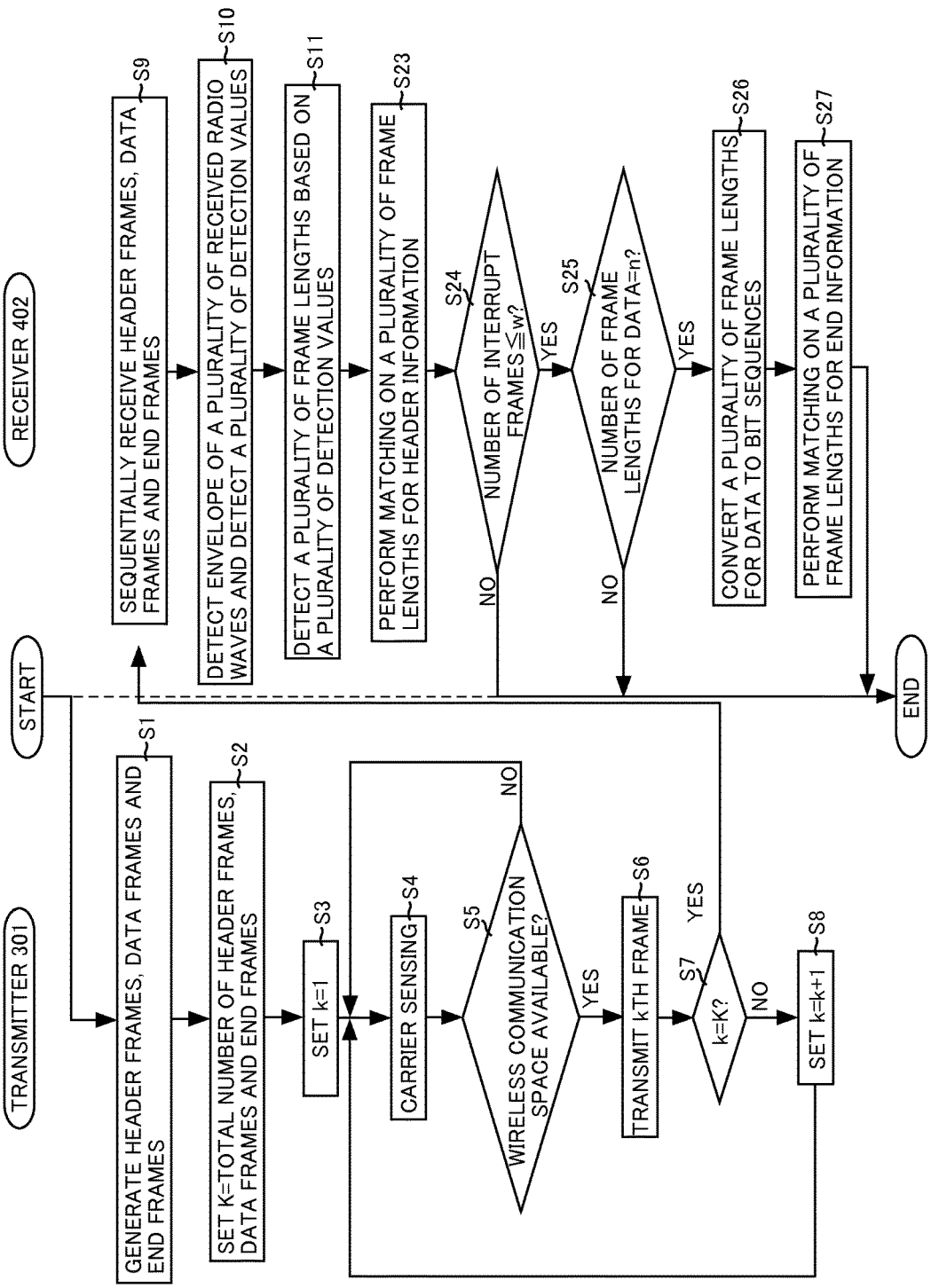
FIG. 32 is a flow chart illustrating the operation of the wireless communication system of FIG. 27.

FIG. 32 is a flow chart illustrating the operation of the wireless communication system 400 of FIG. 27. The flow chart of FIG. 32 is the same as the flow chart of FIG. 8 except that steps S12 to S15 of the flow chart of FIG. 8 are replaced by steps S23 to S27.

Referring to FIG. 32, when the operation of the wireless communication system 400 is started, the transmitter 301 sequentially executes steps S1 to S8 described above.

Then, the receiver 402 sequentially executes steps S9 to S11 described above. After step S11, if the plurality of frame lengths received from the frame length detection circuit 24 are contained in the correspondence table TBL1, the determination circuit 25C of the receiver 402 outputs the plurality of frame lengths to the identification device 410, and the identification device 410 senses that the plurality of frame lengths match the wait state for-L1 4111 to wait state for-Li 411*i*. That is, the receiver 402 performs matching on a plurality of frame lengths for header information (step S23).

Thereafter, the determination circuit 25C determines whether the number of interrupt frames is not larger than the permitted value w (step S24).

If it is determined at step S24 that the number of interrupt frames is not larger than the permitted value w, the determination circuit 25C further determines whether the number of the frame lengths for the data matches the number n (step S25).

If it is determined at step S25 that the number of the frame lengths for the data matches the number n, the determination circuit 25C outputs the plurality of the frame lengths for the data to the decoder 26, and the decoder 26 refers to the correspondence table TBL3 to convert the plurality of frame lengths to a bit sequence (step S26).

After the determination circuit 25C has outputted the plurality of frame lengths for the data to the decoder 26, if the plurality of frame lengths received from the frame length detection circuit 24 are contained in the correspondence table TBL4, it outputs the plurality of frame lengths to the identification device 410, and the identification device 410 senses that the plurality of frame lengths match the wait state for-L1 4121 to wait state for-Lj 412J. That is, the receiver 402 performs matching on the plurality of frame lengths for end information (step 27).

Then, if it is determined at step S24 that the number of interrupt frames is larger than the permitted value w, or if it is determined at step S25 that the number of the frame lengths for the data does not match the number n, or after step S27, the operation ends.

Thus, if the number of interrupt frames is not larger than the permitted value w, the receiving process for the data to be transmitted is continued, and, if the number of data frames DFR is different from a predetermined number (i.e. n), the receiving process for the data to be transmitted is not performed.

Therefore, it is possible to correctly receive data frames DFR while permitting a number of interrupt frames that is not larger than the permitted value w and preventing a data frame DFR from being omitted.

In the above description, the number n of the data frames DFR_1 to DFR_n is held by the determination circuit 25C; however, Embodiment 5 is not limited to such an arrangement, and the number n may be represented by the header frames HFR_1 to HFR_i or end frames FFR_1 to FFR_j.

If the number n is represented by the header frames HFR_1 to HFR_i, a desired one of the header frames HFR_1 to HFR_i has a frame length that represents the number n.

On the other hand, if the number n is represented by the end frames FFR_1 to FFR_j, a desired one of the end frames FFR_1 to FFR_j has a frame length that represents the number n.

If the transition circuit 411 does not sense that the plurality of frame lengths match the wait state for-L1 4111 to wait state for-Li 411*i*, it does not output the signal HDS to the decoder 26. Then, if the transition circuit 412 does not sense that the plurality of frame lengths match the wait state for-L1 4121 to wait state for-Lj 412*j*, it does not output the signal FS to the decoder 26.

Thus, if the interrupt frame ITR interrupts the sequence of the header frames HFR_1 to HFR_i or end frames FFR_1 to FFRj, the decoder 26 does not receive the signal HDS or FS, and therefore the receiving process for the data frames DFR_1 to DFR_n is not performed.

In Embodiment 5, the operations of the transmitter 401 and receiver 402 may be carried out by a program. In this case, each of the transmitter 401 and receiver 402 includes a CPU, a ROM and a RAM. In the transmitter 401, the ROM stores the program A including steps S1 to S8 shown in FIG. 32, and the CPU reads the program A from the ROM and executes it. Thus, the operation of the transmitter 401 is performed. In the receiver 402, the ROM stores a program G including steps S9 to S11, and S23 to S27 shown in FIG. 32, and the CPU reads the program G from the ROM and executes it. Thus, the operation of the receiver 402 is performed. Further, each of the ROMs of the transmitter 401 and receiver 402 corresponds to the storage medium storing a computer- (i.e. CPU-) readable program.

Otherwise, the description of Embodiment 5 is the same as those of Embodiments 1 and 4.

[Embodiment 6]

Figure 33:
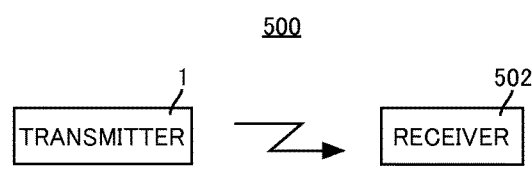
FIG. 33 is a schematic diagram of a wireless communication system according to Embodiment 6.

FIG. 33 is a schematic diagram of a wireless communication system according to Embodiment 6. Referring to FIG. 33, the wireless communication system 500 according to Embodiment 6 is the same as the wireless communication system 10 except that the receiver 2 of the wireless communication system 10 of FIG. 1 is replaced by a receiver 502.

The radio frame WFR6 of Embodiment 6 is constituted by the radio frame WFR1 of FIG. 4.

The receiver 502 is positioned in a wireless communication space. the receiver 502 receives the radio frame WFR6 from the transmitter 1. Then, the receiver 502 processes the header frame HFR1 and end frame FFR1 forming parts of the radio frame WFR6 in the same manner as that in the receiver 2.

The receiver 502 detects the received signal strengths RSSI1 to RSSIn of the data frames DFR_1 to DFR_n forming parts of the radio frame WFR6. Then, when the receiver 502 performs the receiving process on the data frame DFR_2 to DFR_n, it performs the receiving process on the data frames DFR_1 to DFR_n in the manner described above if the strength differences ΔRSSI between the received signal strengths RSSI2 to RSSIn of the data frames DFR_2 to DFR_n and the received signal strengths RSSI1 to RSSIn−1 of the data frames DFR_1 to DFR_n−1 directly preceding the data frame DFR_2 to DFR_n are smaller than the threshold Δ_th.

The threshold Δ_th is decided such that, for example, the n variances, which are the differences between the average of n received signal strengths RSSI1 to RSSIn and the n received signal strengths RSSI1 to RSSIn, is within 90% of the average.

On the other hand, if the strength difference ΔRSSI is not smaller than the threshold Δ_th, the receiver 502 determines whether the number $n_{RSSI}$ of the data frames DFR for which the strength difference ΔRSSI is not smaller than the threshold Δ_th is not larger than the permitted value $w_{RSSI}$. The permitted value $w_{RSSI}$ is 1 or 2.

If the number $n_{RSSI}$ is not larger than the permitted value $w_{RSSI}$, the receiver 502 discards the data frames DFR for which the strength difference ΔRSSI is not smaller than the threshold Δ_th, and performs the receiving process for the data frames DFR_1 to DFR_n in the manner described above.

On the other hand, if the number $n_{RSSI}$ is larger than the permitted value $w_{RSSI}$, the receiver 502 determines that it has failed to receive the data frames DFR_1 to DFR_n, and stops the receiving process for the data frames DFR_1 to DFR_n.

Figure 34:
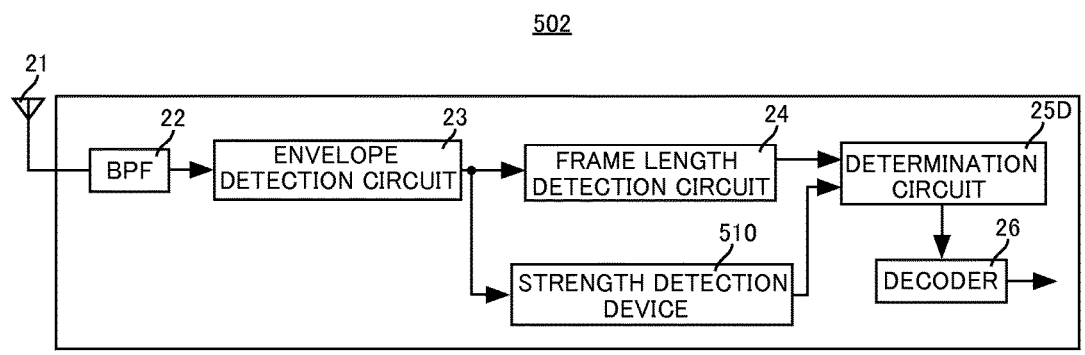
FIG. 34 is a schematic diagram of the receiver of FIG. 33.

FIG. 34 is a schematic diagram of the receiver 502 of FIG. 33. Referring to FIG. 34, the receiver 502 is the same as the receiver 2 except that the determination circuit 25 of the receiver 2 of FIG. 3 is replaced by a determination circuit 25D and a strength detection circuit 510 is added.

In the receiver 502, the envelope detection circuit 23 outputs a detected envelope to the frame length detection circuit 24 and strength detection circuit 510.

The strength detection circuit 510 receives a plurality of envelopes from the envelope detection circuit 23, detects the strengths of the plurality of envelopes that have been received as the received signal strengths RSSI1 to RSSIn, and outputs the detected received signal strengths RSSI1 to RSSIn to the determination circuit 25D.

The determination circuit 25D receives the plurality of frame lengths for the data frames DFR from the frame length detection circuit 24 and receives the received signal strengths RSSI1 to RSSIn from the strength detection circuit 510.

Then, the determination circuit 25D detects the strength difference ΔRSSI between the received signal strengths RSSI2 to RSSIn of the data frames DFR_2 to DFR_n and the received signal strengths RSSI1 to RSSIn-1 of the data frame DFR_1 to DFR_n-1, and determines whether the strength difference ΔRSSI that has been detected is smaller than the threshold Δ_th.

If the strength difference ΔRSSI is smaller than the threshold Δ_th, the determination circuit 25D outputs the plurality of frame lengths to the decoder 26.

On the other hand, if the strength difference ΔRSSI is not smaller than the threshold Δ_th, the determination circuit 25D determines whether the number $n_{RSSI}$ of the data frames DFR for which the strength difference ΔRSSI is not smaller than the threshold Δ_th is not larger than the permitted value $w_{RSSI}$.

If the number $n_{RSSI}$ is not larger than the permitted value $w_{RSSI}$, the determination circuit 25D discards the data frames DFR for which the strength difference ΔRSSI is not smaller than the threshold Δ_th, and outputs the plurality of frame lengths to the decoder 26.

On the other hand, if the number $n_{RSSI}$ is larger than the permitted value $w_{RSSI}$, the determination circuit 25D determines that it has failed to receive the data frames DFR_1 to DFR_n, and discards the plurality of frame lengths.

Otherwise, the determination circuit 25D performs the same functions as the determination circuit 25.

Figure 35:
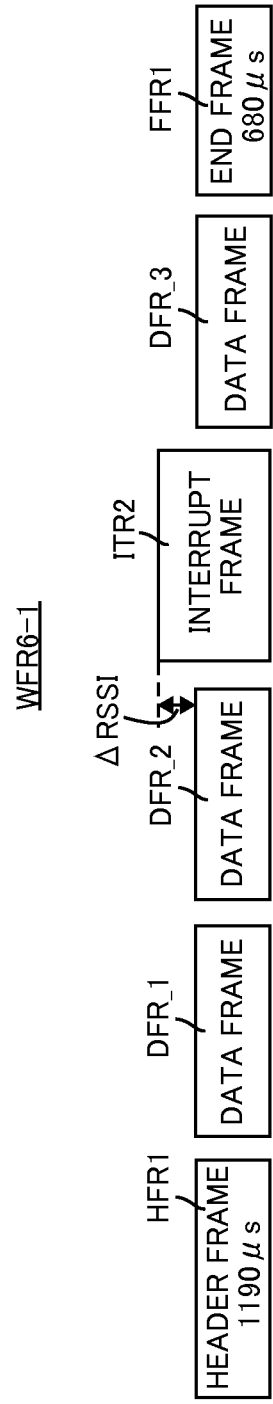
FIG. 35 illustrates a reception state of a radio frame in Embodiment 6.

FIG. 35 illustrates a manner in which a radio frame WFR6 is received according to Embodiment 6. The transmitter 1 transmits a header frame HFR1, data frames DFR_1 to DFR_3 and an end frame FFR1 one after another in accordance with the CSMA/CA scheme.

Then, the receiver 502 sequentially receives the header frame HFR1, the data frames DFR_1 and DFR_2, an interrupt frame ITR2, the data frame DFR_3 and the end frame FFR1.

The strength detection circuit 510 of the receiver 502 receives, from the envelope detection circuit 23, an envelope EVL1 for the header frame HFR1, an envelope EVL2 for the data frame DFR_1, data frame DFR_2, interrupt frame ITR2 and data frame DFR_3, and an envelope EVL3 for the end frame FFR1.

The strength detection circuit 510 detects the strength of the envelope EVL1 as a received signal strength RSSI_HFR, detects the strength of the envelope EVL2 as a received signal strengths RSSI1 to RSSI4, and detects the strength of the envelope EVL3 as a received signal strength RSSI_FFR.

Then, the strength detection circuit 510 outputs the received signal strength RSSI_HFR, received signal strengths RSSI1 to RSSI4 and received signal strength RSSI_FFR to the determination circuit 25D.

The determination circuit 25D receives, from the frame length detection circuit 24, the frame length of the header frame HFR1, the four frame lengths of the data frame DFR_1, data frame DFR_2, interrupt frame ITR2 and data frame DFR_3, and the frame length of the end frame FFR1. Further, the determination circuit 25D receives the received signal strength RSSI_HFR, received signal strengths RSSI1 to RSSI3 and RSSI_ITR, and the received signal strength RSSI_FFR from the strength detection circuit 510.

Then, if the frame length of the header frame HFR1 is equal to 1190 μs, the determination circuit 25D senses the beginning of the data to be transmitted.

When the determination circuit 25D has sensed the beginning of the data to be transmitted, it detects the strength difference $\Delta RSSI_{1-2}$ between the received signal strength RSSI2 and received signal strength RSSI1, and determines that the detected $\Delta RSSI_{1-2}$ is smaller than the threshold Δ_th.

Then, the determination circuit 25D detects the strength difference $\Delta RSSI_{2-ITR}$ between the received signal strength RSSI_ITR and received signal strength RSSI2, and determines that the strength difference $\Delta RSSI_{2-ITR}$ is smaller than the threshold Δ_th.

Thereafter, the determination circuit 25D ignores the interrupt frame ITR2 and detects the strength difference $\Delta RSSI_{2-3}$ between the received signal strength RSSI3 and received signal strength RSSI2, and determines that the strength difference $\Delta RSSI_{2-3}$ is smaller than the threshold Δ_th.

Then, the determination circuit 25D sequentially outputs the three frame lengths of the data frames DFR_1 to DFR_3 to the decoder 26.

On the other hand, if the determination circuit 25D determines that the strength difference $\Delta RSSI_{2-ITR}$ is not smaller than the threshold Δ_th, it counts the number $n_{RSSI}$ of the interrupt frame ITR2 for which the strength difference $\Delta RSSI_{2-ITR}$ is not smaller than the threshold Δ_th, the number $n_{RSSI}$ being 1. Then, the determination circuit 25D ignores the interrupt frame ITR2 and detects the strength difference $\Delta RSSI_{2-3}$ between the received signal strength RSSI3 and received signal strength RSSI2, and determines that the strength difference $\Delta RSSI_{2-3}$ is smaller than the threshold Δ_th.

Thereafter, the determination circuit 25D determines that the number $n_{RSSI}$, i.e. 1, is not larger than the permitted value $w_{RSSI}$ (i.e. 1 or 2), and sequentially outputs the three frame lengths of the data frames DFR_1 to DFR_3 to the decoder 26.

If the number $n_{RSSI}$, i.e. 1, is larger than the permitted value $w_{RSSI}$ (i.e. 1 or 2), the determination circuit 25D discards the three frame lengths of the data frames DFR_1 to DFR_3.

After the determination circuit 25D has outputted the three frame lengths of the data frames DFR_1 to DFR_3 to the decoder 26, it senses the end of the data to be transmitted when the frame length of the end frame FFR1 is equal to 680 μs.

The decoder 26 refers to the correspondence table TBL1 to sequentially convert the three frame lengths received from the determination circuit 25D to bit values.

Thus, Embodiment 6 uses the received signal strength RSSI of a data frame DFR to detect the interrupt frame ITR, and, if the strength difference ΔRSSI in received signal strength between the detected interrupt frame ITR and the data frame DFR is not smaller than a threshold Δ_th, permits a number $n_{RSSI}$ of interrupt frames for which the strength difference ΔRSSI is not smaller than the threshold Δ_th that is not larger than a permitted value $w_{RSSI}$, and ignores the frames for which the strength difference ΔRSSI is not smaller than the threshold Δ_th and continues the receiving process. If the number $n_{RSSI}$ is larger than the permitted value $w_{RSSI}$, it stops the receiving process.

This can prevents a number of interrupt frames ITR that is larger than the permitted value $w_{RSSI}$ from interrupting the sequence of the data frames DFR_1 to DFR_n.

Figure 36:
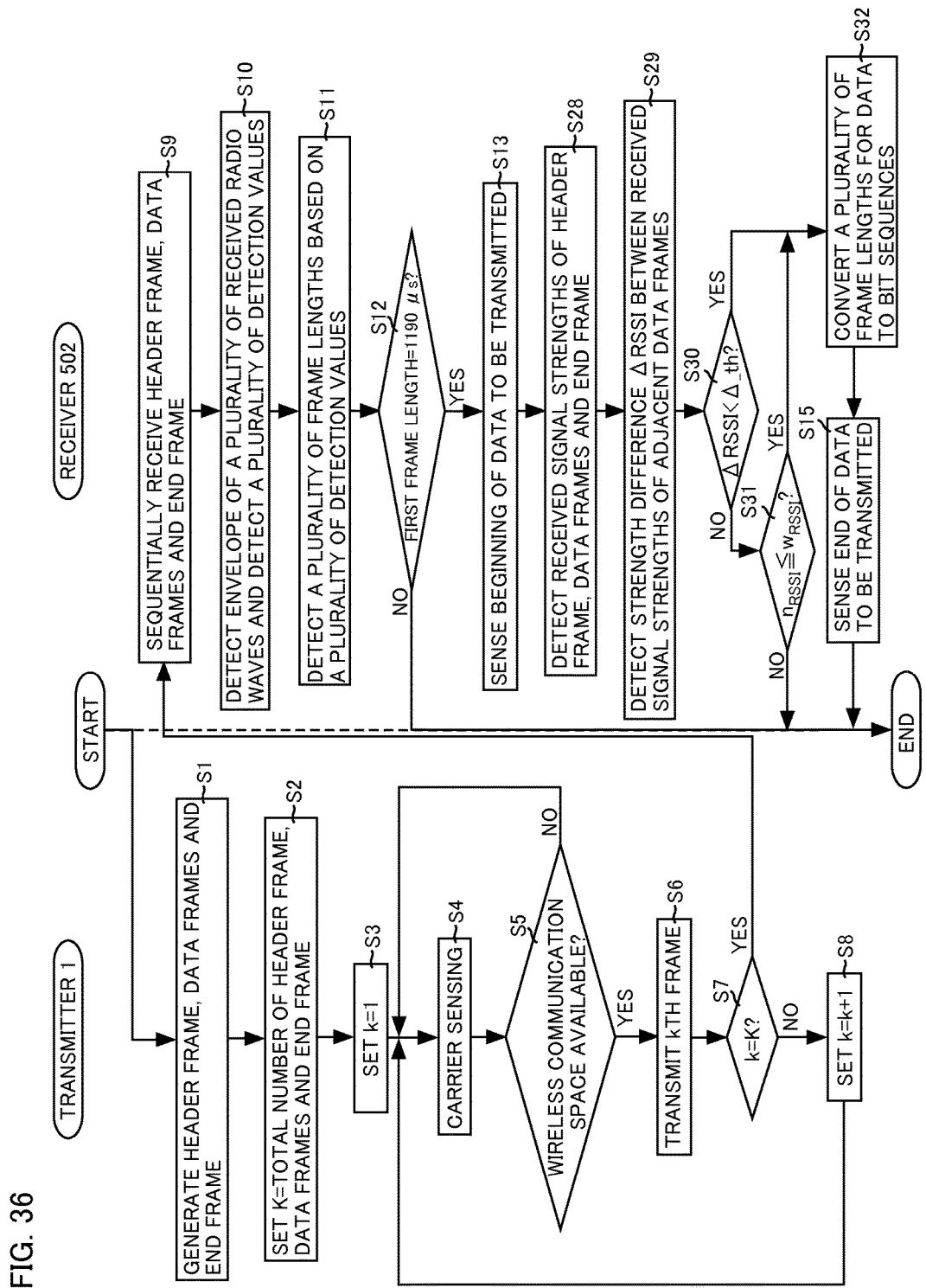
FIG. 36 is a flow chart illustrating the operation of the wireless communication system of FIG. 33.

FIG. 36 is a flow chart illustrating the operation of the wireless communication system 500 of FIG. 33.

The flow chart of FIG. 36 is the same as the flow chart of FIG. 8 except that step S14 of the flow chart of FIG. 8 is replaced by steps S28 to S32.

Referring to FIG. 36, when the operation of the wireless communication system 500 is started, the transmitter 1 sequentially executes steps S1 to S8 described above.

Then, the receiver 502 sequentially executes steps S9 to S13 described above. After step S13, the strength detection circuit 510 of the receiver 502 detects the received signal strengths of the header frame HFR1, data frames DFR_1 to DFR_n and end frame FFR1 (step S28).

Thereafter, the determination circuit 25D of the receiver 502 detects the strength difference ΔRSSI between the received signal strengths of adjacent data frames (step S29).

Subsequently, the determination circuit 25D determines whether the strength difference ΔRSSI is smaller than the threshold Δ_th (step S30).

If it is determined at step S30 that the strength difference ΔRSSI is not smaller than the threshold Δ_th, the determination circuit 25D further determines whether the number $n_{RSSI}$ of the interrupt frames for which the strength difference ΔRSSI is not smaller than the threshold Δ_th is not larger than the permitted value $w_{RSSI}$ (step S31).

If it is determined at step S30 that the strength difference ΔRSSI is smaller than the threshold Δ_th, or if it is determined at step S31 that the number $n_{RSSI}$ is not larger than the permitted value $w_{RSSI}$, the determination circuit 25D outputs the plurality of frame lengths for the data frames DFR to the decoder 26, and the decoder 26 refers to the correspondence table TBL1 to convert the plurality of frame lengths to a bit sequence (step S32). Thereafter, the receiver 502 performs step S15 described above.

If it is determined at step S12 that the first frame length is not equal to 1190 μs, or if it is determined at step S31 that the number $n_{RSSI}$ is larger than the permitted value $w_{RSSI}$, or after step S15, the operation ends.

Thus, Embodiment 6 uses the received signal strength RSSI of a data frame DFR to detect the interrupt frame ITR, and, if the strength difference ΔRSSI in received signal strength between the detected interrupt frame ITR and the data frame DFR is not smaller than the threshold Δ_th, permits that a number $n_{RSSI}$ of the interrupt frames for which the strength difference ΔRSSI is not smaller than the threshold Δ_th is not larger than the permitted value $w_{RSSI}$, and ignores the frames for which the strength difference ΔRSSI is not smaller than the threshold Δ_th and continues the receiving process. If the number $n_{RSSI}$ is larger than the permitted value $w_{RSSI}$, it stops the receiving process.

This can prevents a number of interrupt frames ITR that is larger than the permitted value $w_{RSSI}$ from interrupting the sequence of the data frames DFR_1 to DFR_n.

In the above description, the strength difference ΔRSSI is the strength difference between one of the received signal strengths RSSI2 to RSSIn of the data frames DFR_2 to DFR_n and one of the received signal strengths RSSI1 to RSSIn-1 of the data frames DFR_1 to DFR_n-1; however, Embodiment 6 is not limited to such an implementation, and, in connection with those of the received signal strengths RSSI1 to RSSIn that are the third and following ones, i.e. the received signal strengths RSSI3 to RSSIn, the strength difference ΔRSSI may be the strength difference between the average of a plurality of the received signal strengths before the received signal strengths RSSI3 to RSSIn and the received signal strengths RSSI3 to RSSIn.

In Embodiment 6, the operations of the transmitter 501 and receiver 502 may be carried out by a program. In this case, each of the transmitter 501 and receiver 502 includes a CPU, a ROM and a RAM. In the transmitter 501, the ROM stores the program A including steps S1 to S8 shown in FIG. 36, and the CPU reads the program A from the ROM and executes it. Thus, the operation of the transmitter 501 is performed. In the receiver 502, the ROM stores a program H including steps S9 to S13, S28 to S32 and S15 shown in FIG. 36, and the CPU reads the program H from the ROM and executes it. Thus, the operation of the receiver 502 is performed. Further, each of the ROMs of the transmitter 501 and receiver 502 corresponds to the storage medium storing a computer- (i.e. CPU-) readable program.

Otherwise, the description of Embodiment 6 is the same as that of Embodiment 1.

[Embodiment 7]

Figure 37:
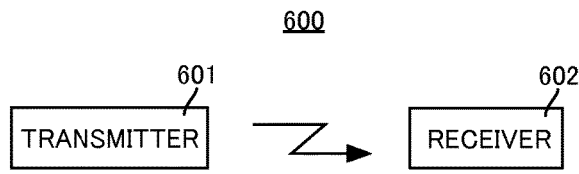
FIG. 37 is a schematic diagram of a wireless communication system according to Embodiment 7.

FIG. 37 is a schematic diagram of a wireless communication system according to Embodiment 7. Referring to FIG. 37, the wireless communication system 600 according to Embodiment 7 includes a transmitter 601 and a receiver 602.

The transmitter 601 and receiver 602 are positioned in a wireless communication space. The transmitter 601 generates identifier frames DGFR_1 to DGFR_s (s is an integer not smaller than 1) having frame lengths representing an identifier of a destination of transmission in the manner described below, and generates the data frames DFR_1 to DFR_n and the end frame FFR1 in the same manner as that in the transmitter 1.

Then, the transmitter 601 transmits the identifier frames DGFR_1 to DGFR_s, data frames DFR_1 to DFR_n and end frame FFR1 one after another in accordance with the CSMA/CA scheme.

The receiver 602 receives the identifier frames DGFR_1 to DGFR_s, data frames DFR_1 to DFR_n and end frame FFR1. Then, the receiver 602 decodes the received radio wave of the identifier frames DGFR_1 to DGFR_s to a bit sequence in the manner described below.

The receiver 602 decodes the received radio wave of the data frames DFR_1 to DFR_n into a bit sequence in the same manner as that in the receiver 2.

Further, the receiver 602 senses the end of the data to be transmitted based on the received radio wave of the end frame FFR1 in the same manner as that in the receiver 2.

Then, if the bit sequence decoded based on the received radio wave of the identifier frames DGFR_1 to DGFR_s matches the identifier of its own, the receiver 602 receives the bit sequence decoded based on the received radio wave of the data frames DFR_1 to DFR_n as the data to be transmitted.

Figure 38:
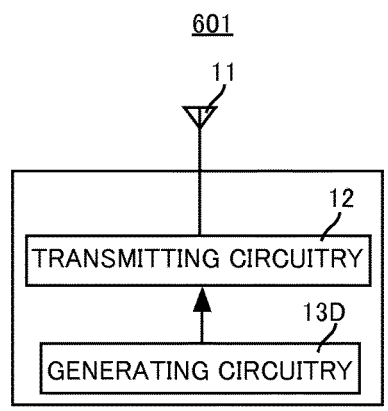
FIG. 38 is a schematic diagram of the transmitter of FIG. 37.

FIG. 38 is a schematic diagram of the transmitter 601 of FIG. 37. Referring to FIG. 38, the transmitter 601 is the same as the transmitter 1 except that the generating circuitry 13 of the transmitter 1 of FIG. 2 is replaced by a generating circuitry 13D.

The generating circuitry 13D holds an identifier of a destination of transmission. Then, the generating circuitry 13D generates identifier frames DGFR_1 to DGFR_s in the manner described below. Further, the generating circuitry 13D generates the data frames DFR_1 to DFR_n and the end frame FFR1 in the same manner as that in the generating circuitry 13.

Then, the generating circuitry 13D outputs the identifier frames DGFR_1 to DGFR_s, data frames DFR_1 to DFR_n and end frame FFR1 to the transmitting circuitry 12.

In the transmitter 601, the transmitting circuitry 12 sequentially transmits the identifier frames DGFR_1 to DGFR_s, data frames DFR_1 to DFR_n and end frame FFR1 in accordance with the CSMA/CA scheme.

Figure 39:
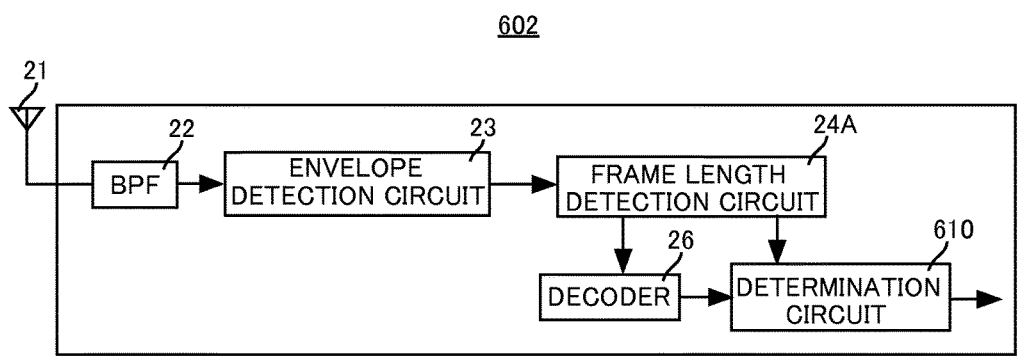
FIG. 39 is a schematic diagram of the receiver of FIG. 37.

FIG. 39 is a schematic diagram of the receiver 602 of FIG. 37. Referring to FIG. 39, the receiver 602 is the same as the receiver 2 except that the frame length detection circuit 24 of the receiver 2 of FIG. 3 is replaced by a frame length detection circuit 24A and the detection circuit 25 is replaced by a determination circuit 610.

The frame length detection circuit 24A detects the plurality of frame lengths in the same manner as that in the frame length detection circuit 24, and outputs the plurality of frame lengths that have been detected except for the last frame length to the decoder 26, and outputs the last frame length to the determination circuit 610.

The determination circuit 610 holds an identifier of the receiver 602. The determination circuit 610 receives a bit sequence from the decoder 26. Then, the determination circuit 610 determines whether the bit sequence of the identifier frames DGFR_1 to DGFR_s matches the identifier of the receiver 602.

If the bit sequence of the identifier frames DGFR_1 to DGFR_s matches the identifier of the receiver 602, the determination circuit 610 senses the beginning of the data to be transmitted and determines that the bit sequence of the data frames DFR_1 to DFR_n is data addressed to the receiver 602.

Then, when the determination circuit 610 senses the end of the data to be transmitted based on the last frame length received from the frame length detection circuit 24A, it outputs the bit sequence of the data frames DFR_1 to DFR_n as the data to be transmitted to the host system.

Figure 40:
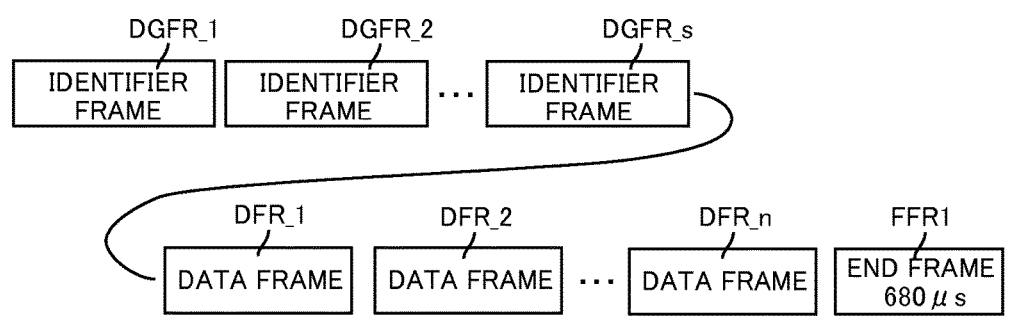
FIG. 40 conceptually illustrates a radio frame according to Embodiment 7.

FIG. 40 conceptually illustrates a radio frame according to Embodiment 7. Referring to FIG. 40, the radio frame WFR7 in Embodiment 7 includes the identifier frames DGFR_1 to DGFR_s, data frames DFR_1 to DFR_n and end frame FFR1.

The identifier frames DGFR_1 to DGFR_s have frame lengths that represent an identifier of a destination of transmission.

The data frames DFR_1 to DFR_n are positioned to follow the identifier frames DGFR_1 to DGFR_s, and the end frame FFR1 is positioned to follow the data frames DFR_1 to DFR_n.

The generating circuitry 13D of the transmitter 610 holds the correspondence table TBL1 (see FIG. 5) and the correspondence table TBL3 (see FIG. 24).

Then, the generating circuitry 13D divides the bit sequence representing the identifier of the destination of transmission into bit values with 4 bits, and refers to the correspondence table TBL1 to convert the divided bit values to frame lengths, and generates identifier frames DGFR_1 to DGFR_s having the converted frame lengths.

The generating circuitry 13D divides the bit sequence representing the data to be transmitted into bit values with 4 bits, and refers to the correspondence table TBL3 to convert the divided bit values to frame lengths, and generates data frames DFR_1 to DFR_n having the converted frame lengths.

In Embodiment 7, the decoder 26 holds the correspondence tables TBL1 and TBL3. If the frame length received from the frame length detection circuit 24A is contained in the correspondence table TBL1, the decoder 26 refers to the correspondence table TBL1 to convert the frame lengths to a bit sequence, and outputs the converted bit sequence to the determination circuit 610.

If the frame length received from the frame length detection circuit 24A is contained in the correspondence table TBL3, the decoder 26 refers to the correspondence table TBL3 to convert the frame lengths to a bit sequence, and outputs the converted bit sequence to the determination circuit 610.

Figure 41:
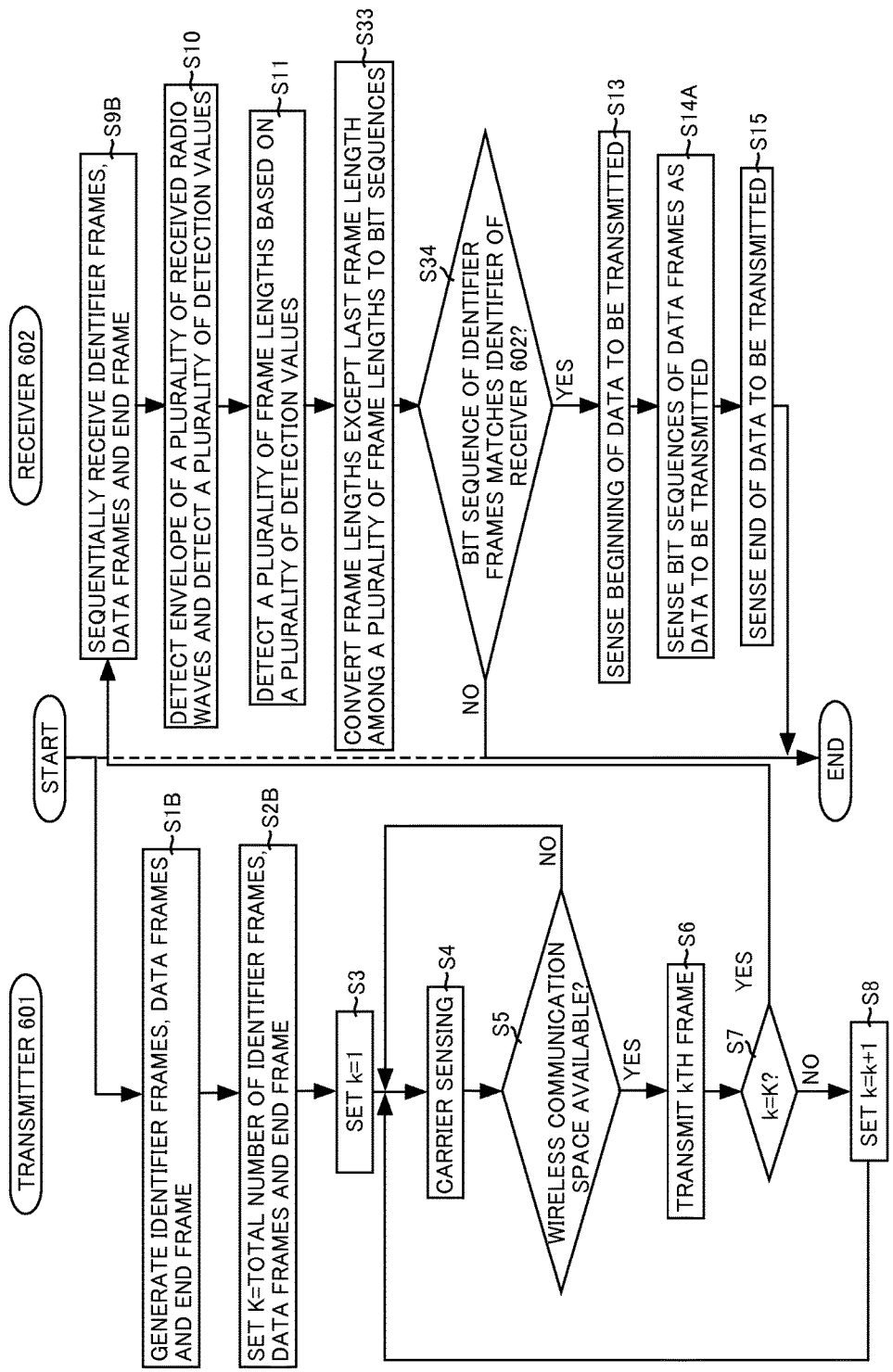
FIG. 41 is a flow chart illustrating the operation of the wireless communication system of FIG. 37.

FIG. 41 is a flow chart illustrating the operation of the wireless communication system 600 of FIG. 37.

The flow chart of FIG. 41 is the same as the flow chart of FIG. 8 except that steps S1, S2, S9 and S14 of the flow chart of FIG. 8 are replaced by steps S1B, S2B, S9B and S14A, respectively, and step S12 is replaced by steps S33 and S34.

Referring to FIG. 41, when the operation of the wireless communication system 600 is started, the transmitter 601 generates the identifier frames DGFR_1 to DGFR_s, data frames DFR_1 to DFR_n and end frame FFR1 in the manner described above (step S1B).

Then, the transmitter 601 sets K=total number of the identifier frames DGFR_1 to DGFR_s, data frames DFR_1 to DFR_n and end frame FFR1 (step S2B).

Thereafter, the receiver 601 sequentially executes steps S3 to S8 described above.

If it is determined at step S7 that k=K, the receiver 601 ends transmission of the radio frame WFR7.

Then, the receiver 602 sequentially receives the identifier frames DGFR_1 to DGFR_s, data frames DFR_1 to DFR_n and end frame FFR1 (step S9B).

Thereafter, the receiver 602 sequentially executes steps S10 and S11 described above. After step S11, the receiver 602 converts the plurality of frame lengths except for the last frame length to a bit sequence (step S33).

More specifically, if the frame length received from the frame length detection circuit 24A is contained in the correspondence table TBL1, the decoder 26 of the receiver 602 refers to the correspondence table TBL1 to convert the frame lengths to bit values. If the frame length received from the frame length detection circuit 24A is contained in the correspondence table TBL3, the decoder 26 refers to the correspondence table TBL3 to convert the frame lengths to bit values.

After step S33, the receiver 602 determines whether the bit sequence of the identifier frames (i.e. bit sequence into which frame lengths have been converted with reference to the correspondence table TBL1) matches the identifier of the receiver 602 (step S34).

If it is determined at step S34 that the bit sequence of the identifier frames matches the identifier of the receiver 602, step S13 described above is performed.

The receiver 602 detects the bit sequence of the data frames (i.e. bit sequence into which data frames have been converted with reference to the correspondence table TBL3) as the data to be transmitted (step S14A).

Thereafter, step S15 described above is executed.

Then, if it is determined at step S34 that the bit sequence of identifier frames does not match the identifier of the receiver 602, or after step S15, the operation ends.

Thus, in Embodiment 7, the transmitter 601 transmits an identifier of a destination of transmission by the identifier frames DGFR_1 to DGFR_s, and, when the bit sequence decoded based on the received radio wave of the identifier frames DGFR_1 to DGFR_s matches the identifier of its own, the receiver 60 detects the bit sequence decoded based on the received radio wave of the data frames DFR_1 to DFR_n as the data to be transmitted.

Thus, a destination of transmission can be designated and data to be transmitted can be modulated with frame lengths and transmitted.

Also, the frame lengths of the identifier frames DGFR_1 to DGFR_s are different from the frame lengths of the data frames DFR_1 to DFR_n, thereby reducing errors in identifiers and data.

In Embodiment 7, the operations of the transmitter 601 and receiver 602 may be carried out by a program. In this case, each of the transmitter 601 and receiver 602 includes a CPU, a ROM and a RAM. In the transmitter 601, the ROM stores a program I including steps S1B, S2B and S3 to S8 shown in FIG. 41, and the CPU reads the program I from the ROM and executes it. Thus, the operation of the transmitter 601 is performed. In the receiver 602, the ROM stores a program J including steps S9B, S10 to S13, S34, S13, S14A and S15 shown in FIG. 41, and the CPU reads the program J from the ROM and executes it. Thus, the operation of the receiver 602 is performed. Further, each of the ROMs of the transmitter 601 and receiver 602 corresponds to the storage medium storing a computer- (i.e. CPU-) readable program.

Otherwise, the description of Embodiment 7 is the same as that of Embodiment 1.

[Embodiment 8]

Figure 42:
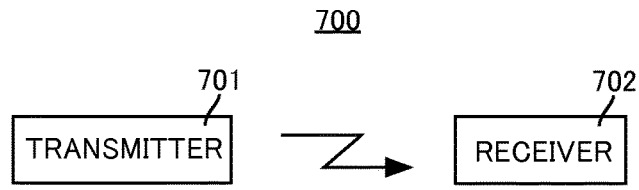
FIG. 42 is a schematic diagram of a configuration of a wireless communication system according to Embodiment 8.

FIG. 42 is a schematic diagram of a configuration of a wireless communication system according to Embodiment 8. Referring to FIG. 42, the wireless communication system 700 according to Embodiment 8 includes a transmitter 701 and a receiver 702.

The transmitter 701 and receiver 702 are positioned in a wireless communication space. The transmitter 701 generates the header frame HFR1 in the same manner as that in the transmitter 1. The transmitter 701 generates data frames DFR_1 to DFR_n in the manner described below, generates an end frame FFR2 having frame length that indicates the end of the data to be transmitted and the number of transmissions of the data frames DFR_1 to DFR_n in the manner described below, and generates a verification frame VFR for verifying the data frames DFR_1 to DFR_n for an error in the manner described below.

Then, the transmitter 701 repeatedly performs, a predetermined number of transmissions, a transmitting process in which the header frame HFR1, data frames DFR_1 to DFR_n, verification frame VFR and end frame FFR2 are transmitted in accordance with the CSMA/CA scheme.

The receiver 702 sequentially receives the header frame HFR1, data frames DFR_1 to DFR_n, verification frame VFR and end frame FFR2. Then, based on the frame length of the header frame HFR1, the receiver 702 senses the beginning of the data to be transmitted.

The receiver 702 repeatedly performs, the number of transmissions of the data frames DFR_1 to DFR_n, a decoding process in which the received radio wave of the data frames DFR_1 to DFR_n is decoded into a bit sequence in the manner described below, and, if the bit sequences for the number of transmissions match each other, receives the bit sequences as the data to be transmitted.

Further, based on the verification frame VFR, the receiver 702 detects an error in the data frames DFR_1 to DFR_n.

Further, based on the end frame FFR2, the receiver 702 senses the end of the data to be transmitted and the number of transmissions of the data frames DFR_1 to DFR_n.

Figure 43:
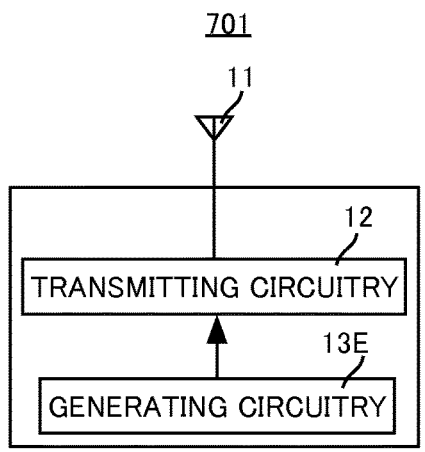
FIG. 43 is a schematic diagram of the transmitter of FIG. 42.

FIG. 43 is a schematic diagram of the transmitter 701 of FIG. 42. Referring to FIG. 43, the transmitter 701 is the same as the transmitter 1 except that the generating circuitry 13 of the transmitter 1 of FIG. 2 is replaced by a generating circuitry 13E.

The generating circuitry 13E holds a number of transmissions of the data frames DFR_1 to DFR_n. The generating circuitry 13E generates a header frame HFR1 in the same manner as that in the generating circuitry 13. The generating circuitry 13E generates data frames DFR_1 to DFR_n in the manner described below, generates an end frame FFR2 having a frame length that indicates the end of the data to be transmitted and the number of transmissions of the data frames DFR_1 to DFR_n in the manner described below, and generates a verification frame VFR for verifying the data frames DFR_1 to DFR_n for an error in the manner described below.

Then, the generating circuitry 13E outputs the header frame HFR1, data frames DFR_1 to DFR_n, verification frame VFR, end frame FFR2 and number of transmissions of the data frames DFR_1 to DFR_n to the transmitting circuitry 12.

In the transmitter 701, the transmitting circuitry 12 repeatedly transmits the header frame HFR1, data frames DFR_1 to DFR_n, verification frame VFR, and end frame FFR2 in accordance with the CSMA/CA scheme the number of transmissions of the data frames DFR_1 to DFR_n.

Figure 44:
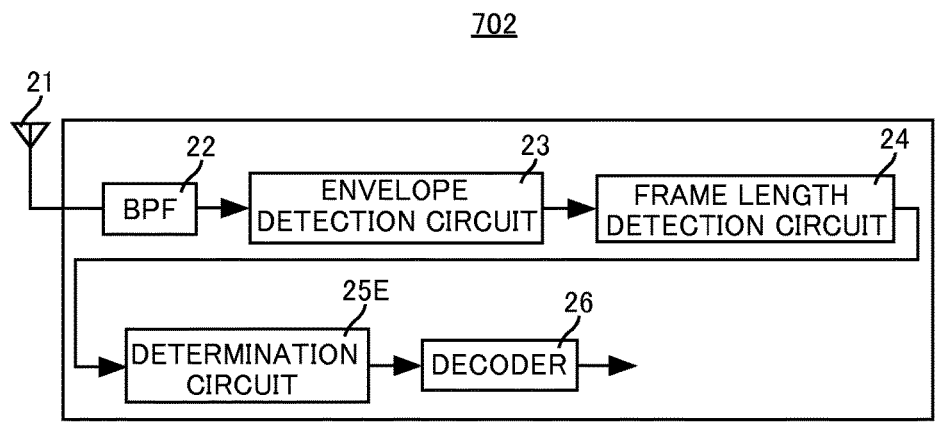
FIG. 44 is a schematic diagram of the receiver of FIG. 42.

FIG. 44 is a schematic diagram of the receiver 702 of FIG. 42. Referring to FIG. 44, the receiver 702 is the same as the receiver 2 except that the determination circuit 25 of the receiver 2 of FIG. 3 is replaced by a determination circuit 25E.

Based on the frame length of the header frame HFR1, the determination circuit 25E senses the beginning of the data to be transmitted.

If the determination circuit 25E detects an error in the data frames DFR_1 to DFR_n based on the frame length of the verification frame VFR, it discards the plurality of frame lengths.

On the other hand, if the determination circuit 25E does not detect an error in the data frames DFR_1 to DFR_n, it senses the end of the data to be transmitted based on the frame length of the end frame FFR2, and senses the number of transmissions of the data frames DFR_1 to DFR_n.

Then, the determination circuit 25E receives, from the frame length detection circuit 24, the plurality of frame lengths of the data frames DFR_1 to DFR_n the number of transmissions, and, if the plurality of frame lengths for the number of transmissions match each other, outputs the plurality of frame lengths to the decoder 26.

Figure 45:
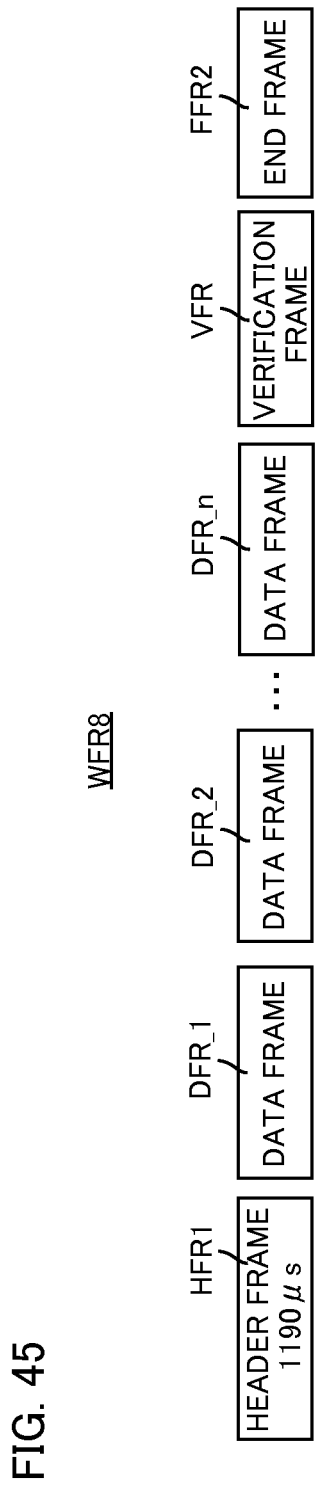
FIG. 45 conceptually illustrates a radio frame according to Embodiment 8.

FIG. 45 conceptually illustrates a radio frame according to Embodiment 8. Referring to FIG. 45, a radio frame WFR8 of Embodiment 8 includes a header frame HFR1, data frames DFR_1 to DFR_n, verification frame VFR and end frame FFR2.

The data frames DFR_1 to DFR_n are positioned to follow the header frame HFR1, the verification frame VFR is positioned to follow the data frame DFR_n, and the end frame FFR2 is positioned to follow the verification frame VFR.

The verification frame VFR has a frame length $L_V$ for detecting the error in the data frames DFR_1 to DFR_n. Supposing that the frame lengths of the data frames DFR_1 to DFR_n are L1 to Ln, respectively, the frame length $L_V$ is represented as $(L1+L2+ \ldots +Ln)/n$ or $|L1-L2+ \ldots +Ln-1-Ln|$.

The end frame FFR2 has a frame length that indicates the end of the data to be transmitted and the number of transmissions of the data frames DFR_1 to DFR_n.

FIG. 46 is a correspondence table illustrating the relationship between the bit value of data and first and second frame lengths.

Referring to FIG. 46, the correspondence table TBL5 contains bit values of data, first frame lengths and second frame lengths. The first frame lengths and second frame lengths are associated with the bit values of data.

The first frame length of 725 μs and the second frame length of 1175 μs are associated with the bit value of "0000". The first frame length of 755 μs and the second frame length of 1145 μs are associated with the bit value of "0001". The first frame length of 785 μs and the second frame length of 1115 μs are associated with the bit value of "0010". The first frame length of 815 μs and the second frame length of 1085 μs are associated with the bit value of "0011". The first frame length of 845 μs and the second frame length of 1055 μs are associated with the bit value of "0100". The first frame length of 875 μs and the second frame length of 1025 μs are associated with the bit value of "0101". The first frame length of 905 μs and the second frame length of 995 μs are associated with the bit value of "0110". The first frame length of 935 μs and the second frame length of 965 μs are associated with the bit value of "0111". The first frame length of 965 μs and the second frame length of 935 μs are associated with the bit value of "1000". The first frame length of 995 μs and the second frame length of 905 μs are associated with the bit value of "1001". The first frame length of 1025 μs and the second frame length of 875 μs are associated with the bit value of "1010". The first frame length of 1055 μs and the second frame length of 845 μs are associated with the bit value of "1011". The first frame length of 1085 μs and the second frame length of 815 μs are associated with the bit value of "1100". The first frame length of 1115 μs and the second frame length of 785 μs are associated with the bit value of "1101". The first frame length of 1145 μs and the second frame length of 755 μs are associated with the bit value of "1110". The first frame length of 1175 μs and the second frame length of 725 μs are associated with the bit value of "1111".

Thus, in Embodiment 8, each of the bit values of "0000" to "1111" is represented by two frame lengths. More specifically, each of the bit values "0000" to "1111" is represented by two frame lengths where, for two bit values A and B, one of the first frame length and second frame length of one bit value A is longer than one of the first frame length and second frame length of the other bit value B and the other one of the first frame length and second frame length of the one bit value A is shorter than the other one of the first frame length and second frame length of the other bit value B.

This allows each of the bit values "0000" to "1111" to be correctly received. The reason follows. Since frame lengths tend to fluctuate to be shorter in wireless communication, it is necessary that an error would occur in a bit value when the longer one of the first and second frame lengths described above becomes a longer frame length, and this fluctuation is unlikely to occur in wireless communication.

The generating circuitry 13E of the transmitter 701 holds a correspondence table TBL5. Then, the generating circuitry 13E divides a bit sequence representing data to be transmitted into bit values with 4 bits, and refers to the correspondence table TBL5 to convert the divided bit values to first and second frame lengths, and generates a data frame DFR having the converted first and second frame lengths.

For example, if the data to be transmitted is represented by the bit sequence of "01100010", the generating circuitry 13E divides the bit sequence "01100010" into the bit values "0110" and "0010", and refers to the correspondence table TBL5 to convert the divided bit value "0110" to the frame lengths of [905 μs, 995 μs], and refers to the correspondence table TBL5 to convert the bit value "0010" to the frame lengths of [785 μs, 1115 μs]. Then, the data frame DFR_1 is composed of a frame having the frame length of 905 μs and a frame having the frame length of 995 μs, while the data frame DFR_2 is composed of a frame having the frame length of 785 μs and a frame having the frame length of 1115 μs.

If two frame lengths are assigned to each of the bit values of "0000" to "1111", each of the frame lengths L1 to Ln of the data frames DFR_1 to DFR_n is constituted by the average of a first frame length and a second frame length. Thus, the generating circuitry 13E calculates the average of first and second frame lengths to determine the frame lengths L1 to Ln, and, based on the determined frame lengths L1 to Ln, calculates (L1+L2+ . . . +Ln)/n or |L1−L2+ . . . +Ln−1−Ln|, thereby determining the frame length $L_V$.

Further, the decoder 26 of the receiver 702 holds the correspondence table TBL5, and refers to the correspondence table TBL5 to convert each pair of two frame lengths to a bit value for decoding to provide a bit sequence representing the data to be transmitted.

FIG. 47 is a correspondence table illustrating the relationship between the number of transmissions and frame length. Referring to FIG. 47, the correspondence table TBL6 contains numbers of transmissions and frame lengths. The frame lengths are associated with the numbers of transmissions.

The frame length of 1200 μs is associated with the number of transmissions of 2; the frame length of 1230 μs is associated with the number of transmissions of 3; the frame length of 1260 μs is associated with the number of transmissions of 4; and the frame length of 1290 μs is associated with the number of transmissions of 5.

The generating circuitry 13E of the transmitter 701 holds the correspondence table TBL6. Then, the generating circuitry 13E refers to the correspondence table TBL6 to detect the frame length associated with the number of transmissions that it holds, and generates an end frame FFR2 having the detected frame length.

Further, the determination circuit 25E of the receiver 702 holds the correspondence table TBL6. Then, the determination circuit 25E refers to the correspondence table TBL6 to detect the number of transmissions associated with the last frame length received from the frame length detection circuit 24, thereby sensing the number of transmissions of the data frames DFR_1 to DFR_n.

How the receiver 702 receives the radio frame WFR8 will be described. It is supposed that the frame length L1 of the data frame DFR_1 is represented by L1=($L_{11}$, $L_{12}$), the frame length L2 of the data frame DFR_2 is represented by L2=($L_{21}$, $L_{22}$), and so forth, and the frame length Ln of the data frame DFR_n is represented by Ln=($L_{n1}$, $L_{n2}$). Here, $L_{11}$ to $L_{n1}$ are the first frame lengths in the correspondence table TBL5, while $L_{12}$ to $L_{n2}$ are the second frame lengths in the correspondence table TBL5.

When the receiver 702 has received the radio frame WFR8, based on the plurality of envelopes from the envelope detection circuit 23, the frame length detection circuit 24 sequentially detects the plurality of frame lengths $L_H$, L1=($L_{11}$, $L_{12}$) to Ln=($L_{n1}$, $L_{n2}$), $L_V$ and $L_F$, and sequentially outputs the plurality of frame lengths $L_H$, L1=($L_{11}$, $L_{12}$) to $Ln=(L_{n1}, L_{n2})$, $L_V$ and $L_F$ that have been detected to the determination circuit 25E. Here, $L_H$ is the frame length of the header frame HFR1, and $L_F$ is the frame length of the end frame FFR1.

When the determination circuit 25E has received the frame length $L_H$, it determines whether the received frame length $L_H$ is equal to 1190 µs, and, if the frame length $L_H$ is equal to 1190 µs, it senses the beginning of the data to be transmitted.

Thereafter, the determination circuit 25E sequentially receives the frame lengths $L1=(L_{11}, L_{12})$ to $Ln=(L_{n1}, L_{n2})$ and $L_V$. Since the determination circuit 25E holds the number n of the data frames DFR_1 to DFR_n, it senses that the 2n frame lengths are the frame lengths of the data frames DFR_1 to DFR_n, and detects that the frame length received after the 2n frame lengths is the frame length $L_V$ of the verification frame VFR.

Thereafter, the determination circuit 25E calculates the average of each of $(L_{11}, L_{12})$ to $(L_{n1}, L_{n2})$ to determine the frame lengths L1 to Ln, and, based on the determined frame lengths L1 to Ln, calculates (L1+L2+ ... +Ln)/n or |L1−L2+ ... +Ln−1−Ln|. Then, the determination circuit 25E determines whether (L1+L2+ ... +Ln)/n or |L1−L2+ ... +Ln−1−Ln| that has been calculated matches the frame length $L_V$.

If (L1+L2+ ... +Ln)/n or |L1−L2+ ... +Ln−1−Ln| matches the frame length $L_V$, the determination circuit 25E determines that there is no error in the data frames DFR_1 to DFR_n. On the other hand, if (L1+L2+ ... +Ln)/n or |L1−L2+ ... +Ln−1−Ln| does not match the frame length $L_V$, the determination circuit 25E senses that there is an error in the data frames DFR_1 to DFR_n, and discards the frame lengths $(L_{11}, L_{12})$ to $(L_{n1}, L_{n2})$. Thus, the determination circuit 25E senses that the receiver has failed to receive the radio frame WFR8.

If determination circuit 25E has determined that there is no error in the data frames DFR_1 to DFR_n, upon receiving the last frame length $L_F$, it refers to the correspondence table TBL6 to detect the number of transmissions corresponding to the frame length $L_F$, and senses the end of the data to be transmitted. Then, the determination circuit 25E waits for the plurality of frame lengths $L_H$, $L1=(L_{11}, L_{12})$ to $Ln=(L_{n1}, L_{n2})$, $L_V$ and $L_F$ supplied from the frame length detection circuit 24.

When the determination circuit 25E has received the plurality of frame lengths $L_H$, $L1=(L_{11}, L_{12})$ to $Ln=(L_{n1}, L_{n2})$, $L_V$ and $L_F$, it repeats the operations described above.

The determination circuit 25E repeats the operations described above the number of transmissions, and, if there is no error in the data frames DFR_1 to DFR_n, it determines whether the values of $L1=(L_{11}, L_{12})$ to $Ln=(L_{n1}, L_{n2})$ for the number of transmissions match each other.

If the values of $L1=(L_{11}, L_{12})$ to $Ln=(L_{n1}, L_{n2})$ for the number of transmissions match each other, the determination circuit 25E outputs $(L_{11}, L_{12})$ to $(L_{n1}, L_{n2})$ to the decoder 26. On the other hand, if the values of $L1=(L_{11}, L_{12})$ to $Ln=(L_{n1}, L_{n2})$ for the number of transmissions do not match each other, the determination circuit 25E discards $(L_{11}, L_{12})$ to $(L_{n1}, L_{n2})$ and senses that the receiver has failed to receive the radio frame WFR8.

Figure 48:
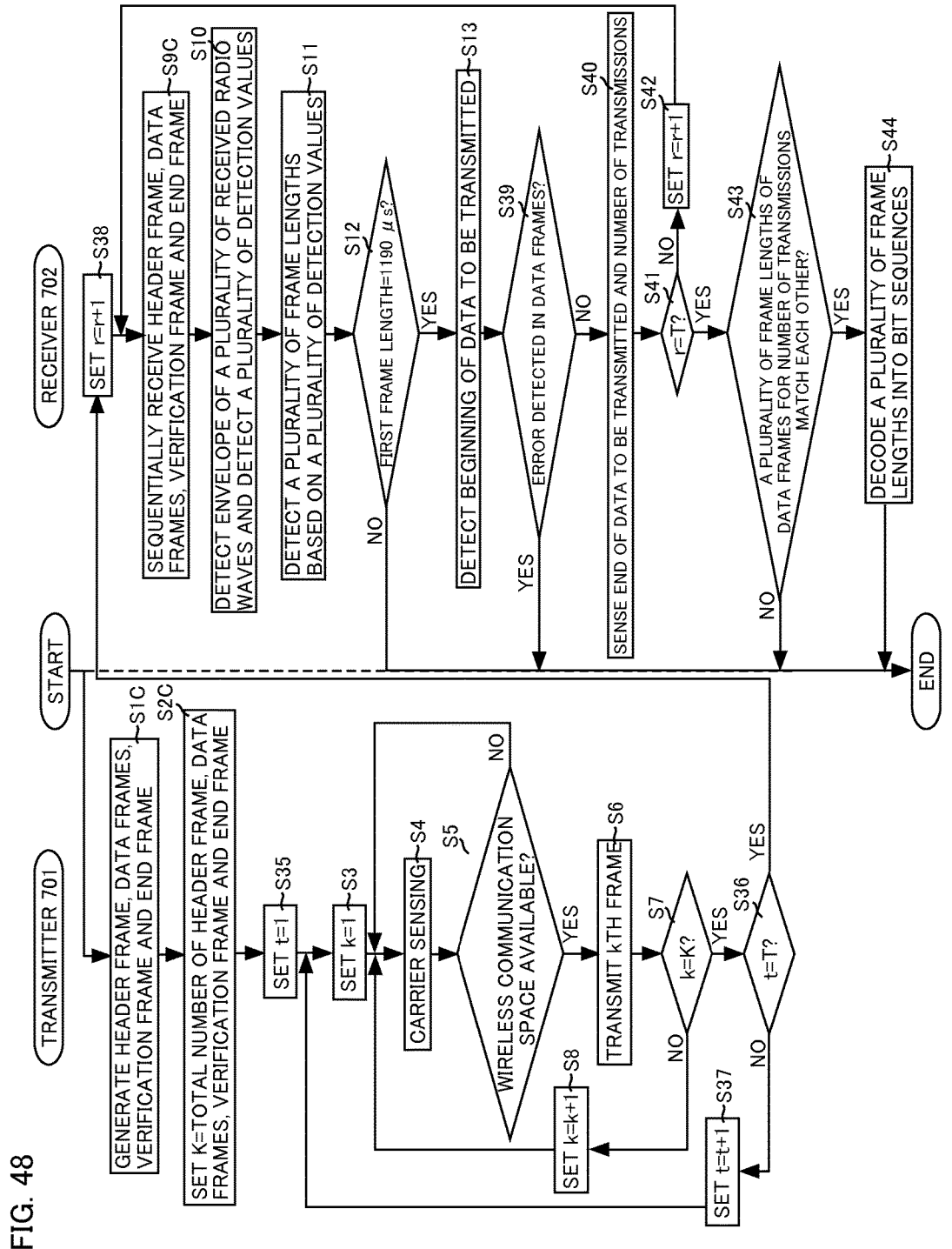
FIG. 48 is a flow chart illustrating the operation of the wireless communication system of FIG. 42.

FIG. 48 is a flow chart illustrating the operation of the wireless communication system 700 of FIG. 42.

The flow chart of FIG. 42 is the same as the flow chart of FIG. 8 except that steps S1, S2 and S9 of the flow chart of FIG. 8 are replaced by steps S1C, S2C and S9C, respectively, and steps S35 to S44 are added.

Referring to FIG. 48, when the operation of the wireless communication system 700 is started, the transmitter 701 generates the header frame HFR1, data frames DFR_1 to DFR_n, verification frame VFR and end frame FFR2 in the manner described above (step S1C).

Then, the transmitter 701 sets K=total number of the header frame HFR1, data frames DFR_1 to DFR_n, verification frame VFR and end frame FFR2 (step S2C).

Thereafter, the transmitter 701 sets t=1 (step S35), and sequentially executes steps S3 to S8 described above.

Then, if it is determined at step S7 that k=K, the transmitter 701 further determines whether t=T (i.e. number of transmissions) (step S36).

If it is determined at step S36 that t=T is not true, the transmitter 701 sets t=t+1 (step S37). Thereafter, the operation returns to step S3, and steps S3 to S8, steps S36 and S37 described above are repeatedly executed until it is determined at step S36 that t=T.

If it is determined at step S36 that t=T, the transmitter 701 ends transmission of the radio frame WFR8.

Thereafter, the receiver 702 sets r=r+1 (step S38), and receives the header frame HFR1, data frames DFR_1 to DFR_n, verification frame VFR and end frame FFR2 (step S9C). Here, r is the number of reception processes.

Then, the receiver 702 sequentially executes steps S10 to S13 described above.

After step S13, the receiver 702 determines whether it has detected an error in the data frames DFR_1 to DFR_n in the manner described above (step S39).

If it is determined at step S39 that no error has been detected in the data frames DFR_1 to DFR_n, based on the last frame length, the receiver 702 senses the end of the data to be transmitted and the number T of transmissions in the manner described above (step S40).

Then, the receiver 702 determines whether r=T (i.e. number of transmissions) (step S41).

If it is determined at step S41 that r=T is not true, the receiver 702 sets r=r+1 (step S42). Thereafter, the operation returns to step S9C and steps S9C, S10 to S13 and S39 to S42 described above are repeatedly executed until it is determined at step S41 that r=T.

If it is determined at step S41 that r=T, the receiver 702 further determines whether the plurality of frame lengths for the number of transmissions of the data frames DFR_1 to DFR_n match each other (step S43).

If it is determined at step S43 that the plurality of frame lengths for the number of transmissions of the data frames DFR_1 to DFR_n match each other, the receiver 702 decodes the plurality of frame lengths into a bit sequence (step S44), thereby receiving the data to be transmitted.

Then, if it is determined at step S12 that the first frame length is not equal to 1190 µs, or if it is determined at step S39 that an error has been detected in the data frames DFR_1 to DFR_n, or if it is determined at step S43 that the plurality of frame lengths for the number of transmissions of the data frames DFR_1 to DFR_n do not match each other, or after step S44, the operation ends.

Thus, according to Embodiment 8, if no error is detected in the data frames DFR_1 to DFR_n, the plurality of frame lengths of the data frames DFR_1 to DFR_n are decoded into a bit sequence and the data to be transmitted is received. Therefore, the data frames DFR_1 to DFR_n could be correctly received.

Further, if the plurality of frame lengths for the number of transmissions of the data frames DFR_1 to DFR_n match each other, the plurality of frame lengths of the data frames DFR_1 to DFR_n are decoded into a bit sequence and the data to be transmitted is received. Therefore, the data frames DFR_1 to DFR_n could be yet more correctly received.

Since the plurality of frame lengths of the data frames DFR_1 to DFR_n decoded into a bit sequence are the data to be transmitted, determining whether the plurality of frame lengths for the number of transmissions of the data frames DFR_1 to DFR_n match each other at steps S43 corresponds to determining whether the data sets for the number of transmissions match each other.

Figure 49:
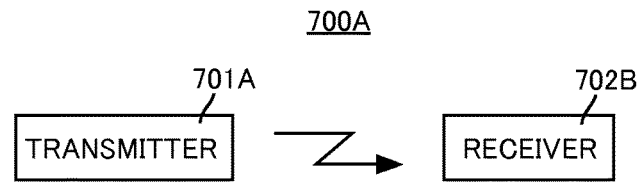
FIG. 49 is a schematic diagram of constitution of another wireless communication system according to Embodiment 8.

FIG. 49 is a schematic diagram of a configuration of another wireless communication system according to Embodiment 8. The wireless communication system according to Embodiment 8 may be the wireless communication system 700A of FIG. 49.

Referring to FIG. 49, the wireless communication system 700A includes a transmitter 701A and a receiver 702A.

The transmitter 701A and receiver 702A are positioned in a wireless communication space. The transmitter 701A generates a header frame HFR1 and end frame FFR2 in the same manner as that in the transmitter 701.

Further, the transmitter 701A generates the data to be transmitted where the bit sequence representing the data to be transmitted contains a checksum. Then, the transmitter 701A divides the data to be transmitted that has been generated into bit values with 4 bits, and refers to the correspondence table TBL5 to convert the divided bit values to frame lengths, and generates the data frames DFR_1 to DFR_n having the converted frame lengths.

Then, the transmitter 701A transmits the header frame HFR1, data frames DFR_1 to DFR_n and end frame FFR2 one after another in accordance with the CSMA/CA scheme.

Thus, since the transmitter 701A transmits the data frames DFR_1 to DFR_n where a checksum for detecting an error in the data frames DFR_1 to DFR_n is placed on the bit sequence representing the data to be transmitted, a radio frame for the wireless communication system 700A has the structure of the radio frame WFR8 (see FIG. 45) where the verification frame VFR is omitted.

The receiver 702A receives the header frame HFR1, data frames DFR_1 to DFR_n and end frame FFR2. Then, the receiver 702A processes the received radio wave of the header frame HFR1 in the same manner as that in the receiver 702.

Thereafter, the receiver 702A detects the plurality of frame lengths based on the received radio wave of the data frames DFR_1 to DFR_n and decodes the plurality of frame lengths that have been detected into a bit sequence. Then, based on the decoded bit sequence, the receiver 702A determines whether there is no error in the data.

If there is an error in the data, the receiver 702A discards the decoded bit sequence and determines that the receiver has failed to receive data.

On the other hand, if there is no error in the data, the receiver 702A detects the frame lengths based on the received radio wave of the end frame FFR2, and, based on the detected frame length, detects the number of transmissions of the data frames DFR_1 to DFR_n.

Then, the receiver 702A detects the plurality of frame lengths based on the received radio wave of the data frames DFR_1 to DFR_n, decodes the plurality of frame lengths that have been detected into a bit sequence, and, based on the decoded bit sequence, determines whether there is no error in the data. The receiver 702A repeatedly executes this process the number of transmissions.

When the receiver 702A has determined that there is no error in the data the number of transmissions, it determines whether the data sets for the number of transmissions match each other. Then, when the receiver 702A determines that the data sets for the number of transmissions match each other, it determines that it has succeeded in receiving data, and accepts the data.

On the other hand, if the data sets for the number of transmissions do not match each other, the receiver 702A determines that it has failed to receive data, and discards the data.

Figure 50:
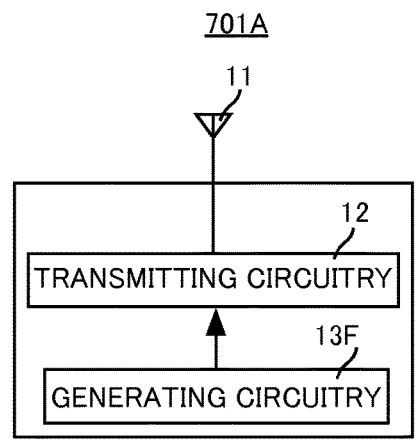
FIG. 50 is a schematic diagram of the transmitter of FIG. 49.

FIG. 50 is a schematic diagram of the transmitter 701A of FIG. 49. Referring to FIG. 50, the transmitter 701A is the same as the transmitter 1 except that the generating circuitry 13 of the transmitter 1 of FIG. 1 is replaced by a generating circuitry 13F.

The generating circuitry 13F holds the correspondence tables TBL5 and TBL6, and the number of transmissions of the data frames DFR_1 to DFR_n. The generating circuitry 13F generates the header frame HFR1 and end frame FFR2 in the same manner as that in the generating circuitry 13E.

Further, the generating circuitry 13F generates the data to be transmitted where the bit sequence representing the data to be transmitted contains a checksum. Then, the generating circuitry 13F divides the data to be transmitted that has been generated into bit values with 4 bits, and refers to the correspondence table TBL5 to convert the divided bit values to frame lengths, and generates data frames DFR_1 to DFR_n having the converted frame lengths.

Then, the generating circuitry 13F outputs the header frame HFR1, data frames DFR_1 to DFR_n, end frame FFR2 and the number of transmissions to the transmitting circuitry 12.

In the transmitter 701A, the transmitting circuitry 12, repeatedly, performs, the number of transmissions, the process in which the header frame HFR1, data frames DFR_1 to DFR_n and end frame FFR2 are transmitted in accordance with the CSMA/CA scheme.

Figure 51:
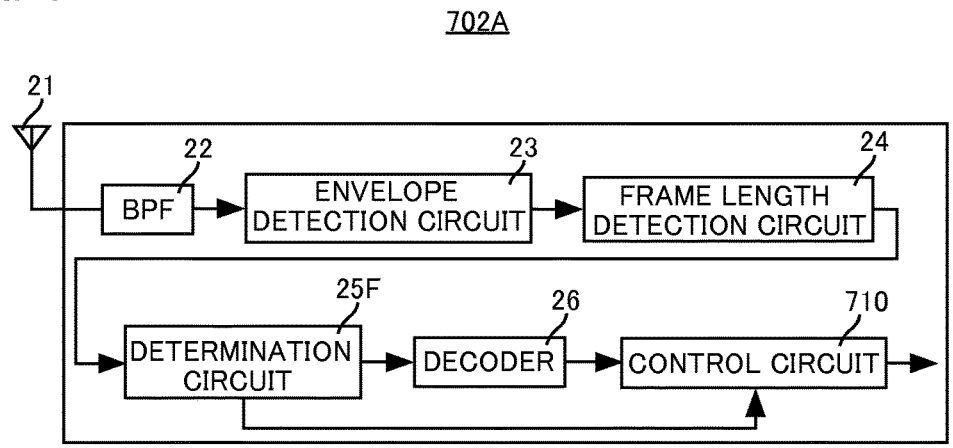
FIG. 51 is a schematic diagram of the receiver of FIG. 49.

FIG. 51 is a schematic diagram of the receiver 702A of FIG. 49. Referring to FIG. 51, the receiver 702A is the same as the receiver 2 except that the determination circuit 25 of the receiver 2 of FIG. 3 is replaced by a determination circuit 25F and a control circuit 710 is added.

The determination circuit 25F holds the correspondence table TBL6. Based on the first frame length received from the frame length detection circuit 24, the determination circuit 25F detects the beginning of the data to be transmitted in the same manner as that in the determination circuit 25.

When the determination circuit 25F has sensed the beginning of the data to be transmitted, it sequentially outputs the plurality of frame lengths sequentially received from the frame length detection circuit 24 to the decoder 26.

When the determination circuit 25F has received the last frame length from the frame length detection circuit 24, it refers to the correspondence table TBL6 to detect the number of transmissions corresponding to the last frame length and sense the end of the data to be transmitted, and outputs the detected number of transmissions to the control circuit 710.

The control circuit 710 receives the bit sequence from the decoder 26 and, based on how bits are arranged in the received bit sequence, determines whether there is an error in the data.

If there is an error in the data, the control circuit 710 discards the decoded bit sequence and determines that the receiver has failed to receive data.

If there is no error in the data, the control circuit 710 repeatedly performs the above operations the number of transmissions.

Then, the control circuit 710 determines whether the data sets for the number of transmissions match each other. If the data sets for the number of transmissions match each other, the control circuit 710 determines that the receiver has succeeded in receiving data, and outputs the data to the host system.

On the other hand, if the data sets for the number of transmissions do not match each other, the control circuit 710 determines that the receiver has failed to receive data, and discards the data.

Figure 52:
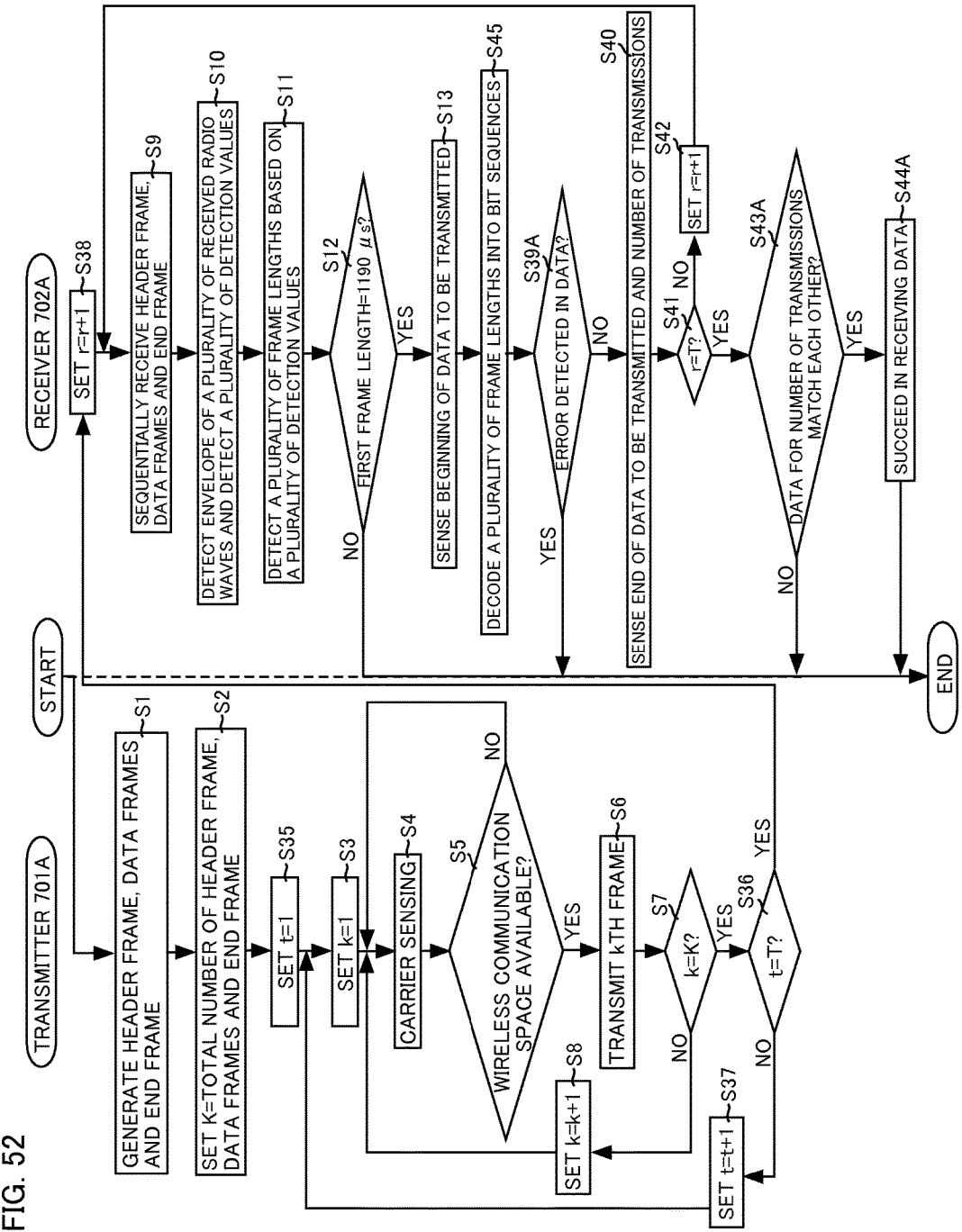
FIG. 52 is a flow chart illustrating the operation of the wireless communication system of FIG. 49.

FIG. 52 is a flow chart illustrating the operation of the wireless communication system 700A of FIG. 49.

The flow chart of FIG. 52 is the same as the flow chart of FIG. 48 except that steps SIC, 2C, S9C, S39, S43 and S44 of the flow chart of FIG. 48 are replaced by steps S1, S2, S9, S39A, S43A and 544A, respectively and step S45 is added.

Referring to FIG. 52, when the operation of the wireless communication system 700A is started, the transmitter 701A sequentially executes steps S1 to S8, S36 and S37 described above. In this case, at step S1, the transmitter 701A generates the data to be transmitted where the bit sequence of the data to be transmitted contains a checksum. Then, based on the generated data, the transmitter 701A generates the data frames DFR_1 to DFR_n in the manner described above. Further, at step S1, the transmitter 701A generates the end frame FFR2 in the manner described above.

The receiver 702A sequentially executes steps S38, S9 to S13 described above. Then, after step S13, the receiver 702A decodes the plurality of frame lengths of the data frames DFR_1 to DFR_n into a bit sequence (step S45).

Thereafter, based on how the bits are arranged in the decoded bit sequence, the receiver 702A determines whether it has detected an error in the data (step S39A).

If it is determined at step S39A that no error has been detected in the data, steps S40 to S42 described above are sequentially executed.

Then, if it is determined at step S41 that r=T, the receiver 702A determines whether the data sets for the number of transmissions match each other (545A).

If it is determined at step S43A that the data sets for the number of transmissions match each other, the receiver 702A determines that it has succeeded in receiving data, and accepts the data (step S44A).

Then, if it is determined at step S12 that the first frame length is not equal to 1190 µs, or if it is determined at step S39A that an error has been detected in the data, or if it is determined at step S43A that the data sets for the number of transmissions do not match each other, or after step S44A, the operation ends.

Thus, since it is determined that the receiver has succeeded in receiving data when the data sets for the number of transmissions match each other, data could be correctly received.

In the above description, in the correspondence table TBL5, the first frame length changes in ascending order and the second frame length changes in descending order as the bit value increases; however, Embodiment 8 is not limited to such an implementation, and the first frame length may change in descending order and the second frame length may change in ascending order as the bit value increases.

Further, in the above description, the first and second frame lengths change by 30 µs as the bit value increases by "1"; however, Embodiment 8 is not limited to such an implementation, and the first and second frame lengths may change by an amount other than 30 µs as the bit value increases by "1".

Further, the verification frame VFR does not need to be located between the data frames DFR_1 to DFR_n and the end frame FFR1, and may be located between the header frame HFR1 and the data frames DFR_1 to DFR_n.

Further, in Embodiment 8, the operations of the transmitter 701 and receiver 702 may be carried out by a program. In this case, each of the transmitter 701 and receiver 702 includes a CPU, a ROM and a RAM. In the transmitter 701, the ROM stores a program K including steps S1C, S2C, S35, S3 to S8, S36 and S37 shown in FIG. 48, and the CPU reads the program K from the ROM and executes it. Thus, the operation of the transmitter 701 is performed. In the receiver 702, the ROM stores a program L including steps S38, S9C, S10 to S13 and S39 to S44 shown in FIG. 48, and the CPU reads the program L from the ROM and executes it. Thus, the operation of the receiver 702 is performed. Further, each of the ROMs of the transmitter 701 and receiver 702 corresponds to the storage medium storing a computer- (i.e. CPU-) readable program.

Further, in Embodiment 8, the operations of the transmitter 701A and receiver 702A may be carried out by a program. In this case, each of the transmitter 701A and receiver 702A includes a CPU, a ROM and a RAM. In the transmitter 701A, the ROM stores a program M including steps S1, S2, S35, S3 to S8, S36 and S37 shown in FIG. 52, and the CPU reads the program M from the ROM and executes it. Thus, the operation of the transmitter 701A is performed. In the receiver 702A, the ROM stores a program N including steps S38, S9 to S13, S45, S39A, S40 to S42, S43A and S44A shown in FIG. 52, and the CPU reads the program N from the ROM and executes it. Thus, the operation of the receiver 702A is performed. Further, each of the ROMs of the transmitter 701A and receiver 702A corresponds to the storage medium storing a computer- (i.e. CPU-) readable program.

Otherwise, the description of Embodiment 8 is the same as that of Embodiment 1.

[Embodiment 9]

Figure 53:
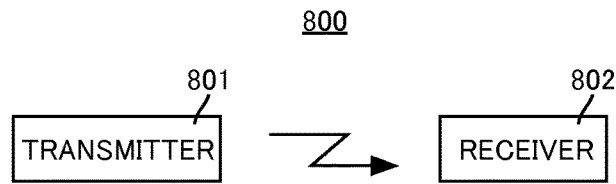
FIG. 53 is a schematic diagram of constitution of a wireless communication system according to Embodiment 9.

FIG. 53 is a schematic diagram of a wireless communication system according to Embodiment 9. Referring to FIG. 53, the wireless communication system 800 according to Embodiment 9 includes a transmitter 801 and a receiver 802.

The transmitter 801 and receiver 802 are positioned in a wireless communication space. The transmitter 801 generates a header frame HFR3, data frames DFR_1 to DFR_n, sub-header frame SHFR3, verification frame VFR3 and end frame FFR3 in the manner described below.

Then, the transmitter 801 transmits the header frame HFR3, data frames DFR_1 to DFR_n and end frame FFR3 one after another in accordance with the CSMA/CA scheme, or transmits the header frame HFR3, data frames DFR_1 to DFR_n, sub-header frame SHFR3 and end frame FFR3 one after another in accordance with the CSMA/CA scheme, or transmits the header frame HFR3, data frames DFR_1 to DFR_n, verification frame VFR3 and end frame FFR3 one after another in accordance with the CSMA/CA scheme, or transmits the header frame HFR3, data frames DFR_1 to DFR_n, sub-header frame SHFR3, verification frame VFR3 and end frame FFR3 one after another in accordance with the CSMA/CA scheme.

The header frame HFR3 has a frame length indicating the beginning of the data to be transmitted, or a frame length representing at least one of the number of the data frames DFR_1 to DFR_n, verification information for verifying an error of the data frames DFR_1 to DFR_n, and the number of transmissions of the data frames DFR_1 to DFR_n, and indicating the beginning of the data to be transmitted.

The end frame FFR3 has a frame length indicating the end of the data to be transmitted, or a frame length representing at least one of the number of the data frames DFR_1 to DFR_n, verification information for verifying an error of the data frames DFR_1 to DFR_n, and the number of transmissions of the data frames DFR_1 to DFR_n, and indicating the end of the data to be transmitted.

The verification frame VFR3 has a frame length representing at least one of the number of the data frames DFR_1 to DFR_n, verification information for verifying an error of the data frames DFR_1 to DFR_n, and the number of transmissions of the data frames DFR_1 to DFR_n.

The sub-header frame SHFR3 has a frame length indicating a delimiter for the data frames DFR_1 to DFR_n, or a frame length representing at least one of the number of the data frames DFR_1 to DFR_n, verification information for verifying an error of the data frames DFR_1 to DFR_n, and the number of transmissions of the data frames DFR_1 to DFR_n, and indicating a delimiter for the data frames DFR_1 to DFR_n.

The receiver 802 sequentially receives the header frame HFR3, data frames DFR_1 to DFR_n and end frame FFR3, or sequentially receives the header frame HFR3, data frames DFR_1 to DFR_n, sub-header frame SHFR3 and end frame FFR3, or sequentially receives the header frame HFR3, data frames DFR_1 to DFR_n, verification frame VFR3 and end frame FFR3, or sequentially receives the header frame HFR3, data frames DFR_1 to DFR_n, sub-header frame SHFR3, verification frame VFR3 and end frame FFR3.

Then, based on the frame length of the header frame HFR3, the receiver 802 senses the beginning of the data to be transmitted, and, depending on the demands, detects at least one of the number of the data frames DFR_1 to DFR_n, an error in the data frames DFR_1 to DFR_n, and the number of transmissions of the data frames DFR_1 to DFR_n.

Further, the receiver 802 decodes the received radio wave of the data frames DFR_1 to DFR_n into a bit sequence in the manner described below.

Furthermore, based on the frame length of the sub-header frame SHFR3, the receiver 802 senses a delimiter in the data frames DFR_1 to DFR_n and, depending on the demands, detects at least one of the number of the data frames DFR_1 to DFR_n, an error in the data frames DFR_1 to DFR_n, and the number of transmissions of the data frames DFR_1 to DFR_n.

Moreover, based on the frame length of the verification frame VFR3, the receiver 802 detects at least one of the number of the data frames DFR_1 to DFR_n, an error in the data frames DFR_1 to DFR_n, and the number of transmissions of the data frames DFR_1 to DFR_n.

Furthermore, based on the frame length of the end frame FFR3, the receiver 802 senses the end of the data to be transmitted, and, depending on the demands, detects at least one of the number of the data frames DFR_1 to DFR_n, an error in the data frames DFR_1 to DFR_n, and the number of transmissions of the data frames DFR_1 to DFR_n.

Figure 54:
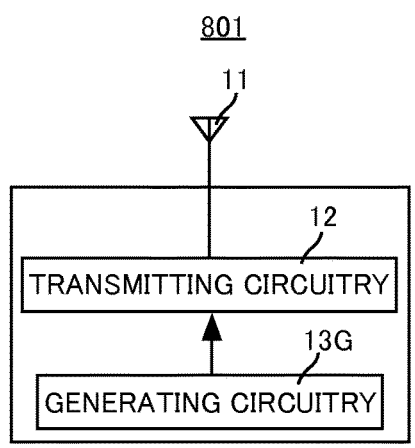
FIG. 54 is a schematic diagram of the transmitter 801 of FIG. 53.

FIG. 54 is a schematic diagram of the transmitter 801 of FIG. 53. Referring to FIG. 54, the transmitter 801 is the same as the transmitter 1 except that the generating circuitry 13 of the transmitter 1 of FIG. 2 is replaced by a generating circuitry 13G.

If the radio frame WFR8 of Embodiment 9 is composed of the header frame HFR3, data frames DFR_1 to DFR_n and end frame FFR3, the generating circuitry 13G generates the header frame HFR3, data frames DFR_1 to DFR_n and end frame FFR3 in the manner described below. Then, the generating circuitry 13G outputs the header frame HFR3, data frames DFR_1 to DFR_n and end frame FFR3 that have been generated to the transmitting circuitry 12.

If the radio frame WFR8 of Embodiment 9 is composed of the header frame HFR3, data frames DFR_1 to DFR_n, sub-header frame SHFR3 and end frame FFR3, the generating circuitry 13G generates the header frame HFR3, data frames DFR_1 to DFR_n, sub-header frame SHFR3 and end frame FFR3 in the manner described below. Then, the generating circuitry 13G outputs the header frame HFR3, data frames DFR_1 to DFR_n, sub-header frame SHFR3 and end frame FFR3 that have been generated to the transmitting circuitry 12.

If the radio frame WFR8 of Embodiment 9 is composed of the header frame HFR3, data frames DFR_1 to DFR_n, verification frame VFR3 and end frame FFR3, the generating circuitry 13G generates the header frame HFR3, data frames DFR_1 to DFR_n, verification frame VFR3 and end frame FFR3 in the manner described below. Then, the generating circuitry 13G outputs the header frame HFR3, data frames DFR_1 to DFR_n, verification frame VFR3 and end frame FFR3 that have been generated to the transmitting circuitry 12.

If the radio frame WFR8 of Embodiment 9 is composed of the header frame HFR3, data frames DFR_1 to DFR_n, sub-header frame SHFR3, verification frame VFR3 and end frame FFR3, the generating circuitry 13G generates the header frame HFR3, data frames DFR_1 to DFR_n, sub-header frame SHFR3, verification frame VFR3 and end frame FFR3 in the manner described below. Then, the generating circuitry 13G outputs the header frame HFR3, data frames DFR_1 to DFR_n, sub-header frame SHFR3, verification frame VFR3 and end frame FFR3 that have been generated to the transmitting circuitry 12.

When the transmitting circuitry 12 has received the header frame HFR3, data frames DFR_1 to DFR_n and end frame FFR3 from the generating circuitry 13G, it transmits the header frame HFR3, data frames DFR_1 to DFR_n and end frame FFR3 one after another in accordance with the CSMA/CA scheme.

When the transmitting circuitry 12 has received the header frame HFR3, data frames DFR_1 to DFR_n, sub-header frame SHFR3 and end frame FFR3 from the generating circuitry 13G, it transmits the header frame HFR3, data frames DFR_1 to DFR_n, sub-header frame SHFR3 and end frame FFR3 one after another in accordance with the CSMA/CA scheme.

When the transmitting circuitry 12 has received the header frame HFR3, data frames DFR_1 to DFR_n, verification frame VFR3 and end frame FFR3 from the generating circuitry 13G, it transmits the header frame HFR3, data frames DFR_1 to DFR_n, verification frame VFR3 and end frame FFR3 one after another in accordance with the CSMA/CA scheme.

When the transmitting circuitry 12 has received the header frame HFR3, data frames DFR_1 to DFR_n, sub-header frame SHFR3, verification frame VFR3 and end frame FFR3 from the generating circuitry 13G, it transmits the header frame HFR3, data frames DFR_1 to DFR_n, sub-header frame SHFR3, verification frame VFR3 and end frame FFR3 one after another in accordance with the CSMA/CA scheme.

Figure 55:
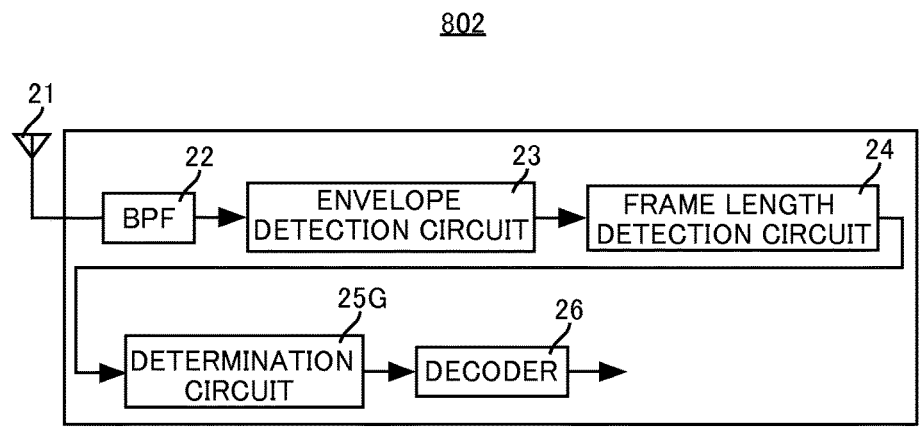
FIG. 55 is a schematic diagram of the receiver 802 of FIG. 53.

FIG. 55 is a schematic diagram of the receiver 802 of FIG. 53. Referring to FIG. 55, the receiver 802 is the same as the receiver 2 except that the determination circuit 25 of the receiver 2 of FIG. 3 is replaced by a determination circuit 25G.

In Embodiment 9, at least one of the number of the data frames DFR_1 to DFR_n, verification information for verifying an error of the data frames DFR_1 to DFR_n, and the number of transmissions of the data frames DFR_1 to DFR_n is placed on at least one of the header frame HFR3, end frame FFR3, sub-header frame SHFR3 and verification frame VFR3 by using a frame length.

If only the number of the data frames DFR_1 to DFR_n is placed on the header frame HFR3 or other frames, the determination circuit 25G receives, from the frame length detection circuit 24, a plurality of frame lengths located between the first frame length and the last frame length, and, if the number of the received plurality of frame lengths matches the number of the data frames DFR_1 to DFR_n, outputs the plurality of frame lengths to the decoder 26. On the other hand, if the number of the plurality frame lengths does not match the number of the data frames DFR_1 to DFR_n, the determination circuit 25G discards the plurality of frame lengths.

If only the verification information for verifying an error of the data frames DFR_1 to DFR_n is placed on the header frame HFR3 or other frames, the determination circuit 25G receives, from the frame length detection circuit 24, a plurality of frame lengths located between the first frame length and the last frame length, and, based on the received plurality of frame lengths and the verification information, determines whether an error has been detected in the data frames DFR_1 to DFR_n. If the determination circuit 25G determines that no error has been detected in the data frames DFR_1 to DFR_n, it outputs the plurality of frame lengths to the decoder 26. On the other hand, if the determination circuit 25G determines that an error has been detected in the data frames DFR_1 to DFR_n, it discards the plurality of frame lengths.

If only the number of transmissions of the data frames DFR_1 to DFR_n is placed on the header frame HFR3 or other frames, the determination circuit 25G receives, from the frame length detection circuit 24, the plurality of frame lengths of the data frames DFR_1 to DFR_n the number of transmissions, and, if the plurality of frame lengths for the number of transmissions match each other, outputs the plurality of frame lengths to the decoder 26. On the other hand, if the plurality of frame lengths for the number of transmissions do not match each other, the determination circuit 25G discards the plurality of frame lengths.

If the number of the data frames DFR_1 to DFR_n and the verification information for verifying an error of the data frames DFR_1 to DFR_n are placed on the header frame HFR3 or other frames, the determination circuit 25G receives, from the frame length detection circuit 24, a plurality of frame lengths located between the first frame length and the last frame length, and, if the number of the received plurality of frame lengths matches the number of the data frames DFR_1 to DFR_n and if, based on the plurality of frame lengths and verification information, it determines that no error has been detected in the data frames DFR_1 to DFR_n, outputs the plurality frame lengths to the decoder 26. On the other hand, if the number of the plurality of frame lengths does not match the number of the data frames DFR_1 to DFR_n and/or if the determination circuit 25G determines that an error has been detected in the data frames DFR_1 to DFR_n, it discards the plurality of frame lengths.

If the number of the data frames DFR_1 to DFR_n and the number of transmissions of the data frames DFR_1 to DFR_n are placed on the header frame HFR3 or other frames, the determination circuit 25G receives, from the frame length detection circuit 24, a plurality of frame lengths located between the first frame length and the last frame length the number of transmissions, and, if the number of the plurality of frame lengths matches the number of the data frames DFR_1 to DFR_n and if the plurality of frame lengths for the number of transmissions match each other, outputs the plurality of frame lengths to the decoder 26. On the other hand, if the number of the plurality of frame lengths does not match the number of the data frames DFR_1 to DFR_n, and/or if the plurality of frame lengths for the number of transmissions do not match each other, the determination circuit 25G discards the plurality of frame lengths.

If the verification information for verifying an error of the data frames DFR_1 to DFR_n and the number of transmissions of the data frames DFR_1 to DFR_n are placed on the header frame HFR3 or other frames, the determination circuit 25G receives, from the frame length detection circuit 24, a plurality of frame lengths located between the first frame length and the last frame length the number of transmissions, and, if based on the plurality of frame lengths and verification information, it determines that no error has been detected in the data frames DFR_1 to DFR_n and if it determines that the plurality of frame lengths for the number of transmissions match each other, outputs the plurality of frame lengths to the decoder 26. On the other hand, if the determination circuit 25G determines that an error has been detected in the data frames DFR_1 to DFR_n and/or if it determines that the plurality of frame lengths for the number of transmissions do not match each other, it discards the plurality of frame lengths.

If the number of the data frames DFR_1 to DFR_n, the verification information for verifying an error of the data frames DFR_1 to DFR_n and the number of transmissions of the data frames DFR_1 to DFR_n are placed on the header frame HFR3 or other frames, the determination circuit 25G receives, from the frame length detection circuit 24, a plurality of frame lengths located between the first frame length and the last frame length the number of transmissions, and, if the number of the plurality of frame lengths matches the number of the data frames DFR_1 to DFR_n, and if, based on the plurality of frame lengths and verification information, it determines that no error has been detected in the data frames DFR_1 to DFR_n, and if it determines that the plurality of frame lengths for the number of transmissions match each other, outputs the plurality of frame lengths to the decoder 26. On the other hand, the determination circuit 25G discards the plurality of frame lengths if at least one of the following is true: that the number of the plurality of frame lengths does not match the number of the data frames DFR_1 to DFR_n; that it determines that an error has been detected in the data frames DFR_1 to DFR_n; and that it determines that the plurality of frame lengths for the number of transmissions do not match each other.

Figure 56:
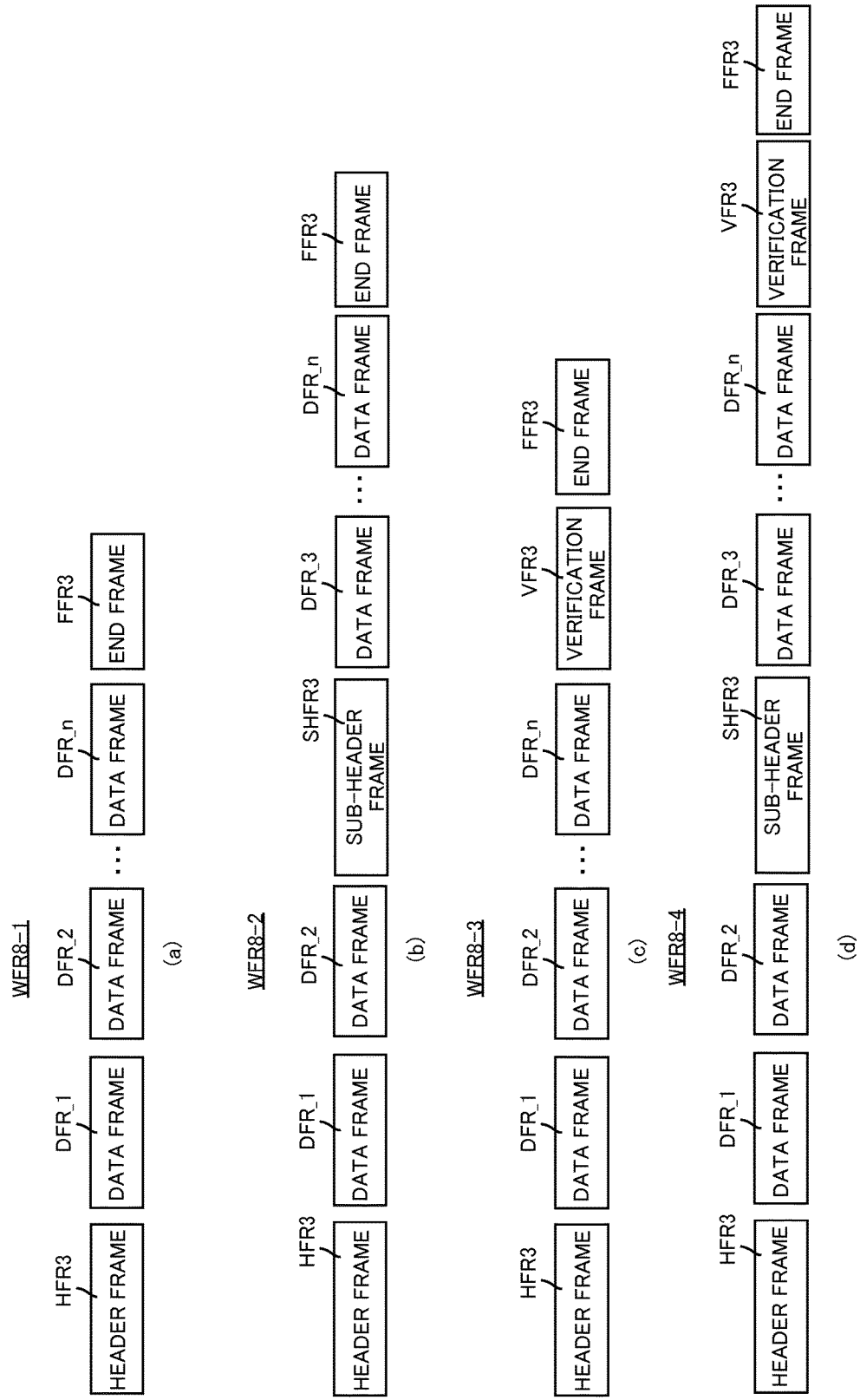
FIG. 56 conceptually illustrates a radio frame according to Embodiment 9.

FIG. 56 conceptually illustrates a radio frame according to Embodiment 9. Referring to FIG. 56, a radio frame WFR8 of Embodiment 9 is constituted by any one of radio frames WFR8-1 to WFR8-4.

The radio frame WFR8-1 includes a header frame HFR3, data frames DFR_1 to DFR_n, and an end frame FFR3 (see FIG. 56(a)). The header frame HFR3 has a frame length indicating the beginning of the data to be transmitted, or a frame length representing at least one of the number of the data frames DFR_1 to DFR_n, verification information for verifying an error of the data frames DFR_1 to DFR_n, and the number of transmissions of the data frames DFR_1 to DFR_n, and indicating the beginning of the data to be transmitted.

The data frames DFR_1 to DFR_n are constituted by the data frames DFR_1 to DFR_n of one of Embodiments 1 to 8 described above.

The end frame FFR3 has a frame length indicating the end of the data to be transmitted, or a frame length representing at least one of the number of the data frames DFR_1 to DFR_n, verification information for verifying an error of the data frames DFR_1 to DFR_n, and the number of transmissions of the data frames DFR_1 to DFR_n, and indicating the end of the data to be transmitted.

The radio frame WFR8-2 is the same as the radio frame WFR8-1 except that a sub header frame SHFR3 is added to the radio frame WFR8-1 (see FIG. 56(b)).

The sub-header frame SHFR3 is inserted at any position in the sequence of the data frames DFR_1 to DFR_n. The sub-header frame SHFR3 has a frame length indicating a delimiter for the data frames DFR_1 to DFR_n, or a frame length representing at least one of the number of the data frames DFR_1 to DFR_n, verification information for verifying an error of the data frames DFR_1 to DFR_n, and the number of transmissions of the data frames DFR_1 to DFR_n, and a delimiter for the data frames DFR_1 to DFR_n.

The number of sub-header frames SHFR3 is not limited to 1 and two or more sub-header frames may be present and, in general terms, one or more sub-header frames may be present. The one or more sub-header frames SHFR3 are inserted at any position in the sequence of the data frames DFR_1 to DFR_n.

The radio frame WFR8-3 is the same as the radio frame WFR8-1 except that a verification frame VFR3 is added to the radio frame WFR8-1 (see FIG. 56(c)).

The verification frame VFR3 is located between the data frame DFR_n and the end frame FFR3. The verification frame VFR3 has a frame length representing at least one of the number of the data frames DFR_1 to DFR_n, verification information for verifying an error of the data frames DFR_1 to DFR_n, and the number of transmissions of the data frames DFR_1 to DFR_n.

Alternatively, the verification frame VFR3 may be located between the header frame HFR3 and the data frame DFR_1.

The radio frame 8-4 is the same as the radio frame 8-1 except that the sub-header frame SHFR3 and the verification frame VFR3 are added to the radio frame WFR8-1 (see FIG. 56(d)).

The sub-header frame SHFR3 and verification frame VFR3 are described above.

FIG. 57 illustrates relationships between information and frames in the case where one of the number of the data frames DFR_1 to DFR_n, the verification information for verifying an error of the data frames DFR_1 to DFR_n and the number of transmissions of the data frames DFR_1 to DFR_n is placed thereon.

In FIG. 57, the number of the data frames DFR_1 to DFR_n is denoted as "A", the verification information for verifying an error of the data frames DFR_1 to DFR_n (also referred to as "error verification information") is denoted as "B", and the number of transmissions of the data frames DFR_1 to DFR_n is denoted as "C".

If the radio frame WFR8 is constituted by the radio frame WFR8-1, each of the number of the data frames DFR_1 to DFR_n (i.e. A), error verification information (i.e. B) and the number of transmissions of the data frames DFR_1 to DFR_n (i.e. C) is placed on the header frame HFR3 or end frame FFR3 by using a frame length (see table TBL-7 of FIG. 57(a)).

If the radio frame WFR8 is constituted by the radio frame WFR8-2, each of the number of the data frames DFR_1 to DFR_n (i.e. A), error verification information (i.e. B) and the number of transmissions of the data frames DFR_1 to DFR_n (i.e. C) is placed on one of the header frame HFR3, end frame FFR3 and sub-header frame SHFR3 by using a frame length (see table TBL-8 of FIG. 57(b)).

If the radio frame WFR8 is constituted by the radio frame WFR8-3, each of the number of the data frames DFR_1 to DFR_n (i.e. A), error verification information (i.e. B) and the number of transmissions of the data frames DFR_1 to DFR_n (i.e. C) is placed on one of the header frame HFR3, end frame FFR3 and verification frame VRF3 by using a frame length (see table TBL-9 of FIG. 57(c)).

If the radio frame WFR8 is constituted by the radio frame WFR8-4, each of the number of the data frames DFR_1 to DFR_n (i.e. A), error verification information (i.e. B) and the number of transmissions of the data frames DFR_1 to DFR_n (i.e. C) is placed on one of the header frame HFR3, end frame FFR3, sub-header frame SHFR3 and verification frame VRF3 by using a frame length (see table TBL-10 of FIG. 57(d)).

FIGS. 58 and 59 illustrate relationships between information and frames in the case where two of the number of the data frames DFR_1 to DFR_n, the verification information for verifying an error of the data frames DFR_1 to DFR_n and the number of transmissions of the data frames DFR_1 to DFR_n are placed thereon.

In FIGS. 58 and 59, too, the number of the data frames DFR_1 to DFR_n is denoted as "A", the error verification information for verifying an error of the data frames DFR_1 to DFR_n is denoted as "B", and the number of transmissions of the data frames DFR_1 to DFR_n is denoted as "C".

If the radio frame WFR8 is constituted by the radio frame WFR8-1, two of the number of the data frames DFR_1 to DFR_n (i.e. A), error verification information (i.e. B) and the number of transmissions of the data frames DFR_1 to DFR_n (i.e. C) are placed on the header frame HFR3 and/or end frame FFR3 by using a frame length (see table TBL-11 of FIG. 58(a)).

If the radio frame WFR8 is constituted by the radio frame WFR8-2, two of the number of the data frames DFR_1 to DFR_n (i.e. A), error verification information (i.e. B) and the number of transmissions of the data frames DFR_1 to DFR_n (i.e. C) are placed on one or two of the header frame HFR3, end frame FFR3 and sub-header frame SHFR3 by using a frame length (see table TBL-12 to TBL-14 of FIG. 58(b) to (d)).

If the radio frame WFR8 is constituted by the radio frame WFR8-3, two of the number of the data frames DFR_1 to DFR_n (i.e. A), error verification information (i.e. B) and the number of transmissions of the data frames DFR_1 to DFR_n (i.e. C) are placed on one or two of the header frame HFR3, end frame FFR3 and verification frame VFR3 by using a frame length (see table TBL-15 of FIG. 58(e) and tables TBL-16 and TBL-17 of FIGS. 59(f) and (g)).

If the radio frame WFR8 is constituted by the radio frame WFR8-4, two of the number of the data frames DFR_1 to DFR_n (i.e. A), error verification information (i.e. B) and the number of transmissions of the data frames DFR_1 to DFR_n (i.e. C) are placed on one or two of the header frame HFR3, end frame FFR3, sub-header frame SHFR3 and verification frame VFR3 by using a frame length (see tables TBL-18 to TBL-20 of FIG. 59(h) to (j)).

FIGS. 60 to 63 illustrate relationships between information and frames in the case where all of the number of the data frames DFR_1 to DFR_n, the verification information for verifying an error of the data frames DFR_1 to DFR_n and the number of transmissions of the data frames DFR_1 to DFR_n are placed thereon.

In FIGS. 60 to 63, too, the number of the data frames DFR_1 to DFR_n is denoted as "A", the error verification information for verifying an error of the data frames DFR_1 to DFR_n is denoted as "B", and the number of transmissions of the data frames DFR_1 to DFR_n is denoted as "C".

If the radio frame WFR8 is constituted by the radio frame WFR8-1, all of the number of the data frames DFR_1 to DFR_n (i.e. A), error verification information (i.e. B) and the number of transmissions of the data frames DFR_1 to DFR_n (i.e. C) are placed on the header frame HFR3 and/or end frame FFR3 by using a frame length (see table TBL-21 of FIG. 60(*a*)).

If the radio frame WFR8 is constituted by the radio frame WFR8-2, all of the number of the data frames DFR_1 to DFR_n (i.e. A), error verification information (i.e. B) and the number of transmissions of the data frames DFR_1 to DFR_n (i.e. C) are placed on at least one of the header frame HFR3, end frame FFR3 and sub-header frame SHFR3 by using a frame length (see tables TBL-22 to TBL-26 of FIG. 60(*b*) to (*f*)).

If the radio frame WFR8 is constituted by the radio frame WFR8-3, all of the number of the data frames DFR_1 to DFR_n (i.e. A), error verification information (i.e. B) and the number of transmissions of the data frames DFR_1 to DFR_n (i.e. C) are placed on at least one of the header frame HFR3, end frame FFR3, and verification frame VFR3 by using a frame length (see tables TBL-27 to TBL-31 of FIG. 61(*g*) to (*k*)).

If the radio frame WFR8 is constituted by the radio frame WFR8-4, all of the number of the data frames DFR_1 to DFR_n (i.e. A), error verification information (i.e. B) and the number of transmissions of the data frames DFR_1 to DFR_n (i.e. C) are placed on one to three of the header frame HFR3, end frame FFR3, sub-header frame SHFR3 and verification frame VFR3 by using a frame length (see tables TBL-32 to TBL-36 of FIG. 62(*l*) to (*p*) and tables TBL-37 to TBL-40 of FIG. 63(*q*) to (*t*)).

How at least one of the number of the data frames DFR_1 to DFR_n, error verification information and the number of transmissions of the data frames DFR_1 to DFR_n is placed on at least one of the header frame HFR3 or other frames by using a frame length will be described.

(9-1) The case where all of number of data frames DFR_1 to DFR_n, error verification information and number of transmissions of data frames DFR_1 to DFR_n are placed on one frame by using a frame length FIG. 64 is a correspondence table illustrating the correspondence between the number of the data frames DFR_1 to DFR_n, the error verification information and the number of transmissions of the data frames DFR_1 to DFR_n, and frame length.

FIG. 64 illustrates the relationship between the number of the data frames DFR_1 to DFR_n, the error verification information and the number of transmissions of the data frames DFR_1 to DFR_n, and frame length in an example where each of the number of the data frames DFR_1 to DFR_n and the number of transmissions of the data frames DFR_1 to DFR_n is in the range of 1 to 7.

Referring to FIG. 64, the correspondence table TBL-41 contains frame lengths, numbers of data frames, error verification information, and numbers of transmissions of data frames. The frame lengths, numbers of data frames, error verification information, and numbers of transmissions of data frames are associated with each other.

If all of the number of the data frames DFR_1 to DFR_n, the error verification information and the number of transmissions of the data frames DFR_1 to DFR_n are placed on one of the header frame HFR3, end frame FFR3, sub-header frame SHFR3 and verification frame VFR3 by using a frame length, all of the number of the data frames DFR_1 to DFR_n, the error verification information and the number of transmissions of the data frames DFR_1 to DFR_n are represented by a bit value with 8 bits, i.e. $b_1 b_2 b_3 b_4 b_5 b_6 b_7 b_8$. In this case, the 3-bit value $b_1 b_2 b_3$ represents the number of the data frames DFR_1 to DFR_n, the 2-bit value $b_4 b_5$ represents the error verification information, and the 3-bit value $b_6 b_7 b_8$ represents the number of transmissions of the data frames DFR_1 to DFR_n. The bit value $b_4 b_5$ representing the error verification information are the two lowest-order bits of the bit sequence representing the sum of the n bit sequences of the data frames DFR_1 to DFR_n. Thus, the bit value $b_4 b_5$ are one of (00), (01), (10) and (11).

The frame length of 500 μs is assigned to the case where the number of the data frames DFR_1 to DFR_n is 1 (i.e. "001"), the error verification information is "00", and the number of transmissions of the data frames DFR_1 to DFR_n is 1 (i.e. "001").

The frame length of 520 μs is assigned to the case where the number of the data frames DFR_1 to DFR_n is 1 (i.e. "001"), the error verification information is "00", and the number of transmissions of the data frames DFR_1 to DFR_n is 2 (i.e. "010").

Other frame lengths are assigned to other cases as shown in the table, and the frame length of 4280 μs is assigned to the case where the number of the data frames DFR_1 to DFR_n is 7 (i.e. "111"), the error verification information is "11", and the number of transmissions of the data frames DFR_1 to DFR_n is 7 (i.e. "111").

Thus, in the correspondence table TBL-41, the frame length increases by 20 μs as the bit value representing one of the number of the data frames DFR_1 to DFR_n, the error verification information and the number of transmissions of the data frames DFR_1 to DFR_n increases by "1".

If the number of the data frames DFR_1 to DFR_n, the error verification information and the number of transmissions of the data frames DFR_1 to DFR_n are placed on the header frame HFR3 by using a frame length, the frame length represents the beginning of the data to be transmissions, the number of the data frames DFR_1 to DFR_n, the error verification information and the number of transmissions of the data frames DFR_1 to DFR_n.

If the number of the data frames DFR_1 to DFR_n, the error verification information and the number of transmissions of the data frames DFR_1 to DFR_n are placed on the sub-header frame SHFR3 by using a frame length, the frame length represents a delimiter for data frames, the number of the data frames DFR_1 to DFR_n, the error verification information and the number of transmissions of the data frames DFR_1 to DFR_n.

If the number of the data frames DFR_1 to DFR_n, the error verification information and the number of transmissions of the data frames DFR_1 to DFR_n are placed on the end frame FFR3 by using a frame length, the frame length represents the end of the data to be transmitted, the number of the data frames DFR_1 to DFR_n, the error verification information and the number of transmissions of the data frames DFR_1 to DFR_n.

If the number of the data frames DFR_1 to DFR_n, the error verification information and the number of transmissions of the data frames DFR_1 to DFR_n are placed on the verification frame VFR3 by using a frame length, this frame length represents the number of the data frames DFR_1 to DFR_n, the error verification information and the number of transmissions of the data frames DFR_1 to DFR_n.

If the number of the data frames DFR_1 to DFR_n, i.e. $b_1b_2b_3$, is "100" (i.e. 4 frames), the error verification information $b_4b_5$ is "01" and the number of transmissions of the data frames DFR_1 to DFR_n, i.e. $b_6b_7b_8$, is "101" (i.e. 5 times), and when these three types of information are placed on one frame, the frame length is 2360 µs.

Figure 65:
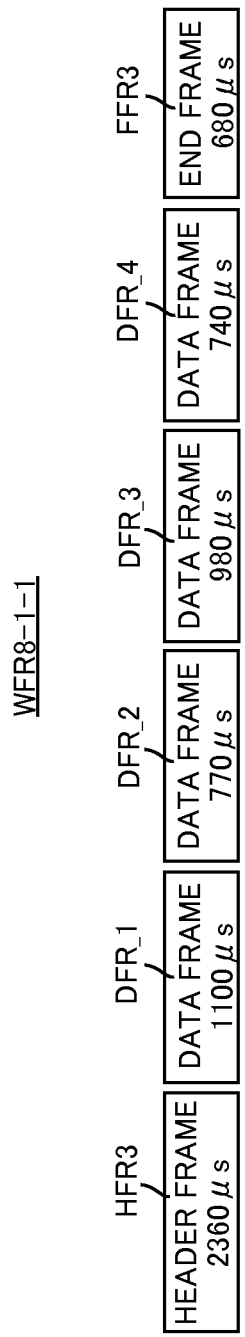
FIG. 65 illustrates a specific example of the radio frame WFR8-1 of FIG. 56(a).

FIG. 65 illustrates a specific example of the radio frame WFR8-1 of FIG. 56(a). FIG. 65 describes the specific example of the radio frame WFR8-1 in the case where the number of the data frames DFR_1 to DFR_n, the error verification information and the number of transmissions of the data frames DFR_1 to DFR_n are placed on the header frame HFR3 by using a frame length.

Referring to FIG. 65, the radio frame WFR8-1-1 includes a header frame HFR3, data frames DFR_1 to DFR_4 and an end frame FFR3.

The header frame HFR3 has the frame length of 2360 µs, the data frame DFR_1 has the frame length of 1100 µs, the data frame DFR_2 has the frame length of 770 µs, the data frame DFR_3 has the frame length of 980 µs, the data frame DFR_4 has the frame length of 740 µs, and the end frame FFR3 has the frame length of 680 µs.

The frame length of 2360 µs of the header frame HFR3 represents the beginning of the data to be transmitted as well as the number of the data frames DFR_1 to DFR_4 "100" (i.e. 4 frames), the error verification information "01" and the number of transmissions of the data frames DFR_1 to DFR_4 "101" (i.e. 5 times). The frame length of 680 µs of the end frame FFR3 indicates only the end of the data to be transmitted If the number of the data frames DFR_1 to DFR_4 "100" (i.e. 4 frames), the error verification information "01" and the number of transmissions of the data frames DFR_1 to DFR_4 "101" (i.e. 5 times) are placed on the end frame FFR3 by using a frame length, the end frame FFR3 has the frame length of 2360 µs and the header frame HFR3 has the frame length of 1190 µs. Then, the frame length of 2360 µs of the end frame FFR3 represents the end of the data to be transmitted as well as the number of the data frames DFR_1 to DFR_4 "100" (i.e. 4 frames), the error verification information "01" and the number of transmissions of the data frames DFR_1 to DFR_4 "101" (i.e. 5 times), and the frame length of 1190 µs of the header frame HFR3 indicates only the beginning of the data to be transmitted.

If a number of the data frames DFR_1 to DFR_n other than "100" (i.e. 4 frames), error verification information other than "01" and a number of transmissions of the data frames DFR_1 to DFR_n other than "101" (i.e. 5 times) are placed on the header frame HFR3 or end frame FFR3 of the radio frame WFR8-1 by using a frame length, too, the number of the data frames DFR_1 to DFR_n other than "100" (i.e. 4 frames), the error verification information other than "01" and the number of transmissions of the data frames DFR_1 to DFR_n other than "101" (i.e. 5 times) are placed on the header frame HFR3 or end frame FFR3 of the radio frame WFR8-1 in the same manner as that described above.

Figure 66:
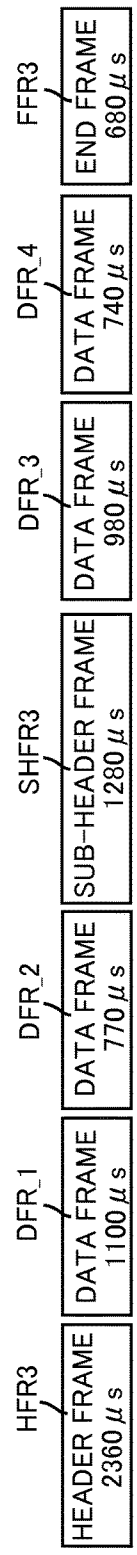
FIG. 66 illustrates a specific example of the radio frame WFR8-2 of FIG. 56(b).

FIG. 66 illustrates a specific example of the radio frame WFR8-2 of FIG. 56(b). FIG. 66 also illustrates the specific example of the radio frame WFR8-2 in the case where the number of the data frames DFR_1 to DFR_n ("100") (i.e. 4 frames), the error verification information "01" and the number of transmissions of the data frames DFR_1 to DFR_n "101" (i.e. 5 times) are placed on the header frame HFR3 by using a frame length.

Referring to FIG. 66, the radio frame WFR8-2-1 includes a header frame HFR3, data frames DFR_1 and DFR_2, a sub-header frame SHFR3, data frames DFR_3 and DFR_4 and an end frame FFR3.

The header frame HFR3 has the frame length of 2360 µs, the data frame DFR_1 has the frame length of 1100 µs, the data frame DFR_2 has the frame length of 770 µs, the sub-header frame SHFR3 has the frame length of 1280 µs, the data frame DFR_3 has the frame length of 980 µs, the data frame DFR_4 has the frame length of 740 µs, and the end frame FFR3 has the frame length of 680 µs.

The frame length of 1280 µs of the sub-header frame SHFR3 indicates a delimiter inserted into the sequence of the data frames DFR_1 to DFR_4.

The frame length of 2360 µs of the header frame HFR3 and the frame length of 680 µs of the end frame FFR3 are described above with reference to FIG. 65.

If the number of the data frames DFR_1 to DFR_4 "100" (i.e. 4 frames), the error verification information "01" and the number of transmissions of the data frames DFR_1 to DFR_4 "101" (i.e. 5 times) are placed on the sub-header frame SHFR3 by using a frame length, the sub-header frame SHFR3 has the frame length of 2360 µs, the header frame HFR3 has the frame length of 1190 µs and the end frame FFR3 has the frame length of 680 µs. Then, the frame length of 2360 µs of the sub-header frame SHFR3 represents a delimiter for the data frames DFR_1 to DFR_4 as well as the number of the data frames DFR_1 to DFR_4 "100" (i.e. 4 frames), the error verification information "01" and the number of transmissions of the data frames DFR_1 to DFR_4 "101" (i.e. 5 times), and the frame length of 1190 µs of the header frame HFR3 indicates only the beginning of the data to be transmitted and the frame length of 680 µs of the end frame FFR3 indicates only the end of the data to be transmitted.

If the number of the data frames DFR_1 to DFR_4 "100" (i.e. 4 frames), the error verification information "01" and the number of transmissions of the data frames DFR_1 to DFR_4 "101" (i.e. 5 times) are placed on the end frame FFR3 by using a frame length, the end frame FFR3 has the frame length of 2360 µs, the header frame HFR3 has the frame length of 1190 µs and the sub-header frame SHFR3 has the frame length of 1280 µs. Then, the frame length of 2360 µs of the end frame FFR3 represents the end of the data to be transmitted as well as the number of the data frames DFR_1 to DFR_4 "100" (i.e. 4 frames), the error verification information "01" and the number of transmissions of the data frames DFR_1 to DFR_4 "101" (i.e. 5 times), and the frame length of 1190 µs of the header frame HFR3 indicates only the beginning of the data to be transmitted and the frame length of 1280 µs of the sub-header frame SHFR3 indicates only a delimiter for the data frames DFR_1 to DFR_4.

If a number of the data frames DFR_1 to DFR_n other than "100" (i.e. 4 frames), error verification information other than "01" and a number of transmissions of the data frames DFR_1 to DFR_n other than "101" (i.e. 5 times) are placed on one of the header frame HFR3, sub-header frame SHFR3 and end frame FFR3 of the radio frame WFR8-2 by using a frame length, too, the number of the data frames DFR_1 to DFR_n other than "100" (i.e. 4 frames), the error verification information other than "01" and the number of transmissions of the data frames DFR_1 to DFR_n other than "101" (i.e. 5 times) are placed on one of the header frame HFR3, sub-header frame SHFR3 and end frame FFR3 of the radio frame WFR8-2 in the same manner as that described above.

Figure 67:
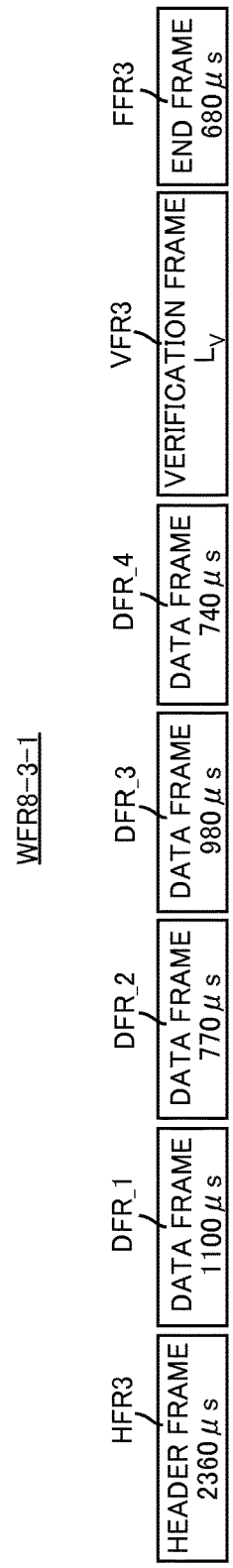
FIG. 67 illustrates a specific example of the radio frame WFR8-3 of FIG. 56(c).

FIG. 67 illustrates a specific example of the radio frame WFR8-3 of FIG. 56(c). FIG. 67 also illustrates the specific example of the radio frame WFR8-3 in the case where the number of the data frames DFR_1 to DFR_n ("100") (i.e. 4 frames), the error verification information "01" and the number of transmissions of the data frames DFR_1 to DFR_n "101" (i.e. 5 times) are placed on the header frame HFR3 by using a frame length.

Referring to FIG. 67, the radio frame WFR8-3-1 includes a header frame HFR3, data frames DFR_1 to DFR_4, a verification frame VFR3, and an end frame FFR3.

The header frame HFR3 has the frame length of 2360 μs, the data frame DFR_1 has the frame length of 1100 μs, the data frame DFR_2 has the frame length of 770 μs, the data frame DFR_3 has the frame length of 980 μs, the data frame DFR_4 has the frame length of 740 μs, the verification frame VFR3 has the frame length $L_V$, and the end frame FFR3 has the frame length of 680 μs.

The frame length $L_V$ of the verification frame VFR3 is a frame length to detect an error in the data frames DFR_1 to DFR_4, as described in connection with Embodiment 8. The frame length of 2360 μs of the header frame HFR3 and the frame length of 680 μs of the end frame FFR3 are described above with reference to FIG. 65.

Since the frame length of 2360 μs of the header frame HFR3 includes the error verification information "01" and the frame length $L_V$ of the verification frame VFR3 is a frame length to detect an error in the data frames DFR_1 to DFR_4, the radio frame WFR8-3-1 includes two pieces of error verification information.

If the number of the data frames DFR_1 to DFR_4 "100" (i.e. 4 frames), the error verification information "01" and the number of transmissions of the data frames DFR_1 to DFR_4 "101" (i.e. 5 times) are placed on the verification frame VFR3 by using a frame length, the verification frame VFR3 has the frame length of 2360 μs, the header frame HFR3 has the frame length of 1190 μs and the end frame FFR3 has the frame length of 680 μs. Then, the frame length of 2360 μs of the verification frame VFR3 represents the number of the data frames DFR_1 to DFR_4 "100" (i.e. 4 frames), the error verification information "01" and the number of transmissions of the data frames DFR_1 to DFR_4 "101" (i.e. 5 times), and the frame length of 1190 μs of the header frame HFR3 indicates only the beginning of the data to be transmitted and the frame length of 680 μs of the end frame FFR3 indicates only the end of the data to be transmitted. In this case, the radio frame WFR8-3 includes one piece of error verification information.

If the number of the data frames DFR_1 to DFR_4 "100" (i.e. 4 frames), the error verification information "01" and the number of transmissions of the data frames DFR_1 to DFR_4 "101" (i.e. 5 times) are placed on the end frame FFR3 by using a frame length, the end frame FFR3 has the frame length of 2360 μs, the header frame HFR3 has the frame length of 1190 μs and the verification frame VFR3 has the frame length $L_V$. Then, the frame length of 2360 μs of the end frame FFR3 represents the end of the data frames DFR_1 to DFR_4 as well as the number of the data frames DFR_1 to DFR_4 "100" (i.e. 4 frames), the error verification information "01" and the number of transmissions of the data frames DFR_1 to DFR_4 "101" (i.e. 5 times), and the frame length of 1190 μs of the header frame HFR3 indicates only the beginning of the data to be transmitted and the frame length $L_V$ of the verification frame VFR3 represents error verification information for detecting an error in the data frames DFR_1 to DFR_4. In this case, too, the radio frame 8-3 includes two pieces of error verification information.

If a number of the data frames DFR_1 to DFR_n other than "100" (i.e. 4 frames), error verification information other than "01" and a number of transmissions of the data frames DFR_1 to DFR_n other than "101" (i.e. 5 times) are placed on one of the header frame HFR3, verification frame VFR3 and end frame FFR3 of the radio frame WFR8-3 by using a frame length, too, the number of the data frames DFR_1 to DFR_n other than "100" (i.e. 4 frames), the error verification information other than "01" and the number of transmissions of the data frames DFR_1 to DFR_n other than "101" (i.e. 5 times) are placed on one of the header frame HFR3, verification frame VFR3 and end frame FFR3 of the radio frame WFR8-3 in the same manner as that described above.

Thus, if the number of the data frames DFR_1 to DFR_4 "100" (i.e. 4 frames), the error verification information "01" and the number of transmissions of the data frames DFR_1 to DFR_4 "101" (i.e. 5 times) are placed on the header frame HFR3 or end frame FFR3 other than the verification frame VFR3 by using the frame length of 2360 μs, the radio frame WFR8-3 includes two pieces of error verification information; if the number of the data frames DFR_1 to DFR_4 "100" (i.e. 4 frames), the error verification information "01" and the number of transmissions of the data frames DFR_1 to DFR_4 "101" (i.e. 5 times) are placed on the verification frame VFR3 by using the frame length of 2360 μs, the radio frame WFR8-3 includes one piece of error verification information.

Figure 68:
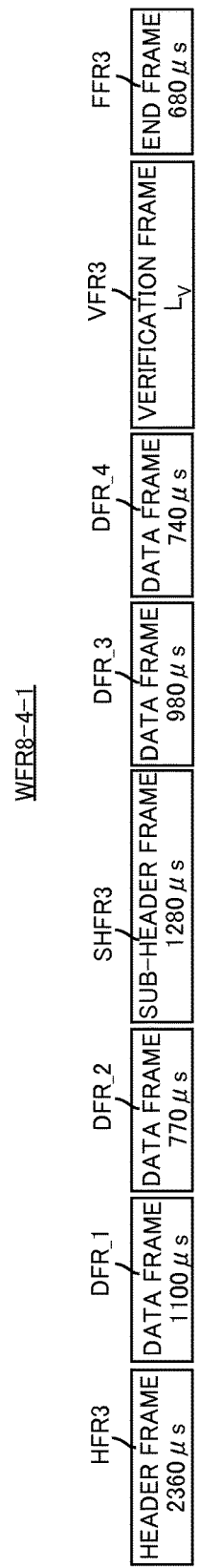
FIG. 68 illustrates a specific example of the radio frame WFR8-4 of FIG. 56(d).

FIG. 68 illustrates a specific example of the radio frame WFR8-4 of FIG. 56(d). FIG. 68 also illustrates the specific example of the radio frame WFR8-4 in the case where the number of the data frames DFR_1 to DFR_n ("100") (i.e. 4 frames), the error verification information "01" and the number of transmissions of the data frames DFR_1 to DFR_n "101" (i.e. 5 times) are placed on the header frame HFR3 by using a frame length.

Referring to FIG. 68, the radio frame WFR8-4-1 includes a header frame HFR3, data frames DFR_1 and DFR_2, a sub-header frame SHFR3, data frames DFR_3 and DFR_4, a verification frame VFR3, and an end frame FFR3.

The header frame HFR3 has the frame length of 2360 μs, the data frame DFR_1 has the frame length of 1100 μs, the data frame DFR_2 has the frame length of 770 μs, the sub-header frame SHFR3 has the frame length of 1280 μs, the data frame DFR_3 has the frame length of 980 μs, the data frame DFR_4 has the frame length of 740 μs, the verification frame VFR3 has the frame length $L_V$, and the end frame FFR3 has the frame length of 680 μs.

The frame length $L_V$ of the verification frame VFR3 is a frame length to detect an error in the data frames DFR_1 to DFR_4, as described in connection with Embodiment 8. The frame length of 2360 μs of the header frame HFR3 and the frame length of 680 μs of the end frame FFR3 are described above with reference to FIG. 65. Further, the frame length of 1280 μs of the sub-header frame SHFR3 is described above with reference to FIG. 66.

Since the frame length of 2360 μs of the header frame HFR3 includes the error verification information "01" and the frame length $L_V$ of the verification frame VFR3 is a frame length to detect an error in the data frames DFR_1 to DFR_4, the radio frame WFR8-4-1 includes two pieces of error verification information.

If the number of the data frames DFR_1 to DFR_4 "100" (i.e. 4 frames), the error verification information "01" and the number of transmissions of the data frames DFR_1 to DFR_4 "101" (i.e. 5 times) are placed on the verification frame VFR3 by using a frame length, the verification frame VFR3 has the frame length of 2360 µs, the header frame HFR3 has the frame length of 1190 µs, the sub-header frame SHFR3 has the frame length of 1280 µs, and the end frame FFR3 has the frame length of 680 µs. Then, the frame length of 2360 µs of the verification frame VFR3 represents the number of the data frames DFR_1 to DFR_4 "100" (i.e. 4 frames), the error verification information "01" and the number of transmissions of the data frames DFR_1 to DFR_4 "101" (i.e. 5 times), and the frame length of 1190 µs of the header frame HFR3 indicates only the beginning of the data to be transmitted, the sub-header frame SHFR3 indicates only a delimiter for the data frames DFR_1 to DFR_4, and the frame length of 680 µs of the end frame FFR3 indicates only the end of the data to be transmitted. In this case, the radio frame WFR8-4 includes one piece of error verification information.

If the number of the data frames DFR_1 to DFR_4 "100" (i.e. 4 frames), the error verification information "01" and the number of transmissions of the data frames DFR_1 to DFR_4 "101" (i.e. 5 times) are placed on the end frame FFR3 by using a frame length, the end frame FFR3 has the frame length of 2360 µs, the header frame HFR3 has the frame length of 1190 µs, the sub-header frame SHFR3 has the frame length of 1280 µs, and the verification frame VFR3 has the frame length $L_V$. Then, the frame length of 2360 µs of the end frame FFR3 represents the end of the data frames DFR_1 to DFR_4 as well as the number of the data frames DFR_1 to DFR_4 "100" (i.e. 4 frames), the error verification information "01" and the number of transmissions of the data frames DFR_1 to DFR_4 "101" (i.e. 5 times), and the frame length of 1190 µs of the header frame HFR3 indicates only the beginning of the data to be transmitted, the sub-header frame SHFR3 indicates only a delimiter for the data frames DFR_1 to DFR_4, and the frame length $L_V$ of the verification frame VFR3 represents error verification information for detecting an error in the data frames DFR_1 to DFR_4. In this case, too, the radio frame 8-4 includes two pieces of error verification information.

If the number of the data frames DFR_1 to DFR_4 "100" (i.e. 4 frames), the error verification information "01" and the number of transmissions of the data frames DFR_1 to DFR_4 "101" (i.e. 5 times) are placed on the sub-header frame SHFR3 by using a frame length, the sub-header frame SHFR3 has the frame length of 2360 µs, the header frame HFR3 has the frame length of 1190 µs, the verification frame VFR3 has the frame length $L_V$, and the end frame FFR3 has the frame length of 680 µs. Then, the frame length of 2360 µs of the header frame HFR3 represents a delimiter for the data frames DFR_1 to DFR_4 as well as the number of the data frames DFR_1 to DFR_4 "100" (i.e. 4 frames), the error verification information "01" and the number of transmissions of the data frames DFR_1 to DFR_4 "101" (i.e. 5 times), and the frame length of 1190 µs of the header frame HFR3 indicates only the beginning of the data to be transmitted, the frame length $L_V$ of the verification frame VFR3 represents error verification information for detecting an error in the data frames DFR_1 to DFR_4, and the end frame FFR3 indicates only the end of the data to be transmitted. In this case, too, the radio frame 8-4 includes two pieces of error verification information.

If a number of the data frames DFR_1 to DFR_n other than "100" (i.e. 4 frames), error verification information other than "01" and a number of transmissions of the data frames DFR_1 to DFR_n other than "101" (i.e. 5 times) are placed on one of the header frame HFR3, sub-header frame SHFR3, verification frame VFR3 and end frame FFR3 of the radio frame WFR8-4 by using a frame length, too, the number of the data frames DFR_1 to DFR_n other than "100" (i.e. 4 frames), the error verification information other than "01" and the number of transmissions of the data frames DFR_1 to DFR_n other than "101" (i.e. 5 times) are placed on one of the header frame HFR3, sub-header frame SHFR3, verification frame VFR3 and end frame FFR3 of the radio frame WFR8-4 in the same manner as that described above.

Thus, if the number of the data frames DFR_1 to DFR_4 "100" (i.e. 4 frames), the error verification information "01" and the number of transmissions of the data frames DFR_1 to DFR_4 "101" (i.e. 5 times) are placed on one of the header frame HFR3, sub-header frame SHFR3 and end frame FFR3 other than the verification frame VFR3 by using the frame length of 2360 µs, then, the radio frame WFR8-4 includes two pieces of error verification information; if the number of the data frames DFR_1 to DFR_4 "100" (i.e. 4 frames), the error verification information "01" and the number of transmissions of the data frames DFR_1 to DFR_4 "101" (i.e. 5 times) are placed on the verification frame VFR3 by using the frame length of 2360 µs, the radio frame WFR8-4 includes one piece of error verification information.

The generating circuitry 13G of the transmitter 801 holds the correspondence tables TBL1 and TBL-41, and refers to the correspondence table TBL1 to generate data frames DFR_1 to DFR_4 having the frame lengths corresponding to the bit values of the data to be transmitted. Further, the generating circuitry 13G refers to the correspondence table TBL-41 to determine a frame length representing the number of the data frames DFR_1 to DFR_n, the error verification information and the number of transmissions of the data frames DFR_1 to DFR_n, and generates a header frame HFR3 (or end frame FFR3 or sub-header frame SHFR3 or verification frame VFR3) having the determined frame length. Otherwise, the generating circuitry 13G generates an end frame FFR3 having the frame length of 680 µs or a header frame HFR3 having the frame length of 1190 µs in the same manner as that for the generating circuitry 13, generating a sub-header frame SHFR3 having the frame length of 1280 µs in the same manner as that in the generating circuitry 13B, and generates a verification frame VFR3 having the frame length $L_V$ in the same manner as that in the generating circuitry 13E.

(i) Receiving Operation for Radio Frame WFR8-1-1

The determination circuit 25G of the receiver 802 holds the correspondence tables TBL1 and TBL-41. If the receiver 802 receives the radio frame WFR8-1-1, the frame length detection circuit 24 detects the frame lengths of 2360 µs, 1100 µs, 770 µs, 980 µs, 740 µs and 680 µs in the manner described above, and sequentially outputs the frame lengths of 2360 µs, 1100 µs, 770 µs, 980 µs, 740 µs and 680 µs that have been detected to the determination circuit 25G.

When the determination circuit 25G has received the first frame length (i.e. 2360 µs), it senses the beginning of the data to be transmitted based on the frame length of 2360 µs. Then, the determination circuit 25G determines which of the correspondence tables TBL1 and TBL-41 contains the frame length of 2360 µs, and determines that the correspondence table TBL-41 contains the frame length of 2360 µs. Then, the determination circuit 25G refers to the correspondence table TBL-41 to detect the number of the data frames DFR_1 to DFR_n "100" (i.e. 4 frames), the error verification information "01" and the number of transmissions of the data frames DFR_1 to DFR_n "101" (i.e. 5 times) that are associated with the frame length of 2360 μs.

Thereafter, the determination circuit 25G receives the frame lengths of 1100 μs, 770 μs, 980 μs, 740 μs and 680 μs from the frame length detection circuit 24, and senses the end of the data to be transmitted based on the frame length of 680 which has been received last. Then, the determination circuit 25G determines whether the number of frame lengths between the frame length of 2360 μs and the frame length of 680 μs (i.e. 1100 μs, 770 μs, 980 μs and 740 μs) match the number of the data frames DFR_1 to DFR_4 "100" (i.e. 4 frames). Further, the determination circuit 25G receives, from the frame length detection circuit 24, the frame lengths of 2360 μs, 1100 μs, 770 μs, 980 μs, 740 μs and 680 μs for the number of transmissions "101" (i.e. 5 times), and extracts, from the frame lengths of 2360 μs, 1100 μs, 770 μs, 980 μs, 740 μs and 680 μs for the number of transmissions "101" (i.e. 5 times) that has been received, the frame lengths of 1100 μs, 770 μs, 980 μs and 740 μs of the data frames DFR_1 to DFR_4 the number of transmissions "101" (i.e. 5 times). Then, the determination circuit 25G determines whether the frame lengths of 1100 μs, 770 μs, 980 μs and 740 μs for the number of transmissions "101" (i.e. 5 times) match each other.

Then, if the determination circuit 25G determines that the number of the frame lengths between the frame length of 2360 μs and the frame length of 680 μs (i.e. 1100 μs, 770 μs, 980 μs and 740 μs) matches the number of the data frames DFR_1 to DFR_4 "100" (i.e. 4 frames) and determines that the frame lengths of 1100 μs, 770 μs, 980 μs and 740 μs for the number of transmissions "101" (i.e. 5 times) match each other, then, it outputs the frame lengths of 1100 μs, 770 μs, 980 μs and 740 μs and error verification information "01" to the decoder 26.

When the decoder 26 has received the frame lengths of 1100 μs, 770 μs, 980 μs and 740 μs and the error verification information "01" from the determination circuit 25G, it refers to the correspondence table TBL1 to convert the frame lengths of 1100 μs, 770 μs, 980 μs and 740 μs to four bit sequences "1101", "0010", "1001" and "0001" in the manner described above, and calculates the sum "1101" of the converted four bit sequences "1101", "0010", "1001" and "0001". Then, from the bit sequence "11001" which represents the calculated sum, the decoder 26 detects the two lowest-order bits "01", and determines whether the detected 2-bit value 01" matches the error verification information "01".

In this case, since the detected 2-bit value "01" matches the error verification information "01", the decoder 26 determines that no error has been detected in the data frames DFR_1 to DFR_4, and outputs the bit sequence "1101001010010001", which is obtained by arranging the four bit sequences "1101", "0010", "1001" and "0001" in order, as the data to be transmitted.

If the determination circuit 25G determines that the number of the frame lengths between the frame length of 2360 μs and the frame length of 680 μs (i.e. 1100 μs, 770 μs, 980 μs and 740 μs) does not match the number of the data frames DFR_1 to DFR_4 "100" (i.e. 4 frames), or if it determines that the frame lengths of 1100 μs, 770 μs, 980 μs and 740 μs for the number of transmissions "101" (i.e. 5 times) do not match each other, it discards the frame lengths of 1100 μs, 770 μs, 980 μs and 740 μs and determines that the receiver failed to receive the data to be transmitted. Further, if the detected 2-bit value does not match the error verification information, the decoder 26 determines that an error has been detected in the data frames DFR_1 to DFR_n and discards the four bit sequences "1101", "0010", "1001" and "0001".

If the number of the data frames DFR_1 to DFR_n, the error verification information and the number of transmissions of the data frames DFR_1 to DFR_n are placed on the end frame FFR3 by using a frame length, the determination circuit 25G of the receiver 802 sequentially receives, from the frame length detection circuit 24, the frame lengths of 1190 μs, 1100 μs, 770 μs, 980 μs, 740 μs and 2360 μs.

Then, based on the first frame length (i.e. 1190 μs), the determination circuit 25G senses the beginning of the data to be transmitted, and, based on the frame length of 2360 μs which has been received last, detects the end of the data to be transmitted as well as the number of the data frames DFR_1 to DFR_4 "100", the error verification information "01" and the number of transmissions of the data frames DFR_1 to DFR_4 "101" (i.e. 5 times).

Thereafter, the determination circuit 25G performs the same operations as those described above, and the decoder 26 outputs the data to be transmitted in accordance with the operations described above.

(ii) Receiving Operation for Radio Frame WFR8-2-1

If the receiver 802 receives the radio frame WFR8-2-1, the frame length detection circuit 24 detects the frame lengths of 2360 μs, 1100 μs, 770 μs, 1280 μs, 980 μs, 740 μs and 680 μs in the manner described above, and sequentially outputs the frame lengths of 2360 μs, 1100 μs, 770 μs, 1280 μs, 980 μs, 740 μs and 680 μs that have been detected to the determination circuit 25G.

When the determination circuit 25G has received the first frame length (i.e. 2360 μs), it senses the beginning of the data to be transmitted based on the frame length of 2360 μs. Then, the determination circuit 25G determines which of the correspondence tables TBL1 and TBL-41 contains the frame length of 2360 μs, and determines that the corresponding table TBL-41 contains the frame length of 2360 μs. Then, the determination circuit 25G refers to the correspondence table TBL-41 to detect the number of the data frames DFR_1 to DFR_n "100" (i.e. 4 frames), the error verification information "01" and the number of transmissions of the data frames DFR_1 to DFR_n "101" (i.e. 5 times) that are associated with the frame length of 2360 μs.

Thereafter, the determination circuit 25G recognizes a predetermined number (i.e. 2) of frame lengths (i.e. 1100 μs and 770 μs) following the first frame length (i.e. 2360 μs) as the frame lengths of the data frames, and, based on the frame length of 1280 μs, senses a delimiter for the data frames. Then, the determination circuit 25G recognizes a predetermined number (i.e. 2) of frame lengths (i.e. 980 μs and 740 μs) following the frame length of 1280 μs as the frame lengths of the data frames, and, based on the frame length of 680 μs which has been received last, senses the end of the data to be transmitted.

Then, the determination circuit 25G determines whether the number of the frame lengths sandwiched between the frame length of 2360 μs, the frame length of 1280 μs and the frame length of 680 μs (i.e. 1100 μs, 770 μs, 980 μs and 740 μs) matches the number of the data frames DFR_1 to DFR_4 "100" (i.e. 4 frames). Further, the determination circuit 25G receives, from the frame length detection circuit 24, the frame lengths of 2360 μs, 1100 μs, 770 μs, 1280 μs, 980 μs, 740 μs and 680 μs for the number of transmissions "101" (i.e. 5 times), and extracts, from the frame lengths of 2360

μs, 1100 μs, 770 μs, 1280 μs, 980 μs, 740 μs and 680 μs for the number of transmissions "101" (i.e. 5 times) that has been received, the frame lengths of 1100 μs, 770 μs, 980 μs and 740 μs of the data frames DFR_1 to DFR_4 the number of transmissions "101" (i.e. 5 times). Then, the determination circuit 25G determines whether the frame lengths of 1100 μs, 770 μs, 980 μs and 740 μs for the number of transmissions "101" (i.e. 5 times) match each other.

Then, if the determination circuit 25G determines that the number of the frame lengths sandwiched between the frame length of 2360 μs, the frame length of 1280 μs and the frame length of 680 μs (i.e. 1100 μs, 770 μs, 980 μs and 740 μs) matches the number of the data frames DFR_1 to DFR_4 "100" (i.e. 4 frames), and determines that the frame lengths of 1100 μs, 770 μs, 980 μs and 740 μs for the number of transmissions "101" (i.e. 5 times) match each other, it outputs the frame lengths of 1100 μs, 770 μs, 980 μs and 740 μs and the error verification information "01" to the decoder 26.

Thereafter, the decoder 26 outputs the bit sequence "1101001010010001" as the data to be transmitted in accordance with the operations described above.

If the determination circuit 25G determines that the number of the frame lengths sandwiched between the frame length of 2360 μs, the frame length of 1280 μs and the frame length of 680 μs (i.e. 1100 μs, 770 μs, 980 μs and 740 μs) does not match the number of the data frames DFR_1 to DFR_4 "100" (i.e. 4 frames), or if it determines that the frame lengths of 1100 μs, 770 μs, 980 μs and 740 μs for the number of transmissions "101" (i.e. 5 times) do not match each other, then, it discards the frame lengths of 1100 μs, 770 μs, 980 μs and 740 μs and determines that the receiver has failed to receive the data to be transmitted.

If the number of the data frames DFR_1 to DFR_n, the error verification information and the number of transmissions of the data frames DFR_1 to DFR_n are placed on the sub-header frame SHFR3 by using a frame length, the determination circuit 25G of the receiver 802 sequentially receives, from the frame length detection circuit 24, the frame lengths of 1190 μs, 1100 μs, 770 μs, 2360 μs, 980 μs, 740 μs and 680 μs.

Then, based on the first frame length (i.e. 1190 μs), the determination circuit 25G senses the beginning of the data to be transmitted, and recognizes a predetermined number (i.e. 2) of frame lengths (i.e. 1100 μs and 770 μs) following the first frame length (i.e. 1190 μs) as the frame lengths of the data frames. Thereafter, based on the frame length of 2360 μs, the determination circuit 25G senses a delimiter for data frames and determines which of the correspondence table TBL1 and TBL-41 contains the frame length of 2360 μs. Then, if the determination circuit 25G determines that the correspondence table TBL-41 contains the frame length of 2360 μs, it refers to the correspondence table TBL-41 and detects the number of the data frames DFR_1 to DFR_n "100" (i.e. 4), the error verification information "01" and the number of transmissions of the data frames DFR_1 to DFR_n "101" (i.e. 5 times) that are associated with the frame length of 2360 μs.

Thereafter, the determination circuit 25G performs the same operations as those described above, and the decoder 26 outputs the data to be transmitted in accordance with the operations described above.

Otherwise, the description of the receiving operation for the radio frame WFR8-2-1 is the same as that of the receiving operation for the radio frame WFR8-1-1.

(iii) Receiving Operation for Radio Frame WFR8-3-1

If the receiver 802 receives the radio frame WFR8-3-1, the frame length detection circuit 24 detects the frame lengths of 2360 μs, 1100 μs, 770 μs, 980 μs, 740 μs, $L_V$, and 680 μs in the manner described above, and sequentially outputs the frame lengths of 2360 μs, 1100 μs, 770 μs, 1280 μs, 980 μs, 740 μs, $L_V$ and 680 μs that have been detected to the determination circuit 25G.

When the determination circuit 25G has received the first frame length (i.e. 2360 μs), it senses the beginning of the data to be transmitted based on the frame length of 2360 μs. Then, the determination circuit 25G determines which of the correspondence tables TBL1 and TBL-41 contains the frame length of 2360 μs, and determines that the corresponding table TBL-41 contains the frame length of 2360 μs. Then, the determination circuit 25G refers to the correspondence table TBL-41 to detect the number of the data frames DFR_1 to DFR_n "100" (i.e. 4 frames), the error verification information "01" and the number of transmissions of the data frames DFR_1 to DFR_n "101" (i.e. 5 times) that are associated with the frame length of 2360 μs.

Thereafter, the determination circuit 25G recognizes the frame lengths (i.e. 1100 μs, 770 μs, 980 μs and 740 μs) following the first frame length (i.e. 2360 μs) as the frame lengths of the data frames, and, based on the frame length $L_V$, senses the error verification information. Then, based on the frame lengths of 1100 μs, 770 μs, 980 μs and 740 μs and frame length $L_V$, the determination circuit 25G determines whether an error has been detected in the data frames DFR_1 to DFR_n in the manner described in connection with Embodiment 8. Subsequently, based on the frame length of 680 μs which has been received last, the determination circuit 25G senses the end of the data to be transmitted.

Then, the determination circuit 25G determines whether the number of the frame lengths between the frame length of 2360 μs and the frame length $L_V$ (i.e. 1100 μs, 770 μs, 980 μs and 740 μs) matches the number of the data frames DFR_1 to DFR_4 "100" (i.e. 4 frames). Further, the determination circuit 25G receives, from the frame length detection circuit 24, the frame lengths of 2360 μs, 1100 μs, 770 μs, 980 μs, 740 μs, $L_V$ and 680 μs for the number of transmissions "101" (i.e. 5 times), and extracts, from the frame lengths of 2360 μs, 1100 μs, 770 μs, 980 μs, 740 μs, $L_V$ and 680 μs for the number of transmissions "101" (i.e. 5 times) that has been received, the frame lengths of 1100 μs, 770 μs, 980 μs and 740 μs of the data frames DFR_1 to DFR_4 the number of transmissions "101" (i.e. 5 times). Then, the determination circuit 25G determines whether the frame lengths of 1100 μs, 770 μs, 980 μs and 740 μs for the number of transmissions "101" (i.e. 5 times) match each other.

Then, if the determination circuit 25G determines that the number of the frame lengths between the frame length of 2360 μs and the frame length $L_V$ (i.e. 1100 μs, 770 μs, 980 μs and 740 μs) matches the number of the data frames DFR_1 to DFR_4 "100" (i.e. 4 frames), determines that no error has been detected in the data frames DFR_1 to DFR_4, and determines that the frame lengths of 1100 μs, 770 μs, 980 μs and 740 μs for the number of transmissions "101" (i.e. 5 times) match each other, it outputs the frame lengths of 1100 μs, 770 μs, 980 μs and 740 μs and the error verification information "01" to the decoder 26.

Thereafter, the decoder 26 outputs the bit sequence "1101001010010001" as the data to be transmitted in accordance with the operations described above. In this case, based on the error verification information "01" and the four bit sequences of the data frames DFR_1 to DFR_4, the decoder 26 determines that no error has been detected in the data frames DFR_1 to DFR_4.

Therefore, if the number of the data frames DFR_1 to DFR_4 "100" (i.e. 4 frames), the error verification information "01" and the number of transmissions of the data frames DFR_1 to DFR_4 "101" (i.e. 5 times) are placed on the header frame HFR3 by using a frame length, the receiver 802 uses the determination circuit 25G and decoder 26 to determine that no error has been detected in the data frames DFR_1 to DFR_4 in different manners. As a result, the data to be transmitted could be received still more correctly.

If the determination circuit 25G determines that the number of the frame lengths between the frame length of 2360 µs and the frame length $L_V$ (i.e. 1100 µs, 770 µs, 980 µs and 740 µs) does not match the number of the data frames DFR_1 to DFR_4 "100" (i.e. 4 frames), or if it determines that an error has been detected in the data frames DFR_1 to DFR_4, or if it determines that the frame lengths of 1100 µs, 770 µs, 980 µs and 740 µs for the number of transmissions "101" (i.e. 5 times) do not match each other, it discards the frame lengths of 1100 µs, 770 µs, 980 µs and 740 µs and determines that the receiver has failed to receive the data to be transmitted.

If the number of the data frames DFR_1 to DFR_4, the error verification information and the number of transmissions of the data frames DFR_1 to DFR_4 are placed on the verification frame VFR3 by using a frame length, the determination circuit 25G of the receiver 802 sequentially receives, from the frame length detection circuit 24, the frame lengths of 1190 µs, 1100 µs, 770 µs, 980 µs, 740 µs, 2360 µs and 680 µs.

Then, based on the first frame length (i.e. 1190 µs), the determination circuit 25G senses the beginning of the data to be transmitted, and recognizes the frame lengths (i.e. 1100 µs, 770 µs, 980 µs and 740 µs) following the first frame length (i.e. 1190 µs) as the frame lengths of the data frames. Thereafter, the determination circuit 25G determines which of the correspondence tables TBL1 and TBL-41 contains the frame length of 2360 µs, and determines that the correspondence table TBL-41 contains the frame length of 2360 µs. Then, the determination circuit 25G refers to the correspondence table TBL-41 to detect the number of the data frames DFR_1 to DFR_n "100" (i.e. 4 frames), the error verification information "01" and the number of transmissions of the data frames DFR_1 to DFR_n "101" (i.e. 5 times) that are associated with the frame length of 2360 µs.

Thereafter, the determination circuit 25G performs the same operations as those described above, and the decoder 26 outputs the data to be transmitted in accordance with the operations described above. In this case, the receiver 802 uses only the decoder 26 to determine whether an error has been detected in the data frames DFR_1 to DFR_4.

If the number of the data frames DFR_1 to DFR_4, the error verification information and the number of transmissions of the data frames DFR_1 to DFR_4 are placed on the end frame FFR3 by using a frame length, the receiver 802 uses the determination circuit 25G and decoder 26 to determine whether an error has been detected in the data frames DFR_1 to DFR_4 in different manners.

Otherwise, the description of the receiving operation for the radio frame WFR8-3-1 is the same as that of the receiving operation for the radio frame WFR8-1-1

(iv) Receiving operation for radio frame WFR8-4-1

If the receiver 802 receives the radio frame WFR8-4-1, the frame length detection circuit 24 detects the frame lengths of 2360 µs, 1100 µs, 770 µs, 1280 µs, 980 µs, 740 µs, $L_V$, and 680 µs in the manner described above, and sequentially outputs the frame lengths of 2360 µs, 1100 µs, 770 µs, 1280 µs, 980 µs, 740 µs, $L_V$ and 680 µs that have been detected to the determination circuit 25G.

When the determination circuit 25G has received the first frame length (i.e. 2360 µs), it senses the beginning of the data to be transmitted based on the frame length of 2360 µs. Then, the determination circuit 25G determines which of the correspondence tables TBL1 and TBL-41 contains the frame length of 2360 µs, and determines that the corresponding table TBL-41 contains the frame length of 2360 µs. Then, the determination circuit 25G refers to the correspondence table TBL-41 to detect the number of the data frames DFR_1 to DFR_n "100" (i.e. 4 frames), the error verification information "01" and the number of transmissions of the data frames DFR_1 to DFR_n "101" (i.e. 5 times) that are associated with the frame length of 2360 µs.

Thereafter, the determination circuit 25G recognizes a predetermined number (i.e. 2) of frame lengths (i.e. 1100 µs and 770 µs) following the first frame length (i.e. 2360 µs) as the frame lengths of the data frames, and, based on the frame length of 1280 µs, senses a delimiter for the data frames. Then, the determination circuit 25G recognizes a predetermined number (i.e. 2) of frame lengths (i.e. 980 µs and 740 µs) following the frame length of 1280 µs as the frame lengths of the data frames, and, based on the frame length $L_V$, senses the error verification information.

Then, based on the frame lengths of 1100 µs, 770 µs, 980 µs and 740 µs and the frame length $L_V$, the determination circuit 25G determines whether an error has been detected in the data frames DFR_1 to DFR_n in the manner described in connection with Embodiment 8. Subsequently, based on the frame length of 680 µs which has been received last, the determination circuit 25G senses the end of the data to be transmitted.

Then, the determination circuit 25G determines whether the number of the frame lengths sandwiched between the frame length of 2360 µs, the frame length of 1280 µs and the frame length $L_V$ (i.e. 1100 µs, 770 µs, 980 µs and 740 µs) matches the number of the data frames DFR_1 to DFR_4 "100" (i.e. 4 frames). Further, the determination circuit 25G receives, from the frame length detection circuit 24, the frame lengths of 2360 µs, 1100 µs, 770 µs, 1280 µs, 980 µs, 740 µs, $L_V$ and 680 µs for the number of transmissions "101" (i.e. 5 times), and extracts, from the frame lengths of 2360 µs, 1100 µs, 770 µs, 1280 µs, 980 µs, 740 µs, $L_V$ and 680 µs for the number of transmissions "101" (i.e. 5 times) that has been received, the frame lengths of 1100 µs, 770 µs, 980 µs and 740 µs of the data frames DFR_1 to DFR_4 the number of transmissions "101" (i.e. 5 times). Then, the determination circuit 25G determines whether the frame lengths of 1100 µs, 770 µs, 980 µs and 740 µs for the number of transmissions "101" (i.e. 5 times) match each other.

Then, if the determination circuit 25G determines that the number of the frame lengths sandwiched between the frame length of 2360 µs, the frame length of 1280 µs and the frame length $L_V$ (i.e. 1100 µs, 770 µs, 980 µs and 740 µs) matches the number of the data frames DFR_1 to DFR_4 "100" (i.e. 4 frames), determines that no error has been detected in the data frames DFR_1 to DFR_4, and if it is determined that the frame lengths of 1100 µs, 770 µs, 980 µs and 740 µs for the number of transmissions "101" (i.e. 5 times) match each other, the determination circuit 25G outputs the frame lengths of 1100 µs, 770 µs, 980 µs and 740 µs and error verification information "01" to the decoder 26.

Thereafter, the decoder 26 outputs the bit sequence "1101001010010001" as the data to be transmitted in accordance with the operations described above. In this case, the decoder 26 determines that no error has been detected in the data frames DFR_1 to DFR_4 based on the error verification information "01" and the four bit sequences of the data frames DFR_1 to DFR_4.

Therefore, if the number of the data frames DFR_1 to DFR_4 "100" (i.e. 4 frames), the error verification information "01" and the number of transmissions of the data frames DFR_1 to DFR_4 "101" (i.e. 5 times) are placed on the header frame HFR3 by using a frame length, the receiver 802 uses the determination circuit 25G and decoder 26 to determine that no error has been detected in the data frames DFR_1 to DFR_4 in different manners. As a result, the data to be transmitted could be received still more correctly.

If the determination circuit 25G determines that the number of the frame lengths sandwiched between the frame length of 2360 μs, the frame length of 1280 μs and the frame length $L_V$ (i.e. 1100 μs, 770 μs, 980 μs and 740 μs) does not match the number of the data frames DFR_1 to DFR_4 "100" (i.e. 4 frames), or if it determines that an error has been detected in the data frames DFR_1 to DFR_4, or it determines that the frame lengths of 1100 μs, 770 μs, 980 μs and 740 μs for the number of transmissions "101" (i.e. 5 times) do not match each other, it discards the frame lengths of 1100 μs, 770 μs, 980 μs and 740 μs and determines that the receiver has failed to receive the data to be transmitted.

The receiving operations performed when the number of the data frames DFR_1 to DFR_n, the error verification information and the number of transmissions of the data frames DRF_1 to DFR_n are placed on the end frame FFR3 by using a frame length, when such information is placed on the sub-header frame SHFR3, and if such information is placed on the verification frame VFR3 are the same as those for the radio frames WFR8-1-1, WFR8-2-1 and WFR8-3-1, described above.

As described above, in the receiving operations for the radio frame WFR8-4-1, if the number of the data frames DFR_1 to DFR_n, the error verification information and the number of transmissions of the data frames DFR_1 to DFR_n are placed on one of the header frame HFR3, sub-header frame SHFR3 and end frame FFR3 by using a frame length, the receiver 802 uses the determination circuit 25G and decoder 26 to determine whether an error has been detected in the data frames DFR_1 to DFR_n in different manners; if the number of the data frames DFR_1 to DFR_n, the error verification information and the number of transmissions of the data frames DFR_1 to DFR_n are placed on the verification frame VFR3 by using a frame length, the receiver 802 uses only the decoder 26 to determine whether an error has been detected in the data frames DFR_1 to DFR_n.

(9-2) The case where all of number of data frames DFR_1 to DFR_n, error verification information and number of transmissions of data frames DFR_1 to DFR_n are placed on a plurality of frames by using frame lengths If all of the number of the data frames DFR_1 to DFR_n, the error verification information and the number of transmissions of the data frames DFR_1 to DFR_n are placed on a plurality of frames by using frame lengths, the following versions are possible: the number of the data frames DFR_1 to DFR_n and the error verification information are placed on one frame by using a frame length and the number of transmissions of the data frames DFR_1 to DFR_n are placed on another frame by using a frame length; the error verification information and the number of transmissions of the data frames DFR_1 to DFR_n are placed on one frame by using a frame length and the number of data frames DFR_1 to DFR_n is placed on another frame by using a frame length; the number of the data frames DFR_1 to DFR_n and the number of transmissions of the data frames DFR_1 to DFR_n are placed on one frame by using a frame length and the error verification information is placed on another frame by using a frame length; and the number of the data frames DFR_1 to DFR_n, the error verification information and the number of transmissions of the data frames DFR_1 to DFR_n are placed on different one frame, respectively, by using a frame length.

(9-2-1) The case where number of data frames DFR_1 to DFR_n and error verification information are placed on one frame by using frame length and number of transmissions of data frames DFR_1 to DFR_n are placed on another frame by using frame length FIG. 69 is a correspondence table illustrating the relationship between the number of the data frames DFR_1 to DFR_n and error verification information, and frame length.

FIG. 69 illustrates the correspondence between the number of the data frames DFR_1 to DFR_n and error verification information, and frame length in an example where the number of the data frames DFR_1 to DFR_n is in the range of 1 to 7.

Referring to FIG. 69, the correspondence table TBL-42 contains frame lengths, numbers of data frames, and error verification information. The frame lengths, numbers of data frames and error verification information are associated with each other.

If the number of the data frames DFR_1 to DFR_n and the error verification information are placed on one of the header frame HFR3, end frame FFR3, sub-header frame SHFR3 and verification frame VFR3 by using a frame length, the number of the data frames DFR_1 to DFR_n and the error verification information are represented as a 5-bit value $b_1b_2b_3b_4b_5$. In this case, the 3-bit value $b_1b_2b_3$ represents the number of the data frames DFR_1 to DFR_n, and the 2-bit value $b_4b_5$ represents the error verification information. The details of the bit value $b_4b_5$ representing the error verification information are described above.

The frame length of 505 μs is assigned to the case where the number of the data frames DFR_1 to DFR_n is 1 (i.e. "001") and the error verification information is "00".

The frame length of 525 μs is assigned to the case where the number of the data frames DFR_1 to DFR_n is 1 (i.e. "001") and the error verification information is "01".

In the same manner, the frame length of 1045 μs is assigned to the case where the number of the data frames DFR_1 to DFR_n is 7 (i.e. "111") and the error verification information is "11".

Thus, in the correspondence table TBL-42, the frame length increases by 20 μs as the bit value representing one of the number of the data frames DFR_1 to DFR_n and the error verification information increases by "1".

If the number of the data frames DFR_1 to DFR_n and the error verification information are to be placed on the header frame HFR3 by using a frame length, this frame length represents the beginning of the data to be transmitted, the number of the data frames DFR_1 to DFR_n and the error verification information.

If the number of the data frames DFR_1 to DFR_n and the error verification information are to be placed on the sub-header frame SHFR3 by using a frame length, this frame length represents a delimiter for the data frames, the number of the data frames DFR_1 to DFR_n and the error verification information.

If the number of the data frames DFR_1 to DFR_n and the error verification information are to be placed on the end frame FFR3 by using a frame length, this frame length represents the end of the data to be transmitted, the number of the data frames DFR_1 to DFR_n and the error verification information.

If the number of the data frames DFR_1 to DFR_n and the error verification information are to be placed on the verification frame VFR3 by using a frame length, this frame length represents the number of the data frames DFR_1 to DFR_n and the error verification information.

The number of the data frames DFR_1 to DFR_n and the error verification information are placed on one of the header frame HFR3, end frame FFR3, sub-header frame SHFR3 and verification frame VFR3 by using the frame length that corresponds to the number of the data frames DFR_1 to DFR_n and error verification information in the correspondence table TBL-42, and the number of transmissions of the data frames DFR_1 to DFR_n is placed on another one of the header frame HFR3, end frame FFR3, sub-header frame SHFR3 and verification frame VFR3 by using the frame length that corresponds to the number of transmissions of the data frames DFR_1 to DFR_n in the correspondence table TBL6 (see FIG. 47).

If the radio frame is constituted by the radio frame WFR8-1, the number of the data frames DFR_1 to DFR_n and the error verification information are placed on the header frame HFR3 or end frame FFR3 by using a frame length on the correspondence table TBL-42, and the number of transmissions of the data frames DFR_1 to DFR_n is placed on the end frame FFR3 or header frame HFR3 by using a frame length on the correspondence table TBL6.

If the radio frame is constituted by the radio frame WFR8-2, the number of the data frames DFR_1 to DFR_n and the error verification information are placed on one of the header frame HFR3, sub-header frame SHFR3 and end frame FFR3 by using a frame length on the correspondence table TBL-42, and the number of transmissions of the data frames DFR_1 to DFR_n is placed on another one of the header frame HFR3, sub-header frame SHFR3 and end frame FFR3 by using a frame length on the correspondence table TBL6. For example, the number of the data frames DFR_1 to DFR_n and the error verification information may be placed on the header frame HFR3, and the number of transmissions of the data frames DFR_1 to DFR_n may be placed on the sub-header frame SHFR3.

If the radio frame is constituted by the radio frame WFR8-3, the number of the data frames DFR_1 to DFR_n and the error verification information are placed on one of the header frame HFR3, verification frame VFR3 and end frame FFR3 by using a frame length on the correspondence table TBL-42, and the number of transmissions of the data frames DFR_1 to DFR_n is placed on another one of the header frame HFR3, verification frame VFR3 and end frame FFR3 by using a frame length on the correspondence table TBL6. For example, the number of the data frames DFR_1 to DFR_n and the error verification information may be placed on the header frame HFR3, and the number of transmissions of the data frames DFR_1 to DFR_n may be placed on the end frame FFR3.

If the radio frame is constituted by the radio frame WFR8-4, the number of the data frames DFR_1 to DFR_n and the error verification information are placed on one of the header frame HFR3, sub-header frame SHFR3, verification frame VFR3 and end frame FFR3 by using a frame length on the correspondence table TBL-42, and the number of transmissions of the data frames DFR_1 to DFR_n is placed on another one of the header frame HFR3, sub-header frame SHFR3, verification frame VFR3 and end frame FFR3 by using a frame length on the correspondence table TBL6. For example, the number of the data frames DFR_1 to DFR_n and the error verification information may be placed on the sub-header frame SHFR3, and the number of transmissions of the data frames DFR_1 to DFR_n may be placed on the verification frame VFR3.

The generating circuitry 13G of the transmitter 801 holds the correspondence tables TBL1, TBL6 and TBL-42. Then, the generating circuitry 13G refers to the correspondence table TBL1 to generate the data frames DFR_1 to DFR_n having the frame lengths corresponding to the bit values of the data to be transmitted. Further, the generating circuitry 13G refers to the correspondence table TBL-42 to determine a frame length that represents the number of the data frames DFR_1 to DFR_n and the error verification information, and generates a header frame HFR3 (or end frame FFR3 or sub-header frame SHFR3 or verification frame VFR3) having the frame length that has been determined. Further, the generating circuitry 13G refers to the correspondence table TBL6 to generate an end frame FFR3 (or sub-header frame SHFR3 or verification frame VFR3 or header frame HFR3) having the frame length that corresponds to the number of transmissions of the data frames DFR_1 to DFR_n. Otherwise, the generating circuitry 13G generates an end frame FFR3 having the frame length of 680 μs or a header frame HFR3 having the frame length of 1190 μs in the same manner as that in the generating circuitry 13, generates a sub-header frame SHFR3 having the frame length of 1280 μs in the same manner as that in the generating circuitry 13B, and generates a verification frame VFR3 having the frame length $L_V$ in the same manner as that in the generating circuitry 13E.

The receiver 802 receives one of the radio frames WFR8-1 to WFR8-4. The determination circuit 25G of the receiver 802 holds the correspondence tables TBL1, TBL6 and TBL-42. Then, the determination circuit 25G receives a plurality of frame lengths from the frame length detection circuit 24 and, based on the received plurality of frame lengths, detects the beginning of the data to be transmitted, the number of the data frames DFR_1 to DFR_n, the error verification information, the number of transmissions of the data frames DFR_1 to DFR_n, and the end of the data to be transmitted in the manner described above. In this case, the determination circuit 25G detects the number of the data frames DFR_1 to DFR_n and the error verification information based on the frame length of one frame such as the header frame HFR3, and detects the number of transmissions of the data frames DFR_1 to DFR_n based on the frame length of the other one frame.

Thereafter, the determination circuit 25G and decoder 26 performs the operations described in section (9-1), and outputs the data to be transmitted.

(9-2-2) The case where error verification information and number of transmissions of data frames DFR_1 to DFR_n are placed on one frame by using frame length and number of data frames DFR_1 to DFR_n is placed on another frame by using frame length FIG. 70 is a correspondence table illustrating the correspondence between the error verification information and the number of transmissions of the data frames DFR_1 to DFR_n, and frame length.

FIG. 70 illustrates the correspondence between the number of transmissions of the data frames DFR_1 to DFR_n and error verification information, and frame length in an example where the number of transmissions of the data frames DFR_1 to DFR_n is in the range of 1 to 7.

Referring to FIG. 70, the correspondence table TBL-43 contains frame lengths, error verification information and number of transmissions of data frames. The frame lengths, error verification information and number of transmissions of data frames are associated with each other.

If the error verification information and the number of transmissions of the data frames DFR_1 to DFR_n are placed on one of the header frame HFR3, end frame FFR3, sub-header frame SHFR3 and verification frame VFR3 by using a frame length, the error verification information and the number of transmissions of the data frames DFR_1 to DFR_n are represented as a 5-bit value $b_4b_5b_6b_7b_8$. In this case, the 2-bit value $b_4b_5$ represents the error verification information and the 3-bit value $b_6b_7b_8$ represents the number of transmissions of the data frames DFR_1 to DFR_n. The details of the bit value $b_4b_5$ representing the error verification information are described above.

The frame length of 510 μs is assigned to the case where the error verification information is "00" and the number of transmissions of the data frames DFR_1 to DFR_n is 1 (i.e. "001").

The frame length of 530 μs is assigned to the case where the error verification information is "01" and the number of transmissions of the data frames DFR_1 to DFR_n is 1 (i.e. "001").

In the same manner, the frame length of 1050 μs is assigned to the case where the error verification information is "11" and the number of transmissions of the data frames DFR_1 to DFR_n is 7 (i.e. "111").

Thus, in the correspondence table TBL-43, the frame length increases by 20 μs as the bit value representing one of the error verification information and the number of transmissions of the data frames DFR_1 to DFR_n increases by "1".

If the error verification information and the number of transmissions of the data frames DFR_1 to DFR_n are placed on the header frame HFR3 by using a frame length, this frame length represents the beginning of the data to be transmitted, the error verification information and the number of transmissions of the data frames DFR_1 to DFR_n.

If the error verification information and the number of transmissions of the data frames DFR_1 to DFR_n are placed on the sub-header frame SHFR3 by using a frame length, this frame length represents a delimiter for the data frames, the error verification information and the number of transmissions of the data frames DFR_1 to DFR_n.

If the error verification information and the number of transmissions of the data frames DFR_1 to DFR_n are placed on the end frame FFR3 by using a frame length, this frame length represents the end of the data to be transmitted, the error verification information and the number of transmissions of the data frames DFR_1 to DFR_n.

If the error verification information and the number of transmissions of the data frames DFR_1 to DFR_n are placed on the verification frame VFR3 by using a frame length, this frame length represents the error verification information and the number of transmissions of the data frames DFR_1 to DFR_n.

The error verification information and the number of transmissions of the data frames DFR_1 to DFR_n are placed on one of the header frame HFR3, end frame FFR3, sub-header frame SHFR3 and verification frame VFR3 by using the frame length that corresponds to the error verification information and the number of transmissions of the data frames DFR_1 to DFR_n in the correspondence table TBL-43, and the number of the data frames DFR_1 to DFR_n is placed on another one of the header frame HFR3, end frame FFR3, sub-header frame SHFR3 and verification frame VFR3 by using the frame length that corresponds to the number of the data frames DFR_1 to DFR_n in the correspondence table TBL2 (see FIG. 12). The correspondence table TBL2 illustrates the relationship between the number of data frames and the frame length of a header frame, however, in Embodiment 9, the frame length of a header frame on the correspondence table 2 may be replaced by one of the frame length of the end frame FFR3, the frame length of the sub-header frame SHFR3, and the frame length of the verification frame VFR3.

If the radio frame is constituted by the radio frame WFR8-1, the error verification information and the number of transmissions of the data frames DFR_1 to DFR_n are placed on the header frame HFR3 or end frame FFR3 by using a frame length on the correspondence table TBL-43, and the number of the data frames DFR_1 to DFR_n is placed on the end frame FFR3 or header frame HFR3 by using a frame length on the correspondence table TBL2.

If the radio frame is constituted by the radio frame WFR8-2, the error verification information and the number of transmissions of the data frames DFR_1 to DFR_n are placed on one of the header frame HFR3, sub-header frame SHFR3 and end frame FFR3 by using a frame length on the correspondence table TBL-43, and the number of the data frames DFR_1 to DFR_n is placed on another one of the header frame HFR3, sub-header frame SHFR3 and end frame FFR3 by using a frame length on the correspondence table TBL2. For example, the error verification information and the number of transmissions of the data frames DFR_1 to DFR_n may be placed on the header frame HFR3, and the number of the data frames DFR_1 to DFR_n may be placed on the sub-header frame SHFR3.

If the radio frame is constituted by the radio frame WFR8-3, the error verification information and the number of transmissions of the data frames DFR_1 to DFR_n are placed on one of the header frame HFR3, verification frame VFR3 and end frame FFR3 by using a frame length on the correspondence table TBL-43, and the number of the data frames DFR_1 to DFR_n is placed on another one of the header frame HFR3, verification frame VFR3 and end frame FFR3 by using a frame length on the correspondence table TBL2. For example, the error verification information and the number of transmissions of the data frames DFR_1 to DFR_n may be placed on the header frame HFR3, and the number of the data frames DFR_1 to DFR_n may be placed on the end frame FFR3.

If the radio frame is constituted by the radio frame WFR8-4, the error verification information and the number of transmissions of the data frames DFR_1 to DFR_n are placed on one of the header frame HFR3, sub-header frame SHFR3, verification frame VFR3 and end frame FFR3 by using a frame length on the correspondence table TBL-43, and the number the data frames DFR_1 to DFR_n is placed on another one of the header frame HFR3, sub-header frame SHFR3, verification frame VFR3 and end frame FFR3 by using a frame length on the correspondence table TBL2. For example, the error verification information and the number of transmissions of the data frames DFR_1 to DFR_n may be placed on the sub-header frame SHFR3, and the number of the data frames DFR_1 to DFR_n may be placed on the verification frame VFR3.

The generating circuitry 13G of the transmitter 801 holds the correspondence tables TBL1, TBL2 and TBL-43. Then, the generating circuitry 13G refers to the correspondence table TBL1 to generate the data frames DFR_1 to DFR_n having the frame lengths corresponding to the bit values of the data to be transmitted. Further, the generating circuitry 13G refers to the correspondence table TBL-43 to determine a frame length that represents the error verification information and the number of transmissions of the data frames DFR_1 to DFR_n, and generates a header frame HFR3 (or end frame FFR3 or sub-header frame SHFR3 or verification frame VFR3) having the frame length that has been determined. Further, the generating circuitry 13G refers to the correspondence table TBL2 to generate an end frame FFR3 (or sub-header frame SHFR3 or verification frame VFR3 or header frame HFR3) having the frame length that corresponds to the number of the data frames DFR_1 to DFR_n. Otherwise, the generating circuitry 13G generates an end frame FFR3 having the frame length of 680 µs or a header frame HFR3 having the frame length of 1190 µs in the same manner as that in the generating circuitry 13, generates a sub-header frame SHFR3 having the frame length of 1280 µs in the same manner as that in the generating circuitry 13B, and generates a verification frame VFR3 having the frame length $L_V$ in the same manner as that in the generating circuitry 13E.

The receiver 802 receives one of the radio frames WFR8-1 to WFR8-4. The determination circuit 25G of the receiver 802 holds the correspondence tables TBL1, TBL2 and TBL-43. Then, the determination circuit 25G receives a plurality of frame lengths from the frame length detection circuit 24 and, based on the plurality of frame lengths that have been received, detects the beginning of the data to be transmitted, the number of the data frames DFR_1 to DFR_n, the error verification information, the number of transmissions of the data frames DFR_1 to DFR_n, and the end of the data to be transmitted in the manner described above. In this case, the determination circuit 25G detects the error verification information and the number of transmissions of the data frames DFR_1 to DFR_n based on the frame length of one frame such as the header frame HFR3, and detects the number of the data frames DFR_1 to DFR_n based on the frame length of the other one frame.

Thereafter, the determination circuit 25G and decoder 26 performs the operations described in section (9-1), and outputs the data to be transmitted.

(9-2-3) The case where number of data frames DFR_1 to DFR_n and number of transmissions of data frames DFR_1 to DFR_n are placed on one frame by using frame length and error verification information is placed on another one frame by using frame length FIG. 71 is a correspondence table illustrating the correspondence between the number of the data frames DFR_1 to DFR_n and the number of transmissions of the data frames DFR_1 to DFR_n, and frame length.

FIG. 71 illustrates the correspondence between the number of the data frames DFR_1 to DFR_n and the number of transmissions of the data frames DFR_1 to DFR_n, and frame length in an example where each of the number of the data frames DFR_1 to DFR_n and the number of transmissions of the data frames DFR_1 to DFR_n is in the range of 1 to 7.

Referring to FIG. 71, the correspondence table TBL-43 contains frame lengths, numbers of data frames, and numbers of transmissions of data frames. The frame lengths, numbers of data frames and number of transmissions of data frames are associated with each other.

If the number of the data frames DFR_1 to DFR_n and the number of transmissions of the data frames DFR_1 to DFR_n are placed on one of the header frame HFR3, end frame FFR3, sub-header frame SHFR3 and verification frame VFR3 by using a frame length, the number of the data frames DFR_1 to DFR_n and the number of transmissions of the data frames DFR_1 to DFR_n are represented as a 6-bit value $b_1b_2b_3b_6b_7b_8$. In this case, the 3-bit value $b_1b_2b_3$ represents the number of the data frames DFR_1 to DFR_n, and the 3-bit value $b_6b_7b_8$ represents the number of transmissions of the data frames DFR_1 to DFR_n.

The frame length of 515 µs is assigned to the case where the number of the data frames DFR_1 to DFR_n is "001" (i.e. 1 frame) and the number of transmissions of the data frames DFR_1 to DFR_n is 1 "001".

The frame length of 535 µs is assigned to the case where the number of the data frames DFR_1 to DFR_n is "001" and the number of transmissions of the data frames DFR_1 to DFR_n is 2 (i.e. "010").

In the same manner, the frame length of 1475 µs is assigned to the case where the number of the data frames DFR_1 to DFR_n is "111" (7 frames) and the number of transmissions of the data frames DFR_1 to DFR_n is 7 (i.e. "111").

Thus, in the correspondence table TBL-44, the frame length increases by 20 µs as the bit value representing one of the number of the data frames DFR_1 to DFR_n and the number of transmissions of the data frames DFR_1 to DFR_n increases by "1".

If the number of the data frames DFR_1 to DFR_n and the number of transmissions of the data frames DFR_1 to DFR_n are placed on the header frame HFR3 by using a frame length, this frame length represents the beginning of the data to be transmitted, the number of the data frames DFR_1 to DFR_n and the number of transmissions of the data frames DFR_1 to DFR_n.

If the number of the data frames DFR_1 to DFR_n and the number of transmissions of the data frames DFR_1 to DFR_n are placed on the sub-header frame SHFR3 by using a frame length, this frame length represents a delimiter for the data frames, the number of the data frames DFR_1 to DFR_n and the number of transmissions of the data frames DFR_1 to DFR_n.

If the number of the data frames DFR_1 to DFR_n and the number of transmissions of the data frames DFR_1 to DFR_n are placed on the end frame FFR3 by using a frame length, this frame length represents the end of the data to be transmitted, the number of the data frames DFR_1 to DFR_n and the number of transmissions of the data frames DFR_1 to DFR_n.

If the number of the data frames DFR_1 to DFR_n and the number of transmissions of the data frames DFR_1 to DFR_n are placed on the verification frame VFR3 by using a frame length, this frame length represents the number of the data frames DFR_1 to DFR_n and the number of transmissions of the data frames DFR_1 to DFR_n.

The number of the data frames DFR_1 to DFR_n and the number of transmissions of the data frames DFR_1 to DFR_n are placed on one of the header frame HFR3, end frame FFR3, sub-header frame SHFR3 and verification frame VFR3 by using the frame length that corresponds to the number of the data frames DFR_1 to DFR_n and the number of transmissions of the data frames DFR_1 to DFR_n in the correspondence table TBL-44, and the error verification information is placed on another one of the header frame HFR3, end frame FFR3, sub-header frame SHFR3 and verification frame VFR3 by using the frame length $L_V$ described in Embodiment 8.

If the radio frame is constituted by the radio frame WFR8-1, the number of the data frames DFR_1 to DFR_n and the number of transmissions of the data frames DFR_1 to DFR_n are placed on the header frame HFR3 or end frame FFR3 by using a frame length on the correspondence table TBL-44, and the error verification information is placed on the end frame FFR3 or header frame HFR3 by using the frame length $L_V$.

If the radio frame is constituted by the radio frame WFR8-2, the number of the data frames DFR_1 to DFR_n and the number of transmissions of the data frames DFR_1 to DFR_n are placed on one of the header frame HFR3, sub-header frame SHFR3 and end frame FFR3 by using a frame length on the correspondence table TBL-44, and the error verification information is placed on another one of the header frame HFR3, sub-header frame SHFR3 and end frame FFR3 by using the frame length $L_V$. For example, the number of the data frames DFR_1 to DFR_n and the number of transmissions of the data frames DFR_1 to DFR_n may be placed on the header frame HFR3, and the error verification information may be placed on the sub-header frame SHFR3.

If the radio frame is constituted by the radio frame WFR8-3, the number of the data frames DFR_1 to DFR_n and the number of transmissions of the data frames DFR_1 to DFR_n are placed on one of the header frame HFR3, verification frame VFR3 and end frame FFR3 by using a frame length on the correspondence table TBL-44, and the error verification information is placed on another one of the header frame HFR3, verification frame VFR3 and end frame FFR3 by using the frame length $L_V$. For example, the number of the data frames DFR_1 to DFR_n and the number of transmissions of the data frames DFR_1 to DFR_n may be placed on the header frame HFR3, and the error verification information may be placed on the end frame FFR3.

If the radio frame is constituted by the radio frame WFR8-4, the number of the data frames DFR_1 to DFR_n and the number of transmissions of the data frames DFR_1 to DFR_n are placed on one of the header frame HFR3, sub-header frame SHFR3, verification frame VFR3 and end frame FFR3 by using a frame length on the correspondence table TBL-44, and the error verification information is placed on another one of the header frame HFR3, sub-header frame SHFR3, verification frame VFR3 and end frame FFR3 by using the frame length $L_V$. For example, the number of the data frames DFR_1 to DFR_n and the number of transmissions of the data frames DFR_1 to DFR_n may be placed on the sub-header frame SHFR3, and the error verification information may be placed on the verification frame VFR3.

The generating circuitry 13G of the transmitter 801 holds the correspondence tables TBL1 and TBL-44. Then, the generating circuitry 13G refers to the correspondence table TBL1 to generate the data frames DFR_1 to DFR_n having the frame lengths corresponding to the bit values of the data to be transmitted. Further, the generating circuitry 13G refers to the correspondence table TBL-44 to determine a frame length that represents the number of the data frames DFR_1 to DFR_n and the number of transmissions of the data frames DFR_1 to DFR_n, and generates a header frame HFR3 (or end frame FFR3 or sub-header frame SHFR3 or verification frame VFR3) having the frame length that has been determined. Further, the generating circuitry 13G generates an end frame FFR3 (or sub-header frame SHFR3 or verification frame VFR3 or header frame HFR3) having the frame length $L_V$ that represents the error verification information. Otherwise, the generating circuitry 13G generates an end frame FFR3 having the frame length of 680 μs or a header frame HFR3 having the frame length of 1190 μs in the same manner as that in the generating circuitry 13, generates a sub-header frame SHFR3 having the frame length of 1280 μs in the same manner as that in the generating circuitry 13B, and generates a verification frame VFR3 having the frame length $L_V$ in the same manner as that in the generating circuitry 13E.

The receiver 802 receives one of the radio frames WFR8-1 to WFR8-4. The determination circuit 25G of the receiver 802 holds the correspondence tables TBL1 and TBL-44. Then, the determination circuit 25G receives a plurality of frame lengths from the frame length detection circuit 24 and, based on the plurality of frame lengths that have been received, detects the beginning of the data to be transmitted, the number of the data frames DFR_1 to DFR_n, the error verification information, the number of transmissions of the data frames DFR_1 to DFR_n, and the end of the data to be transmitted in the manner described above. In this case, the determination circuit 25G detects the number of the data frames DFR_1 to DFR_n and the number of transmissions of the data frames DFR_1 to DFR_n based on the frame length of one frame such as the header frame HFR3, and detects the error verification information based on the frame length of the other one frame.

Thereafter, the determination circuit 25G and decoder 26 performs the operations described in section (9-1), and outputs the data to be transmitted.

(9-2-4) The case where number of data frames DFR_1 to DFR_n, error verification information and number of transmissions of data frames DFR_1 to DFR_n are placed on different frames by using frame length The number of the data frames DFR_1 to DFR_n is placed on one of the header frame HFR3, sub-header frame SHFR3, verification frame VFR3 and end frame FFR3 by using the frame length corresponding to the number of the data frames DFR_1 to DFR_n in the correspondence table TBL2, the error verification information is placed on another one of the header frame HFR3, sub-header frame SHFR3, verification frame VFR3 and end frame FFR3 by using the frame length $L_V$ in the same manner as that in Embodiment 8, and the number of transmissions of the data frames DFR_1 to DFR_n is placed on another one of the header frame HFR3, sub-header frame SHFR3, verification frame VFR3 and end frame FFR3 by using the frame length corresponding to the number of transmissions of the data frames DFR_1 to DFR_n in the correspondence table TBL6. For example, the number of the data frames DFR_1 to DFR_n may be placed on the header frame HFR3, the error verification information may be placed on the sub-header frame SHFR3, and the number of transmissions of the data frames DFR_1 to DFR_n may be placed on the end frame FFR3.

If the number of the data frames DFR_1 to DFR_n is to be placed on the header frame HFR3 by using a frame length on the correspondence table TBL2, this frame length represents the beginning of the data to be transmitted and the number of the data frames DFR_1 to DFR_n. If the number of the data frames DFR_1 to DFR_n is to be placed on the sub-header frame SHFR3 by using a frame length on the correspondence table TBL2, this frame length represents a delimiter for the data frames DFR_1 to DFR_n and the number of the data frames DFR_1 to DFR_n. If the number of the data frames DFR_1 to DFR_n is placed on the verification frame VFR3 by using a frame length on the correspondence table TBL2, this frame length represents the number of the data frames DFR_1 to DFR_n. If the number of the data frames DFR_1 to DFR_n is placed on the end frame FFR3 by using a frame length on the correspondence table TBL2, this frame length represents the end of the data frames DFR_1 to DFR_n and the number of the data frames DFR_1 to DFR_n.

If the error verification information is placed on the header frame HFR3 by using the frame length $L_V$, the frame length $L_V$ represents the beginning of the data to be transmitted and the error verification information. If the error verification information is placed on the sub-header frame SHFR3 by using the frame length $L_V$, the frame length $L_V$ represents a delimiter for the data frames DFR_1 to DFR_n and the error verification information. If the error verification information is placed on the verification frame VFR3 by using the frame length $L_V$, the frame length $L_V$ represents only the error verification information. If the error verification information is placed on the end frame FFR3 by using the frame length $L_V$, the frame length $L_V$ represents the end of the data to be transmitted and the error verification information.

If the number of transmissions of the data frames DFR_1 to DFR_n is placed on the header frame HFR3 by using a frame length on the correspondence table TBL6, this frame length represents the beginning of the data to be transmitted and the number of transmissions of the data frames DFR_1 to DFR_n. If the number of transmissions of the data frames DFR_1 to DFR_n is placed on the sub-header frame SHFR3 by using a frame length on the correspondence table TBL6, this frame length represents a delimiter for the data frames DFR_1 to DFR_n and the number of transmissions of the data frames DFR_1 to DFR_n. If the number of transmissions of the data frames DFR_1 to DFR_n is placed on the verification frame FFR3 by using a frame length on the correspondence table TBL6, this frame length represents the number of transmissions of the data frames DFR_1 to DFR_n. If the number of transmissions of the data frames DFR_1 to DFR_n is placed on the end frame FFR3 by using a frame length on the correspondence table TBL6, this frame length represents the end of the data to be transmitted and the number of transmissions of the data frames DFR_1 to DFR_n.

Since the number of the data frames DFR_1 to DFR_n, the error verification information and the number of transmissions of the data frames DFR_1 to DFR_n are placed on different frames by using frame lengths, one of the radio frames WFR8-2 to WFR8-4 is used in section (9-2-4).

If the radio frame WFR8-2 is used, the number of the data frames DFR_1 to DFR_n is placed on one of the header frame HFR3, sub-header frame SHFR3 and end frame FFR3 by using a frame length on the correspondence table TBL2, the error verification information is placed on another one of the header frame HFR3, sub-header frame SHFR3 and end frame FFR3 by using the frame length $L_V$, and the number of transmissions of the data frames DFR_1 to DFR_n is placed on another one of the header frame HFR3, sub-header frame SHFR3 and end frame FFR3 by using a frame length on the correspondence table TBL6. For example, the number of the data frames DFR_1 to DFR_n may be placed on the header frame HFR3, the error verification information may be placed on the sub-header frame SHFR3, and the number of transmissions of the data frames DFR_1 to DFR_n may be placed on the end frame FFR3.

If the radio frame WFR8-3 is used, the number of the data frames DFR_1 to DFR_n is placed on one of the header frame HFR3, verification frame VFR3 and end frame FFR3 by using a frame length on the correspondence table TBL2, the error verification information is placed on another one of the header frame HFR3, verification frame VFR3 and end frame FFR3 by using the frame length $L_V$, and the number of transmissions of the data frames DFR_1 to DFR_n is placed on another one of the header frame HFR3, verification frame VFR3 and end frame FFR3 by using the frame length $L_V$. For example, the number of the data frames DFR_1 to DFR_n may be placed on the header frame HFR3, the error verification information may be placed on the end frame FFR3, and the number of transmissions of the data frames DFR_1 to DFR_n may be placed on the verification frame VFR3.

If the radio frame WFR8-4 is used, the number of the data frames DFR_1 to DFR_n is placed on one of the header frame HFR3, sub-header frame SHFR3, verification frame VFR3 and end frame FFR3 by using a frame length on the correspondence table TBL2, the error verification information is placed on another one of the header frame HFR3, sub-header frame SHFR3, verification frame VFR3 and end frame FFR3 by using the frame length $L_V$, and the number of transmissions of the data frames DFR_1 to DFR_n is placed on another one of the header frame HFR3, sub-header frame SHFR3, verification frame VFR3 and end frame FFR3. For example, the number of the data frames DFR_1 to DFR_n may be placed on the sub-header frame SHFR3, the error verification information may be placed on the verification frame VFR3, and the number of transmissions of the data frames DFR_1 to DFR_n may be placed on the header frame HFR3.

The generating circuitry 13G of the transmitter 801 holds the correspondence tables TBL1, TBL2 and TBL6. Then, the generating circuitry 13G refers to the correspondence table TBL1 to generate the data frames DFR_1 to DFR_n having the frame lengths corresponding to the bit values of the data to be transmitted. Further, the generating circuitry 13G refers to the correspondence table TBL2 to determine a frame length that represents the number of the data frames DFR_1 to DFR_n, and generates a header frame HFR3 (or end frame FFR3 or sub-header frame SHFR3 or verification frame VFR3) having the frame length that has been determined. Further, the generating circuitry 13G generates an end frame FFR3 (or sub-header frame SHFR3 or verification frame VFR3 or header frame HFR3) having the frame length $L_V$ that represents the error verification information. Further, the generating circuitry 13G refers to the correspondence table TBL6 to generate a sub-header frame SHFR3 (or verification frame VFR3 or header frame HFR3 or end frame FFR3) having the frame length corresponding to the number of transmissions of the data frames DFR_1 to DFR_n. Otherwise, the generating circuitry 13G generates an end frame FFR3 having the frame length of 680 μs or a header frame HFR3 having the frame length of 1190 μs in the same manner as that in the generating circuitry 13, generates a sub-header frame SHFR3 having the frame length of 1280 μs in the same manner as that in the generating circuitry 13B, and generates a verification frame VFR3 having the frame length $L_V$ in the same manner as that in the generating circuitry 13E.

The receiver 802 receives one of the radio frames WFR8-2 to WFR8-4. The determination circuit 25G of the receiver 802 holds the correspondence tables TBL1, TBL2 and TBL6. Then, the determination circuit 25G receives a plurality of frame lengths from the frame length detection circuit 24 and, based on the plurality of frame lengths that have been received, detects the beginning of the data to be transmitted, the number of the data frames DFR_1 to DFR_n, the error verification information, the number of transmissions of the data frames DFR_1 to DFR_n, and the end of the data to be transmitted in the manner described above. In this case, the determination circuit 25G detects the number of the data frames DFR_1 to DFR_n, the error verification information and the number of transmissions of the data frames DFR_1 to DFR_n based on the frame lengths of different frames, each for one frame.

Thereafter, the determination circuit 25G and decoder 26 performs the operations described in section (9-1), and outputs the data to be transmitted.

(9-3) The case where two of number of data frames DFR_1 to DFR_n, error verification information and number of transmissions of data frames DFR_1 to DFR_n are placed on one frame by using frame length If the number of the data frames DFR_1 to DFR_n and the error verification information are to be placed on one frame by using a frame length, the number of the data frames DFR_1 to DFR_n and the error verification information are placed on one of the header frame HFR3, the sub-header frame SHFR3, the verification frame VFR3 and the end frame FFR3 by using a frame length on the correspondence table TBL-42.

If the number of the data frames DFR_1 to DFR_n and the error verification information are placed on the header frame HFR3 by using a frame length on the correspondence table TBL-42, this frame length represents the beginning of the data to be transmitted, the number of the data frames DFR_1 to DFR_n and the error verification information.

If the number of the data frames DFR_1 to DFR_n and the error verification information are placed on the sub-header frame SHFR3 by using a frame length on the correspondence table TBL-42, this frame length represents a delimiter for the data frames DFR_1 to DFR_n, the number of the data frames DFR_1 to DFR_n and the error verification information.

If the number of the data frames DFR_1 to DFR_n and the error verification information are placed on the verification frame VFR3 by using a frame length on the correspondence table TBL-42, this frame length represents the number of the data frames DFR_1 to DFR_n and the error verification information.

If the number of the data frames DFR_1 to DFR_n and the error verification information are placed on the end frame FFR3 by using a frame length on the correspondence table TBL-42, this frame length represents the end of the data frames DFR_1 to DFR_n, the number of the data frames DFR_1 to DFR_n and the error verification information.

The generating circuitry 13G of the transmitter 801 holds the correspondence tables TBL1 and TBL42. Then, the generating circuitry 13G refers to the correspondence table TBL1 to generate the data frames DFR_1 to DFR_n having the frame lengths corresponding to the bit values of the data to be transmitted. Further, the generating circuitry 13G refers to the correspondence table TBL-42 to determine a frame length that represents the number of the data frames DFR_1 to DFR_n and the error verification information, and generates a header frame HFR3 (or end frame FFR3 or sub-header frame SHFR3 or verification frame VFR3) having the frame length that has been determined. Otherwise, the generating circuitry 13G generates an end frame FFR3 having the frame length of 680 μs or a header frame HFR3 having the frame length of 1190 μs in the same manner as that in the generating circuitry 13, generates a sub-header frame SHFR3 having the frame length of 1280 μs in the same manner as that in the generating circuitry 13B, and generates a verification frame VFR3 having the frame length $L_V$ in the same manner as that in the generating circuitry 13E.

The receiver 802 receives one of the radio frames WFR8-1 to WFR8-4. The determination circuit 25G of the receiver 802 holds the correspondence tables TBL1 and TBL-42. Then, the determination circuit 25G receives a plurality of frame lengths from the frame length detection circuit 24 and, based on the plurality of frame lengths that have been received, detects the beginning of the data to be transmitted, the number of the data frames DFR_1 to DFR_n, the error verification information, and the end of the data to be transmitted in the manner described above. In this case, the determination circuit 25G refers to the correspondence table TBL-42 to detect the number of the data frames DFR_1 to DFR_n and the error verification information based on the frame length of one frame.

Thereafter, if the number of the plurality of frame lengths corresponding to the data frames DFR_1 to DFR_n matches the number of the data frames DFR_1 to DFR_n that have been detected, the determination circuit 25G outputs the plurality of frame lengths and error verification information (i.e. one of "00", "01", "10" and "11") to the decoder 26. Then, the decoder 26 receives the plurality of frame lengths and error verification information (i.e. one of "00", "01", "10" and "11") and, based on the plurality of frame lengths and error verification information (i.e. one of "00", "01", "10" and "11") that have been received, outputs the data to be transmitted in accordance with the operations described above.

If the number of the plurality of frame lengths corresponding to the data frames DFR_1 to DFR_n does not match the number of the data frames DFR_1 to DFR_n that have been detected, the determination circuit 25G discards the plurality of frame lengths corresponding to the data frames DFR_1 to DFR_n.

If the error verification information and the number of transmissions of the data frames DFR_1 to DFR_n are placed on one frame by using a frame length, the error verification information and the number of transmissions of the data frames DFR_1 to DFR_n are placed on one of the header frame HFR3, the sub-header frame SHFR3, the verification frame VFR3 and the end frame FFR3 by using a frame length on the correspondence table TBL-43.

If the error verification information and the number of transmissions of the data frames DFR_1 to DFR_n are placed on the header frame HFR3 by using a frame length on the correspondence table TBL-43, this frame length represents the beginning of the data to be transmitted, the error verification information and the number of transmissions of the data frames DFR_1 to DFR_n.

If the error verification information and the number of transmissions of the data frames DFR_1 to DFR_n are placed on the sub-header frame SHFR3 by using a frame length on the correspondence table TBL-43, this frame length represents a delimiter for the data frames DFR_1 to DFR_n, the error verification information and the number of transmissions of the data frames DFR_1 to DFR_n.

If the error verification information and the number of transmissions of the data frames DFR_1 to DFR_n are placed on the verification frame VFR3 by using a frame length on the correspondence table TBL-43, this frame length represents the error verification information and the number of transmissions of the data frames DFR_1 to DFR_n.

If the error verification information and the number of transmissions of the data frames DFR_1 to DFR_n are placed on the end frame FFR3 by using a frame length on the correspondence table TBL-43, this frame length represents the end of the data frames DFR_1 to DFR_n, the error verification information and the number of transmissions of the data frames DFR_1 to DFR_n.

The generating circuitry 13G of the transmitter 801 holds the correspondence tables TBL1 and TBL-43. Then, the generating circuitry 13G refers to the correspondence table TBL1 to generate the data frames DFR_1 to DFR_n having the frame lengths corresponding to the bit values of the data to be transmitted. Further, the generating circuitry 13G refers to the correspondence table TBL-43 to determine a frame length that represents the error verification information and the number of transmissions of the data frames DFR_1 to DFR_n, and generates a header frame HFR3 (or end frame FFR3 or sub-header frame SHFR3 or verification frame VFR3) having the frame length that has been determined. Otherwise, the generating circuitry 13G generates an end frame FFR3 having the frame length of 680 μs or a header frame HFR3 having the frame length of 1190 μs in the same manner as that in the generating circuitry 13, generates a sub-header frame SHFR3 having the frame length of 1280 μs in the same manner as that in the generating circuitry 13B, and generates a verification frame VFR3 having the frame length $L_V$ in the same manner as that in the generating circuitry 13E.

The receiver 802 receives one of the radio frames WFR8-1 to WFR8-4. The determination circuit 25G of the receiver 802 holds the correspondence tables TBL1 and TBL-43. Then, the determination circuit 25G receives a plurality of frame lengths from the frame length detection circuit 24 and, based on the plurality of frame lengths that have been received, detects the beginning of the data to be transmitted, the error verification information, the number of transmissions of the data frames DFR_1 to DFR_n, and the end of the data to be transmitted in the manner described above. In this case, the determination circuit 25G refers to the correspondence table TBL-43 to detect the error verification information and the number of transmissions of the data frames DFR_1 to DFR_n based on the frame length of one frame.

Thereafter, the determination circuit 25G detects the plurality of frame lengths corresponding to the data frames DFR_1 to DFR_n the number of transmissions and, if the plurality of frame lengths for the number of transmissions that has been detected match each other, outputs the plurality of frame lengths and error verification information (i.e. one of "00", "01", "10" and "11") to the decoder 26. Then, the decoder 26 receives the plurality of frame lengths and error verification information (i.e. one of "00", "01", "10" and "11") and, based on the plurality of frame lengths and error verification information (i.e. one of "00", "01", "10" and "11") that have been received, outputs the data to be transmitted in accordance with the operations described above.

If the plurality of frame lengths for the number of transmissions do not match each other, the determination circuit 25G discards the plurality of frame lengths corresponding to the data frames DFR_1 to DFR_n.

If the number of the data frames DFR_1 to DFR_n and the number of transmissions of the data frames DFR_1 to DFR_n are placed on one frame by using a frame length, the number of the data frames DFR_1 to DFR_n and the number of transmissions of the data frames DFR_1 to DFR_n are placed on one of the header frame HFR3, the sub-header frame SHFR3, the verification frame VFR3 and the end frame FFR3 by using a frame length on the correspondence table TBL-44.

If the number of the data frames DFR_1 to DFR_n and the number of transmissions of the data frames DFR_1 to DFR_n are placed on the header frame HFR3 by using a frame length on the correspondence table TBL-44, this frame length represents the beginning of the data to be transmitted, the number of the data frames DFR_1 to DFR_n and the number of transmissions of the data frames DFR_1 to DFR_n.

If the number of the data frames DFR_1 to DFR_n and the number of transmissions of the data frames DFR_1 to DFR_n are placed on the sub-header frame SHFR3 by using a frame length on the correspondence table TBL-44, this frame length represents a delimiter for the data frames DFR_1 to DFR_n, the number of the data frames DFR_1 to DFR_n and the number of transmissions of the data frames DFR_1 to DFR_n.

If the number of the data frames DFR_1 to DFR_n and the number of transmissions of the data frames DFR_1 to DFR_n are placed on the verification frame VFR3 by using a frame length on the correspondence table TBL-44, this frame length represents the number of the data frames DFR_1 to DFR_n and the number of transmissions of the data frames DFR_1 to DFR_n.

If the number of the data frames DFR_1 to DFR_n and the number of transmissions of the data frames DFR_1 to DFR_n are placed on the end frame FFR3 by using a frame length on the correspondence table TBL-44, this frame length represents the end of the data frames DFR_1 to DFR_n, the number of the data frames DFR_1 to DFR_n and the number of transmissions of the data frames DFR_1 to DFR_n.

The generating circuitry 13G of the transmitter 801 holds the correspondence tables TBL1 and TBL-44. Then, the generating circuitry 13G refers to the correspondence table TBL1 to generate the data frames DFR_1 to DFR_n having the frame lengths corresponding to the bit values of the data to be transmitted. Further, the generating circuitry 13G refers to the correspondence table TBL-44 to determine a frame length that represents the number of the data frames DFR_1 to DFR_n and the number of transmissions of the data frames DFR_1 to DFR_n, and generates a header frame HFR3 (or end frame FFR3 or sub-header frame SHFR3 or verification frame VFR3) having the frame length that has been determined. Otherwise, the generating circuitry 13G generates an end frame FFR3 having the frame length of 680 μs or a header frame HFR3 having the frame length of 1190 μs in the same manner as that in the generating circuitry 13, and generates a sub-header frame SHFR3 having the frame length of 1280 μs in the same manner as that in the generating circuitry 13B.

The receiver 802 receives one of the radio frames WFR8-1 to WFR8-4. The determination circuit 25G of the receiver 802 holds the correspondence tables TBL1 and TBL-44. Then, the determination circuit 25G receives a plurality of frame lengths from the frame length detection circuit 24 and, based on the plurality of frame lengths that have been received, detects the beginning of the data to be transmitted, the number of the data frames DFR_1 to DFR_n, the number of transmissions of the data frames DFR_1 to DFR_n, and the end of the data to be transmitted in the manner described above. In this case, the determination circuit 25G refers to the correspondence table TBL-44 to detect the number of the data frames DFR_1 to DFR_n and the number of transmissions of the data frames DFR_1 to DFR_n based on the frame length of one frame.

Thereafter, the determination circuit 25G detects the plurality of frame lengths corresponding to the data frames DFR_1 to DFR_n the number of transmissions. Then, if the number of the plurality of frame lengths corresponding to the data frames DFR_1 to DFR_n matches the number of the data frames DFR_1 to DFR_n that has been detected and if the plurality of frame lengths for the number of transmissions match each other, the determination circuit 25G outputs the plurality of frame lengths and error verification information (i.e. one of "00", "01", "10" and "11") to the decoder 26. Then, the decoder 26 receives the plurality of frame lengths and error verification information (i.e. one of "00", "01", "10" and "11") and, based on the plurality of frame lengths and error verification information (i.e. one of "00", "01", "10" and "11") that have been received, outputs the data to be transmitted in accordance with the operations described above.

If the number of the plurality of frame lengths corresponding to the data frames DFR_1 to DFR_n does not match the number of the data frames DFR_1 to DFR_n that has been detected, or if the plurality of frame lengths for the number of transmissions do not match each other, the determination circuit 25G discards the plurality of frame lengths corresponding to the data frames DFR_1 to DFR_n.

(9-4) The case where two of number of data frames DFR_1 to DFR_n, error verification information and number of transmissions of data frames DFR_1 to DFR_n are placed on two frames by using frame lengths If the number of the data frames DFR_1 to DFR_n and the error verification information are to be placed on different frames, each for one frame, by using frame lengths, the number of the data frames DFR_1 to DFR_n is placed on one of the header frame HFR3, the sub-header frame SHFR3, the verification frame VFR3 and the end frame FFR3 by using a frame length on the correspondence table TBL2, and the error verification information is placed on another one of the header frame HFR3, the sub-header frame SHFR3, the verification frame VFR3 and the end frame FFR3 by using the frame length $L_V$. For example, the number of the data frames DFR_1 to DFR_n may be placed on the header frame HFR3, and the error verification information may be placed on the sub-header frame SHFR3.

If the number of the data frames DFR_1 to DFR_n is to be placed on the header frame HFR3 by using a frame length on the correspondence table TBL2, this frame length represents the beginning of the data to be transmitted and the number of the data frames DFR_1 to DFR_n.

If the number of the data frames DFR_1 to DFR_n is to be placed on the sub-header frame SHFR3 by using a frame length on the correspondence table TBL2, this frame length represents a delimiter for the data frames DFR_1 to DFR_n and the number of the data frames DFR_1 to DFR_n.

If the number of the data frames DFR_1 to DFR_n is placed on the verification frame VFR3 by using a frame length on the correspondence table TBL2, this frame length represents the number of the data frames DFR_1 to DFR_n.

If the number of the data frames DFR_1 to DFR_n is placed on the end frame FFR3 by using a frame length on the correspondence table TBL2, this frame length represents the end of the data frames DFR_1 to DFR_n and the number of the data frames DFR_1 to DFR_n.

If the error verification information is placed on the header frame HFR3 by using the frame length $L_V$, the frame length $L_V$ represents the beginning of the data to be transmitted and the error verification information.

If the error verification information is placed on the sub-header frame SHFR3 by using the frame length $L_V$, the frame length $L_V$ represents a delimiter for the data frames DFR_1 to DFR_n and the error verification information.

If the error verification information is placed on the verification frame VFR3 by using the frame length $L_V$, the frame length $L_V$ represents the error verification information.

If the error verification information is placed on the end frame FFR3 by using the frame length $L_V$, the frame length $L_V$ represents the end of the data to be transmitted and the error verification information.

The generating circuitry 13G of the transmitter 801 holds the correspondence tables TBL1 and TBL2. Then, the generating circuitry 13G refers to the correspondence table TBL1 to generate the data frames DFR_1 to DFR_n having the frame lengths corresponding to the bit values of the data to be transmitted. Further, the generating circuitry 13G refers to the correspondence table TBL2 to determine a frame length that represents the number of the data frames DFR_1 to DFR_n, and generates a header frame HFR3 (or end frame FFR3 or sub-header frame SHFR3 or verification frame VFR3) having the frame length that has been determined. Further, the generating circuitry 13G generates an end frame FFR3 (or sub-header frame SHFR3 or verification frame VFR3 or header frame HFR3) having the frame length $L_V$. Otherwise, the generating circuitry 13G generates an end frame FFR3 having the frame length of 680 µs or a header frame HFR3 having the frame length of 1190 µs in the same manner as that in the generating circuitry 13, generates a sub-header frame SHFR3 having the frame length of 1280 µs in the same manner as that in the generating circuitry 13B, and generates a verification frame VFR3 having the frame length $L_V$ in the same manner as that in the generating circuitry 13E.

The receiver 802 receives one of the radio frames WFR8-1 to WFR8-4. The determination circuit 25G of the receiver 802 holds the correspondence tables TBL1 and TBL2. Then, the determination circuit 25G receives a plurality of frame lengths from the frame length detection circuit 24 and, based on the plurality of frame lengths that have been received, detects the beginning of the data to be transmitted, the number of the data frames DFR_1 to DFR_n, the error verification information, and the end of the data to be transmitted in the manner described above. In this case, the determination circuit 25G refers to the correspondence table TBL2 to detect the number of the data frames DFR_1 to DFR_n based on the frame length of one frame and detect the error verification information based on the frame length $L_V$.

Thereafter, if the number of the plurality of frame lengths corresponding to the data frames DFR_1 to DFR_n matches the number of the data frames DFR_1 to DFR_n that have been detected, and if the determination circuit 25G determines based on the frame length $L_V$ that no error has been detected in the data frames DFR_1 to DFR_n, it outputs the plurality of frame lengths corresponding to the data frames DFR_1 to DFR_n to the decoder 26. Then, the decoder 26 refers to the correspondence table TBL1 to convert the plurality of frame lengths to bit sequences, and outputs the data to be transmitted.

If the number of the plurality of frame lengths corresponding to the data frames DFR_1 to DFR_n does not match the number of the data frames DFR_1 to DFR_n that have been detected, or if the determination circuit 25G detects an error in the data frames DFR_1 to DFR_n, it discards the plurality of frame lengths corresponding to the data frames DFR_1 to DFR_n.

If the error verification information and the number of transmissions of the data frames DFR_1 to DFR_n are placed on different frames, each for one frame, by using frame lengths, the error verification information is placed on one of the header frame HFR3, the sub-header frame SHFR3, the verification frame VFR3 and the end frame FFR3 by using the frame length $L_V$, and the number of transmissions of the data frames DFR_1 to DFR_n is placed on another one of the header frame HFR3, the sub-header frame SHFR3, the verification frame VFR3 and the end frame FFR3 by using a frame length on the correspondence table TBL6. For example, the error verification information may be placed on the sub-header frame SHFR3 and the number of transmissions of the data frames DFR_1 to DFR_n may be placed on the header frame HFR3.

If the error verification information is placed on the header frame HFR3 by using the frame length $L_V$, the frame length $L_V$ represents the beginning of the data to be transmitted and the error verification information.

If the error verification information is placed on the sub-header frame SHFR3 by using the frame length $L_V$, the frame length $L_V$ represents a delimiter for the data frames DFR_1 to DFR_n and the error verification information.

If the error verification information is placed on the verification frame VFR3 by using the frame length $L_V$, the frame length $L_V$ represents the error verification information.

If the error verification information is placed on the end frame FFR3 by using the frame length $L_V$, the frame length $L_V$ represents the end of the data to be transmitted and the error verification information.

If the number of transmissions of the data frames DFR_1 to DFR_n is placed on the header frame HFR3 by using a frame length on the correspondence table TBL6, this frame length represents the beginning of the data to be transmitted and the number of transmissions of the data frames DFR_1 to DFR_n.

If the number of transmissions of the data frames DFR_1 to DFR_n is placed on the sub-header frame SHFR3 by using a frame length on the correspondence table TBL6, this frame length represents a delimiter for the data frames DFR_1 to DFR_n and the number of transmissions of the data frames DFR_1 to DFR_n.

If the number of transmissions of the data frames DFR_1 to DFR_n is placed on the verification frame VFR3 by using a frame length on the correspondence table TBL6, this frame length represents the number of transmissions of the data frames DFR_1 to DFR_n.

If the number of transmissions of the data frames DFR_1 to DFR_n is placed on the end frame FFR3 by using a frame length on the correspondence table TBL6, this frame length represents the end of the data frames DFR_1 to DFR_n and the number of transmissions of the data frames DFR_1 to DFR_n.

The generating circuitry 13G of the transmitter 801 holds the correspondence tables TBL1 and TBL6. Then, the generating circuitry 13G refers to the correspondence table TBL1 to generate the data frames DFR_1 to DFR_n having the frame lengths corresponding to the bit values of the data to be transmitted. Further, the generating circuitry 13G generates a header frame HFR3 (or end frame FFR3 or sub-header frame SHFR3 or verification frame VFR3) having the frame length $L_V$. Further, the generating circuitry 13G refers to the correspondence table TBL6 to determine a frame length that represents the number of transmissions of the data frames DFR_1 to DFR_n, and generates an end frame FFR3 (or sub-header frame SHFR3 or verification frame VFR3 or header frame HFR3) having the frame length that has been determined. Otherwise, the generating circuitry 13G generates an end frame FFR3 having the frame length of 680 μs or a header frame HFR3 having the frame length of 1190 μs in the same manner as that in the generating circuitry 13, generates a sub-header frame SHFR3 having the frame length of 1280 μs in the same manner as that in the generating circuitry 13B, and generates a verification frame VFR3 having the frame length $L_V$ in the same manner as that in the generating circuitry 13E.

The receiver 802 receives one of the radio frames WFR8-1 to WFR8-4. The determination circuit 25G of the receiver 802 holds the correspondence tables TBL1 and TBL6. Then, the determination circuit 25G receives a plurality of frame lengths from the frame length detection circuit 24 and, based on the plurality of frame lengths that have been received, detects the beginning of the data to be transmitted, the error verification information, the number of transmissions of the data frames DFR_1 to DFR_n, and the end of the data to be transmitted in the manner described above. In this case, the determination circuit 25G refers to the correspondence table TBL6 to detect the number of transmissions of the data frames DFR_1 to DFR_n based on the frame length of one frame, and detects the error verification information based on the frame length $L_V$.

Thereafter, the determination circuit 25G detects the plurality of frame lengths corresponding to the data frames DFR_1 to DFR_n the number of transmissions. Then, if the plurality of frame lengths for the number of transmissions match each other, and if it determines based on the frame length $L_V$ that no error has been detected in the data frames DFR_1 to DFR_n, it outputs the plurality of frame lengths corresponding to the data frames DFR_1 to DFR_n to the decoder 26. Then, the decoder 26 refers to the correspondence table TBL1 to convert the plurality of frame lengths to bit sequences and outputs the data to be transmitted.

If the plurality of frame lengths for the number of transmissions do not match each other, or if the determination circuit 25G detects an error in the data frames DFR_1 to DFR_n, it discards the plurality of frame lengths corresponding to the data frames DFR_1 to DFR_n.

If the number of the data frames DFR_1 to DFR_n and the number of transmissions of the data frames DFR_1 to DFR_n are placed on different frames, each for one frame, by using frame lengths, the number of the data frames DFR_1 to DFR_n is placed on one of the header frame HFR3, the sub-header frame SHFR3, the verification frame VFR3 and the end frame FFR3 by using a frame length on the correspondence table TBL2, and the number of transmissions of the data frames DFR_1 to DFR_n is placed on another one of the header frame HFR3, the sub-header frame SHFR3, the verification frame VFR3 and the end frame FFR3 by using a frame length on the correspondence table TBL6. For example, the number of the data frames DFR_1 to DFR_n is placed on the sub-header frame SHFR3, and the number of transmissions of the data frames DFR_1 to DFR_n is placed on the header frame HFR3.

If the number of the data frames DFR_1 to DFR_n is placed on the header frame HFR3 by using a frame length on the correspondence table TBL2, this frame length represents the beginning of the data to be transmitted and the number of the data frames DFR_1 to DFR_n.

If the number of the data frames DFR_1 to DFR_n is placed on the sub-header frame SHFR3 by using a frame length on the correspondence table TBL2, this frame length represents a delimiter for the data frames DFR_1 to DFR_n and the number of the data frames DFR_1 to DFR_n.

If the number of the data frames DFR_1 to DFR_n is placed on the verification frame VFR3 by using a frame length on the correspondence table TBL2, this frame length represents the number of the data frames DFR_1 to DFR_n.

If the number of the data frames DFR_1 to DFR_n is placed on the end frame FFR3 by using a frame length on the correspondence table TBL2, this frame length represents the end of the data frames DFR_1 to DFR_n and the number of the data frames DFR_1 to DFR_n.

If the number of transmissions of the data frames DFR_1 to DFR_n is placed on the header frame HFR3 by using a frame length on the correspondence table TBL6, this frame length represents the beginning of the data to be transmitted and the number of transmissions of the data frames DFR_1 to DFR_n.

If the number of transmissions of the data frames DFR_1 to DFR_n is placed on the sub-header frame SHFR3 by using a frame length on the correspondence table TBL6, this frame length represents a delimiter for the data frames DFR_1 to DFR_n and the number of transmissions of the data frames DFR_1 to DFR_n.

If the number of transmissions of the data frames DFR_1 to DFR_n is placed on the verification frame VFR3 by using a frame length on the correspondence table TBL6, this frame length represents the number of transmissions of the data frames DFR_1 to DFR_n.

If the number of transmissions of the data frames DFR_1 to DFR_n is placed on the end frame FFR3 by using a frame length on the correspondence table TBL6, this frame length represents the end of the data frames DFR_1 to DFR_n and the number of transmissions of the data frames DFR_1 to DFR_n.

The generating circuitry 13G of the transmitter 801 holds the correspondence tables TBL1, TBL2 and TBL6. Then, the generating circuitry 13G refers to the correspondence table TBL1 to generate the data frames DFR_1 to DFR_n having the frame lengths corresponding to the bit values of the data to be transmitted. Further, the generating circuitry 13G refers to the correspondence table TBL2 to determine a frame length that represents the number of the data frames DFR_1 to DFR_n, and generates a header frame HFR3 (or end frame FFR3 or sub-header frame SHFR3 or verification frame VFR3) having the frame length that has been determined. Further, the generating circuitry 13G refers to the correspondence table TBL6 to determine a frame length that represents the number of transmissions of the data frames DFR_1 to DFR_n, and generates an end frame FFR3 (or sub-header frame SHFR3 or verification frame VFR3 or header frame HFR3) having the frame length that has been determined. Otherwise, the generating circuitry 13G generates an end frame FFR3 having the frame length of 680 µs or a header frame HFR3 having the frame length of 1190 µs in the same manner as that in the generating circuitry 13, and generates a sub-header frame SHFR3 having the frame length of 1280 µs in the same manner as that in the generating circuitry 13B.

The receiver 802 receives one of the radio frames WFR8-1 to WFR8-4. The determination circuit 25G of the receiver 802 holds the correspondence tables TBL1, TBL2 and TBL6. Then, the determination circuit 25G receives a plurality of frame lengths from the frame length detection circuit 24 and, based on the plurality of frame lengths that have been received, detects the beginning of the data to be transmitted, the number of the data frames DFR_1 to DFR_n, the number of transmissions of the data frames DFR_1 to DFR_n, and the end of the data to be transmitted in the manner described above. In this case, the determination circuit 25G refers to the correspondence table TBL2 to detect the number of the data frames DFR_1 to DFR_n based on the frame length of one frame, and refers to the correspondence table TBL6 to detect the number of transmissions of the data frames DFR_1 to DFR_n based on the frame length of one frame.

Thereafter, the determination circuit 25G detects the plurality of frame lengths corresponding to the data frames DFR_1 to DFR_n the number of transmissions. Then, if the number of the plurality of frame lengths corresponding to the data frames DFR_1 to DFR_n matches the number of data frames that has been detected and if the plurality of frame lengths for the number of transmissions match each other, the determination circuit 25G outputs the plurality of frame lengths corresponding to the data frames DFR_1 to DFR_n to the decoder 26. Then, the decoder 26 refers to the correspondence table TBL1 to convert the plurality of frame lengths to bit sequences, and outputs the data to be transmitted.

If the number of the plurality of frame lengths corresponding to the data frames DFR_1 to DFR_n does not match the number of the data frames that has been detected, or if the plurality of frame lengths for the number of transmissions do not match each other, the determination circuit 25G discards the plurality of frame lengths corresponding to the data frames DFR_1 to DFR_n.

(9-5) The case where one of number of data frames DFR_1 to DFR_n, error verification information and number of transmissions of data frames DFR_1 to DFR_n is placed on one frame by using frame length If the number of the data frames DFR_1 to DFR_n is placed on one frame by using a frame length, the number of the data frames DFR_1 to DFR_n is placed on one of the header frame HFR3, the sub-header frame SHFR3, the verification frame VFR3 and the end frame FFR3 by using a frame length on the correspondence table TBL2.

If the number of the data frames DFR_1 to DFR_n is placed on the header frame HFR3 by using a frame length on the correspondence table TBL2, this frame length represents the beginning of the data to be transmitted and the number of the data frames DFR_1 to DFR_n.

If the number of the data frames DFR_1 to DFR_n is placed on the sub-header frame SHFR3 by using a frame length on the correspondence table TBL2, this frame length represents a delimiter for the data frames DFR_1 to DFR_n and the number of the data frames DFR_1 to DFR_n.

If the number of the data frames DFR_1 to DFR_n is placed on the verification frame VFR3 by using a frame length on the correspondence table TBL2, this frame length represents the number of the data frames DFR_1 to DFR_n.

If the number of the data frames DFR_1 to DFR_n is placed on the end frame FFR3 by using a frame length on the correspondence table TBL2, this frame length represents the end of the data frames DFR_1 to DFR_n and the number of the data frames DFR_1 to DFR_n.

The generating circuitry 13G of the transmitter 801 holds the correspondence tables TBL1 and TBL2. Then, the generating circuitry 13G refers to the correspondence table TBL1 to generate the data frames DFR_1 to DFR_n having the frame lengths corresponding to the bit values of the data to be transmitted. Further, the generating circuitry 13G refers to the correspondence table TBL2 to determine a frame length that represents the number of the data frames DFR_1 to DFR_n, and generates a header frame HFR3 (or end frame FFR3 or sub-header frame SHFR3 or verification frame VFR3) having the frame length that has been determined. Otherwise, the generating circuitry 13G generates an end frame FFR3 having the frame length of 680 µs or a header frame HFR3 having the frame length of 1190 µs in the same manner as that in the generating circuitry 13, and generates a sub-header frame SHFR3 having the frame length of 1280 µs in the same manner as that in the generating circuitry 13B.

The receiver 802 receives one of the radio frames WFR8-1 to WFR8-4. The determination circuit 25G of the receiver 802 holds the correspondence tables TBL1 and TBL2. Then, the determination circuit 25G receives a plurality of frame lengths from the frame length detection circuit 24 and, based on the plurality of frame lengths that have been received, detects the beginning of the data to be transmitted, the number of the data frames DFR_1 to DFR_n, and the end of the data to be transmitted in the manner described above. In this case, the determination circuit 25G refers to the correspondence table TBL2 to detect the number of the data frames DFR_1 to DFR_n based on the frame length of one frame.

Thereafter, if the number of the plurality of frame lengths corresponding to the data frames DFR_1 to DFR_n matches the number of data frames that has been detected, the determination circuit 25G outputs the plurality of frame lengths corresponding to the data frames DFR_1 to DFR_n to the decoder 26. Then, the decoder 26 refers to the correspondence table TBL1 to convert the plurality of frame lengths to bit sequences, and outputs the data to be transmitted.

If the number of the plurality of frame lengths corresponding to the data frames DFR_1 to DFR_n does not match the number of data frames that has been detected, the determination circuit 25G discards the plurality of frame lengths corresponding to the data frames DFR_1 to DFR_n.

If the error verification information is placed on one frame by using the frame length $L_V$, the error verification information is placed on one of the header frame HFR3, the sub-header frame SHFR3, the verification frame VFR3 and the end frame FFR3 by using the frame length $L_V$.

If the error verification information is placed on the header frame HFR3 by using the frame length $L_V$, the frame length $L_V$ represents the beginning of the data to be transmitted and the error verification information.

If the error verification information is placed on the sub-header frame SHFR3 by using the frame length $L_V$, the frame length $L_V$ represents a delimiter for the data frames DFR_1 to DFR_n and the error verification information.

If the error verification information is placed on the verification frame VFR3 by using the frame length $L_V$, the frame length $L_V$ represents the error verification information.

If the error verification information is placed on the end frame FFR3 by using the frame length $L_V$, the frame length $L_V$ represents the end of the data frames DFR_1 to DFR_n and the error verification information.

The generating circuitry 13G of the transmitter 801 holds the correspondence table TBL1. Then, the generating circuitry 13G refers to the correspondence table TBL1 to generate the data frames DFR_1 to DFR_n having the frame lengths corresponding to the bit values of the data to be transmitted. Further, the generating circuitry 13G generates a header frame HFR3 (or end frame FFR3 or sub-header frame SHFR3 or verification frame VFR3) having the frame length $L_V$ in accordance with the method in Embodiment 8. Otherwise, the generating circuitry 13G generates an end frame FFR3 having the frame length of 680 µs or a header frame HFR3 having the frame length of 1190 µs in the same manner as that in the generating circuitry 13, and generates a sub-header frame SHFR3 having the frame length of 1280 µs in the same manner as that in the generating circuitry 13B.

The receiver 802 receives one of the radio frames WFR8-1 to WFR8-4. The determination circuit 25G of the receiver 802 holds the correspondence table TBL1. Then, the determination circuit 25G receives a plurality of frame lengths from the frame length detection circuit 24 and, based on the plurality of frame lengths that have been received, detects the beginning of the data to be transmitted, the error verification information, and the end of the data to be transmitted in the manner described above. In this case, the determination circuit 25G detects the error verification information based on the frame length of one frame.

Thereafter, if no error has been detected in the frames DFR_1 to DFR_n, the determination circuit 25G outputs the plurality of frame lengths corresponding to the data frames DFR_1 to DFR_n to the decoder 26. Then, the decoder 26 refers to the correspondence table TBL1 to convert the plurality of frame lengths to bit sequences and outputs the data to be transmitted.

If an error has been detected in the data frames DFR_1 to DFR_n, the determination circuit 25G discards the plurality of frame lengths corresponding to the data frames DFR_1 to DFR_n.

If the number of transmissions of the data frames DFR_1 to DFR_n is placed on one frame by using a frame length, the number of transmissions of the data frames DFR_1 to DFR_n is placed on one of the header frame HFR3, the sub-header frame SHFR3, the verification frame VFR3 and the end frame FFR3 by using a frame length on the correspondence table TBL6.

If the number of transmissions of the data frames DFR_1 to DFR_n is placed on the header frame HFR3 by using a frame length on the correspondence table TBL6, this frame length represents the beginning of the data to be transmitted and the number of transmissions of the data frames DFR_1 to DFR_n.

If the number of transmissions of the data frames DFR_1 to DFR_n is placed on the sub-header frame SHFR3 by using a frame length on the correspondence table TBL6, this frame length represents a delimiter for the data frames DFR_1 to DFR_n and the number of transmissions of the data frames DFR_1 to DFR_n.

If the number of transmissions of the data frames DFR_1 to DFR_n is placed on the verification frame VFR3 by using a frame length on the correspondence table TBL6, this frame length represents the number of transmissions of the data frames DFR_1 to DFR_n.

If the number of transmissions of the data frames DFR_1 to DFR_n is placed on the end frame FFR3 by using a frame length on the correspondence table TBL6, this frame length represents the end of the data frames DFR_1 to DFR_n and the number of transmissions of the data frames DFR_1 to DFR_n.

The generating circuitry 13G of the transmitter 801 holds the correspondence tables TBL1 and TBL6. Then, the generating circuitry 13G refers to the correspondence table TBL1 to generate the data frames DFR_1 to DFR_n having the frame lengths corresponding to the bit values of the data to be transmitted. Further, the generating circuitry 13G refers to the correspondence table TBL6 to determine a frame length that represents the number of transmissions of the data frames DFR_1 to DFR_n, and generates a header frame HFR3 (or end frame FFR3 or sub-header frame SHFR3 or verification frame VFR3) having the frame length that has been determined. Otherwise, the generating circuitry 13G generates an end frame FFR3 having the frame length of 680 µs or a header frame HFR3 having the frame length of 1190 µs in the same manner as that in the generating circuitry 13, and generates a sub-header frame SHFR3 having the frame length of 1280 µs in the same manner as that in the generating circuitry 13B.

The receiver 802 receives one of the radio frames WFR8-1 to WFR8-4. The determination circuit 25G of the receiver 802 holds the correspondence tables TBL1 and TBL6. Then, the determination circuit 25G receives a plurality of frame lengths from the frame length detection circuit 24 and, based on the plurality of frame lengths that have been received, detects the beginning of the data to be transmitted, the number of transmissions of the data frames DFR_1 to DFR_n, and the end of the data to be transmitted in the manner described above. In this case, the determination circuit 25G refers to the correspondence table TBL6 to detect the number of transmissions of the data frames DFR_1 to DFR_n based on the frame length of one frame.

Thereafter, the determination circuit 25G detects the plurality of frame lengths corresponding to the data frames DFR_1 to DFR_n the number of transmissions. Then, if the plurality of frame lengths for the number of transmissions that has been detected match each other, the determination circuit 25G outputs the plurality of frame lengths corresponding to the data frames DFR_1 to DFR_n to the decoder 26. Then, the decoder 26 refers to the correspondence table TBL1 to convert the plurality of frame lengths to bit sequences, outputs the data to be transmitted.

If the plurality of frame lengths for the number of transmissions do not match each other, the determination circuit 25G discards the plurality of frame lengths corresponding to the data frames DFR_1 to DFR_n.

As described above, in Embodiment 9, at least one of the number of the data frames DFR_1 to DFR_n, the error verification information and the number of transmissions of the data frames DFR_1 to DFR_n is placed on at least one of the header frame HFR3, sub-header frame SHFR3, verification frame VFR3 and end frame FFR3 by using a frame length.

Figure 72:
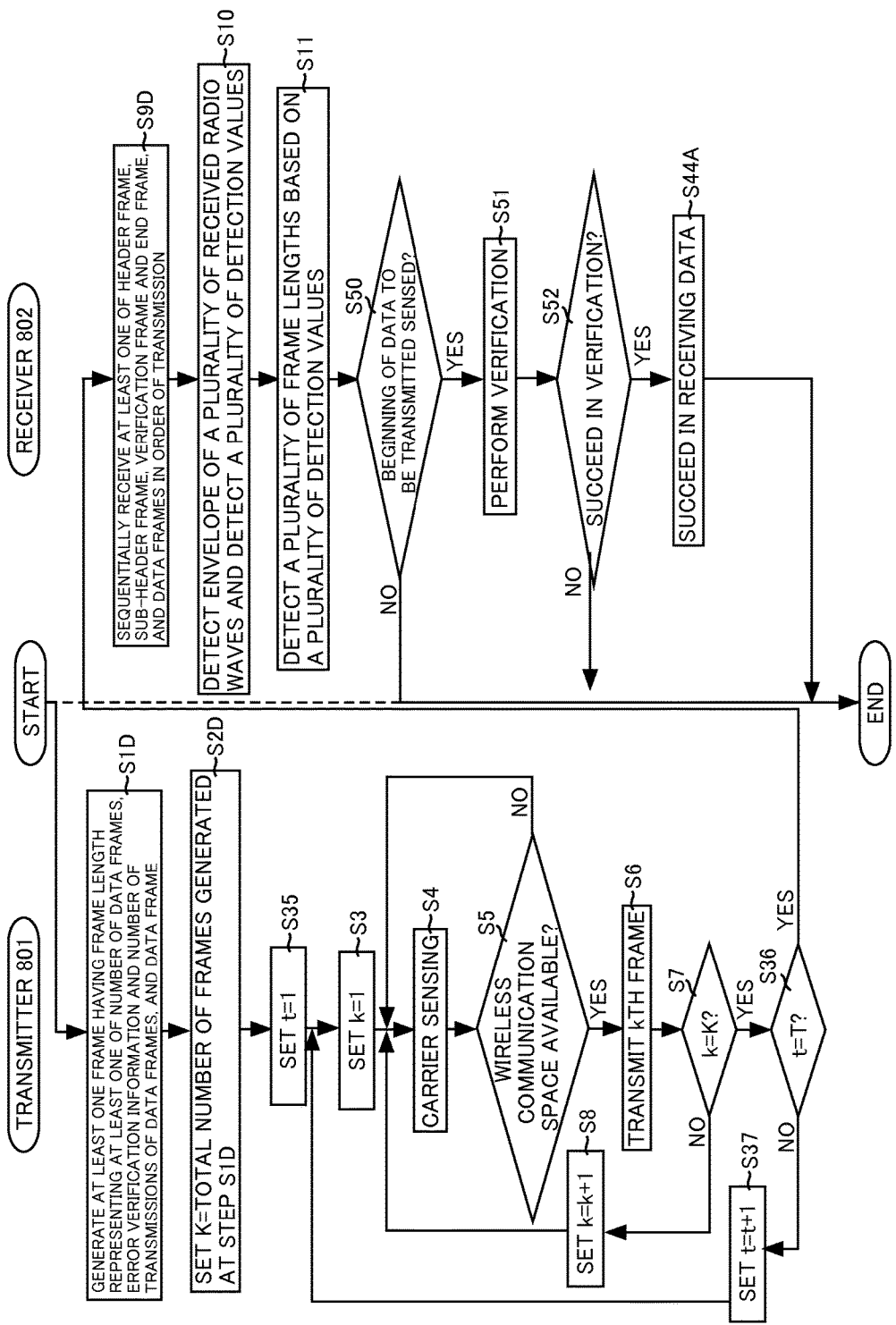
FIG. 72 is a flow chart illustrating the operation of the wireless communication system of FIG. 53.

FIG. 72 is a flow chart illustrating the operation of the wireless communication system 800 of FIG. 53. The flow chart of FIG. 72 is the same as the flow chart of FIG. 52 except that steps S1 and S2 of the flow chart of FIG. 52 are replaced by steps S1D and S2D, respectively, step S38 is deleted, step S9 is replaced by step S9D, and steps S12, S13, S45, S39A, S40 to S42 and S43A are replaced by steps S50 to S52.

Referring to FIG. 72, when the operation is started, the generating circuitry 13G of the transmitter 801 generates at least one frame having a frame length that represents at least one of the number of the data frames DFR_1 to DFR_n, the error verification information and the number of transmissions of the data frames DFR_1 to DFR_n, and the data frames DFR_1 to DFR_n in the manner described above (step S1D).

In this case, at least one of the number of the data frames DFR_1 to DFR_n, the error verification information and the number of transmissions of the data frames DFR_1 to DFR_n is placed on at least one of the header frame HFR3, sub-header frame SHFR3, verification frame VFR3 and end frame FFR3 by using at least one frame length.

Then, the transmitter 801 sets K=total number of the frames generated at step S1D (step S2D).

Thereafter, steps S35, S3 to S8, S36 and S37 described above are sequentially executed.

Then, the receiver 802 sequentially receives at least one of the header frame HFR3, sub-header frame SHFR3, verification frame VFR3 and end frame FFR3, and the data frames DFR_1 to DFR_n in the order in which they were transmitted (step S9D).

Thereafter, steps S10 and S11 described above are sequentially executed.

After step S11, the determination circuit 25G of the receiver 802 determines whether it has detected the beginning of the data to be transmitted by determining whether the first frame length is 1190 μs or matches a frame length contained in one of the correspondence tables TBL2, TBL6 and TBL-41 to TBL-44 (step S50).

In this case, if none of the number of the data frames DFR_1 to DFR_n, the error verification information and the number of transmissions of the data frames DFR_1 to DFR_n is placed on the header frame HFR3 by using a frame length, the determination circuit 25 determines whether it has detected the beginning of the data to be transmitted by determining whether the first frame length is equal to 1190 μs. On the other hand, if at least one of the number of the data frames DFR_1 to DFR_n, the error verification information and the number of transmissions of the data frames DFR_1 to DFR_n is placed on the header frame HFR3 by using a frame length, the determination circuit 25G determines whether it has detected the beginning of the data to be transmitted by determining whether the first frame length matches a frame length contained in one of the correspondence tables TBL2, TBL6 and TBL-41 to TBL-44.

If it is determined at step S50 that the beginning of the data to be transmitted has not detected, the operation ends.

On the other hand, if it is determined at step S50 that the beginning of the data to be transmitted has been detected, the determination circuit 25G, or the determination circuit 25G and decoder 26 in the receiver 802, perform(s) a verification procedure (step S51).

This verification procedure includes the following:

(I) verifying that the number of the plurality of frame lengths corresponding to the data frames DFR_1 to DFR_n matches the number of the data frames DFR_1 to DFR_n that has been detected;

(II) based on the error verification information, verifying that no error has been detected in the data frames DFR_1 to DFR_n; and (III) verifying that the plurality of frame lengths for the number of transmissions corresponding to the data frames DFR_1 to DFR_n match each other.

If the verification of (II) above is performed based on the frame length $L_V$, the determination circuit 25G performs the verification of (II) above; if the verification of (II) is performed based on the 2-bit value $b_4$ and $b_5$, the decoder 26 performs the verification of (II) above.

The determination circuit 25G, or the determination circuit 25G and decoder 26 detect(s) at least one of the number of the data frames DFR_1 to DFR_n, the error verification information and the number of transmissions of the data frames DFR_1 to DFR_n in the manner described above, and, depending on the at least one information that has been detected, performs at least one of the verification of (I) to (III) above to perform the verification procedure.

After step S51, the determination circuit 25G, or the determination circuit 25G and decoder 26, determine(s) whether it/they has/have succeeded in the verification procedure (step S52).

If all of the at least one of verification of (I) to (III) above performed depending on the at least one information type that has been detected are satisfied, the determination circuit 25G or the determination circuit 25G and decoder 26 determine(s) that it/they has/have succeeded in the verification procedure. On the other hand, if even some of the at least one of the verifications of (I) to (III) above performed depending on the at least one information that has been detected is not satisfied, the determination circuit 25G or the determination circuit 25G and decoder 26 determine(s) that it/they has/have not succeeded in the verification procedure.

The end of the data to be transmitted is detected based on the frame length of the end frame FFR3 during the verification procedure of step S51. Then, if none of the number of the data frames DFR_1 to DFR_n, the error verification information and the number of transmissions of the data frames DFR_1 to DFR_n is placed on the end frame FFR3 by using a frame length, the determination circuit 25G determines whether the end of the data to be transmitted has been detected by determining whether the last frame length is equal to 680 μs. On the other hand, if at least one of the number of the data frames DFR_1 to DFR_n, the error verification information and the number of transmissions of the data frames DFR_1 to DFR_n is placed on the end frame FFR3 by using a frame length, the determination circuit 25G determines whether the end of the data to be transmitted has been detected by determining whether the last frame length matches a frame length contained in one of the correspondence tables TBL2, TBL6 and TBL-41 to TBL-44.

Further, a delimiter for the data frames DFR_1 to DFR_n is detected based on the frame length of the sub-header frame SHFR3 during the verification procedure of step S51. Then, if none of the number of the data frames DFR_1 to DFR_n, the error verification information and the number of transmissions of the data frames DFR_1 to DFR_n is placed on the sub-header frame SHFR3 by using a frame length, the determination circuit 25G determines whether a delimiter for the data frames DFR_1 to DFR_n has been detected by determining whether a frame length different from the frame lengths of the data frames DFR_1 to DFR_n is equal to 1280 μs. On the other hand, if at least one of the number of the data frames DFR_1 to DFR_n, the error verification information and the number of transmissions of the data frames DFR_1 to DFR_n is placed on the sub-header frame SHFR3 by using a frame length, the determination circuit 25G determines whether a delimiter for the data frames DFR_1 to DFR_n has been detected by determining whether a frame length different from the frame lengths of the data frames DFR_1 to DFR_n matches a frame length contained in one of the correspondence tables TBL2, TBL6 and TBL-41 to TBL-44.

If it is determined at step S52 that the verification procedure is not succeeded, the operation ends.

On the other hand, if it is determined at step S52 that the verification procedure is succeeded, the receiver 802 determines that it has succeeded in receiving the data (step S44A), and the operation ends.

As described above, in Embodiment 9, the transmitter 801 transmits at least one frame (i.e. at least one of the header frame HFR3, sub-header frame SHFR3, verification frame VFR3 and end frame FFR3) having at least one frame length that represents at least one of the number of the data frames DFR_1 to DFR_n, the error verification information and the number of transmissions of the data frames DFR_1 to DFR_n, and the receiver 802 receives at least one frame (i.e. at least one of the header frame HFR3, sub-header frame SHFR3, verification frame VFR3 and end frame FFR3) and performs at least one of the verification of (I) to (III) above. This significantly improves the freedom with which the at least one of the number of the data frames DFR_1 to DFR_n, the error verification information and the number of transmissions of the data frames DFR_1 to DFR_n is transmitted and received, thereby allowing the data frames DFR_1 to DFR_n to be correctly received.

In Embodiment 9, the operations of the transmitter 801 and receiver 802 may be carried out by a program. In this case, each of the transmitter 801 and receiver 802 includes a CPU, a ROM and a RAM. In the transmitter 801, the ROM stores a program O including steps S1D, S2D, S35, S3 to S8 and S37 shown in FIG. 72, and the CPU reads the program O from the ROM and executes it. Thus, the operation of the transmitter 801 is performed. In the receiver 802, the ROM stores a program P including steps S9D, S10, S11, S50 to S52 and S44A shown in FIG. 72, and the CPU reads the program P from the ROM and executes it. Thus, the operation of the receiver 802 is performed. Further, each of the ROMs of the transmitter 801 and receiver 802 corresponds to the storage medium storing a computer- (i.e. CPU-) readable program.

Furthermore, at least one of the header frame HFR3, sub-header frame SHFR3 (also referred to as "delimiter frame"), verification frame VFR3 and end frame FFR3 constitutes the "auxiliary frame".

Otherwise, the description of Embodiment 9 is the same as those of Embodiments 1 to 8.

[Embodiment 10]

Figure 73:
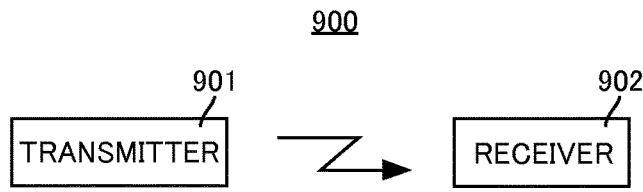
FIG. 73 is a schematic diagram of a wireless communication system according to Embodiment 10.

FIG. 73 is a schematic diagram of a wireless communication system according to Embodiment 10. Referring to FIG. 73, the wireless communication system 900 according to Embodiment 10 includes a transmitter 901 and a receiver 902.

The transmitter 901 and receiver 902 are positioned in a wireless communication space. The transmitter 901 generates a start frame STA in the manner described below. The transmitter 901 generates header frames HFR_1 to HFR_i in the same manner as that in the transmitter 301, generates data frames DFR_1 to DFR_n in the same manner as that in the transmitter 1, and generates check frames CHK_1 to CHK_n in the manner described below.

Then, the transmitter 801 transmits the start frame STA, header frames HFR_1 to HFR_i, data frame DFR_1, check frame CHK_1, data frame DFR_2, check frame CHK_2, . . . , data frame DFR_n, and check frame CHK_n one after another in accordance with the CSMA/CA scheme.

The start frame STA is a frame for informing the receiver 902 of start of transmission of frames. Each of the check frames CHK_1 to CHK_n is a frame for checking the data frames DFR_1 to DFR_n.

The receiver 902 sequentially receives the start frame STA, header frames HFR_1 to HFR_i, data frame DFR_1, check frame CHK_1, data frame DFR_2, check frame CHK_2, . . . , data frame DFR_n and check frame CHK_n.

Then, based on the frame length of the start frame STA, the receiver 802 senses start of transmission of frames, and, based on the bit sequence of the header frames HFR_1 to HFR_i, detects the beginning of the data to be transmitted and detects the header information. The receiver 902 checks whether the data frames DFR_1 to DFR_n are correct based on the frame lengths of the check frames CHK_1 to CHK_n. Then, if the data frames DFR_1 to DFR_n are correct, the receiver 902 converts the frame lengths of the data frames DFR_1 to DFR_n to bit sequences, thereby providing the data to be transmitted.

Figure 74:
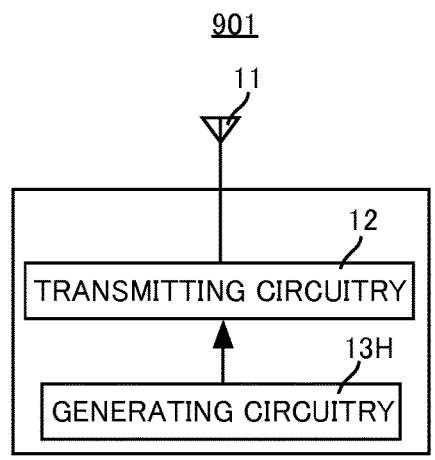
FIG. 74 is a schematic diagram of the transmitter of FIG. 73.

FIG. 74 is a schematic diagram of the transmitter of FIG. 73. Referring to FIG. 74, the transmitter 901 is the same as the transmitter 1 except that the generating circuitry 13 of the transmitter 1 is replaced by a generating circuitry 13H.

The generating circuitry 13H generates the start frame STA in the manner described below, generates the header frames HFR_1 to HFR_i in the same manner as that in the generating circuitry 13C, generates the data frames DFR_1 to DFR_n in the same manner as that in the generating circuitry 13, and generates the check frames CHK_1 to CHK_n in the manner described below. Then, the generating circuitry 13H outputs the start frame STA, header frames HFR_1 to HFR_i, data frame DFR_1, check frame CHK_1, data frame DFR_2, check frame CHK_2, . . . , data frame DFR_n and check frame CHK_n that have been generated to the transmitting circuitry 12.

The transmitting circuitry 12 transmits the start frame STA, header frames HFR_1 to HFR_i, data frame DFR_1, check frame CHK_1, data frame DFR_2, check frame CHK_2, . . . , data frame DFR_n and check frame CHK_n one after another in accordance with the CSMA/CA scheme.

Figure 75:
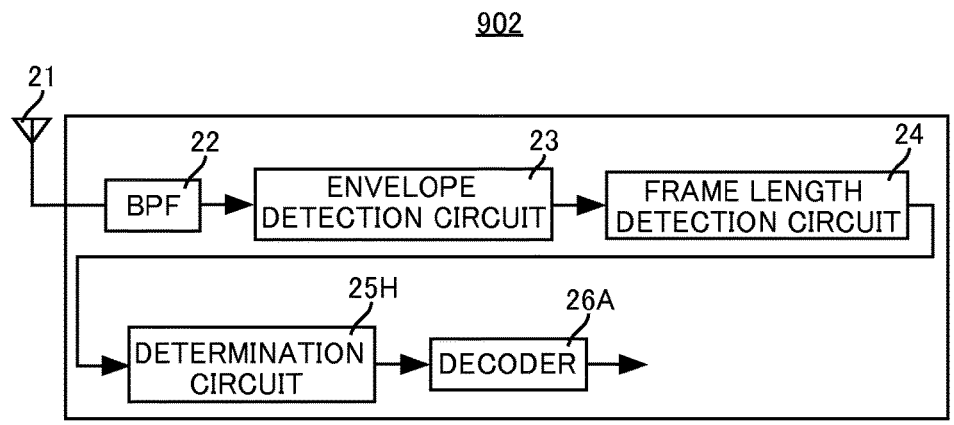
FIG. 75 is a schematic diagram of the receiver of FIG. 73.

FIG. 75 is a schematic diagram of the receiver of FIG. 73. Referring to FIG. 75, the receiver 902 is the same as the receiver 2 except that the determination circuit 25 of the receive 2 is replaced by a determination circuit 25H and the decoder 26 is replaced by a decoder 26A.

The determination circuit 25H receives a plurality of frame lengths from the frame length detection circuit 24. Then, if the firstly received frame length matches the frame length of the start frame STA, the determination circuit 25H senses start of transmission of frames.

If the determination circuit 25H has sensed start of transmission of frames, it outputs the plurality of frame lengths including the second frame length and frame lengths following the second frame length to the decoder 26A.

If the first frame length does not match the frame length of the start frame STA, the determination circuit 25H discards the plurality of frame lengths that have been received in the second and subsequent.

When the decoder 26A has received the plurality of frame lengths from the determination circuit 25H, it converts the plurality of frame lengths that have been received to the bit sequences of the header frames HFR_1 to HFR_i, the bit sequences of the data frames DFR_1 to DFR_n and the bit sequences of the check frames CHK_1 to CHK_n in the manner described below.

Then, based on the bit sequences of the header frames HFR_1 to HFR_i, the bit sequences of the data frames DFR_1 to DFR_n and the bit sequences of the check frames CHK_1 to CHK_n, the decoder 26A determines whether the data frames DFR_1 to DFR_n are correct in the manner described below.

If the decoder 26A determines that the data frames DFR_1 to DFR_n are correct, it outputs a bit sequence obtained by arranging the bit sequences of the data frames DFR_1 to DFR_n in one series as the data to be transmitted.

On the other hand, if the decoder 26A determines that the data frames DFR_1 to DFR_n are not correct, it discards the bit sequences of the data frames DFR_1 to DFR_n.

Figure 76:
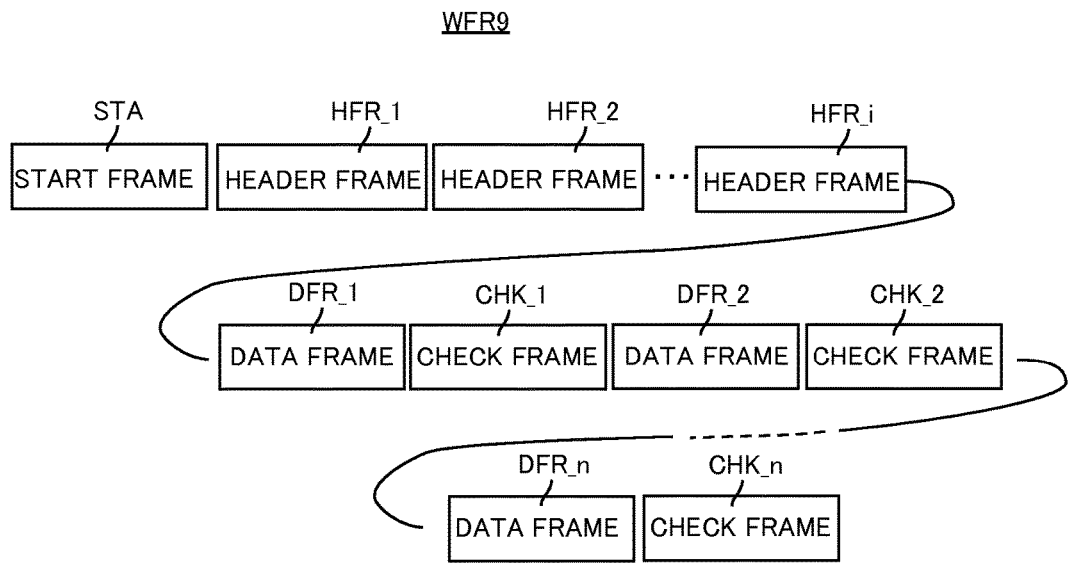
FIG. 76 schematically illustrates a radio frame according to Embodiment 10.

FIG. 76 schematically illustrates a radio frame according to Embodiment 10. Referring to FIG. 76, the radio frame WFR9 of Embodiment 10 includes a start frame STA, header frames HFR1 to HFR_i, data frames DFR_1 to DFR_n and check frames CHK_1 to CHK_n.

The header frames HFR_1 to HFR_i are positioned to follow the start frame STA, the data frame DFR_1 is positioned to follow the header frame HFR_i, the check frame CHK_1 is positioned to follow the data frame DFR_1, the data frame DFR_2 is positioned to follow the check frame CHK_1, the check frame CHK_2 is positioned to follow the data frame DFR_2, and so forth, and the data frame DFR_n is positioned to follow the check frame CHK_n−1, and the check frame CHK_n is positioned to follow the data frame DFR_n.

The start frame STA has a frame length different from those of the data frames DFR_1 to DFR_n.

The check frame CHK_1 has the frame length corresponding to the bit sequence of the four lowest-order bits of the bit sequence that represents the sum of the i bit sequences of the header frames HFR_1 to HFR_i and the bit sequence of the data frame DFR_1.

The check frame CHK_2 has the frame length corresponding to the bit sequence of the four lowest-order bits of the bit sequence that represents the sum of the bit sequence of the check frame CHK_1 and the bit sequence of the data frame DFR_2.

The check frame CHK_3 has the frame length corresponding to the bit sequence of the four lowest-order bits of the bit sequence that represents the sum of the bit sequence of the check frame CHK_2 and the bit sequence of the data frame DFR_3.

In the same manner, the check frame CHK_n has the frame length corresponding to the bit sequence of the four lowest-order bits of the bit sequence that represents the sum of the bit sequence of the check frame CHK_n−1 and the bit sequence of the data frame DFR_n.

Figure 77:
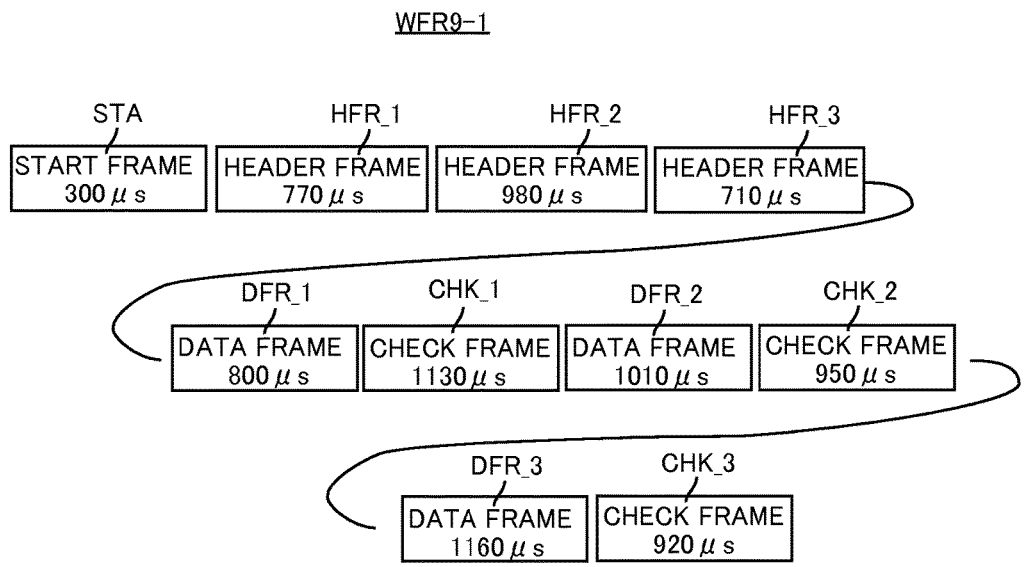
FIG. 77 illustrates a specific example of a radio frame according to Embodiment 10.

FIG. 77 illustrates a specific example of a radio frame WFR9 according to Embodiment 10. Referring to FIG. 77, the radio frame WFR9-1 includes a start frame STA, header frames HFR_1 to HFR_3, data frames DFR_1 to DFR_3, and check frames CHK_1 to CHK_3.

The start frame STA has the frame length of 300 μs, the header frames HFR_1 to HFR_3 have the frame lengths of 770 μs, 980 μs and 710 μs, respectively, the data frames DFR_1 to DFR_3 have the frame lengths of 800 μs, 1010 μs and 1160 μs, respectively.

The frame length of 770 μs of the header frame HFR_1 corresponding to the bit sequence of "0010", the frame length of 980 μs of the header frame HFR_2 corresponding to the bit sequence of "1001", the frame length of 710 μs of the header frame HFR_3 corresponding to the bit sequence of "0000", the frame length of 800 μs of the data frame DFR_1 corresponding to the bit sequence of "0011", the frame length of 1010 μs of the data frame DFR_2 corresponding to the bit sequence of "1010", and the frame length of 1160 μs of the data frame DFR_3 corresponding to the bit sequence of "1111" (see correspondence table TBL1).

As a result, the check frame CHK_1 has the frame length of 1130 μs, which corresponds to "1110", i.e. the sum of "0010", "1001", "0000" and "0011".

The check frame CHK_2 has the frame length of 950 μs, which corresponds to the bit sequence of "1000", i.e. the four lowest-order bits of "11000", which is the sum of the bit sequence "1110" of the check frame CHK_1 and the bit sequence "1010" of the data frame DFR_2.

The check frame CHK_3 has the frame length of 920 μs, which corresponds to the bit sequence "0111", i.e. the four lowest-order bits of "10111", which is the sum of the bit sequence "1000" of the check frame CHK_2 and the bit sequence "1111" of the data frame DFR_3.

The generating circuitry 13H of the transmitter 901 holds the correspondence table TBL1. Then, the generating circuitry 13H generates a start frame STA having the frame length of 300 μs. Then, the generating circuitry 13H refers to the correspondence table TBL1 and, based on the bit sequence "0010" of the header frame HFR_1, the bit sequence "1001" of the header frame HFR_2 and the bit sequence "0000" of the header frame HFR_3, generates the header frame HFR_1 having the frame length of 770 μs, the header frame HFR_2 having the frame length of 980 μs and the header frame HFR_3 having the frame length of 710 μs, respectively. Thereafter, the generating circuitry 13H refers to the correspondence table TBL1 and, based on the bit sequence "0011" of the data frame DFR_1, the bit sequence "1010" of the data frame DFR_2 and the bit sequence "1111" of the data frame DFR_3, generates the data frame DFR_1 having the frame length of 800 µs, the data frame DFR_2 having the frame length of 1010 µs, and the data frame DFR_3 having the frame length of 1160 µs, respectively.

Then, the generating circuitry 13H generates the check frame CHK_1 having the frame length of 1130 µs, the check frame CHK_2 having the frame length of 950 µs and the check frame CHK_3 having the frame length of 920 µs in the manner described above.

Then, the generating circuitry 13H sequentially outputs the start frame STA, header frames HFR_1 to HFR_3, data frame DFR_1, check frame CHK_1, data frame DFR_2, check frame CHK_2, data frame DFR_3 and check frame CHK_3 to the transmitting circuitry 12, and the transmitting circuitry 12 transmits the start frame STA, header frames HFR_1 to HFR_3, data frame DFR_1, check frame CHK_1, data frame DFR_2, check frame CHK_2, data frame DFR_3 and check frame CHK_3 one after another in accordance with the CSMA/CA scheme.

The receiver 902 sequentially receives the start frame STA, header frames HFR_1 to HFR_3, data frame DFR_1, check frame CHK_1, data frame DFR_2, check frame CHK_2, data frame DFR_3 and check frame CHK_3.

Then, the frame length detection circuit 24 of the receiver 902 detects the frame lengths of 300 µs, 770 µs, 980 µs, 710 µs, 800 µs, 1130 µs, 1010 µs, 950 µs, 1160 µs and 920 µs and sequentially outputs the frame lengths of 300 µs, 770 µs, 980 µs, 710 µs, 800 µs, 1130 µs, 1010 µs, 950 µs, 1160 µs and 920 µs that have been detected to the determination circuit 25H in the manner described above.

When the determination circuit 25H has received the frame length of 300 µs, it senses that it has received the start frame STA since the received frame length is 300 µs, and senses start of transmission of frames.

Then, the determination circuit 25H outputs the frame lengths of 770 µs, 980 µs, 710µ, 800 µs, 1130 µs, 1010 µs, 950 µs, 1160 µs, and 920 µs following the frame length of 300 µs to the decoder 26A.

The decoder 26A holds the correspondence table TBL1. Then, the decoder 26A refers to the correspondence table TBL1 to convert the frame lengths of 770 µs, 980 µs, 710µ, 800 µs, 1130 µs, 1010 µs, 950 µs, 1160 µs, and 920 µs to the bit sequences "0010", "1001", "0000", "0011", "1110", "1010", "1000", "1111" and "0111", respectively.

Then, the decoder 26 A calculates the sum "1110" of "0010", "1001", "0000" and "0011", and detects that the calculated sum "1110" matches the bit sequence "1110" of the check frame CHK_1 and senses that the data frame DFR_1 is correct.

Thereafter, the decoder 26A detects that bit sequence "1000" of four lowest-order bits of the sum "1100" of the bit sequence "1110" of the check frame CHK_1 and the bit sequence "1010" of the data frame DFR_2 matches the bit sequence "1000" of the check frame CHK_2 to sense that the data frame DFR_2 is correct.

Further, the decoder 26A detects that the bit sequence "0111" of four lowest-order bits of the sum "1011" of the bit sequence "1000" of the check frame CHK_2 and the bit sequence "1111" of the data frame DFR_3 matches the bit sequence "0111" of the check frame CHK_3 to sense that the data frame DFR_3 is correct.

Then, the decoder 26A arranges the bit sequences "0011", "1010" and "1111" of the data frames DFR_1 to DFR_3 in one series to outputs "001110101111" as the data to be transmitted.

In the above description, the number of the check frames CHK_1 to CHK_n is equal to the number of the data frames DFR_1 to DFR_n; however, Embodiment 10 is not limited to such an implementation, and the number of the check frames CHK may be unequal to the number of the data frames DFR_1 to DFR_n and a check frame CHK may be inserted between the data frames DFR_1 to DFR_n at a desired interval along the data frames DFR_1 to DFR_n.

In the above description, the header frames HFR_1 to HFR_i, data frames DFR_1 to DFR_n and check frames CHK are represented by 4-bit sequences; however, Embodiment 10 is not limited to such an implementation, and the header frames HFR_1 to HFR_i, data frames DFR_1 to DFR_n and check frame CHK may be represented by bit sequences different from 4-bit sequences.

Further, in the above description, the header frames HFR_1 to HFR_i, data frames DFR_1 to DFR_n and check frames CHK are transmitted only once; however, Embodiment 10 is not limited to such an implementation, and it is only required that the header frames HFR_1 to HFR_i, data frames DFR_1 to DFR_n and check frames CHK be transmitted one or more times. In this case, when the receiver 902 has determined that the data frames DFR_1 to DFR_n are correct using check frames CHK the number of transmissions, it arranges the bit sequences of the data frames DFR_1 to DFR_n in one series to output the arranged bit sequence as the data to be transmitted.

Figure 78:
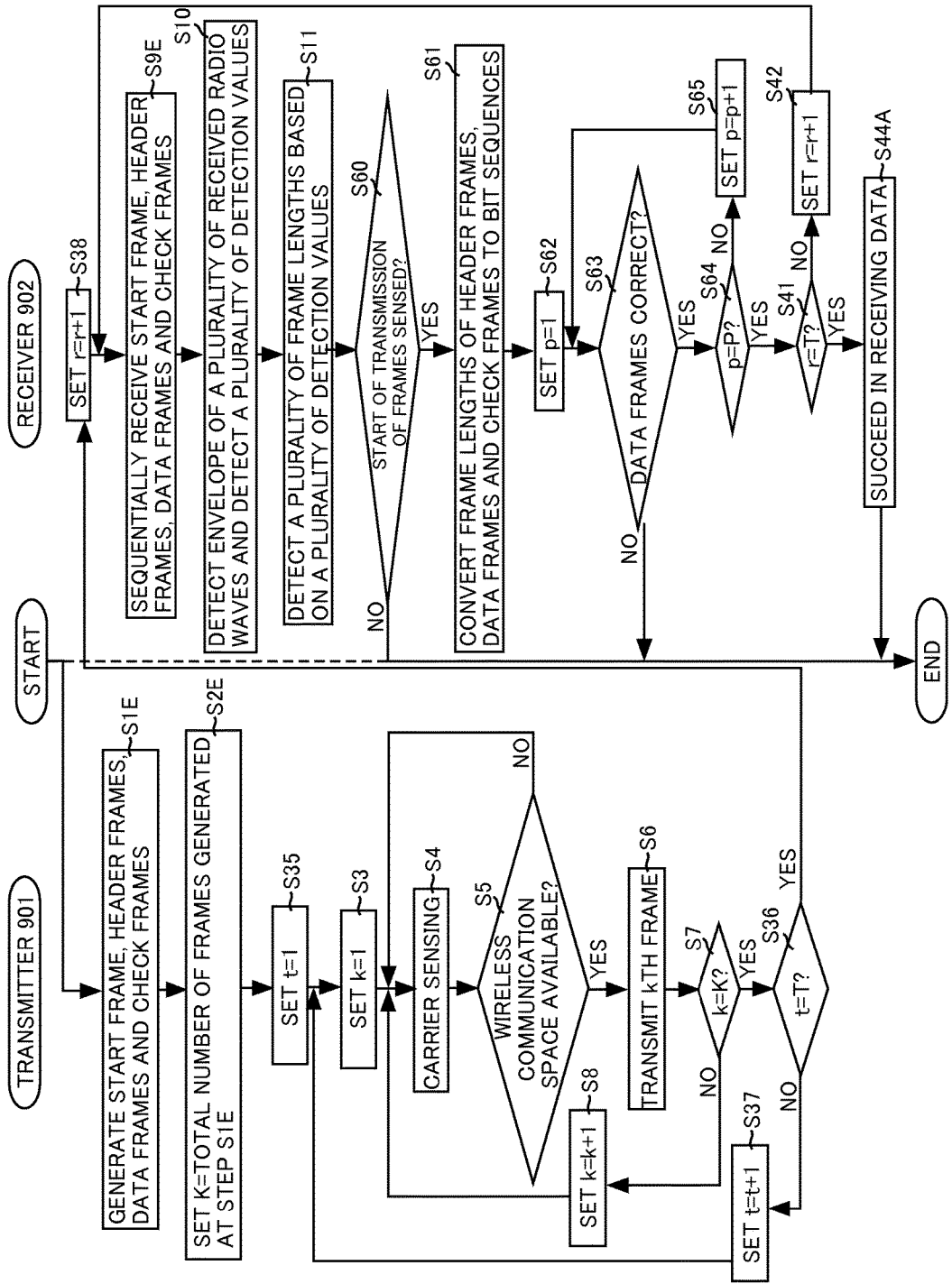
FIG. 78 is a flow chart illustrating the operation of the wireless communication system of FIG. 73.

FIG. 78 is a flow chart illustrating the operation of the wireless communication system 900 of FIG. 73. The flow chart of FIG. 78 is the same as the flow chart of FIG. 52 except that steps S1, S2 and S9 of the flow chart of FIG. 52 are replaced by steps S1E, S2E and S9E, respectively, steps S12, S13, S45, S39A and S40 are replaced by steps S60 to S65, and step S43 A is deleted.

Referring to FIG. 78, when the operation is started, the transmitter 901 generates the start frame STA, header frames HFR_1 to HFR_i, data frames DFR_1 to DFR_n and check frames CHK_1 to CHK_P (P is a positive integer) in the manner described above (step S1E).

Then, the transmitter 901 sets K=total number of the frames generated at step S1E (step S2E).

Thereafter, steps S35, S3 to S8 and S36 to S38 described above are sequentially executed.

Then, the receiver 902 sequentially receives the start frame STA, header frames HFR_1 to HFR_i, data frames DFR_1 to DFR_n and check frames CHK_1 to CHK_P (step S9E).

Then, steps S10 and S11 described above are sequentially executed. Then, after step S11, the determination circuit 25H of the receiver 902 determines whether it has sensed start of transmission of frames by determining whether the first frame length is 300 µs (step S60). In this case, if the first frame length is 300 µs, the determination circuit 25H determines that it has sensed start of transmission of frames, and, if the first frame length is not 300 µs, determines that it has not sensed start of transmission of frames.

If it is determined at step S60 that it has not sensed start of transmission of frames, the operation ends.

On the other hand, if it is determined at step S60 that it has sensed start of transmission of frames, the determination circuit 25H outputs the second and subsequent frame lengths to the decoder 26A, and the decoder 26A refers to the correspondence table TBL1 to convert the second and subsequent frame lengths to bit sequences. That is, the decoder 26A converts the frame lengths of the header frames HFR_1 to HFR_i, data frames DFR_1 to DFR_n and check frames CHK_1 to CHK_P to bit sequences (step S61).

Then, the decoder 26A sets p=1 (p is an integer that meets 1≤p≤P) (step S62), and uses the bit sequence of the first check frame CHK_1 to determine, in the manner described above, whether the data frames are correct (step S63).

If it is determined at step S63 that the data frames are not correct, the operation ends.

If it is determined at step S63 that the data frames are correct, the decoder 26A determines whether p=P (step S64).

If it is determined at step S64 that p=P is not true, the decoder 26A sets p=p+1 (step S65). Thereafter, the operation returns to step S63. Then, steps S63 to S65 described above are repeatedly executed until it is determined at step S64 that p=P.

If it is determined at step S64 that p=P, steps S9E, S10, S11, S60 to S65, S41 and S42 described above are repeatedly executed until it is determined at step S41 that r=T.

If it is determined at step S41 that r=T, the receiver 902 has succeeded in receiving the data (step S44A), and the operation ends.

Thus, in Embodiment 10, it is determined for each check frame whether the data frames are correct (see step S63). Then, if it is determined the number of transmissions that all of the data frames DFR_1 to DFR_n are correct, the receiver succeeds in receiving the data.

Therefore, the data frames DFR_1 to DFR_n could be received correctly.

Further, if the number P of the check frames CHK_1 to CHK_P is equal to the number n of the data frames DFR_1 to DFR_n, it is checked for each data frame whether the data frame is correct, thereby allowing the data frames DFR_1 to DFR_n to be received more correctly.

In Embodiment 10, the operations of the transmitter 901 and receiver 902 may be carried out by a program. In this case, each of the transmitter 901 and receiver 902 includes a CPU, a ROM and a RAM. In the transmitter 901, the ROM stores a program Q including steps S1E, S2E, S35, S3 to S8, S36 and S37 shown in FIG. 78, and the CPU reads the program Q from the ROM and executes it. Thus, the operation of the transmitter 901 is performed. In the receiver 902, the ROM stores a program R including steps S38, S9E, S10, S11, S60 to S65, S41, S42 and S44A shown in FIG. 78, and the CPU reads the program R from the ROM and executes it. Thus, the operation of the receiver 902 is performed. Further, each of the ROMs of the transmitter 901 and receiver 902 corresponds to the storage medium storing a computer- (i.e. CPU-) readable program.

Further, in the above description, the start frame STA has the frame length of 300 μs; however, Embodiment 10 is not limited to such an implementation, and the start frame STA may have any frame length other than 300 μs if its frame length is different from the frame lengths of the data frames DFR_1 to DFR_n.

Otherwise, the description of Embodiment 10 is the same as those of Embodiment 1 to 8.

[Embodiment 11]

Figure 79:
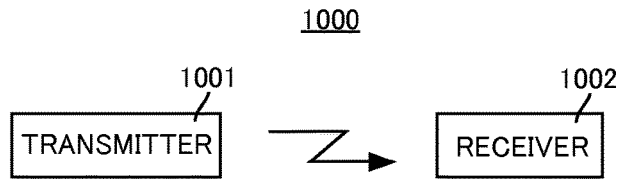
FIG. 79 is a schematic diagram of a wireless communication system according to Embodiment 11.

FIG. 79 is a schematic diagram of a wireless communication system according to Embodiment 11. Referring to FIG. 79, the wireless communication system 1000 according to Embodiment 11 includes a transmitter 1001 and receiver 1002.

The transmitter 1001 and receiver 1002 are positioned in a wireless communication space. The transmitter 1001 generates header frames HFR_1 to HFR_i having the frame lengths corresponding to the bit sequence of header information in the manner described below. Further, the transmitter 1001 generates data frames DFR_1 to DFR_n in the manner described below. Furthermore, the transmitter 1001 generates delimiter frames KFR_1 to KFR_m having the frame lengths corresponding to the bit sequences that indicate delimiters for the data frames DFR_1 to DFR_n in the manner described below. Moreover, the transmitter 1001 generates a check frame CHK in the manner described above.

Then, the transmitter 1001 transmits the header frames HFR_1 to HFR_i, then consecutively transmits the delimiter frames KFR_1 q times (q is a positive integer), then consecutively transmits the data frames DFR_1 q times and consecutively transmits the delimiter frame KFR_2 q times, then consecutively transmits the data frame DFR_2 q times, and so forth, and consecutively transmits the delimiter frame KFR_m−1 q times, then consecutively transmits the data frames DFR_n−1 q times, then consecutively transmits the delimiter frame KFR_m q times, then consecutively transmits the data frame DFR_n q times, and then consecutively transmits the check frame CHK q times.

The receiver 1002 sequentially receives the header frames HFR_1 to HFR_i, q delimiter frames KFR_1, q data frames DFR_1, q delimiter frames KFR_2, q data frames DFR_2, . . . q delimiter frames KFR_m, q data frames DFR_n and check frames CHK.

Then, when the receiver 1002 has detected the frame lengths of the header frames HFR_1 to HFR_i, it senses the beginning of the data to be transmitted.

Thereafter, when the receiver 1002 has received the q delimiter frames KFR_1, it enters into a state of waiting for a data frame DFR_1; when it has received the q data frames DFR_1, it enters into a state of waiting for a delimiter frame KFR_2; when it has received the q delimiter frames KFR_2, it enters into a state of waiting for a data frame DFR_2; and so forth, and when it has received the q delimiter frames KFR_m, it enters into a state of waiting for a data frame DFR_n. Then, after the receiver 1002 has received the q data frames DFR_n, it receives the check frames CHK, and uses the received check frames CHK to determine whether the data frames DFR_1 to DFR_n are correct. When the receiver 1002 determines that the data frames DFR_1 to DFR_n are correct, it determines that the receiver has succeeded in receiving the data to be transmitted.

Figure 80:
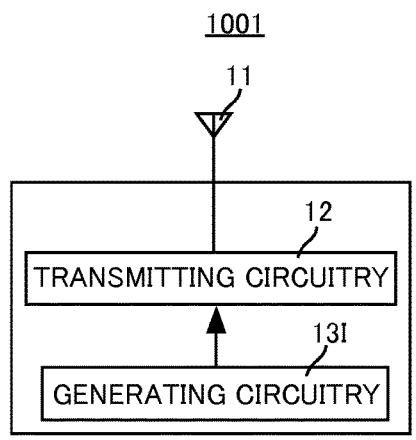
FIG. 80 is a schematic diagram of the transmitter of FIG. 79.

FIG. 80 is a schematic diagram of the transmitter of FIG. 79. Referring to FIG. 80, the transmitter 1001 is the same as the transmitter 1 except that the generating circuitry 13 of the transmitter 1 is replaced by a generating circuitry 13I.

The generating circuitry 13I generates the header frames HFR_1 to HFR_i, data frames DFR_1 to DFR_n and delimiter frames KFR_1 to KFR_m in the manner described below. Further, the generating circuitry 13I generates the check frames CHK in the manner described above.

Then, the generating circuitry 13I outputs the header frames HFR_1 to HFR_i, data frames DFR_1 to DFR_n, delimiter frames KFR_1 to KFR_m and check frames CHK to the transmitting circuitry 12.

In the transmitter 1001, the transmitting circuitry 12 transmits the header frames HFR_1 to HFR_i, q delimiter frames KFR_1, q data frames DFR_1, . . . , the q delimiter frames KFR_m, q data frames DFR_n and q check frames CHK one after another in accordance with the CSMA/CA scheme.

Figure 81:
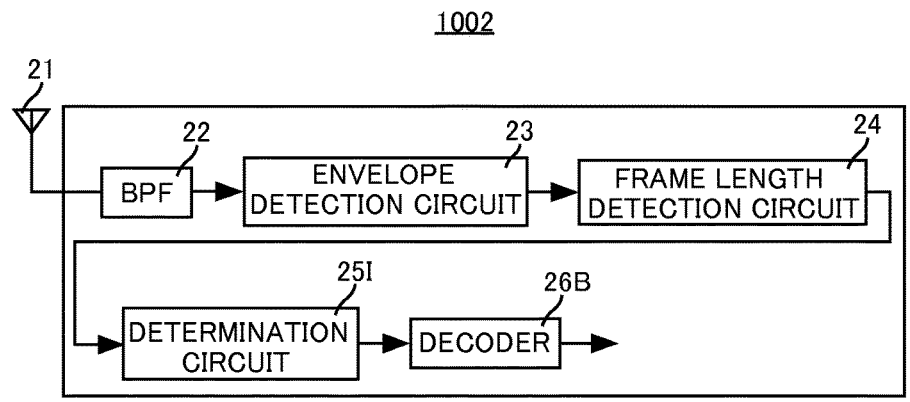
FIG. 81 is a schematic diagram of the receiver of FIG. 79.

FIG. 81 is a schematic diagram of the receiver of FIG. 79. Referring to FIG. 81, the receiver 1002 is the same as the receiver 2 except that the determination circuit 25 of the receiver 2 is replaced by a determination circuit 25I and the decoder 26 is replaced by a decoder 26B.

When the decoder circuit 25I has detected the frame lengths of the header frames HFR_1 to HFR_i, it senses the beginning of the data to be transmitted.

Thereafter, when the determination circuit 25I has received the q frame lengths of the q delimiter frames KFR_1 from the frame length detection circuit 24, it enters into a state of waiting for a data frame DFR_1; when it has received the q frame lengths of the q data frames DFR_1 from the frame length detection circuit 24, it enters into a state of waiting for a delimiter frame KFR_2; when it has received the q frame lengths of the q delimiter frames KFR_2 from the frame length detection circuit 24, it enters into a state of waiting for a data frame DFR_2; and so forth, and when it has received the q frame lengths of the q delimiter frames KFR_m from the frame length detection circuit 24, it enters into a state of waiting for a data frame DFR_n. Then, after the determination circuit 25I has received the q frame lengths of the q data frames DFR_n from the frame length detection circuit 24, it receives the frame lengths of the check frames CHK.

Then, the determination circuit 25I outputs the q frame lengths of the q data frames DFR_1 to the q frame lengths of the q data frames DFR_n, the q frame lengths of the q delimiter frames KFR_1 to the q frame lengths of the q delimiter frames KFR_n and the frame lengths of the check frames CHK to the decoder 26B.

Then, the decoder 26B converts the q frame lengths of the q data frames DFR_1 to the q frame lengths of the q data frames DFR_n, the q frame lengths of the q delimiter frames KFR_1 to the q frame lengths of the q delimiter frames KFR_n and the frame length of the check frame CHK to q×n bit sequences, q×m bit sequences and one bit sequence in the manner described below, and, based on the converted q×n bit sequences, q×m bit sequences and one bit sequence, determines whether the q data frames DFR_1 to q data frames DFR_n are correct. Then, if the decoder 26B determines that the q data frames DFR_1 to q data frames DFR_n are correct, the receiver has succeeded in receiving the data to be transmitted.

Figure 82:
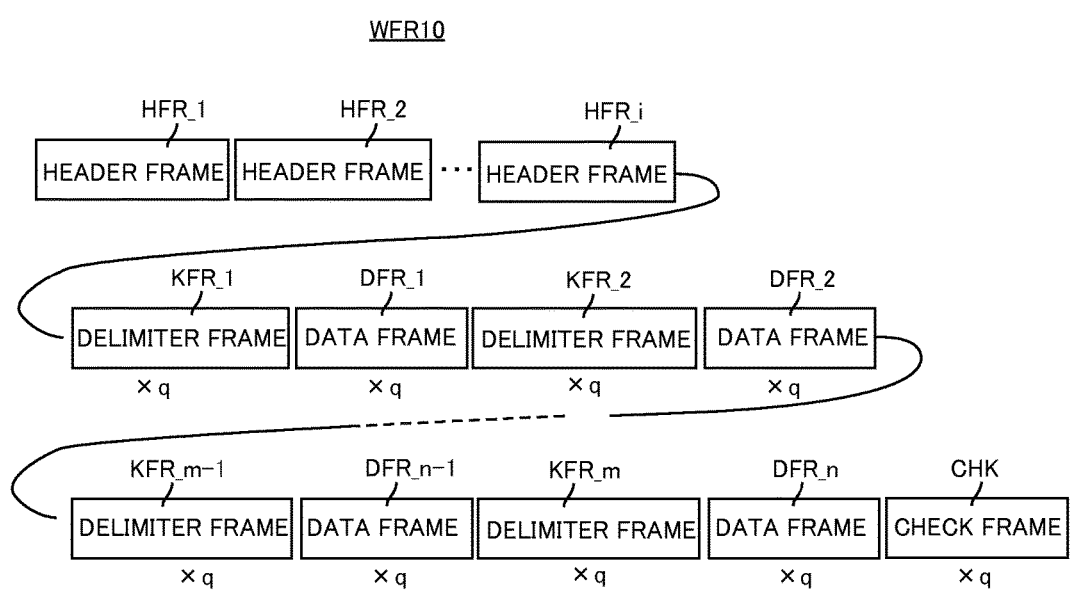
FIG. 82 schematically illustrates a radio frame according to Embodiment 11.

FIG. 82 schematically illustrates a radio frame according to Embodiment 11. Referring to FIG. 82, the radio frame WFR10 of Embodiment 11 includes header frames HFR_1 to HFR_i, q delimiter frames KFR_1 to q delimiter frames KFR_m, q data frames DFR_1 to q data frames DFR_n, and q check frames CHK.

The q delimiter frames KFR_1 are positioned to follow the header frame HFR_i, the q data frames DFR_1 are positioned to follow the q delimiter frames KFR_1, the q delimiter frames KFR_2 are positioned to follow the q data frames DFR_1, the q data frames DFR_2 are positioned to follow the q delimiter frames KFR_2, and so forth, the q data frames DFR_n−1 are positioned to follow the q delimiter frames KFR_m−1, the q delimiter frames KFR_m are positioned to follow the q data frames DFR_n−1, the q data frames DFR_n are positioned to follow the q delimiter frames KFR_m, and the q check frames CHK are positioned to follow the q data frames DFR_n.

FIG. 83 is a correspondence table illustrating the correspondence between the bit value of header information and frame length.

Referring to FIG. 83, the correspondence table TBL-45 contains bit values of header information and frame lengths. The bit values of header information are associated with the frame lengths.

In header information, the bit value of "0000" is associated with the frame length of 715 μs, the bit value of "0001" is associated with the frame length of 745 μs, and in the same manner, the bit value of "1111" is associated with the frame length of 1165 μs.

Thus, in the correspondence table TBL-45, the frame length increases by 30 μs as the bit value of header information increases by "1".

FIG. 84 is a correspondence table illustrating the correspondence between the bit value of delimiter information and frame length.

Referring to FIG. 84, the correspondence table TBL-46 contains bit values of delimiter information and frame lengths. The bit values of delimiter information are associated with the frame lengths.

In delimiter information, the bit value of "0000" is associated with the frame length of 720 μs, the bit value of "0001" is associated with the frame length of 750 μs, and in the same manner, the bit value of "1111" is associated with the frame length of 1170 μs.

Thus, in the correspondence table TBL-46, the frame length increases by 30 μs as the bit value of delimiter information increases by "1".

FIG. 85 is a correspondence table illustrating the correspondence between the bit value of a check frame and frame length.

Referring to FIG. 85, the correspondence table TBL-47 contains bit values of check frames and frame lengths. The bit values of check frames are associated with the frame lengths.

In check frames, the bit value of "0000" is associated with the frame length of 725 μs, the bit value of "0001" is associated with the frame length of 755 μs, in the same manner, the bit value of "1111" is associated with the frame length of 1175 μs.

Thus, in the correspondence table TBL-47, the frame length increases by 30 μs as the bit value of a check frame increases by "1".

The generating circuitry 13I of the transmitter 1001 holds the correspondence tables TBL1, TBL-45, TBL-46 and TBL-47. Then, the generating circuitry 13I refers to the correspondence table TBL-45 to generate the header frames HFR_1 to HFR_i having the frame lengths corresponding to the bit value of the header information. Further, the generating circuitry 13I refers to the correspondence table TBL1 to generate the data frames DFR_1 to DFR_n having the frame lengths corresponding to the bit value of the data to be transmitted. Furthermore, the generating circuitry 13I refers to the correspondence table TBL-46 to generate the delimiter frames KFR_1 to KFR_m having the frame lengths corresponding to the bit value of the delimiter information. Moreover, based on the bit sequences of the header frames HFR_1 to HFR_i, and the bit sequences of the q data frames DFR_1 to q data frames DFR_n, the generating circuitry 13I calculates the bit value of the check frame in the manner described above, and refers to the correspondence table TBL-47 to generate the check frame CHK having the frame length corresponding to the calculated bit value.

The determination circuit 25I and decoder 26B of the receiver 1002 each hold the correspondence tables TBL1, TBL-45, TBL-46 and TBL-47.

Then, the determination circuit 25I determines whether the a frame length received from the frame length detection circuit 24 is contained in one of the correspondence tables TBl1, TBL-45, TBL-46 and TBL-47. If the frame length is contained in the correspondence table TBl1, the determination circuit 25I determines that the frame length is one of the frame lengths of the data frames DFR_1 to DFR_n. If the frame length is contained in the correspondence table TBL-45, the determination circuit 25I determines that the frame length is one of the frame lengths of the header frames HFR_1 to HFR_i. If the frame length is contained in the correspondence table TBL-46, the determination circuit 25I determines that the frame length is one of the frame lengths of the delimiter frames KFR_1 to KFR_m. If the frame length is contained in the correspondence table TBL-47, the determination circuit 25I determines that the frame length is the frame length of the check frames CHK.

The decoder 26B refers to the correspondence tables TBL1, TBL-45, TBL-46 and TBL-47 to convert the frame lengths of the data frames DFR_1 to DFR_n, the frame lengths of the header frames HFR_1 to HFR_i, the frame lengths of the delimiter frames KFR_1 to KFR_m and the frame length of the check frames CHK to bit sequences, respectively.

Then, based on the converted bit sequences, the decoder 26B determines whether the data frames DFR_1 to DFR_n are correct in the manner described above. When the decoder 26B has determined that the data frames DFR_1 to DFR_n are correct, it arranges the n bit sequences of the data frames DFR_1 to DFR_n in one series and outputs the arranged bit sequence as the data to be transmitted. On the other hand, if the decoder 26B has determined that the data frames DFR_1 to DFR_n are not correct, it discards the n bit sequences of the data frames DFR_1 to DFR_n.

Figure 86:
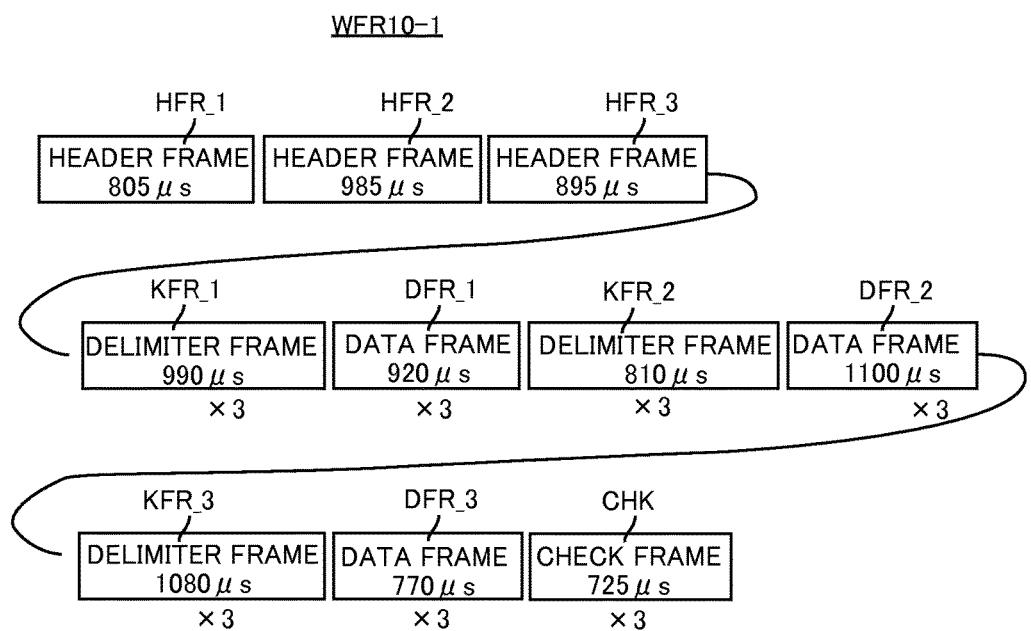
FIG. 86 illustrates a specific example of a radio frame according to Embodiment 11.

FIG. 86 illustrates a specific example of the radio frame WFR10 according to Embodiment 11. Referring to FIG. 86, the radio frame WFR10-1 contains the header frames HFR_1 to HFR_3, delimiter frames KFR_1 to KFR_3, data frames DFR_1 to DFR_3 and check frames CHK.

The header frames HFR_1 to HFR_3 have the frame lengths of 805 μs, 985 μs and 895 μs, respectively; the delimiter frames KFR_1 to KFR_3 have the frame lengths of 990 μs, 810 μs and 1080 μs, respectively; and the data frames DFR_1 to DFR_3 have the frame lengths of 920 μs, 1100 μs and 770 μs, respectively. As a result, the check frame CHK has the frame length of 725 μs.

Then, the delimiter frames KFR_1 to KFR_3 and data frames DFR_1 to DFR_3 are consecutively transmitted three times.

The generating circuitry 13I of the transmitter 1001 divides the header information into the 4-bit values "0011", "1001" and "0110", and refers to the correspondence table TBL-45 to convert the bit values "0011", "1001" and "0110" to the frame lengths of 805 μs, 985 μs and 895 μs, respectively. Then, the generating circuitry 13I generates the header frames HFR_1 to HFR_3 having the frame lengths of 805 μs, 985 μs and 895 μs, respectively.

Further, the generating circuitry 13I divides the data to be transmitted into the 4-bit values "0111", "1101" and "0010", and refers to the correspondence table TBL1 to convert the bit values "0111", "1101" and "0010" to the frame lengths of 920 μs, 1100 μs and 770 μs, respectively. Then, the generating circuitry 13I generates the data frames DFR_1 to DFR_3 having the frame lengths of 920 μs, 1100 μs and 770 μs, respectively.

Furthermore, the generating circuitry 13I divides the delimiter information into the 4-bit values "1001", "0011" and "1100", and refers to the correspondence table TBL-46 to convert the bit values "1001", "0011" and "1100" to the frame lengths of 990 μs, 810 μs and 1080 μs, respectively. Then, the generating circuitry 13I generates the delimiter frames KFR_1 to KFR_3 having the frame lengths of 990 μs, 810 μs and 1080 μs, respectively.

Then, generating circuitry 13I sums the bit values "0011", "1001" and "0110" of the header frames HFR_1 to HFR_3, the bit values "1001", "0011" and "1100" of the delimiter frames KFR_1 to KFR_3 and the bit values "0111", "1101" and "0010" of the data frames DFR_1 to DFR_3 and detects the four lowest-order bits of the sum to detect the bit value "0000". Then, the generating circuitry 13I refers to the correspondence table TBL-47 to detect the frame length of 725 μs corresponding to the bit value "0000", and generates the check frame CHK having the detected frame length of 725 μs.

Thereafter, the generating circuitry 13I sequentially outputs the header frame HFR_1, header frame HFR_2, header frame HFR_3, delimiter frame KFR_1, data frame DFR_1, delimiter frame KFR_2, data frame DFR_2, delimiter frame KFR_3, data frame DFR_3 and check frame CHK to the transmitting circuitry 12.

The transmitting circuitry 12 transmits the header frame HFR_1, header frame HFR_2 and header frame HFR_3 one after another in accordance with the CSMA/CA scheme, then consecutively transmits the delimiter frame KFR_1 three times in accordance with the CSMA/CA scheme, then, consecutively transmits the data frame DFR_1 three times in accordance with the CSMA/CA scheme, then consecutively transmits the delimiter frame KFR_2 three times in accordance with the CSMA/CA scheme, then consecutively transmits the data frame DFR_2 three times in accordance with the CSMA/CA scheme, then consecutively transmits the delimiter frame KFR_3 three times in accordance with the CSMA/CA scheme, then consecutively transmits the data frame DFR_3 three times in accordance with the CSMA/CA scheme, and then consecutively transmits the check frame CHK three times in accordance with the CSMA/CA scheme.

The receiver 1002 sequentially receives the header frames HFR_1 to HFR_3, three delimiter frames KFR_1, three data frames DFR_1, three delimiter frames KFR_2, three data frames DFR_2, three delimiter frames KFR_3, three data frames DFR_3 and check frames CHK.

Then, the frame length detection circuit 24 of the receiver 1002 detects the frame lengths of 805 μs, 985 μs, 895 μs, triple 990 μs, triple 920 μs, triple 810 μs, triple 1100 μs, triple 1080 μs, triple 770 μs and triple 725 μs in the manner described above, and sequentially outputs the frame lengths of 805 μs, 985 μs, 895 μs, triple 990 μs, triple 920 μs, triple 810 μs, triple 1100 μs, triple 1080 μs, triple 770 μs and triple 725 μs that have been detected to the determination circuit 25I.

The determination circuit 25I sequentially receives the frame lengths of 805 μs, 985 μs, 895 μs, triple 990 μs, triple 920 μs, triple 810 μs, triple 1100 μs, triple 1080 μs, triple 770 μs and triple 725 μs, and determines whether the frame lengths of 805 μs, 985 μs, 895 μs, triple 990 μs, triple 920 μs, triple 810 μs, triple 1100 μs, triple 1080 μs, triple 770 μs and triple 725 μs that have been received are contained in the correspondence tables TBL1, TBL-45, TBL-46 and TBL-47.

As a result, the determination circuit 25I determines that the frame lengths of 805 μs, 985 μs and 895 μs are contained in the correspondence table TBL-45, to sense that the frame lengths of 805 μs, 985 μs and 895 μs are the frame lengths of the header frames HFR_1 to HFR_3. Thus, the determination circuit 25I senses the beginning of the data to be transmitted.

Thereafter, the determination circuit 25I receives the triple frame length of 990 μs, and determines that the received triple frame length of 990 μs is contained in the correspondence table TBL-46 to sense that the triple frame length of 990 μs is the frame length of the delimiter frame KFR_1. Then, the determination circuit 25I enters into a state of waiting for the data frame DFR_1.

Thereafter, the determination circuit 25I receives the triple frame length of 920 μs and determines that the received triple frame length of 920 μs is contained in the correspondence table TBL1 to sense that the triple frame length of 920 μs is the frame length of the data frame DFR_1. Then, the determination circuit 25I enters into a state of waiting for the delimiter frame KFR_2.

In the same manner, when the determination circuit 25I has received the triple frame length of 810 μs, it senses that it has received the three delimiter frames KFR_2 and enters into a state of waiting for a data frame DFR_2; when it has received the triple frame length of 1100 μs, it senses that it has received the three data frames DFR_2 and enters into a state of waiting for a delimiter frame DFR_3; and when it has received the triple frame length of 1080 μs, it senses that it has received the three delimiter frames KFR_3 and enters into a state of waiting for a data frame DFR_3. Then, when the determination circuit 25I has received the triple frame length of 770 μs, it senses that it has received the three data frames DFR_3, and then, when it has received the triple frame length of 725 μs, it senses that it has received the three check frames CHK.

Thus, the determination circuit 25I detects that it has received the data frames DFR_1 to DFR_3 and delimiter frames KFR_1 to KFR_3 while repeating the state of waiting for a data frame and the state of waiting for a delimiter frame.

Then, the determination circuit 25I sequentially outputs the frame lengths of 805 μs, 985 μs, 895 μs, triple 990 μs, triple 920 μs, triple 810 μs, triple 1100 μs, triple 1080 μs, triple 770 μs, and triple 725 μs to the decoder 26B.

The decoder 26B sequentially receives the frame lengths of 805 μs, 985 μs, 895 μs, triple 990 μs, triple 920 μs, triple 810 μs, triple 1100 μs, triple 1080 μs, triple 770 μs, and triple 725 μs. Then, the decoder 26B refers to the correspondence table TBL-45 to convert the frame lengths of 805 μs, 985 μs and 895 μs to the bit values of "0011", "1001" and "0110", respectively, and refers to the correspondence table TBL-46 to convert the triple frame length of 990 μs to the triple bit value of "1001", and refers to the correspondence table TBL1 to convert the triple frame length of 920 μs to the triple bit value of "0111".

Thereafter, the decoder 26B refers to the correspondence table TBL-46 to convert the triple frame length of 810 μs to the triple bit value of "0011", and refers to the correspondence table TBL1 to convert the triple frame length of 1100 μs to the triple bit value of "1101".

Subsequently, the decoder 26B refers to the correspondence table TBL-46 to convert the triple frame length of 1080 μs to the triple bit value of "1100", and refers to the correspondence table TBL1 to convert the triple frame length of 770 μs to the triple bit value of "0010".

Finally, the decoder 26B refers to the correspondence table TBL-47 to convert the triple frame length of 725 μs to the triple bit value of "0000".

Then, the decoder 26B sums the bit values of "0011", "1001" and "0110" of the header frames HFR_1 to HFR_3, the bit value of "1001" of the delimiter frame KFR_1, the bit value of "0111" of the data frame DFR_1, the bit value of "0011" of the delimiter frame KFR_2, the bit value of "1101" of the data frame DFR_2, the bit value of "1100" of the delimiter frame KFR_3, and the bit value of "0010" of the data frame DFR_3 and detects the four lowest-order bits of the sum to detect the bit value of "0000". Then, the decoder 26B senses that the detected bit value of "0000" is equal to the bit value of "0000" of the check frame CHK, and determines that the data frames DFR_1 to DFR_3 are correct. Thereafter, the decoder 26B outputs the triple bit value of "0111", triple bit value of "1101" and triple bit value of "0010" of the three data frames DFR_1, three data frames DFR_2 and the three data frames DFR_3 as the data to be transmitted.

Thus, as the data frames DFR_1 to DFR_3 and delimiter frames KFR_1 to KFR_3 are transmitted alternately, the receiver 1002 enters into a state of waiting for a data frame when it has received a delimiter frame and enters into a state of waiting for a delimiter frame when it has received a data frame. As a result, the receiver 1002 correctly receives each of the data frames DFR_1 to DFR_3 three times. This allows the same data to be received correctly.

Figure 87:
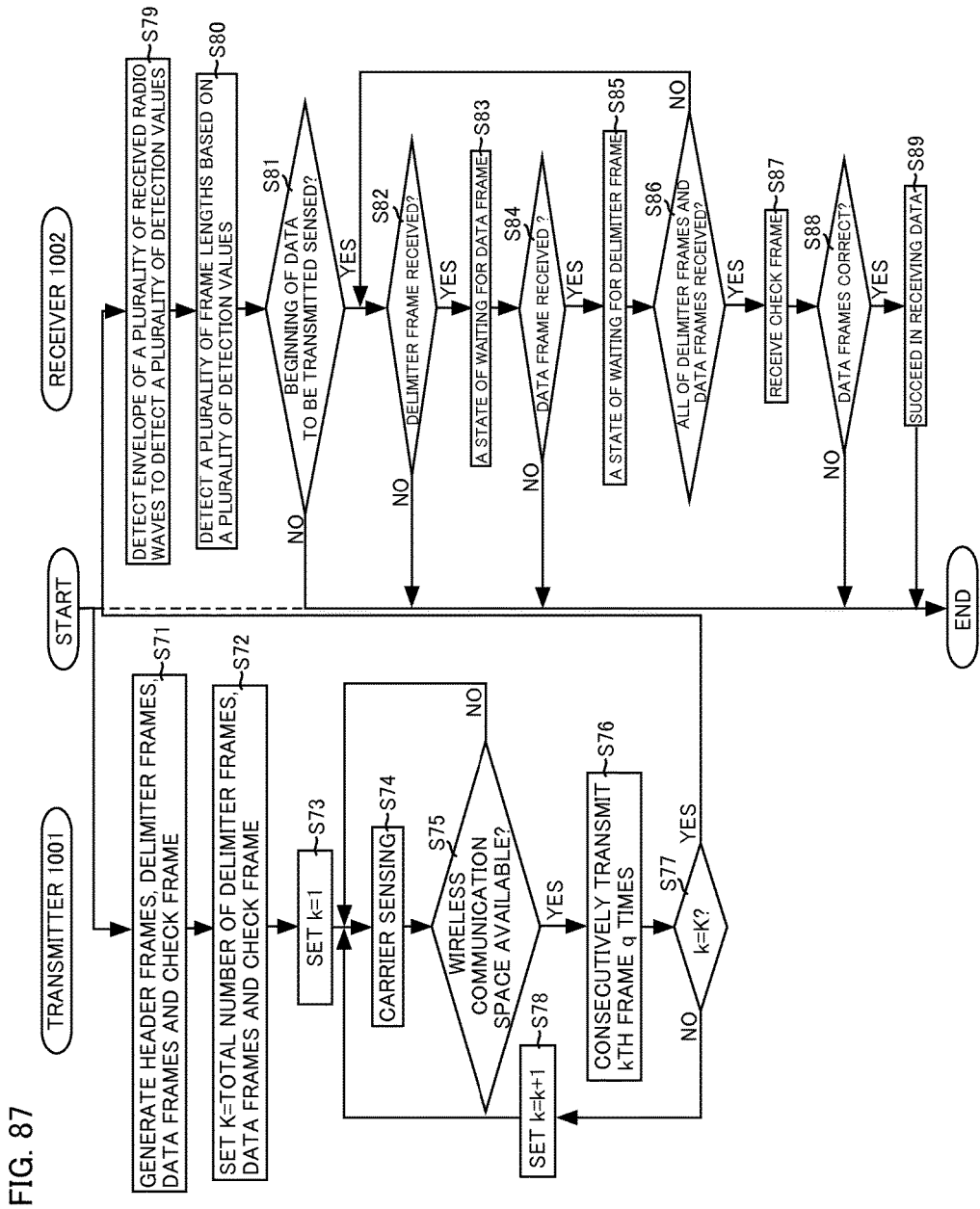
FIG. 87 is a flow chart illustrating the operation of the wireless communication system of FIG. 79.

FIG. 87 is a flow chart illustrating the operation of the wireless communication system 1000 of FIG. 79.

Referring to FIG. 87, when the operation is started, the transmitter 1001 generates the header frames HFR_1 to HFR_i, delimiter frames KFR_1 to KFR_m, data frames DFR_1 to DFR_n and check frame CHK in the manner described above (step S71).

Then, the transmitter 1001 sets K=total number of the delimiter frames KFR_1 to KFR_m, data frames DFR_1 to DFR_n and check frames CHK (step S72).

Thereafter, the same steps as steps S3 to S5 of the flow chart of FIG. 8 are sequentially executed (step S73 to S75).

If it is determined at step S75 that the wireless communication space is available, the transmitter 1001 consecutively transmits the kth frame q times (step S76).

Then, the transmitter 1001 determines whether k=K (step S77). If it is determined at step S77 that k=K is not true, the transmitter 1001 sets k=k+1 (step S78). Thereafter, the operation returns to step S74. Then, steps S74 to S78 described above are repeatedly executed until it is determined at step S77 that k=K.

If it is determined at step S77 that k=K, this circuitry that each of the delimiter frames KFR_1 to KFR_m, data frames DFR_1 to DFR_n and check frame CHK was consecutively transmitted q times.

After it is determined at step S77 that k=K, the receiver 1002 detects envelopes of a plurality of received radio waves to detect a plurality of detection values (step S79). Then, based on the plurality of wave detection values, the receiver 1002 detects a plurality of frame lengths in the manner described above (step S80).

Thereafter, the receiver 1002 determines whether it has sensed the beginning of the data to be transmitted by determining whether it has received the header frames HFR_1 to HFR_i (step S81).

If it is determined at step S81 that the beginning of the data to be transmitted has not been sensed, the operation ends.

On the other hand, if it is determined at step S81 that the beginning of the data to be transmitted has been sensed, the receiver 1002 determines whether it has received a delimiter frame in the manner described above (step S82).

If it is determined at step S82 that no delimiter frame has been received, the operation ends.

On the other hand, if it is determined at step S82 that a delimiter frame has been received, the receiver 1002 enters into a state of waiting for a data frame (step S83). Then, the receiver 1002 determines whether a data frame has been received in the manner described above (step S84).

If it is determined at step S84 that no data frame has been received, the operation ends.

On the other hand, if it is determined at step S84 that a data frame has been received, the receiver 1002 enters into a state of waiting for a delimiter frame (step S85). Then, the receiver 1002 determines whether all of the delimiter frames and data frames have been received (step S86).

If it is determined at step S86 that not all of the delimiter frames and data frames have been not received, the operation returns to step S82. Then, steps S82 to S86 described above are repeatedly executed until it is determined at step S86 that all of the delimiter frames and data frames have been received.

If it is determined at step S86 that all of the delimiter frames and data frames have been received, the receiver 1002 receives the check frame in the manner described above (step S87), and converts the frame lengths of the header frames HFR_1 to HFR_i, delimiter frames KFR_1 to KFR_m, data frames DFR_1 to DFR_n and check frame CHK to bit values in the manner described above.

Then, the receiver 1002 determines whether the data frames are correct in the manner described above (step S88).

If it is determined at step S88 that the data frames are not correct, the operation ends.

On the other hand, if it is determined at step S88 that the data frames are correct, the receiver 1002 has succeeded in receiving the data (step S89), and the operation ends.

Thus, as the data frames DFR_1 to DFR_3 and delimiter frames KFR_1 to KFR_3 are transmitted alternately, the receiver 1002 enters into a state of waiting for a data frame when it has received a delimiter frame and enters into a state of waiting for a delimiter frame when it has received a data frame (see steps S82 to S85). Therefore, the receiver can correctly receive each of the data frames DFR_1 to DFR_3 one or more times. Further, the same data can be received correctly.

In Embodiment 11, a delimiter frame may be inserted into the sequence of the header frames HFR_1 to HFR_i in the manner described above. In this case, the receiver enters into a state of waiting for a header frame or data frame when it has received a delimiter frame, and enters into a state of waiting for a delimiter frame when it has received a header frame or data frame. This allows the header frames HFR_1 to HFR_i and data frames DFR_1 to DFR_n to be received correctly.

In Embodiment 11, the operations of the transmitter 1001 and receiver 1002 may be carried out by a program. In such implementations, each of the transmitter 1001 and receiver 1002 includes a CPU, a ROM and a RAM. In the transmitter 1001, the ROM stores a program S including step S71 to S78 shown in FIG. 87, and the CPU reads the program S from the ROM and executes it. Thus, the operation of the transmitter 1001 is performed. In the receiver 1002, the ROM stores a program T including steps S79 to S89 shown in FIG. 87, and the CPU reads the program T from the ROM and executes it. Thus, the operation of the receiver 1002 is performed. Further, each of the ROMs of the transmitter 1001 and receiver 1002 corresponds to the storage medium storing a computer- (i.e. CPU-) readable program.

Otherwise, the description of Embodiment 11 is the same as those of Embodiments 1 to 8.

[Embodiment 12]

Embodiment 12 describes an implementation where a transmitter transmits data indicating a control action and a receiver receives the data indicating a control action to control a device. In this implementation, the control action includes an absolute control and a relative control. The absolute control is a control that is completed in one round, such as on and off. The relative control is a control that gradually changes the state of the device, such as up and down for sound volume.

If a relative control is to be performed, the control action may be transmitted a plurality of times in series, but even then, the receiver may fail to receive the control action transmitted in one of these transmission rounds, making it difficult to perform the desired control.

In view of this, the following describes a method for controlling correctly the device when a relative control is performed.

Figure 88:
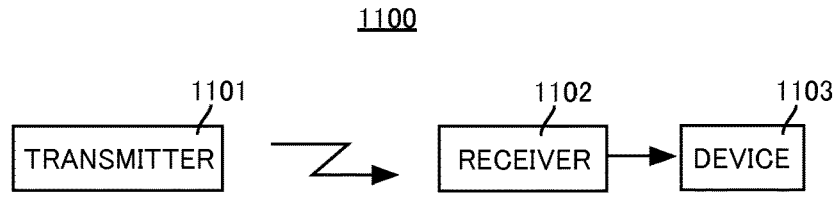
FIG. 88 is a schematic diagram of a wireless communication system according to Embodiment 12.

FIG. 88 is a schematic diagram of a wireless communication system according to Embodiment 12. Referring to FIG. 88, the wireless communication system 1100 according to Embodiment 12 includes a transmitter 1101 and receiver 1102.

The transmitter 1101 and receiver 1102 are positioned in a wireless communication space. The transmitter 1101 generates the header frames HFR_1 to HFR_i and data frames DFR_1 to DFR_n in the manner described above. In this case, the data frames DFR_1 to DFR_n have the frame lengths corresponding to the bit values indicating the control action of the device 1103.

Then, the transmitter 1101 transmits the header frames HFR_1 to HFR_i and data frames DFR_1 to DFR_n in the manner described below.

The receiver 1102 sequentially receives the header frames HFR_1 to HFR_i and data frames DFR_1 to DFR_n in the manner described below. Then, the receiver 1102 decodes the data frames DFR_1 to DFR_n into data, and outputs this data as the control action to the device 1103.

Figure 89:
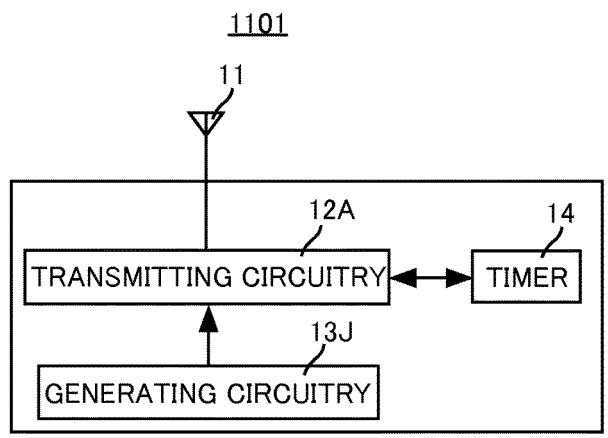
FIG. 89 is a schematic diagram of the transmitter of FIG. 88.

FIG. 89 is a schematic diagram of the transmitter of FIG. 88. Referring to FIG. 89, the transmitter 1101 is the same as the transmitter 1 except that the transmitting circuitry 12 of the transmitter 1 is replaced by a transmitting circuitry 12A, the generating circuitry 13 is replaced by a generating circuitry 13J, and a timer 14 is added.

The generating circuitry 13J refers to the correspondence table TBL-45 and generates the header frames HFR_1 to HFR_i having the frame lengths corresponding to the bit values representing header information, and refers to the correspondence table TBL1 to generate the data frames DFR_1 to DFR_n having the frame lengths corresponding to the bit values representing data to be transmitted (i.e. control action for the device 1103). Then, the generating circuitry 13J outputs the header frames HFR_1 to HFR_i and data frames DFR_1 to DFR_n that have been generated to the transmitting circuitry 12A.

The transmitting circuitry 12A receives the header frames HFR_1 to HFR_i and data frames DFR_1 to DFR_n. Then, when the timer 14 has measured the cycle Tt, the transmitting circuitry 122A consecutively transmits the header frame HFR_1 a plurality of times in accordance with the CSMA/CA scheme within the cycle Tt. Thereafter, when the timer 14 has measured the cycle Tt, the transmitting circuitry 12A consecutively transmits the header frame HFR_2 a plurality of times in accordance with the CSMA/CA scheme within the cycle Tt. In the same manner, each time the timer 14 measures the cycle Tt, the transmitting circuitry 12A consecutively transmits one header frame or one data frame a plurality of times in accordance with the CSMA/CA scheme within the cycle Tt to consecutively transmit each of the header frames HFR_3 to HFR_i and data frames DFR_1 to DFR_n a plurality of times.

The timer 14 measures the cycle Tt and provides the start timing and end timing of an cycle Tt to the transmitting circuitry 12A.

Figure 90:
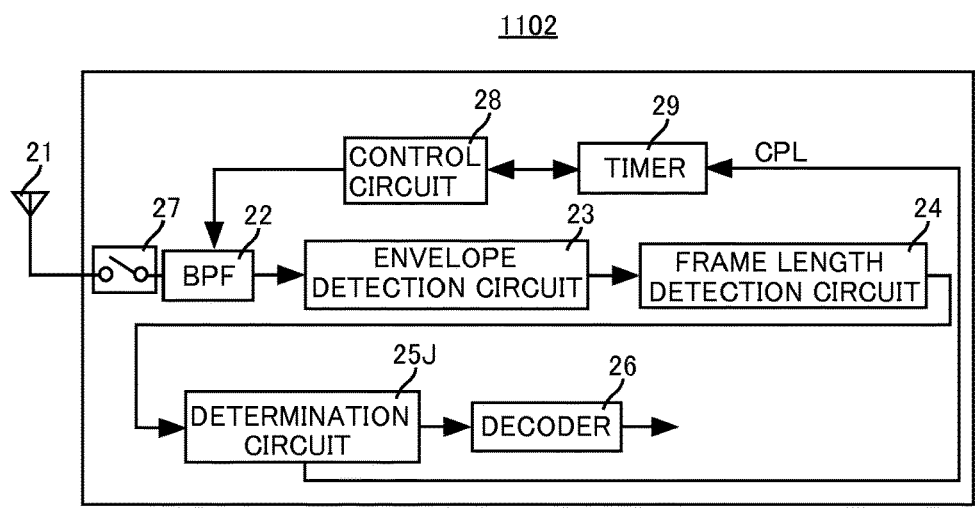
FIG. 90 is a schematic diagram of the receiver of FIG. 88.

FIG. 90 is a schematic diagram of the receiver of FIG. 88. Referring to FIG. 90, the receiver 1102 is the same as the receiver 2 except that the determination circuit 25 of the receiver 2 is replaced by a determination circuit 25J, and a switch 27, a control circuit 28 and a timer 29 are added.

The switch 27 is connected between the antenna 21 and BPF 22. The switch 27 is turned on and off depending on the control signal CTL from the control circuit 28. That is, the switch 27 is turned on when the control signal CTL is at H (i.e. logical high) level, and is turned off when the control signal CTL is at L (i.e. logical low) level.

When the control circuit 28 has received a start timing for a cycle Tr from the timer 29, it outputs a control signal CTL at L level to the switch 27, and, when it has received an end timing for the cycle Tr from the timer 29, it outputs a control signal CTL at H level to the switch 27.

Each time the timer 29 receives, from the determination circuit 25J, a completion signal CPL indicating that it has completed reception of frame lengths, it measures a cycle Tr, and outputs a start timing and end timing for the cycle Tr to the control circuit 28.

The determination circuit 25J holds the correspondence tables TBL1 and TBL-45. Then, the determination circuit 25J refers to the correspondence tables TBL1 and TBL-45 and, when it determines that a frame length received from the frame length detection circuit 24 is one of the frame lengths of the header frames HFR_1 to HFR_i or data frames DFR_1 to DFR_n, it outputs the completion signal CPL to the timer 29.

Further, if the determination circuit 25J has detected the beginning of the data to be transmitted based on the frame lengths of the header frames HFR_1 to HFR_i, it outputs the plurality of frame lengths of the header frames HFR_1 to HFR_i and data frames DFR_1 to DFR_n to the decoder 26.

The decoder 26 refers to the correspondence tables TBL1 and TBL-45 to convert the plurality of frame lengths received from the determination circuit 25J to bit sequences, and outputs the bit sequences corresponding to the data frames DFR_1 to DFR_n as a control action to the device 1103.

Figure 91:
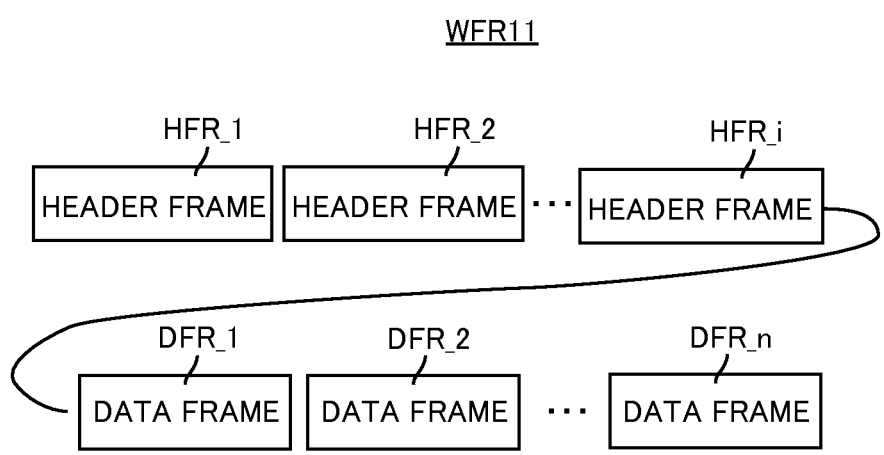
FIG. 91 schematically illustrates a radio frame according to Embodiment 12.

FIG. 91 schematically illustrates a radio frame according to Embodiment 12. Referring to FIG. 91, the radio frame WFR11 of Embodiment 12 includes header frames HFR_1 to HFR_i and data frames DFR_1 to DFR_n.

The data frames DFR_1 to DFR_n are positioned to follow the header frames HFR_1 to HFR_i.

Figure 92:
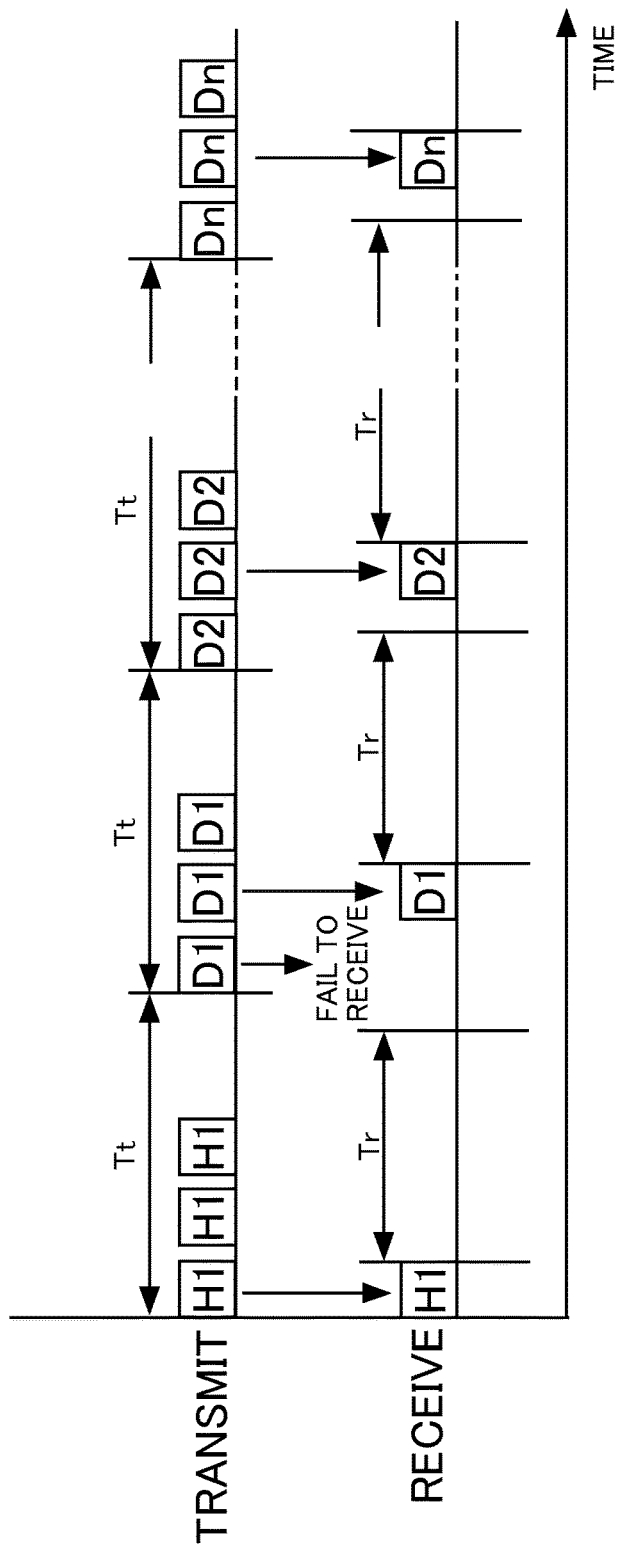
FIG. 92 conceptually illustrates the method of transmitting frames and the method of receiving frames according to Embodiment 12.

FIG. 92 conceptually illustrates the method of transmitting frames and the method of receiving frames according to Embodiment 12. FIG. 92 illustrates a method of transmitting and receiving frames in an example where each of the header frames and data frames is consecutively transmitted three times.

Referring to FIG. 92, within a first cycle Tt, the transmitter 1101 consecutively transmits the header frame H1 three times in accordance with the CSMA/CA scheme in synchronization with the start timing of the first cycle Tt.

Then, when the receiver 1102 has completed reception of the first header frames H1, it measures the first cycle Tr beginning at the timing at which it completed reception of the header frames H1, and stops receiving frames from the transmitter 1101 from the start timing to end timing for the first cycle Tr.

Thereafter, within a second cycle Tt, the transmitter 1101 consecutively transmits the data frame D1 three times in accordance with the CSMA/CA scheme in synchronization with the start timing of the second cycle Tt.

Then, the receiver 1102 fails to receive the first data frame D1 and succeeds in receiving the second data frame D1. Then, when the receiver 1102 has completed reception of the second data frame D1, it measures a second cycle Tr beginning at the timing at which it completed reception of the data frame D1, and stops receiving frames from the transmitter 1101 from the start timing to end timing for the second cycle Tr.

In the same manner, within a cycle Tt, the transmitter 1101 consecutively transmits each of the data frames D2 to Dn three times in accordance with the CSMA/CA scheme in synchronization with the start timing of the cycle Tt.

Then, for each of the data frames D2 to Dn, the receiver 1102 succeeds in receiving one of the first to third data frames (i.e. first to third data frames of one of the data frames D2 to Dn), and stops receiving frames from the transmitter 1101 in the time period of the cycle Tr beginning at the timing at which it completed reception of data frames.

Here, the following X, Y and N are prescribed.

X: maximum valid frame length of the header frame, data frame, sub-header frame, verification frame, end frame and delimiter frame;

Y: maximum frame transmission interval (for example, the time interval between H1 and H1); and N: number of frames for one communication sequence. N is an integer not smaller than 2.

As a result, the cycles Tt and Tr should meet the following conditions:

$$N(X+Y) \le Tt \qquad (1), \text{ and}$$

$$(N-1)(X+Y) \le Tr \le Tt-(\text{minimum frame length}) \qquad (2).$$

Equation (1) represents the condition that needs to be met to allow all the frames in one communication sequence to be transmitted.

Further, the timing at which reception of one frame is completed is the earliest if the receiver succeeds in receiving the first frame, then, the receiver must stop receiving frames in a time period where there is a possibility that it receives the remaining N−1 frames, and therefore, $(N-1)(X+Y) \le Tr$ is satisfied.

Then, the cycle Tr must end before transmission of the next frame is started, then, the cycle Tr is the longest when the first frame is received in one communication sequence, and therefore, Tr≤Tt−(minimum frame length) is satisfied.

Thus, Equation (2) above is the required condition.

Figure 93:
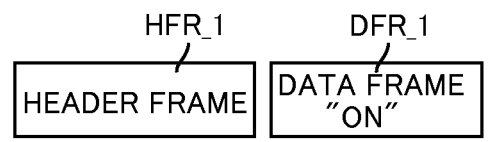
FIG. 93 illustrates a first specific example of a radio frame according to Embodiment 12.

FIG. 93 illustrates a first specific example of a radio frame WFR11 according to Embodiment 12. Referring to FIG. 93, the radio frame WFR11-1 includes the header frame HFR_1 and the data frame DFR_1. The header frame HFR_1 has the frame length corresponding to a bit value representing header information. The data frame DFR_1 has the frame length corresponding to a bit value indicating the control action of "on".

The generating circuitry 13J of the transmitter 1101 refers to the correspondence table TBL-45 to generate the header frame HFR_1 having the frame length corresponding to the bit value indicating the header information, and refers to the correspondence TBL1 to generate the data frame DFR_1 having the frame length corresponding to the bit value indicating the control action of "on".

Then, within the cycle Tt, the transmitting circuitry 12A consecutively transmits the header frame HFR_1 a plurality of times in synchronization with the start timing of the cycle Tt from the timer 14 in accordance with the CSMA/CA scheme, and then, again, within the cycle Tt, consecutively transmits the data frame DFR_1 a plurality of times in synchronization with the start timing of the cycle Tt from the timer 14 in accordance with the CSMA/CA scheme.

In the receiver 1102, the switch 27 is turned on, and the BPF 22 receives the received radio wave of one of the plurality of header frames HFR_1 transmitted within the first cycle Tt, and outputs those portions of the received radio wave received that have the frequency of the radio frame WFR11 to the envelope detection circuit 23.

Then, the envelope detection circuit 23 detects the envelope of the received radio wave portions from the BPF 22 and outputs the detection values to the frame length detection circuit 24. Based on the detection values from the envelope detection circuit 23, the frame length detection circuit 24 detects the frame length in the manner described above, and outputs the detected frame length to the determination circuit 25J.

The determination circuit 25J detects that the frame length received from the frame length detection circuit 24 is contained in the correspondence table TBL-45, and determines that the it has received the frame length of the header frame HFR_1. Then, the determination circuit 25J outputs the completion signal CPL to the timer 29 and outputs the frame length to the decoder 26.

In response to the completion signal CPL, the timer 29 measures the cycle Tr, and outputs the start timing and end timing for the cycle Tr to the control circuit 28. In response to the start timing for the cycle Tr, the control circuit 28 outputs the control signal CTL at L level to the switch 27, and, in response to the control signal CTL at L level, the switch 27 is turned off. Thus, the receiver 1102 stops receiving frames.

Thereafter, in response to the end timing for the cycle Tr, the control circuit 28 outputs the control signal CTL at H level to the switch 27, and, in response to the control signal CTL at H level, the switch 27 is turned on. Thus, the receiver 1102 enters into a state of being able to receive frame lengths.

Then, the BPF 22 receives the received radio wave of one of the plurality of data frames DFR_1 transmitted within the second cycle Tt, and outputs those portions of the received radio wave received that have the frequency of the radio frame WFR11 to the envelope detection circuit 23.

Then, the envelope detection circuit 23 detects the envelope of the received radio wave portions from the BPF 22 and outputs the detection values to the frame length detection circuit 24. Based on the detection values from the envelope detection circuit 23, the frame length detection circuit 24 detects the frame length in the manner described above, and outputs the detected frame length to the determination circuit 25J.

The determination circuit 25J detects that the frame length received from the frame length detection circuit 24 is contained in the correspondence table TBL1, and determines that it has received the frame length of the data frame DFR_1. Then, the determination circuit 25J outputs the completion signal CPL to the timer 29 and outputs the frame length to the decoder 26.

In response to the completion signal CPL, the timer 29 measures the cycle Tr, and outputs the start timing and end timing for the cycle Tr to the control circuit 28. In response to the start timing for the cycle Tr, the control circuit 28 outputs the control signal CTL at L level to the switch 27, and, in response to the control signal CTL at L level, the switch 27 is turned off. Thus, the receiver 1102 stops receiving frame lengths.

The decoder 26 receives the frame length of the header frame HFR_1 and the frame length of the data frame DFR_1, refers to the correspondence table TBL-45 to convert the frame length of the header frame HFR_1 to a bit sequence, and senses the beginning of the data to be transmitted. Thereafter, the decoder 26 refers to the correspondence table TBL1 to convert the frame length of the data frame DFR_1 to a bit sequence, and outputs the bit sequence that indicates the control action of "on" to the device 1103. Thus, the device 1103 is turned "on".

The device 1103 is turned "off" in the same manner.

Figure 94:
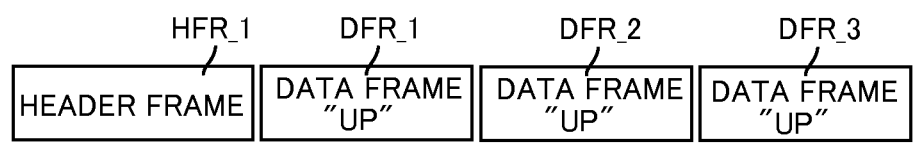
FIG. 94 illustrates a second specific example of a radio frame according to Embodiment 12.

FIG. 94 illustrates a second specific example of the radio frame WFR11 according to Embodiment 12.

Referring to FIG. 94, the radio frame WFR11-2 includes the header frame HFR_1 and data frames DFR_1 to DFR_3. The header frame HFR_1 has the frame length corresponding to the bit value indicating the header information. The data frames DFR_1 to DFR_3 has the frame length corresponding to the bit value indicating the control action of "up".

The generating circuitry 13J of the transmitter 1101 refers to the correspondence table TBL-45 to generate the header frame HFR_1 having the frame length corresponding to the bit value indicating the header information, and refers to the correspondence table TBL1 to generate the data frames DFR_1 to DFR_3 having the frame length corresponding to the bit value indicating the control action of "up".

Within the cycle Tt, the transmitting circuitry 12A consecutively transmits each of the header frame HFR_1 and data frames DFR_1 to DFR_3 a plurality of times in the manner described above.

Within the cycle Tt, the receiver 1102 completes reception of the frame lengths of the header frame HFR_1 and data frames DFR_1 to DFR_3 in the manner described above, and converts the frame lengths of the header frame HFR_1 and data frames DFR_1 to DFR_3 to bit sequences.

Then, the receiver 1102 outputs the three bit sequences of the data frames DFR_1 to DFR_3 to the device 1103. Thus, the device 1103 increases its sound volume by three steps, for example, or increases its brightness by three steps.

The device 1103 decreases its sound volume or brightness in the same manner.

Figure 95:
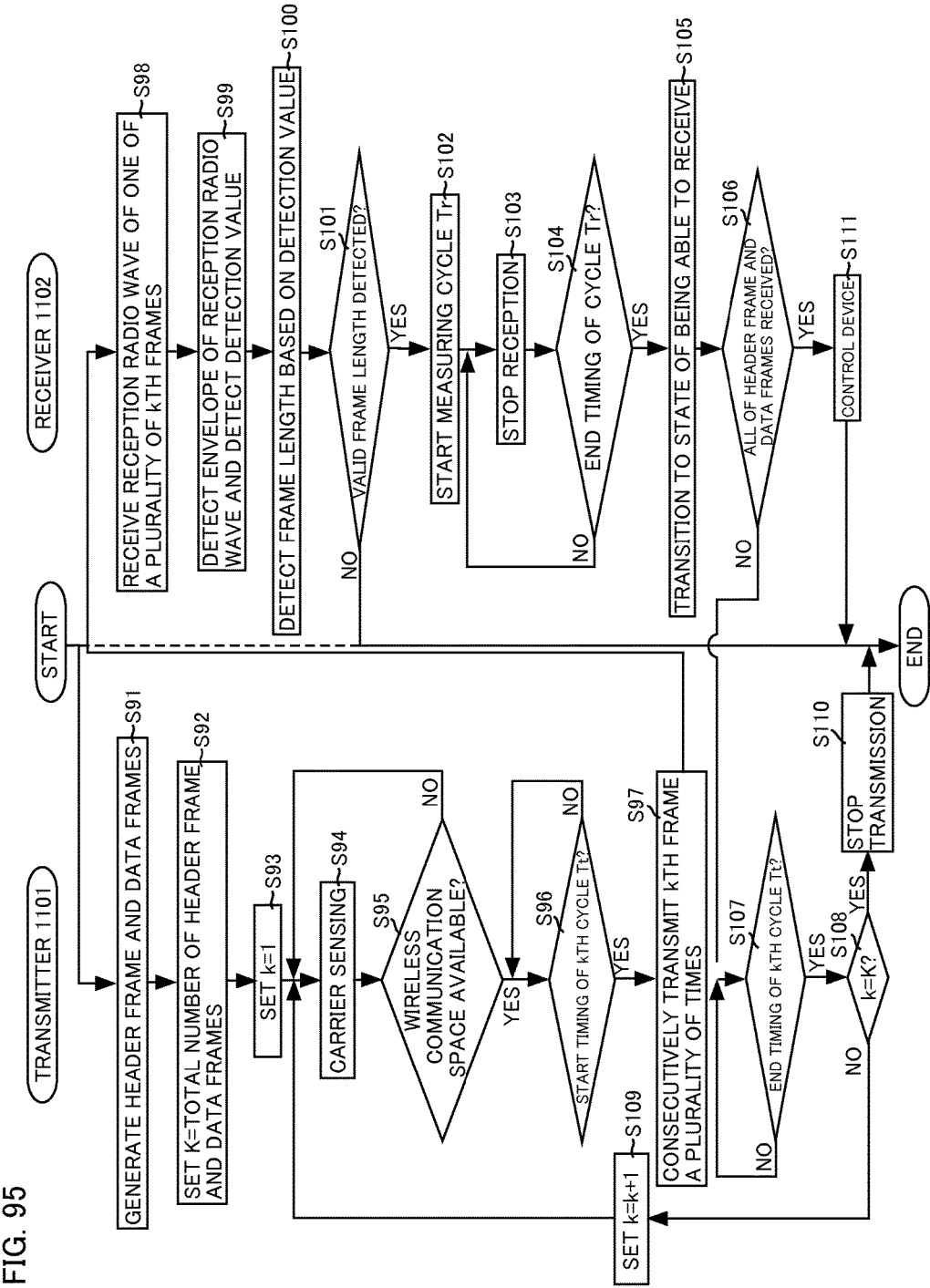
FIG. 95 is a flow chart illustrating the operation of the wireless communication system of FIG. 88.

FIG. 95 is a flow chart illustrating the operation of the wireless communication system of FIG. 88. Referring to FIG. 95, when the operation is started, the transmitter 1101 generates the header frames HFR_1 to HFR_i and data frames DFR_1 to DFR_n in the manner described above (step S91). Then, the transmitter 1101 sets K=total number of the header frames HFR_1 to HFR_i and data frames DFR_1 to DFR_n (step S92).

Thereafter, the transmitter 1101 sets k=1 (step S93), and performs carrier sensing (step S94).

Based on the result of carrier sensing, the transmitter 1101 determines whether the wireless communication space is available (step S95), and, if it determines that the wireless communication space is available, it further determines whether the current timing is the start timing for the kth cycle Tt (step S96). If it determines that the current timing is the start timing for the kth cycle Tt, the transmitter 1101 consecutively transmits the kth frame a plurality of times (step S97).

Thereafter, the receiver 1102 receives the received radio wave of one of the plurality of the kth frames (step S98). Then, the receiver 1102 detects the envelope of the received radio wave and detects the detection values (step S99), and detects the frame length based on the detection value (step S100).

The receiver 1102 determines whether it has detected a valid frame length in the manner described above (step S101). If it is determined at step S101 that no valid frame length has been detected, the operation ends.

On the other hand, if it is determined at step S101 that a valid frame length has been detected, the receiver 1102 starts measuring the cycle Tr (step S102), and stops reception (step S103).

Thereafter, the receiver 1102 determines whether the current time is the end timing for the cycle Tr (step S104), and, if it is determined that the current time is the end timing for the cycle Tr, it transitions to the state in which it is ready to receive (step S105).

Then, the receiver 1102 determines whether it has received all of the header frames and data frames (step S106).

If it is determined at step S106 that all of the header frames and data frames have been not received, the transmitter 1101 determines whether the current time is the end timing for the kth cycle Tt (step S107), and, if it determines that the current time is the end timing for the kth cycle Tt, it further determines whether k=K (step S108). If it is determined at step S108 that k=K is not true, the transmitter 1101 sets k=k+1 (step S109). Thereafter, the operation returns to step S94, and steps S94 to S108 described above are repeatedly executed until it is determined at step S108 that k=K.

If it is determined at step S108 that k=K, the transmitter 1101 stops transmission (step S110).

On the other hand, if the receiver 1102 determines at step S106 that it has received all of the header frames and data frames, it converts the header frames HFR1 to HFR_i and data frames DFR_1 to DFR_n to bit sequences in the manner described above, and outputs the bit sequences of the data frames DFR_1 to DFR_n to the device 1103 to control the device 1103 (step S111). Then, after steps S110 and S111, the operation ends.

Thus, the following is performed for all of the header frames and data frames within one cycle Tt: the transmitter 1101 consecutively transmits one frame a plurality of times, and the receiver 1102 receives one of the plurality of frame lengths transmitted by the transmitter 1101.

This ensures that each of the header frames and data frames is absolutely received and, even when the device 1103 is under relative control, the device 1103 can be correctly controlled.

In the above description, the radio frame WFR11 includes the header frames HFR_1 to HFR_i and data frames DFR_1 to DFR_n, Embodiment 12 is not limited to such an implementation, and the radio frame WFR11 may further include at least one of the sub-header frame SHFR, verification frame VFR, end frame FFR, delimiter frame KFR and check frame CHK, described above.

Now, application examples of the wireless communication system 1100 will be described.

APPLICATION EXAMPLE 1

Figure 96:
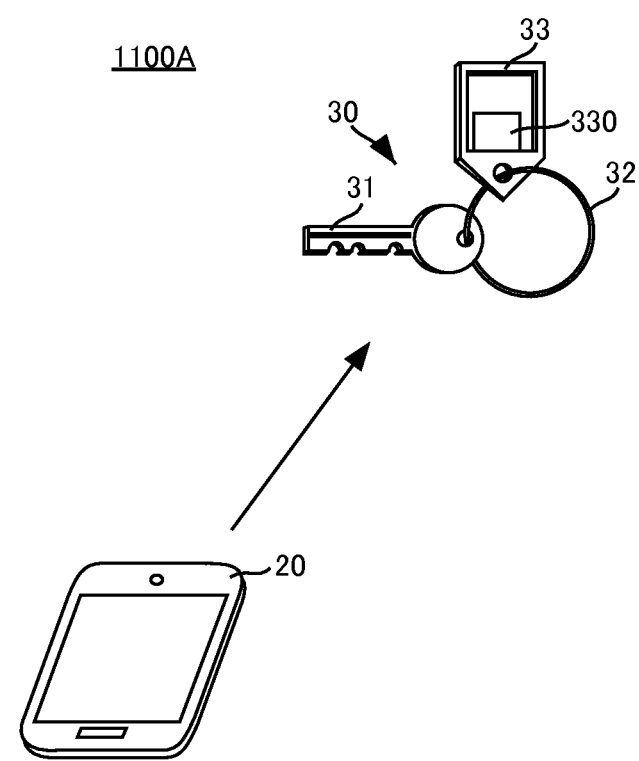
FIG. 96 is a schematic view of the constitution of Application Example 1.

FIG. 96 is a schematic view of the constitution of Application Example 1. Referring to FIG. 96, a control system 1100A according to Application Example 1 includes a smartphone 20 and a key 30.

The smartphone 20 includes the constitution of the transmitter 1101 shown in FIG. 88. The key 30 is carried around by the user of the smartphone 20.

The key 30 includes a key body 31, a ring 32 and a tab 33. The key body 31 is connected to the tab 33 via the ring 32.

The tab 33 includes a receiver 330, and the receiver 330 has the same constitution as the receiver 1102 shown in FIG. 88.

The smartphone 20 uses GPS, for example, to acquire a current position and a current time. Then, the smartphone 20 places the bit sequence indicating the current position and the bit sequence indicating the current time on the data frames DFR_1 to DFR_n and transmits them to the receiver 330 of the key 30.

The receiver 330 receives the radio frame WFR11 from the smartphone 20. Then, based on the received radio wave, the receiver 330 detects the bit sequences of the data frames DFR_1 to DFR_n in the manner described above, and stores in the storage unit the current position and current time in an associated manner.

In this way, in Application Example 1, the smartphone 20 acquires a current position and a current time at fixed intervals and transmits the acquired current position and current time to the receiver 330 of the key 30, and the receiver 330 stores in the storage unit the current position of the smartphone 20 and current time in an associated manner.

As a result, if by any chance the user of the smartphone 20 loses the smartphone 20, he will know where and when he lost the smartphone 20 if he acquires the current positions and current times stored in the receiver 330 of the key 30. That is, the last current position and current time stored in the receiver 330 indicate where and when the smartphone 20 was lost since no current position of the smartphone 20 and current time may be stored in the receiver 330 without the smartphone 20.

In Application Example 1, the key 30 may be replaced by a watch; in generally, any object that the user of the smartphone 20 carries may be used.

As described above, in Application Example 1, information that allows the user of the smartphone 20 to know where and when he lost the smartphone 20 is transmitted to the receiver 330 mounted on an object carried by the user, where the information stored by the receiver 330 may be any information that allows the user to know where and when he lost the smartphone 20.

Thus, in generally, Application Example 1 may be employed in cases where it is desired to know where and when a smartphone 20 was lost.

Alternatively, in Application Example 1, the smartphone 20 may transmit, instead of both a current position and current time, only a current time to the key 30 and the receiver 330 may store only the current time received from the smartphone 20 in the storage unit. If the user of the smartphone 20 knows the time when the receiver 330 ceased to receive time information from the smartphone 20, he may try to remember where he was at that time and look for the smartphone 20.

APPLICATION EXAMPLE 2

Figure 97:
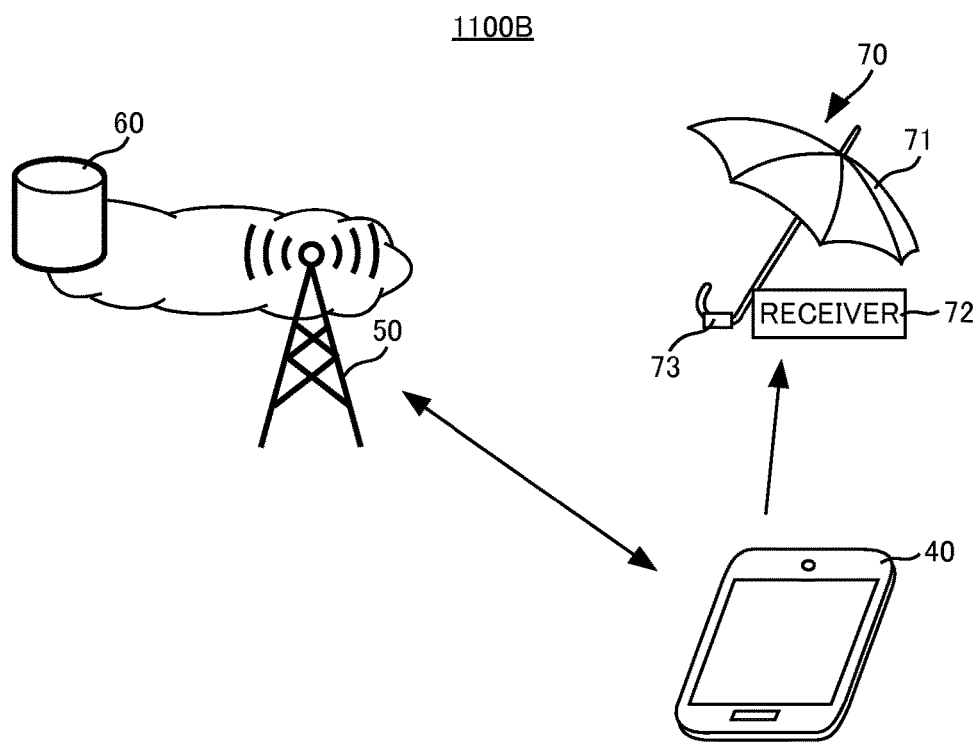
FIG. 97 is a schematic view of the constitution of Application Example 2.

FIG. 97 is a schematic view of the constitution of Application Example 2. Referring to FIG. 97, the control system 1100B of Application Example 2 includes a smartphone 40, a base station 50, a cloud server 60 and a rain item 70.

The smartphone 40 includes the constitution of the transmitter 1101 described above.

The rain item 70 includes an umbrella 71, a receiver 72 and a Light Emitting Device (LED) 73. The receiver 72 has the same constitution as the receiver 1102 described above. The receiver 72 and LED 73 are mounted on the umbrella 71.

The smartphone 40 uses an application program installed thereon to automatically access the cloud server 60 via a wireless access network (a 3G link) of the base station 50, and acquires a weather forecast from the cloud server 60.

Then, the smartphone 40 places a bit sequence indicating the weather forecast on the data frames DFR_1 to DFR_n and transmits them to the receiver 72 of the rain item 70.

The receiver 72 receives the radio frame WFR11 from the smartphone 40. Then, based on the received radio wave, the receiver 72 detects the bit sequence in the manner described above and determines the content of the weather forecast based on the detected bit sequence, and, if the weather forecast says that it will rain, controls the LED 73 to be turned on. Then, the LED 73 is turned on in accordance with control by the receiver 72.

In this way, the smartphone 40 transmits another information acquired via a network (i.e. a weather forecast) to the rain item 70 being controlled. Thus, the user of the smartphone 40 can go out to have to not forget the rain item 70.

In Application Example 2, if the weather forecast says that it will rain, the umbrella 71 may be opened instead of the LED 73 being turned on.

In generally, as described above, Application Example 2 may be employed in cases where the user of the smartphone 40 does not forget carrying an object that he must carry when he goes out.

APPLICATION EXAMPLE 3

Figure 98:
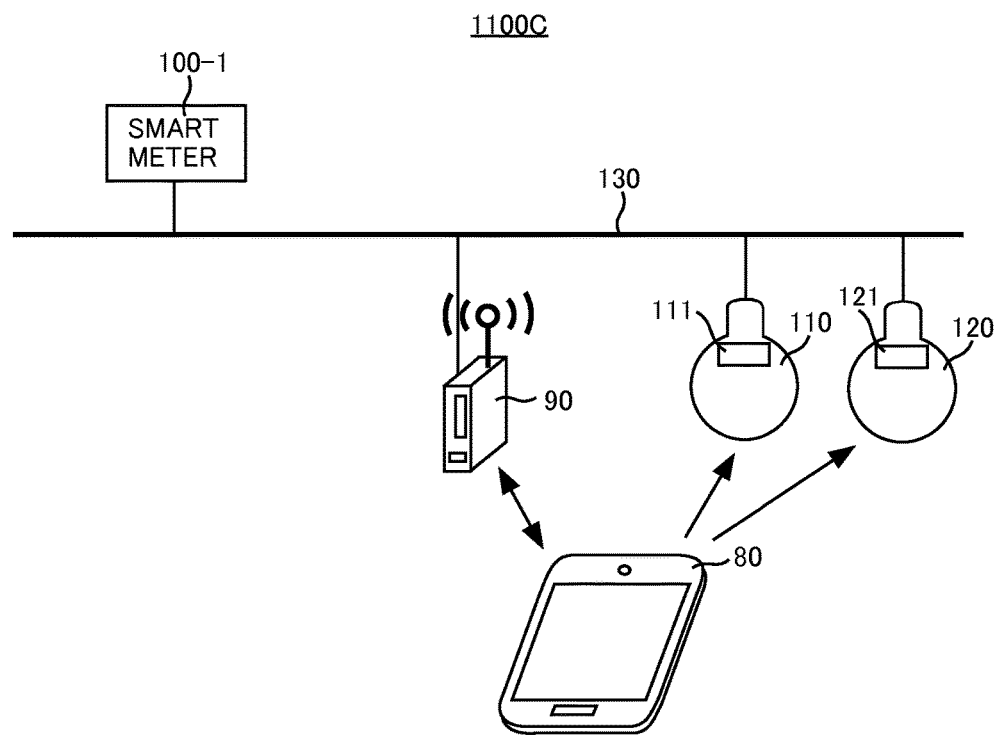
FIG. 98 is a schematic view of the constitution of Application Example 3.

FIG. 98 is a schematic view of the constitution of Application Example 3. Referring to FIG. 98, a control system 1100C of Application Example 3 includes a smartphone 80, an access point 90, a smart meter 100-1, lights 110 and 120, and a control line 130.

The access point 90, smart meter 100-1 and lights 110 and 120 are connected to the control line 130. The control 130 may comply with any standards.

The smartphone 80 includes the constitution of the transmitter 1101 described above. The light 110 includes a receiver 111 and the light 120 includes a receiver 121. Each of the receivers 111 and 121 has the same constitution as the receiver 1102 described above.

The smartphone 80 uses an usual method to establish a radio link with the access point 90. Then, the smartphone 80 accesses the access point 90 to transmit its authentication information to the access point 90, and inquires of the access point 90 whether the lights 110 and 120 are controllable.

In response to the inquiry by the smartphone 80, the access point 90 requests the smart meter 100-1 so as to transmit to itself the value of power that can be supplied to the two lights 110 and 120. In response to the request by the access point 90, the smart meter 100-1 transmits to the access point 90 the value of power that can be supplied to the two lights 110 and 120.

The access point 90 receives from the smart meter 100-1 the value of power that can be supplied to the two lights 110 and 120. The access point 90 holds in advance the value of power that allows the two lights 110 and 120 to be turned on. The access point 90 determines whether the smartphone 80 is an authenticated one based on the authentication information received from the smartphone 80. If the access point 90 determines that the smartphone 80 is an authenticated one, it determines whether the value of power that can be supplied to the two lights 110 and 120 is larger than the value of power that allows the two lights 110 and 120 to turn on. If the value of power that can be supplied is larger than the value of power that allows the two lights 110 and 120 to turn on, the access point 90 permits that the smartphone 80 controls the lights 110 and 120. Then, the access point 90 transmits, to the lights 110 and 120 via the control line 130, a signal that allows the lights 110 and 120 to be controlled by the smartphone 80. Thus, controls are possible through the control line 130.

If the smartphone 80 is permitted by the access point 90 to control the lights 110 and 120, it places a bit sequence indicating control actions for controlling the lighting intensity of the lights 110 and 120 on the data frames DFR_1 to DFR_n and transmits them to the receivers 111 and 121, respectively, in accordance with the same operations as the transmitter 1101.

The receiver 111 receives a radio frame from the smartphone 80. Then, based on the received radio wave, the receiver 111 detects the bit sequence in the manner described above, and controls the lighting intensity of the light 110 based on the detected bit sequence.

The receiver 121 receives a radio frame from the smartphone 80. Then, based on the received radio wave, the receiver 121 detects the bit sequence in the manner described above, and controls the lighting intensity of the light 120 based on the detected bit sequence.

Thus, in Application Example 3, the smartphone 80 can control the lights 110 and 120 on the conditions that it is allocated to the access point 90 and it has obtained permission from the access point 90 to control the lights 110 and 120.

Further, the controlling of the lights 110 and 120 by the smartphone 80 may be limited to the time period in which controls are possible through the control line 130.

In generally, as described above, Application Example 3 may be employed in cases where the controlling of the controlled devices (i.e. lights 110 and 120) is to be restricted based on local information held by the smart meter 100-1 and the authentication information of the smartphone 80 held by the access point 90.

APPLICATION EXAMPLE 4

Figure 99:
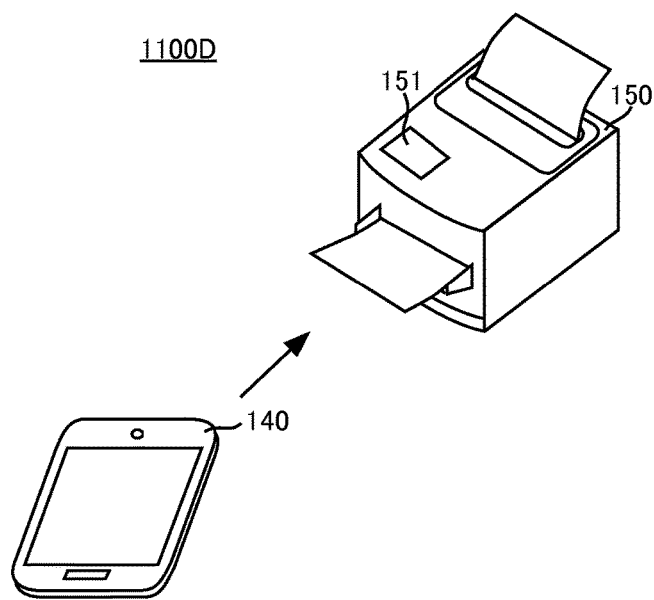
FIG. 99 is a schematic view of the constitution of Application Example 4.

FIG. 99 is a schematic view of the constitution of Application Example 4. Referring to FIG. 99, a control system 1100D according to Application Example 4 includes a smartphone 140 and printer 150.

The smartphone 140 has the same constitution as the transmitter 1101 described above. The printer 150 includes a receiver 151. The receiver 151 has the same constitution as the receiver 1102 described above.

The smartphone 140 and printer 150 are provided in the same room. That is, the printer 150 is located near the smartphone 140. The printer 150 gets on standby at a low power consumption if it has not been used for a certain period of time (for example, 10 minutes). The low power consumption may be 10% to 30% of the power consumption found during normal operation, for example; in generally, any value smaller than the power consumption found during normal operation may be used.

The smartphone 140 places a bit sequence indicating a control action for the printer 150 on the data frames DFR_1 to DFR_n and transmits them to the receiver 151 of the printer 150.

The receiver 151 receives the radio frame from the smartphone 140. Then, based on the received radio wave, the receiver 151 detects the bit sequence in the manner described above, and activates the printer 150 based on the detected bit sequence.

After the printer 150 is activated in accordance with control by the receiver 151, it gets on standby at a low power consumption if a certain period of time goes by after the completion of use by the holder of the smartphone 140.

In this way, in Application Example 4, the smartphone 140 activates the printer 150 located near itself. Thus, when the holder of the smartphone 140 desires to use the printer 150, he may remotely activate the printer 150 to print various data. Also, the power consumption of the printer 150 may be saved.

Alternatively, in Application Example 4, the control system 1100D may include a personal computer instead of the smartphone 140. In this case, the personal computer activates the printer 150 in accordance with the same operations as the smartphone 140.

The printer 150 may be in any position that can be associated with the positional information of the smartphone 140.

APPLICATION EXAMPLE 5

Figure 100:
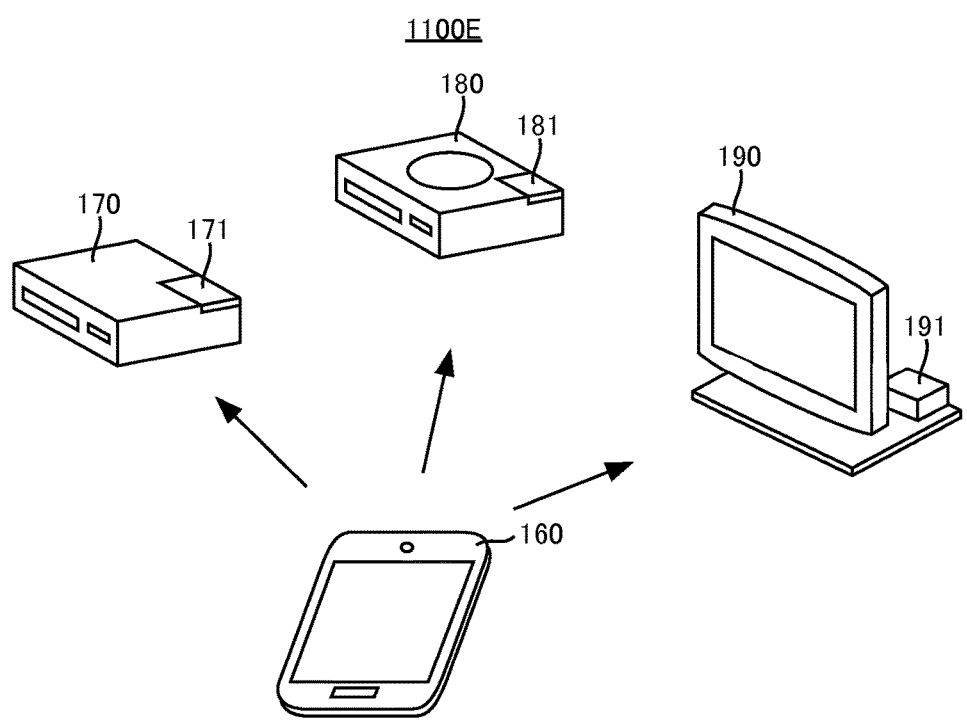
FIG. 100 is a schematic view of the constitution of Application Example 5.

FIG. 100 is a schematic view of the constitution of Application Example 5. Referring to FIG. 100, a control system 1100E according to Application Example 5 includes a smartphone 160, a VTR 170, a game machine 180 and a television 190.

The smartphone 160, VTR 170, game machine 180 and television 190 are positioned in one house.

The smartphone 160 has the same constitution as the transmitter 1101 described above. The VTR 170 includes a receiver 171. The game machine 180 includes a receiver 181. The television 190 includes a receiver 191. Each of the receivers 171, 181 and 191 has the same constitution as the receiver 1102 described above.

In a manner similar to that in the transmitter 1101, the smartphone 160 places a bit sequence indicating one of the control action of turning on the VTR 170, the control action of turning off the VTR 170, the control action of increasing the sound volume of the VTR 170 and the control action of reducing the sound volume of the VTR 170 on the data frames DFR_1 to DFR_n and transmits them to the receiver 171.

In a manner similar to that in the transmitter 1101, the smartphone 160 places a bit sequence indicating one of the control action of turning on the game machine 180, the control action of turning off the game machine 180, the control action of increasing the sound volume of the game machine 180 and the control action of reducing the sound volume of the game machine 180 on the data frames DFR_1 to DFR_n and transmits them to the receiver 181.

In a manner similar to that in the transmitter 1101, the smartphone 160 places a bit sequence indicating one of the control action of turning on the television 190, the control action of turning off the television 190, the control action of increasing the sound volume of the television 190 and the control action of reducing the sound volume of the television 190 on the data frames DFR_1 to DFR_n and transmits them to the receiver 191.

The receiver 171 of the VTR 170 receives the radio frame from the smartphone 160. Based on the received radio wave, the receiver 171 detects the bit sequence in the manner described above, and, based on the detected bit sequence, turns on the VTR 170, turns off the VTR 170, increases the sound volume of the VTR 170, or reduces the sound volume of the VTR 170.

The receiver 181 of the game machine 180 receives the radio frame from the smartphone 160. Based on the received radio wave, the receiver 181 detects the bit sequence in the manner described above, and, based on the detected bit sequence, turns on the game machine 180, turns off the game machine 180, increases the sound volume of the game machine 180, or reduces the sound volume of the game machine 180.

The receiver 191 of the television 190 receives the radio frame from the smartphone 160. Based on the received radio wave, the receiver 191 detects the bit sequence in the manner described above, and, based on the detected bit sequence, turns on the television 190, turns off the television 190, increases the sound volume of the television 190, or reduces the sound volume of the television 190.

In this way, in Application Example 5, the smartphone 160 controls home electronics in a home to turn on/off and to increase/decrease the sound volume. Thus, the smartphone 160 may be used as a remote controller for home electronics.

APPLICATION EXAMPLE 6

Figure 101:
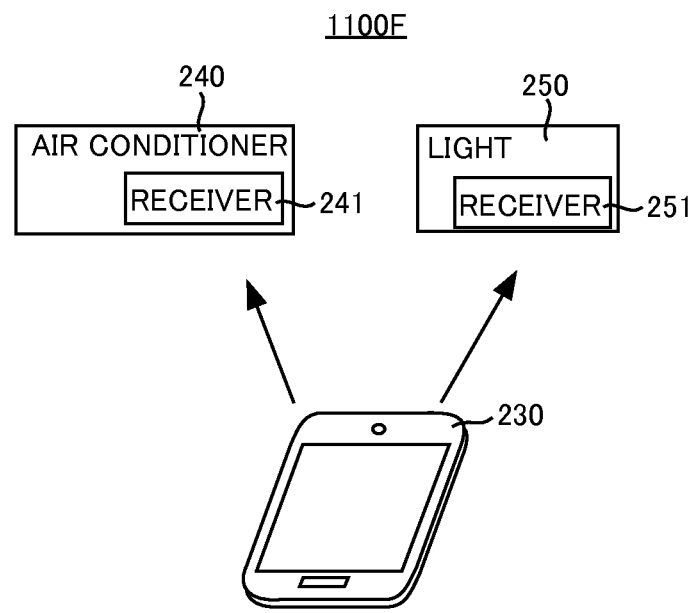
FIG. 101 is a schematic view of the constitution of Application Example 6.

FIG. 101 is a schematic view of the constitution of Application Example 6. Referring to FIG. 101, a control system 1100F according to Application Example 6 includes a smartphone 230, an air conditioner 240 and a light 250.

The smartphone 230 is carried by a person working in an office or commercial facilities. The air conditioner 240 and light 250 are positioned in the office or commercial facilities.

The smartphone 230 has the same constitution as the transmitter 1101 described above. The air conditioner 240 includes a receiver 241. The light 250 includes a receiver 251. Each of the receivers 241 and 251 has the same constitution as the receiver 1102 described above.

In a manner similar to that in the transmitter 1101, the smartphone 230 places a bit sequence indicating the control action of saving the electricity used by the air conditioner 240 or a control action that depends on the desire of the holder of the smartphone 230 on the data frames DFR_1 to DFR_n and transmits them to the receiver 241. Control actions that depend on the desire of the holder of the smartphone 230 include, for example, causing relatively strong ventilation, causing relatively week ventilation, setting the temperature to a relatively high level, setting the temperature to a relatively low level, and ensuring that the holder of the smartphone 230 is not exposed to direct airflow from the air conditioner.

In a manner similar to that in the transmitter 1101, the smartphone 230 places a bit sequence indicating the control action of saving the electricity used by the light 250, or a control action that depends on the desire of the holder of the smartphone 230 on the data frames DFR_1 to DFR_n and transmits them to the receiver 251. Controls actions that depend on the desire of the holder of the smartphone 230 include, for example, increasing the brightness and reducing the brightness.

The receiver 241 of the air conditioner 240 receives the radio frame from the smartphone 230. Then, based on the received radio wave, the receiver 241 detects the bit sequence in the manner described above, and, based on the detected bit sequence, increases the ventilation of the air conditioner 240, reduces the ventilation of the air conditioner 240, sets the temperature to be achieved by the air conditioner 240 to a high level, or sets the temperature to be achieved by the air conditioner 240 to a low level.

The receiver 251 of the light 250 receives a radio frame from the smartphone 230. Then, based on the received radio wave, the receiver 251 detects the bit sequence in the manner described above, and, based on the detected bit sequence, increases the brightness of the light 250 or reduces the brightness of the light 250.

In this way, in Application Example 6, a person working in the office or commercial facilities may use his own smartphone 230 to save the electricity used by the air conditioner 240 and light 250 or control the air conditioner 240 and light 250 as he wishes, while staying at his own desk.

Thus, energy conservation can be achieved in an office or commercial facilities. Also, the interior of the office or commercial facilities may be made more comfortable.

Alternatively, in Application Example 6, the control system 1100F may include an electric device other than the air conditioner 240 and light 250, and may include any electric device that is positioned in an office or commercial facilities.

The receivers 241 and 251 may be any receivers that are positioned in a building, in facilities or above facilities and are capable of controlling the air conditioner 240 and light 250 (i.e. the controlled elements) depending on the desire of a person using the building or facilities.

APPLICATION EXAMPLE 7

Figure 102:
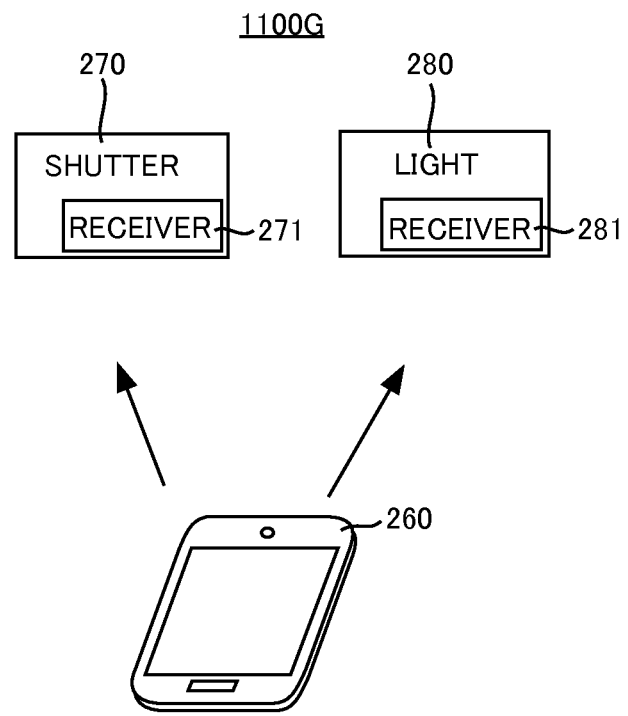
FIG. 102 is a schematic view of the constitution of Application Example 7.

FIG. 102 is a schematic view of the constitution of Application Example 7. Referring to FIG. 102, a control system 1100G according to Application Example 7 includes a smartphone 260, a shutter 270 and a light 280.

The smartphone 260 is held by a resident of a building (for example, an apartment) including a living space in which the resident lives and a space for common use. The shutter 270 and light 280 are positioned in the space for common use in this building.

The smartphone 260 has the same constitution as the transmitter 1101 described above. The shutter 270 includes a receiver 271. The light 280 includes a receiver 281. Each of the receivers 271 and 281 has the same constitution as the receiver 1102 described above.

In a manner similar to that in the transmitter 1101, the smartphone 260 places a bit sequence indicating the control action of opening the shutter 270 or the control action of closing the shutter 270 on the data frames DFR_1 to DFR_n and transmits them to the receiver 271.

In a manner similar to that in the transmitter 1101, the smartphone 260 places a bit sequence indicating the control action of turning on the light 280 or the control action of turning off the light 280 on the data frames DFR_1 to DFR_n and transmits them to the receiver 281.

The receiver 271 of the shutter 270 receives the radio frame from the smartphone 260. Then, based on the received radio wave, the receiver 271 detects the bit sequence in the manner described above, and, based on the detected bit sequence, opens the shutter 270 or closes the shutter 270.

The receiver 281 of the light 280 receives the radio frame from the smartphone 260. Then, based on the received radio wave, the receiver 281 detects the bit sequence in the manner described above, and, based on the detected bit sequence, turns on the light 280 or turns off the light 280.

In this way, in Application Example 7, a resident of an apartment or the like may use his smartphone 260 to control the shutter 270 and light 280 positioned in the space for common use of the apartment or the like.

Thus, the electricity used by electric devices positioned in a space for common use of an apartment or the like may be saved. Further, an electric device positioned in a space for common use of an apartment or the like may be freely controlled, thereby making the life in the apartment or the like more comfortable.

Alternatively, in Application Example 7, the control system 1100G may include an electric device other than the shutter 270 and light 280; in generally, the system may include any electric device that is positioned in a space for common use of an apartment or the like.

The electric device may be controlled by a plurality of smartphones 260 (i.e. a plurality of transmitters 1101) carried by a plurality of persons.

APPLICATION EXAMPLE 8

Figure 103:
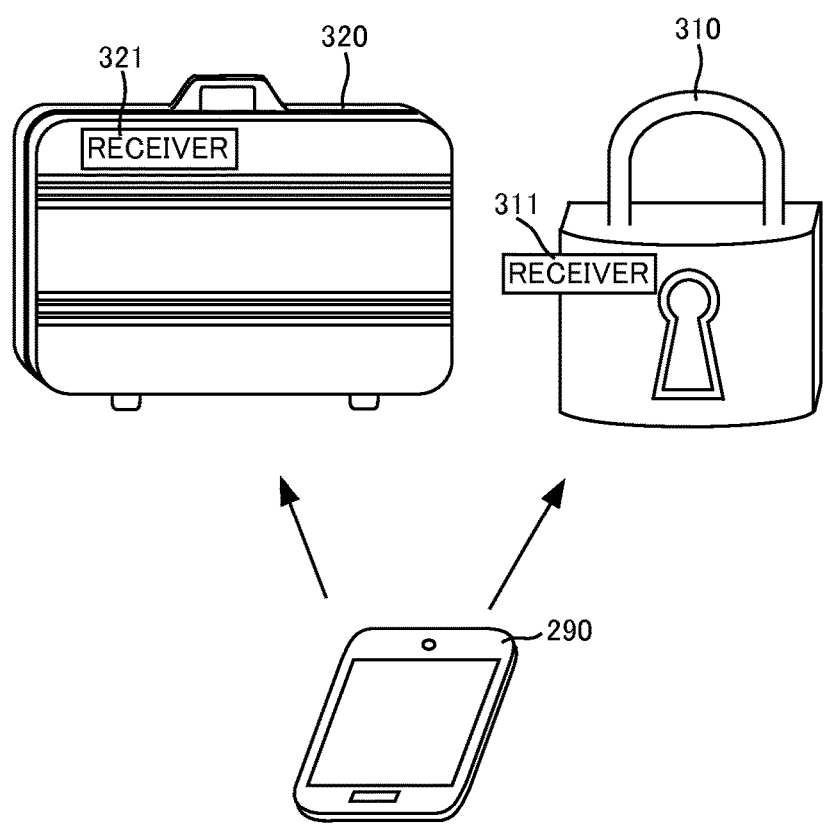
FIG. 103 is a schematic view of the constitution of Application Example 8.

FIG. 103 is a schematic view of the constitution of Application Example 8. Referring to FIG. 103, a control system 1100H according to Application Example 8 includes a smartphone 290, a lock 310 and a case 320.

The smartphone 290 has the same constitution as the transmitter 1101 described above. The lock 310 and case 320 are objects carried by the user of the smartphone 290. The lock 310 includes a receiver 311 and the case 320 includes a receiver 321. Each of the receivers 311 and 321 has the same constitution as the receiver 1102 described above. In this case, the receiver 311 controls a display device. The receiver 321 controls a Light Emitting Device (LED) or speaker.

When the case 320 is controlled, the smartphone 290 places a bit sequence indicating a control action on the data frames DFR_1 to DFR_n in the same manner as that in the transmitter 1101, and transmits them to the receiver 321.

The receiver 321 of the case 300 receives the radio frame from the smartphone 290. Then, based on the received radio wave, the receiver 321 detects the bit sequence in the manner described above, and, based on the detected bit sequence, turns on the LED which serves as the controlled element.

Thus, the user of the smartphone 290 can see that the LED is on to find out where the case 300, which is an object that he carries, is located.

If the receiver 321 controls a speaker, the receiver 321 controls the speaker to produce a sound. Thus, the user of the smartphone 290 can hear the sound produced by the speaker to find out where the case 320, which is an object that he carries, is located.

When the lock 310 is controlled, the smartphone 290 uses GPS, for example, to acquire a current position and a current time. Then, the smartphone 290 places a bit sequence indicating the current position and a bit sequence indicating the current time on the data frames DFR_1 to DFR_n in the same manner as that in the transmitter 1101 and transmits them to the receiver 311 of the lock 310.

The receiver 311 of the lock 310 receives the radio frame from the smartphone 290. Then, based on the received radio wave, the receiver 311 detects the current position and current time based on the bit sequence in the manner described above, and stores in the storage unit the detected current position and current time in an associated manner, and displays the current position and current time on the display device.

Thus, the user of the smartphone 290 can monitor the lock 310, which is an object that he carries.

Thus, Application Example 8 allows the smartphone 290 to control a "called object" or allows the smartphone 290 to control a "monitored object".

Alternatively, the control system 10I may include an object other than the lock 310 or case 320, as long as the object is an "object to be called" by the smartphone 290 or an "object to be monitored" by the smartphone 290.

In Embodiment 12, the operations of the transmitter 1101 and receiver 1102 may be carried out by a program. In such implementations, each of the transmitter 1101 and receiver 1102 includes a CPU, a ROM and a RAM. In the transmitter 101, the ROM stores a program U including steps S91 to S97 and S107 to S110 shown in FIG. 95, and the CPU reads the program U from the ROM and executes it. Thus, the operation of the transmitter 1101 is performed. In the receiver 1102, the ROM stores a program V including steps S98 to S106 and S111 shown in FIG. 95, and the CPU reads the program V from the ROM and executes it. Thus, the operation of the receiver 1102 is performed. Further, each of the ROMs of the transmitter 1101 and receiver 1102 corresponds to the storage medium storing a computer- (i.e. CPU-) readable program.

Otherwise, the description of Embodiment 12 is the same as those of Embodiments 1 to 11.

In the above description, the receivers 2, 102, 202, 302, 402, 502, 602, 702, 702A, 802, 902, 1002 and 1102 detect an envelope of a received radio wave of a radio frame; however, embodiments of the present invention are not limited to such implementations, and the receivers 2, 102, 202, 302, 402, 502, 602, 702, 702A, 802, 902, 1002 and 1102 may perform synchronous detection on a received radio wave of a radio frame or perform regenerative detection on a received radio wave of a radio frame, or, in generally, it is only required that they detect a received radio wave of a radio frame.

In Embodiments 1 to 12 described above, various transmitter and receivers are described. Thus, a transmitter according to an embodiment of the present invention may include: a generating circuitry that generates a first radio frame having a frame length representing header information for data to be transmitted and a second radio frame having a frame length representing the data to be transmitted; and a transmitting circuitry that transmits the first radio frame and the second radio frame one after another in accordance with a wireless communication scheme to transmit a radio frame when a wireless communication space is available and to wait to transmit a radio frame when the wireless communication space is not available.

Further, a receiver according to an embodiment of the present invention may include: a receiving circuitry that sequentially receives a first radio frame having a frame length representing header information for data to be transmitted and a second radio frame having a frame length representing the data to be transmitted; a first detecting circuitry that detects a beginning of the data to be transmitted based on a received radio wave of the first radio frame; a second detecting circuitry that, when the beginning of the data to be transmitted is detected, detects the frame length of the second radio frame based on a received radio wave of the second radio frame; and a decoding circuitry that decodes the detected frame length into a bit sequence representing the data to be transmitted.

Furthermore, a program for causing a computer to execute transmission of radio frames in a transmitter according to an embodiment of the present invention may include: a first step in which a generating circuitry generates a first radio frame having a frame length representing header information of data to be transmitted and a second radio frame having a frame length representing the data to be transmitted; and a second step in which a transmitting circuitry transmits the first radio frame and the second radio frame one after another in accordance with a wireless communication scheme to transmit a radio frame when a wireless communication space is available and to wait to transmit a radio frame when the wireless communication space is not available.

Moreover, a program for causing a computer to execute reception of radio frames in a receiver according to an embodiment of the present invention may include: a first step in which a receiving circuitry sequentially receives a first radio frame having a frame length representing header information of data to be transmitted and a second radio frame having a frame length representing the data to be transmitted; a second step in which a first detecting circuitry detects a beginning of the data to be transmitted based on a received radio wave of the first radio frame; a third step in which, when the beginning of the data to be transmitted is detected, a second detecting circuitry detects the frame length of the second radio frame based on a received radio wave of the second radio frame; and a fourth step in which a decoding circuitry decodes the detected frame length into a bit sequence representing the data to be transmitted.

It should be understood that the embodiments disclosed herein are exemplary in every respect and not limiting. It is contemplated that the scope of the present invention is defined by the Claims and not by the above description of the embodiments, and includes all modifications within the spirit and scope equivalent to those of the Claims.

INDUSTRIAL APPLICABILITY

The present invention is applied to a program executed in a transmitter, a receiver, and a program executed in a receiver.

The invention claimed is:
1. A receiver comprising:
a receiving circuitry sequentially receiving a first radio frame having a first frame length and a second radio frame having a second frame length, wherein the first frame length represents header information of data to be transmitted, and the second frame length represents the data to be transmitted;
a first detecting circuitry detecting a beginning of the data to be transmitted based on the first frame length of the first radio frame;
a second detecting circuitry detecting the second frame length of the second radio frame based on a received radio wave of the second radio frame when the beginning of the data to be transmitted is detected; and
a decoding circuitry decoding the detected second frame length into a bit sequence representing the data to be transmitted.
2. The receiver according to claim 1, wherein the receiving circuitry further receives a third radio frame having a third frame length, wherein the third frame length represents an end of the data to be transmitted, and
the first detecting circuitry further detects the end of the data to be transmitted based on a received radio wave of the third radio frame.
3. The receiver according to claim 1, wherein:
the second radio frame includes a plurality of second data frames having a plurality of second frame lengths, wherein the plurality of second frame lengths represents the data to be transmitted,
the second detecting circuitry detects the plurality of second frame lengths of the plurality of second data frames, and the decoding circuitry decodes the detected plurality of second frame lengths into a bit sequence representing the data to be transmitted.

4. The receiver according to claim 2, wherein at least one of the first and third radio frames include(s) a plurality of header frames having a plurality of header frame lengths,
if the first radio frame includes a plurality of first radio frames, the first detecting circuitry detects the beginning of the data to be transmitted by detecting all of the plurality of header frame lengths in the order in which the plurality of header frames were transmitted, and, if the third radio frame includes a plurality of third radio frames, detects the end of the data to be transmitted by detecting all of the plurality of header frame lengths in the order in which the plurality of end frames were transmitted.

5. The receiver according to claim 1, wherein:
the first radio frame includes a plurality of identifier frames having a plurality of identifier frame lengths, wherein the plurality of identifier frame lengths represents an identifier of a device to which transmission is directed,
the second detecting circuitry further detects the plurality of identifier frame lengths of the plurality of identifier frames based on a received radio wave of the plurality of identifier frames, and
the decoding circuitry further decodes the detected plurality of identifier frame lengths into a bit sequence representing the identifier of the device to which transmission is directed.

6. The receiver according to claim 1, further comprising:
a third detecting circuitry detecting at least one of a number of data frames constituting the second radio frame, error detection information for detecting an error and a number of transmissions of the data frames, wherein
the receiving circuitry further receives an auxiliary frame having an auxiliary frame length, wherein the auxiliary frame length represents at least one of the number of data frames, the error detection information, and the number of transmissions of the data frames,
the second detecting circuitry further detects the auxiliary frame length of the auxiliary frame based on a received radio wave of the auxiliary frame,
the third detecting circuitry detects at least one of the number of data frames, the error detection information and the number of transmissions of the data frames based on the detected auxiliary frame length of the auxiliary frame, and
the auxiliary frame includes at least one of a header frame, a delimiter frame, a verification frame and an end frame.

7. The receiver according to claim 1, wherein, if the second frame length of the second radio frame detected by the second detecting circuitry is within a range of frame lengths representing the data to be transmitted, the decoding circuitry decodes the detected second frame length into a bit sequence representing the data to be transmitted.

8. The receiver according to claim 1, wherein, when the second frame length of the second radio frame detected by the second detecting circuitry is not within a range of frame lengths representing the data to be transmitted, the decoding circuitry permits up to a permitted number of second frame lengths of the second radio frame that are not within the range of frame lengths representing the data to be transmitted to decode the detected second frame length into a bit sequence representing the data to be transmitted.

9. The receiver according to claim 1, wherein:
the second radio frame includes a plurality of second data frames,
the second detecting circuitry detects a plurality of second frame lengths based on a plurality of received radio waves of the plurality of second data frames, and further detects a plurality of received signal strengths based on the plurality of received radio waves, and
when a strength difference between received signal strengths being processed that are the second and subsequent received signal strengths in the plurality of received signal strengths and the received signal strengths before the received signal strengths being processed is smaller than a threshold, the decoding circuitry decodes the detected second frame length into a bit sequence representing the data to be transmitted.

10. The receiver according to claim 9, wherein, when the strength difference is not smaller than the threshold, the decoding circuitry permits up to a permitted number the number of data frames that received signal strengths with the strength difference not smaller than the threshold are detected, to decode the detected second frame length into a bit sequence representing the data to be transmitted.

11. A non-transitory computer-readable medium including a program for causing a computer to execute a method of receiving radio frames in a receiver, the method comprising:
a first step in which a receiving circuitry sequentially receives a first radio frame having a first frame length and a second radio frame having a second frame length, wherein the first frame length represents header information of data to be transmitted, and the second frame length represents the data to be transmitted;
a second step in which a first detecting circuitry detects a beginning of the data to be transmitted based on the first frame length of the first radio frame;
a third step in which, when the beginning of the data to be transmitted is detected, a second detecting circuitry detects the second frame length of the second radio frame based on a received radio wave of the second radio frame; and
a fourth step in which a decoding circuitry decodes the detected second frame length into a bit sequence representing the data to be transmitted.

12. The non-transitory computer-readable medium including the program according to claim 11, wherein, in the first step, the receiving circuitry further receives a third radio frame having a third frame length, wherein the third frame length represents an end of the data to be transmitted, and,
in the second step, the first detecting circuitry further detects the end of the data to be transmitted based on a received radio wave of the third radio frame.

13. The non-transitory computer-readable medium including the program according to claim 11, wherein:
the second radio frame includes a plurality of second data frames having a plurality of second frame lengths, wherein the plurality of second frame lengths represents the data to be transmitted,
in the third step, the second detecting circuitry detects the plurality of second frame lengths of the plurality of second data frames, and
in the fourth step, the decoding circuitry decodes the detected plurality of second frame lengths into a bit sequence representing the data to be transmitted.

14. The non-transitory computer-readable medium including the program according to claim 12, wherein at least one of the first and third radio frames includes a plurality of header frames having a plurality of header frame lengths, in the second step, if the first radio frame includes a plurality of first radio frames, the first detecting circuitry detects the beginning of the data to be transmitted by detecting all of the plurality of header frame lengths in the order in which the plurality of header frames were transmitted, and, if the third radio frame includes a plurality of third radio frames, detects the end of the data to be transmitted by detecting all of the plurality of header frame lengths in the order in which the plurality of end frames were transmitted.

15. The non-transitory computer-readable medium including the program according to claim 11, wherein:
the first radio frame includes a plurality of identifier frames having a plurality of identifier frame lengths representing an identifier of a device to which transmission is directed,
in the third step, the second detecting circuitry further detects the plurality of identifier frame lengths of the plurality of identifier frames based on a received radio wave of the plurality of identifier frames, and
the decoding circuitry further decodes the detected plurality of identifier frame lengths into a bit sequence representing the identifier of the device to which transmission is directed.

16. The non-transitory computer-readable medium including the program according to claim 11, the program further causing the computer to execute: a fifth step in which a third detecting circuitry detects at least one of a number of data frames constituting the second radio frame, error detection information for detecting an error and a number of transmissions of the data frames,
wherein, in the first step, the receiving circuitry further receives an auxiliary frame having an auxiliary frame length representing at least one of the number of data frames, the error detection information and the number of transmissions of the data frames,
in the third step, the second detecting circuitry further detects the auxiliary frame length of the auxiliary frame based on a received radio wave of the auxiliary frame,
in the fifth step, the third detecting circuitry detects at least one of the number of data frames, the error detection information and the number of transmissions of the data frames based on the detected auxiliary frame length of the auxiliary frame, and
the auxiliary frame includes at least one of a header frame, a delimiter frame, a verification frame and an end frame.

17. The non-transitory computer-readable medium including the program according to claim 11, wherein, in the fourth step, if the second frame length of the second radio frame detected by the second detecting circuitry is within a range of frame lengths representing the data to be transmitted, the decoding circuitry decodes the detected second frame length into a bit sequence representing the data to be transmitted.

18. The non-transitory computer-readable medium including the program according to claim 11, wherein, in the fourth step, when the second frame length of the second radio frame detected by the second detecting circuitry is not within a range of frame lengths representing the data to be transmitted, the decoding circuitry permits up to a permitted number the number of second frame lengths of the second radio frame that are not within the range of frame lengths representing the data to be transmitted to decode the detected second frame length into a bit sequence representing the data to be transmitted.

19. The non-transitory computer-readable medium including the program according to claim 11, wherein:
the second radio frame includes a plurality of second data frames,
in the third step, the second detecting circuitry detects a plurality of second frame lengths based on a plurality of received radio waves of the plurality of second data frames, and further detects a plurality of received signal strengths based on the plurality of received radio waves, and
when a strength difference between received signal strengths being processed that are the second and subsequent received signal strengths in the plurality of received signal strengths and the received signal strengths before the received signal strengths being processed is smaller than a threshold, the decoding circuitry decodes the detected second frame length into a bit sequence representing the data to be transmitted.

20. The non-transitory computer-readable medium including the program according to claim 19, wherein, in the fourth step, when the strength difference is not smaller than the threshold, the decoding circuitry permits up to a permitted number the number of data frames determined to have received signal strengths with a strength difference not smaller than the threshold to decode the detected second frame length into a bit sequence representing the data to be transmitted.

* * * * *